(12) United States Patent
Manzari et al.

(10) Patent No.: US 11,204,692 B2
(45) Date of Patent: Dec. 21, 2021

(54) USER INTERFACE CAMERA EFFECTS

(71) Applicant: Apple Inc., Cupertino, CA (US)

(72) Inventors: Behkish J. Manzari, San Francisco, CA (US); Marek Bereza, London (GB); Jeffrey A. Brasket, San Francisco, CA (US); Frederic Cao, Santa Clara, CA (US); Alan C. Dye, San Francisco, CA (US); Elliott Harris, San Francisco, CA (US); Cyrus Daniel Irani, Los Altos, CA (US); Jonathan P. Ive, San Jose, CA (US); Garrett Johnson, San Francisco, CA (US); Emilie Kim, San Francisco, CA (US); Joseph A. Malia, San Francisco, CA (US); Grant Paul, San Francisco, CA (US); Pavel Pivonka, Cupertino, CA (US); Billy Sorrentino, III, San Francisco, CA (US); Andre Souza Dos Santos, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/733,718

(22) Filed: Jan. 3, 2020

(65) Prior Publication Data
US 2020/0142577 A1 May 7, 2020

Related U.S. Application Data

(63) Continuation of application No. 15/728,147, filed on Oct. 9, 2017, now Pat. No. 10,528,243.
(Continued)

(51) Int. Cl.
*H04N 5/232* (2006.01)
*G06F 3/0484* (2013.01)
(Continued)

(52) U.S. Cl.
CPC ...... *G06F 3/04847* (2013.01); *G06F 3/04883* (2013.01); *H04N 5/23212* (2013.01);
(Continued)

(58) Field of Classification Search
CPC ............ G06F 3/04847; G06F 3/04883; G06F 3/04817; G06F 3/0482; H04N 5/232935;
(Continued)

(56) References Cited

U.S. PATENT DOCUMENTS 4,518,237 A  5/1985  Mizokami
4,933,702 A  6/1990  Komatsuzaki et al.
(Continued)

FOREIGN PATENT DOCUMENTS

AU   2013368443 B2   3/2016
AU   2017100683 B4   1/2018
(Continued)

OTHER PUBLICATIONS

Non-Final Office Action received for U.S. Appl. No. 16/528,941, dated Jan. 30, 2020, 14 pages.
(Continued)

*Primary Examiner* — Beau D Spratt
(74) *Attorney, Agent, or Firm* — Dentons US LLP

(57) ABSTRACT

The present disclosure generally relates to user interfaces. In some examples, the electronic device provides for transitioning between simulated lighting effects. In some examples, the electronic device applies a simulated lighting effect to an image. In some examples, the electronic device provides user interfaces for applying a filter to an image. In some examples, the electronic device provides for a reduced filter interface. In some examples, the electronic device provides a visual aid displayed in a viewfinder.

60 Claims, 120 Drawing Sheets

Related U.S. Application Data

(60) Provisional application No. 62/556,414, filed on Sep. 9, 2017, provisional application No. 62/514,947, filed on Jun. 4, 2017.

(51) Int. Cl.
*G06F 3/0488* (2013.01)
*H04N 5/247* (2006.01)
*G06F 3/0482* (2013.01)
*G06F 3/0481* (2013.01)

(52) U.S. Cl.
CPC ..... *H04N 5/23216* (2013.01); *H04N 5/23219* (2013.01); *H04N 5/23222* (2013.01); *H04N 5/23241* (2013.01); *H04N 5/23245* (2013.01); *H04N 5/23293* (2013.01); *H04N 5/23296* (2013.01); *H04N 5/232411* (2018.08); *H04N 5/232935* (2018.08); *H04N 5/247* (2013.01); *G06F 3/0482* (2013.01); *G06F 3/04817* (2013.01)

(58) Field of Classification Search
CPC ......... H04N 5/232411; H04N 5/232212; H04N 5/23216; H04N 5/23219; H04N 5/23222; H04N 5/23241; H04N 5/23245; H04N 5/23293; H04N 5/23296; H04N 5/247
See application file for complete search history.

(56) References Cited

U.S. PATENT DOCUMENTS

| | | |
|---|---|---|
| 5,463,443 A | 10/1995 | Tanaka et al. |
| 5,557,358 A | 9/1996 | Mukai et al. |
| 5,615,384 A | 3/1997 | Allard et al. |
| 6,262,769 B1 | 7/2001 | Anderson et al. |
| 6,268,864 B1 | 7/2001 | Chen et al. |
| 6,278,466 B1 | 8/2001 | Chen |
| 6,621,524 B1 | 9/2003 | Iijima et al. |
| 6,677,981 B1 | 1/2004 | Mancuso et al. |
| 6,900,840 B1 | 5/2005 | Schinner et al. |
| 7,515,178 B1 | 4/2009 | Fleischman et al. |
| 8,185,839 B2 | 5/2012 | Jalon et al. |
| 8,295,546 B2 | 10/2012 | Craig et al. |
| 8,405,680 B1 | 3/2013 | Cardoso Lopes et al. |
| 8,423,089 B2 | 4/2013 | Song et al. |
| 8,493,408 B2 | 7/2013 | Williamson et al. |
| 8,638,371 B2 | 1/2014 | Laberge et al. |
| 8,723,988 B2 | 5/2014 | Thorn |
| 8,736,704 B2 | 5/2014 | Jasinski et al. |
| 8,736,716 B2 | 5/2014 | Prentice |
| 8,885,978 B2 | 11/2014 | Cote et al. |
| 8,896,652 B2 | 11/2014 | Ralston |
| 9,001,226 B1 | 4/2015 | Ng et al. |
| 9,094,576 B1 | 7/2015 | Karakotsios |
| 9,153,031 B2 | 10/2015 | El-Saban et al. |
| 9,185,291 B1 | 11/2015 | Shabtay et al. |
| 9,207,837 B2 | 12/2015 | Paretti et al. |
| 9,223,486 B2 | 12/2015 | Shin et al. |
| 9,230,241 B1 | 1/2016 | Singh et al. |
| 9,230,355 B1 | 1/2016 | Ahuja et al. |
| 9,245,177 B2 | 1/2016 | Perez |
| 9,246,961 B2 | 1/2016 | Walkin et al. |
| 9,250,797 B2 | 2/2016 | Roberts et al. |
| 9,264,660 B1 | 2/2016 | Petterson et al. |
| 9,288,476 B2 | 3/2016 | Sandrew et al. |
| 9,298,263 B2 | 3/2016 | Geisner et al. |
| 9,313,397 B2 | 4/2016 | Harris et al. |
| 9,313,401 B2 | 4/2016 | Frey et al. |
| 9,342,230 B2 | 5/2016 | Bastien et al. |
| 9,349,414 B1 | 5/2016 | Furment et al. |
| 9,360,671 B1 | 6/2016 | Zhou |
| 9,448,708 B1 | 9/2016 | Bennett et al. |
| 9,467,812 B2 | 10/2016 | Jung et al. |
| 9,538,152 B2 | 1/2017 | Shabtay et al. |
| 9,544,563 B1 | 1/2017 | Cheng et al. |
| 9,602,559 B1 | 3/2017 | Barros et al. |
| 9,609,221 B2 | 3/2017 | Kim et al. |
| 9,628,416 B2 | 4/2017 | Henderson |
| 9,667,881 B2 | 5/2017 | Harris et al. |
| 9,686,497 B1 | 6/2017 | Terry |
| 9,704,250 B1 | 7/2017 | Shah et al. |
| 9,716,825 B1 | 7/2017 | Manzari et al. |
| 9,767,613 B1 | 9/2017 | Bedikian et al. |
| 9,948,589 B2 | 4/2018 | Gonnen et al. |
| 10,021,294 B2 | 7/2018 | Kwon et al. |
| 10,055,887 B1 | 8/2018 | Gil et al. |
| 10,095,385 B2 | 10/2018 | Walkin et al. |
| 10,152,222 B2 | 12/2018 | Ozawa et al. |
| 10,176,622 B1 | 1/2019 | Waggoner et al. |
| 10,187,587 B2 | 1/2019 | Hasinoff et al. |
| 10,225,463 B2 | 3/2019 | Yun et al. |
| 10,230,901 B2 | 3/2019 | Harris et al. |
| 10,270,983 B1 | 4/2019 | Van Os et al. |
| 10,289,265 B2 | 5/2019 | Kulkarni |
| 10,297,034 B2 | 5/2019 | Nash et al. |
| 10,304,231 B2 | 5/2019 | Saito |
| 10,313,652 B1 | 6/2019 | Falstrup et al. |
| 10,326,942 B2 | 6/2019 | Shabtay et al. |
| 10,375,313 B1 | 8/2019 | Van Os et al. |
| 10,379,719 B2 | 8/2019 | Scapel et al. |
| 10,397,500 B1 | 8/2019 | Xu et al. |
| 10,447,908 B2 | 10/2019 | Lee et al. |
| 10,467,729 B1 | 11/2019 | Perera et al. |
| 10,467,775 B1 | 11/2019 | Waggoner et al. |
| 10,521,091 B2 | 12/2019 | Anzures et al. |
| 10,521,948 B2 | 12/2019 | Rickwald et al. |
| 10,523,879 B2 | 12/2019 | Dye et al. |
| 10,574,895 B2 | 2/2020 | Lee et al. |
| 10,585,551 B2 | 3/2020 | Lee et al. |
| 10,614,139 B2 | 4/2020 | Fujioka et al. |
| 10,645,294 B1 | 5/2020 | Manzari et al. |
| 10,652,470 B1 | 5/2020 | Manzari et al. |
| 10,657,695 B2 | 5/2020 | Chand et al. |
| 10,659,405 B1 | 5/2020 | Chang et al. |
| 10,674,072 B1 | 6/2020 | Manzari et al. |
| 10,681,282 B1 | 6/2020 | Manzari et al. |
| 10,698,575 B2 | 6/2020 | Walkin et al. |
| 10,798,035 B2 | 10/2020 | Lewis et al. |
| 10,845,968 B2 | 11/2020 | Scapel et al. |
| 10,902,661 B1 | 1/2021 | Mourkogiannis et al. |
| 11,039,074 B1 | 6/2021 | Manzari et al. |
| 2003/0075409 A1 | 4/2003 | Bauer et al. |
| 2003/0107664 A1 | 6/2003 | Suzuki |
| 2003/0122930 A1 | 7/2003 | Schofield et al. |
| 2003/0174216 A1 | 9/2003 | Iguchi et al. |
| 2004/0041924 A1 | 3/2004 | White et al. |
| 2004/0061796 A1 | 4/2004 | Honda et al. |
| 2004/0201699 A1 | 10/2004 | Parulski et al. |
| 2005/0189419 A1 | 9/2005 | Igarashi et al. |
| 2005/0248660 A1 | 11/2005 | Stavely et al. |
| 2005/0270397 A1 | 12/2005 | Battles |
| 2006/0132482 A1 | 6/2006 | Oh et al. |
| 2006/0158730 A1 | 7/2006 | Kira |
| 2006/0187322 A1 | 8/2006 | Janson et al. |
| 2006/0209067 A1 | 9/2006 | Pellacini et al. |
| 2006/0228040 A1 | 10/2006 | Simon et al. |
| 2007/0024614 A1 | 2/2007 | Tam et al. |
| 2007/0025723 A1 | 2/2007 | Baudisch et al. |
| 2007/0031062 A1 | 2/2007 | Pal et al. |
| 2007/0097088 A1 | 5/2007 | Battles |
| 2007/0113099 A1 | 5/2007 | Takikawa et al. |
| 2007/0140675 A1 | 6/2007 | Yanagi |
| 2007/0228259 A1 | 10/2007 | Hohenberger |
| 2007/0257992 A1 | 11/2007 | Kato |
| 2007/0273769 A1 | 11/2007 | Takahashi |
| 2007/0291152 A1 | 12/2007 | Suekane et al. |
| 2008/0030592 A1 | 2/2008 | Border et al. |
| 2008/0084484 A1 | 4/2008 | Ochi et al. |
| 2008/0106601 A1 | 5/2008 | Matsuda |
| 2008/0129759 A1 | 6/2008 | Jeon et al. |
| 2008/0129825 A1 | 6/2008 | Deangelis et al. |
| 2008/0143840 A1 | 6/2008 | Corkum et al. |
| 2008/0192020 A1 | 8/2008 | Kang et al. |

(56) References Cited

U.S. PATENT DOCUMENTS

| | | |
|---|---|---|
| 2008/0218611 A1 | 9/2008 | Parulski et al. |
| 2008/0222558 A1 | 9/2008 | Cho et al. |
| 2008/0298571 A1 | 12/2008 | Kurtz et al. |
| 2009/0021576 A1 | 1/2009 | Linder et al. |
| 2009/0021600 A1 | 1/2009 | Watanabe |
| 2009/0022422 A1 | 1/2009 | Sorek et al. |
| 2009/0027515 A1 | 1/2009 | Maruyama et al. |
| 2009/0027539 A1 | 1/2009 | Kunou |
| 2009/0040332 A1 | 2/2009 | Yoshino et al. |
| 2009/0051783 A1 | 2/2009 | Kim et al. |
| 2009/0066817 A1 | 3/2009 | Sakamaki |
| 2009/0073285 A1 | 3/2009 | Terashima |
| 2009/0144639 A1 | 6/2009 | Nims et al. |
| 2009/0167671 A1 | 7/2009 | Kerofsky |
| 2009/0167672 A1 | 7/2009 | Kerofsky |
| 2009/0244318 A1 | 10/2009 | Makii |
| 2009/0251484 A1 | 10/2009 | Zhao et al. |
| 2010/0020221 A1 | 1/2010 | Tupman et al. |
| 2010/0020222 A1 | 1/2010 | Jones et al. |
| 2010/0033615 A1 | 2/2010 | Mori |
| 2010/0039522 A1 | 2/2010 | Huang |
| 2010/0093400 A1* | 4/2010 | Ju ................... G06F 3/04817 455/566 |
| 2010/0123737 A1 | 5/2010 | Williamson et al. |
| 2010/0124941 A1 | 5/2010 | Cho |
| 2010/0153847 A1 | 6/2010 | Fama |
| 2010/0164893 A1 | 7/2010 | Shin et al. |
| 2010/0188426 A1 | 7/2010 | Ohmori et al. |
| 2010/0194931 A1 | 8/2010 | Kawaguchi et al. |
| 2010/0208122 A1 | 8/2010 | Yumiki |
| 2010/0231777 A1 | 9/2010 | Shintani et al. |
| 2010/0232703 A1 | 9/2010 | Aiso |
| 2010/0238327 A1 | 9/2010 | Griffith et al. |
| 2010/0259645 A1 | 10/2010 | Kaplan et al. |
| 2010/0277470 A1 | 11/2010 | Margolis |
| 2010/0283743 A1 | 11/2010 | Coddington |
| 2010/0289825 A1 | 11/2010 | Shin et al. |
| 2010/0302280 A1 | 12/2010 | Szeliski et al. |
| 2010/0317410 A1 | 12/2010 | Song et al. |
| 2011/0008033 A1 | 1/2011 | Ichimiya |
| 2011/0013049 A1 | 1/2011 | Thörn |
| 2011/0018970 A1 | 1/2011 | Wakabayashi |
| 2011/0019058 A1 | 1/2011 | Sakai et al. |
| 2011/0072394 A1 | 3/2011 | Victor |
| 2011/0074710 A1 | 3/2011 | Weeldreyer et al. |
| 2011/0074830 A1 | 3/2011 | Rapp et al. |
| 2011/0109581 A1 | 5/2011 | Ozawa et al. |
| 2011/0138332 A1 | 6/2011 | Miyagawa |
| 2011/0157379 A1 | 6/2011 | Kimura |
| 2011/0187879 A1 | 8/2011 | Ochiai |
| 2011/0199495 A1 | 8/2011 | Laberge et al. |
| 2011/0221755 A1 | 9/2011 | Geisner et al. |
| 2011/0242369 A1 | 10/2011 | Misawa et al. |
| 2011/0249073 A1 | 10/2011 | Cranfill et al. |
| 2011/0249078 A1 | 10/2011 | Abuan et al. |
| 2011/0296163 A1 | 12/2011 | Abernethy et al. |
| 2011/0304632 A1 | 12/2011 | Evertt et al. |
| 2012/0002898 A1 | 1/2012 | Cote et al. |
| 2012/0026378 A1 | 2/2012 | Pang et al. |
| 2012/0056997 A1 | 3/2012 | Jang |
| 2012/0069028 A1 | 3/2012 | Bouguerra |
| 2012/0127346 A1 | 5/2012 | Sato et al. |
| 2012/0133797 A1 | 5/2012 | Sato et al. |
| 2012/0162242 A1 | 6/2012 | Amano et al. |
| 2012/0169776 A1 | 7/2012 | Rissa et al. |
| 2012/0188394 A1 | 7/2012 | Park et al. |
| 2012/0194559 A1 | 8/2012 | Lim |
| 2012/0206452 A1 | 8/2012 | Geisner et al. |
| 2012/0235990 A1 | 9/2012 | Yamaji |
| 2012/0243802 A1 | 9/2012 | Fintel et al. |
| 2012/0293611 A1 | 11/2012 | Lee |
| 2012/0309520 A1 | 12/2012 | Evertt et al. |
| 2013/0038546 A1 | 2/2013 | Mineo |
| 2013/0055119 A1 | 2/2013 | Luong |
| 2013/0076908 A1 | 3/2013 | Bratton et al. |
| 2013/0083222 A1 | 4/2013 | Matsuzawa et al. |
| 2013/0088413 A1 | 4/2013 | Raffle et al. |
| 2013/0101164 A1 | 4/2013 | Leclerc et al. |
| 2013/0135315 A1 | 5/2013 | Bares et al. |
| 2013/0141362 A1 | 6/2013 | Asanuma et al. |
| 2013/0141513 A1 | 6/2013 | Setton et al. |
| 2013/0147933 A1 | 6/2013 | Kulas et al. |
| 2013/0155308 A1 | 6/2013 | Wu et al. |
| 2013/0159900 A1 | 6/2013 | Pendharkar |
| 2013/0165186 A1 | 6/2013 | Choi |
| 2013/0179831 A1 | 7/2013 | Izaki |
| 2013/0194378 A1 | 8/2013 | Brown |
| 2013/0201104 A1 | 8/2013 | Ptucha et al. |
| 2013/0210563 A1 | 8/2013 | Hollinger |
| 2013/0222663 A1 | 8/2013 | Rydenhag et al. |
| 2013/0239057 A1 | 9/2013 | Ubillos et al. |
| 2013/0246948 A1 | 9/2013 | Chen et al. |
| 2013/0265467 A1 | 10/2013 | Matsuzawa et al. |
| 2013/0290905 A1 | 10/2013 | Luvogt et al. |
| 2013/0346916 A1 | 12/2013 | Williamson et al. |
| 2014/0022399 A1 | 1/2014 | Rashid et al. |
| 2014/0028872 A1 | 1/2014 | Lee et al. |
| 2014/0028885 A1 | 1/2014 | Ma et al. |
| 2014/0033043 A1 | 1/2014 | Kashima |
| 2014/0033100 A1 | 1/2014 | Noda et al. |
| 2014/0037178 A1 | 2/2014 | Park |
| 2014/0043368 A1 | 2/2014 | Yu |
| 2014/0043517 A1 | 2/2014 | Yim et al. |
| 2014/0047389 A1* | 2/2014 | Aarabi ............... G06F 3/04817 715/834 |
| 2014/0049536 A1 | 2/2014 | Neuman et al. |
| 2014/0055554 A1 | 2/2014 | Du et al. |
| 2014/0063175 A1 | 3/2014 | Jafry et al. |
| 2014/0063313 A1* | 3/2014 | Choi .................. H04N 5/23293 348/333.02 |
| 2014/0071061 A1* | 3/2014 | Lin ..................... G06F 3/04883 345/173 |
| 2014/0071325 A1 | 3/2014 | Kawahara et al. |
| 2014/0092272 A1 | 4/2014 | Choi |
| 2014/0095122 A1 | 4/2014 | Appleman et al. |
| 2014/0118563 A1 | 5/2014 | Mehta et al. |
| 2014/0132735 A1 | 5/2014 | Lee et al. |
| 2014/0152886 A1 | 6/2014 | Morgan-mar et al. |
| 2014/0176469 A1 | 6/2014 | Lim |
| 2014/0176565 A1 | 6/2014 | Adeyoola et al. |
| 2014/0192233 A1 | 7/2014 | Kakkori et al. |
| 2014/0218371 A1 | 8/2014 | Du et al. |
| 2014/0232838 A1 | 8/2014 | Jorgensen et al. |
| 2014/0240471 A1 | 8/2014 | Srinivasa et al. |
| 2014/0240531 A1 | 8/2014 | Nakai et al. |
| 2014/0267126 A1 | 9/2014 | Berg et al. |
| 2014/0267867 A1* | 9/2014 | Lee .................... H04N 9/045 348/333.01 |
| 2014/0282223 A1 | 9/2014 | Bastien et al. |
| 2014/0285698 A1 | 9/2014 | Geiss |
| 2014/0300635 A1 | 10/2014 | Suzuki |
| 2014/0327639 A1 | 11/2014 | Papakipos et al. |
| 2014/0333671 A1 | 11/2014 | Phang et al. |
| 2014/0351753 A1 | 11/2014 | Shin et al. |
| 2014/0359438 A1 | 12/2014 | Matsuki |
| 2014/0362091 A1 | 12/2014 | Bouaziz et al. |
| 2014/0362274 A1 | 12/2014 | Christie et al. |
| 2014/0368601 A1 | 12/2014 | Decharms |
| 2014/0368719 A1 | 12/2014 | Kaneko et al. |
| 2014/0372856 A1 | 12/2014 | Radakovitz et al. |
| 2015/0033192 A1 | 1/2015 | Bohannon et al. |
| 2015/0035825 A1 | 2/2015 | Zhou et al. |
| 2015/0042852 A1 | 2/2015 | Lee et al. |
| 2015/0043806 A1 | 2/2015 | Karsch et al. |
| 2015/0058754 A1 | 2/2015 | Rauh |
| 2015/0067513 A1 | 3/2015 | Zambetti et al. |
| 2015/0070362 A1 | 3/2015 | Hirai |
| 2015/0078621 A1 | 3/2015 | Choi et al. |
| 2015/0085174 A1 | 3/2015 | Shabtay et al. |
| 2015/0092077 A1 | 4/2015 | Feder et al. |
| 2015/0109417 A1 | 4/2015 | Zirnheld |
| 2015/0116353 A1 | 4/2015 | Miura et al. |
| 2015/0116448 A1 | 4/2015 | Gottlieb |
| 2015/0135109 A1 | 5/2015 | Zambetti et al. |

(56) References Cited

U.S. PATENT DOCUMENTS

| | | |
|---|---|---|
| 2015/0135234 A1 | 5/2015 | Hall |
| 2015/0138079 A1 | 5/2015 | Lannsjo |
| 2015/0145950 A1 | 5/2015 | Murphy et al. |
| 2015/0146079 A1 | 5/2015 | Kim |
| 2015/0149927 A1 | 5/2015 | Walkin et al. |
| 2015/0150141 A1 | 5/2015 | Szymanski et al. |
| 2015/0154448 A1 | 6/2015 | Murayama et al. |
| 2015/0172534 A1* | 6/2015 | Miyakawa ......... H04N 5/23229 348/222.1 |
| 2015/0181135 A1 | 6/2015 | Shimosato |
| 2015/0189138 A1 | 7/2015 | Xie et al. |
| 2015/0194186 A1 | 7/2015 | Lee et al. |
| 2015/0208001 A1 | 7/2015 | Kaneko et al. |
| 2015/0212723 A1 | 7/2015 | Lim et al. |
| 2015/0220249 A1 | 8/2015 | Snibbe et al. |
| 2015/0248198 A1 | 9/2015 | Somlai-fisher et al. |
| 2015/0248583 A1 | 9/2015 | Sugita et al. |
| 2015/0249775 A1 | 9/2015 | Jacumet |
| 2015/0249785 A1 | 9/2015 | Mehta et al. |
| 2015/0254855 A1 | 9/2015 | Patankar et al. |
| 2015/0256749 A1 | 9/2015 | Frey et al. |
| 2015/0277686 A1 | 10/2015 | Laforge et al. |
| 2015/0286724 A1 | 10/2015 | Knaapen et al. |
| 2015/0289104 A1 | 10/2015 | Jung et al. |
| 2015/0301731 A1 | 10/2015 | Okamoto et al. |
| 2015/0310583 A1 | 10/2015 | Hume et al. |
| 2015/0312182 A1 | 10/2015 | Langholz |
| 2015/0312184 A1 | 10/2015 | Langholz et al. |
| 2015/0312185 A1 | 10/2015 | Langholz et al. |
| 2015/0334075 A1 | 11/2015 | Wang et al. |
| 2015/0334291 A1 | 11/2015 | Cho et al. |
| 2015/0341536 A1 | 11/2015 | Huang et al. |
| 2015/0350141 A1 | 12/2015 | Yang et al. |
| 2015/0350533 A1 | 12/2015 | Harris et al. |
| 2015/0362998 A1 | 12/2015 | Park et al. |
| 2015/0370458 A1 | 12/2015 | Chen |
| 2016/0012567 A1 | 1/2016 | Siddiqui et al. |
| 2016/0026371 A1* | 1/2016 | Lu ..................... G06F 3/04886 715/765 |
| 2016/0044236 A1 | 2/2016 | Matsuzawa et al. |
| 2016/0048598 A1 | 2/2016 | Fujioka et al. |
| 2016/0048599 A1 | 2/2016 | Fujioka et al. |
| 2016/0048725 A1 | 2/2016 | Holz et al. |
| 2016/0048903 A1 | 2/2016 | Fujioka et al. |
| 2016/0050169 A1 | 2/2016 | Ben Atar et al. |
| 2016/0050351 A1 | 2/2016 | Lee et al. |
| 2016/0050446 A1 | 2/2016 | Fujioka et al. |
| 2016/0065832 A1 | 3/2016 | Kim et al. |
| 2016/0065861 A1* | 3/2016 | Steinberg ................ G06T 11/60 348/239 |
| 2016/0077725 A1 | 3/2016 | Maeda |
| 2016/0080639 A1 | 3/2016 | Choi et al. |
| 2016/0088280 A1 | 3/2016 | Sadi et al. |
| 2016/0092035 A1 | 3/2016 | Crocker et al. |
| 2016/0117829 A1* | 4/2016 | Yoon .................... H04N 5/2258 348/222.1 |
| 2016/0127636 A1 | 5/2016 | Ito et al. |
| 2016/0132200 A1 | 5/2016 | Walkin et al. |
| 2016/0132201 A1 | 5/2016 | Shaw et al. |
| 2016/0142649 A1 | 5/2016 | Yim |
| 2016/0148384 A1 | 5/2016 | Bud et al. |
| 2016/0162039 A1 | 6/2016 | Eilat et al. |
| 2016/0163084 A1 | 6/2016 | Corazza et al. |
| 2016/0173869 A1 | 6/2016 | Wang et al. |
| 2016/0188181 A1 | 6/2016 | Smith |
| 2016/0212319 A1 | 7/2016 | Harris et al. |
| 2016/0217601 A1 | 7/2016 | Tsuda et al. |
| 2016/0219217 A1 | 7/2016 | Williams et al. |
| 2016/0225175 A1 | 8/2016 | Kim et al. |
| 2016/0226926 A1 | 8/2016 | Singh et al. |
| 2016/0227016 A1 | 8/2016 | Kim et al. |
| 2016/0247309 A1 | 8/2016 | Li et al. |
| 2016/0255268 A1 | 9/2016 | Kang et al. |
| 2016/0259413 A1 | 9/2016 | Anzures et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0267067 A1 | 9/2016 | Mays et al. |
| 2016/0283097 A1 | 9/2016 | Voss |
| 2016/0284123 A1 | 9/2016 | Hare et al. |
| 2016/0307324 A1 | 10/2016 | Nakada et al. |
| 2016/0337570 A1 | 11/2016 | Tan et al. |
| 2016/0337582 A1 | 11/2016 | Shimauchi et al. |
| 2016/0353030 A1 | 12/2016 | Gao et al. |
| 2016/0357353 A1 | 12/2016 | Miura et al. |
| 2016/0357387 A1 | 12/2016 | Penha et al. |
| 2016/0360097 A1 | 12/2016 | Penha et al. |
| 2016/0360116 A1 | 12/2016 | Penha et al. |
| 2016/0366323 A1 | 12/2016 | Chan et al. |
| 2016/0366344 A1 | 12/2016 | Pan et al. |
| 2016/0370974 A1 | 12/2016 | Stenneth |
| 2016/0373650 A1 | 12/2016 | Kim et al. |
| 2017/0011773 A1 | 1/2017 | Lee |
| 2017/0013179 A1 | 1/2017 | Kang et al. |
| 2017/0018289 A1 | 1/2017 | Morgenstern |
| 2017/0019604 A1 | 1/2017 | Kim et al. |
| 2017/0024872 A1 | 1/2017 | Olsson et al. |
| 2017/0034449 A1 | 2/2017 | Eum et al. |
| 2017/0039686 A1 | 2/2017 | Miura et al. |
| 2017/0041677 A1 | 2/2017 | Anderson et al. |
| 2017/0046065 A1 | 2/2017 | Zeng et al. |
| 2017/0048450 A1 | 2/2017 | Lee et al. |
| 2017/0048461 A1 | 2/2017 | Lee et al. |
| 2017/0048494 A1 | 2/2017 | Boyle et al. |
| 2017/0061635 A1 | 3/2017 | Oberheu et al. |
| 2017/0094019 A1 | 3/2017 | Ahmed et al. |
| 2017/0109912 A1 | 4/2017 | Lee et al. |
| 2017/0111567 A1 | 4/2017 | Pila |
| 2017/0111616 A1 | 4/2017 | Li et al. |
| 2017/0178287 A1 | 6/2017 | Anderson |
| 2017/0186162 A1 | 6/2017 | Mihic et al. |
| 2017/0220212 A1 | 8/2017 | Yang et al. |
| 2017/0230576 A1 | 8/2017 | Sparks et al. |
| 2017/0230585 A1 | 8/2017 | Nash et al. |
| 2017/0237888 A1 | 8/2017 | Harris et al. |
| 2017/0243389 A1 | 8/2017 | Wild et al. |
| 2017/0244896 A1 | 8/2017 | Chien et al. |
| 2017/0244897 A1 | 8/2017 | Jung et al. |
| 2017/0257596 A1 | 9/2017 | Murata et al. |
| 2017/0264817 A1 | 9/2017 | Yan et al. |
| 2017/0272654 A1* | 9/2017 | Poindexter, Jr. ... H04N 5/23216 |
| 2017/0285764 A1 | 10/2017 | Kim et al. |
| 2017/0287220 A1 | 10/2017 | Khalid et al. |
| 2017/0302840 A1 | 10/2017 | Hasinoff et al. |
| 2017/0315772 A1 | 11/2017 | Lee et al. |
| 2017/0324784 A1 | 11/2017 | Taine et al. |
| 2017/0336926 A1 | 11/2017 | Chaudhri et al. |
| 2017/0336928 A1 | 11/2017 | Chaudhri et al. |
| 2017/0336961 A1 | 11/2017 | Heo et al. |
| 2017/0352379 A1* | 12/2017 | Oh ......................... G11B 27/11 |
| 2017/0354888 A1 | 12/2017 | Benedetto et al. |
| 2017/0359504 A1 | 12/2017 | Manzari et al. |
| 2017/0359505 A1 | 12/2017 | Manzari et al. |
| 2017/0359506 A1 | 12/2017 | Manzari et al. |
| 2017/0366729 A1 | 12/2017 | Itoh |
| 2018/0007315 A1 | 1/2018 | Kim et al. |
| 2018/0021684 A1 | 1/2018 | Benedetto |
| 2018/0035031 A1* | 2/2018 | Kwak .................... H04N 5/2254 |
| 2018/0047200 A1 | 2/2018 | O'hara et al. |
| 2018/0077332 A1 | 3/2018 | Shimura et al. |
| 2018/0091728 A1 | 3/2018 | Brown et al. |
| 2018/0091732 A1 | 3/2018 | Wilson et al. |
| 2018/0095649 A1 | 4/2018 | Valdivia et al. |
| 2018/0096487 A1 | 4/2018 | Nash et al. |
| 2018/0109722 A1 | 4/2018 | Laroia et al. |
| 2018/0113577 A1 | 4/2018 | Burns et al. |
| 2018/0114543 A1 | 4/2018 | Novikoff |
| 2018/0120661 A1 | 5/2018 | Kilgore et al. |
| 2018/0124299 A1 | 5/2018 | Brook |
| 2018/0129224 A1 | 5/2018 | Hur |

(56) References Cited

U.S. PATENT DOCUMENTS

| | | |
|---|---|---|
| 2018/0131878 A1 | 5/2018 | Charlton et al. |
| 2018/0146132 A1 | 5/2018 | Manzari et al. |
| 2018/0152611 A1 | 5/2018 | Li et al. |
| 2018/0184061 A1 | 6/2018 | Kitsunai et al. |
| 2018/0191944 A1 | 7/2018 | Carbonell et al. |
| 2018/0199025 A1 | 7/2018 | Holzer et al. |
| 2018/0227479 A1 | 8/2018 | Parameswaran et al. |
| 2018/0227482 A1 | 8/2018 | Holzer et al. |
| 2018/0227505 A1 | 8/2018 | Baltz et al. |
| 2018/0234608 A1 | 8/2018 | Sudo et al. |
| 2018/0267703 A1 | 9/2018 | Kamimaru et al. |
| 2018/0270420 A1 | 9/2018 | Lee et al. |
| 2018/0278823 A1 | 9/2018 | Horesh |
| 2018/0284979 A1 | 10/2018 | Choi et al. |
| 2018/0288310 A1 | 10/2018 | Goldenberg |
| 2018/0302551 A1 | 10/2018 | Yamajo et al. |
| 2018/0302568 A1 | 10/2018 | Kim et al. |
| 2018/0308282 A1 | 10/2018 | Yokoi |
| 2018/0335927 A1 | 11/2018 | Anzures et al. |
| 2018/0335929 A1 | 11/2018 | Scapel et al. |
| 2018/0335930 A1 | 11/2018 | Scapel et al. |
| 2018/0336715 A1 | 11/2018 | Rickwald et al. |
| 2018/0349008 A1 | 12/2018 | Manzari et al. |
| 2018/0352165 A1 | 12/2018 | Zhen et al. |
| 2018/0376122 A1 | 12/2018 | Park et al. |
| 2019/0028650 A1 | 1/2019 | Bernstein et al. |
| 2019/0029513 A1 | 1/2019 | Gunnerson et al. |
| 2019/0051032 A1 | 2/2019 | Chu et al. |
| 2019/0082097 A1 | 3/2019 | Manzari et al. |
| 2019/0089873 A1 | 3/2019 | Misawa et al. |
| 2019/0114740 A1 | 4/2019 | Ogino et al. |
| 2019/0121216 A1 | 4/2019 | Shabtay et al. |
| 2019/0149706 A1 | 5/2019 | Rivard et al. |
| 2019/0174054 A1 | 6/2019 | Srivastava et al. |
| 2019/0199926 A1 | 6/2019 | An et al. |
| 2019/0205861 A1 | 7/2019 | Bace |
| 2019/0206031 A1 | 7/2019 | Kim et al. |
| 2019/0235743 A1 | 8/2019 | Ono |
| 2019/0289201 A1 | 9/2019 | Nishimura et al. |
| 2019/0318538 A1 | 10/2019 | Li et al. |
| 2019/0342507 A1 | 11/2019 | Dye et al. |
| 2019/0379837 A1 | 12/2019 | Kim et al. |
| 2020/0045245 A1 | 2/2020 | Van Os et al. |
| 2020/0059605 A1 | 2/2020 | Liu et al. |
| 2020/0068121 A1 | 2/2020 | Wang |
| 2020/0082599 A1 | 3/2020 | Manzari |
| 2020/0105003 A1 | 4/2020 | Stauber et al. |
| 2020/0106952 A1 | 4/2020 | Missig et al. |
| 2020/0128191 A1 | 4/2020 | Sun et al. |
| 2020/0204725 A1 | 6/2020 | Li |
| 2020/0221020 A1 | 7/2020 | Manzari et al. |
| 2020/0234508 A1 | 7/2020 | Shaburov et al. |
| 2020/0236278 A1 | 7/2020 | Yeung et al. |
| 2020/0244879 A1 | 7/2020 | Hohjoh |
| 2020/0285806 A1 | 9/2020 | Radakovitz et al. |
| 2020/0285851 A1 | 9/2020 | Lin et al. |
| 2020/0336660 A1 | 10/2020 | Dong et al. |
| 2020/0358963 A1 | 11/2020 | Manzari et al. |
| 2020/0380768 A1 | 12/2020 | Harris et al. |
| 2020/0380781 A1 | 12/2020 | Barlier et al. |
| 2020/0410763 A1 | 12/2020 | Hare et al. |
| 2020/0412975 A1 | 12/2020 | Al Majid et al. |
| 2021/0005003 A1 | 1/2021 | Chong et al. |
| 2021/0058351 A1 | 2/2021 | Viklund et al. |
| 2021/0065448 A1 | 3/2021 | Goodrich et al. |
| 2021/0065454 A1 | 3/2021 | Goodrich et al. |
| 2021/0096703 A1 | 4/2021 | Anzures et al. |
| 2021/0099568 A1 | 4/2021 | DePue et al. |
| 2021/0099761 A1 | 4/2021 | Zhang |
| 2021/0146838 A1 | 5/2021 | Goseberg et al. |
| 2021/0152505 A1 | 5/2021 | Baldwin et al. |
| 2021/0168108 A1 | 6/2021 | Antmen et al. |
| 2021/0195093 A1 | 6/2021 | Manzari et al. |
| 2021/0264656 A1 | 8/2021 | Barlier et al. |

FOREIGN PATENT DOCUMENTS

| | | |
|---|---|---|
| AU | 2015297035 B2 | 6/2018 |
| CA | 2729392 A1 | 8/2011 |
| CA | 2965700 A1 | 5/2016 |
| CA | 2729392 C | 5/2017 |
| CN | 1437365 A | 8/2003 |
| CN | 101068311 A | 11/2007 |
| CN | 101282422 A | 10/2008 |
| CN | 101310519 A | 11/2008 |
| CN | 101364031 A | 2/2009 |
| CN | 101388965 A | 3/2009 |
| CN | 101576996 A | 11/2009 |
| CN | 101778220 A | 7/2010 |
| CN | 101883213 A | 11/2010 |
| CN | 102075727 A | 5/2011 |
| CN | 102084327 A | 6/2011 |
| CN | 102088554 A | 6/2011 |
| CN | 102272700 A | 12/2011 |
| CN | 102428655 A | 4/2012 |
| CN | 102457661 A | 5/2012 |
| CN | 102474560 A | 5/2012 |
| CN | 102567953 A | 7/2012 |
| CN | 202330968 U | 7/2012 |
| CN | 103051837 A | 4/2013 |
| CN | 103051841 A | 4/2013 |
| CN | 103297719 A | 9/2013 |
| CN | 103309602 A | 9/2013 |
| CN | 103324329 A | 9/2013 |
| CN | 103685925 A | 3/2014 |
| CN | 103702039 A | 4/2014 |
| CN | 103777742 A | 5/2014 |
| CN | 103947190 A | 7/2014 |
| CN | 103970472 A | 8/2014 |
| CN | 104270597 A | 1/2015 |
| CN | 104346080 A | 2/2015 |
| CN | 104423946 A | 3/2015 |
| CN | 104461288 A | 3/2015 |
| CN | 104754203 A | 7/2015 |
| CN | 104813322 A | 7/2015 |
| CN | 104836947 A | 8/2015 |
| CN | 104952063 A | 9/2015 |
| CN | 105138259 A | 12/2015 |
| CN | 105190511 A | 12/2015 |
| CN | 105229571 A | 1/2016 |
| CN | 105474163 A | 4/2016 |
| CN | 105493138 A | 4/2016 |
| CN | 105589637 A | 5/2016 |
| CN | 105611215 A | 5/2016 |
| CN | 105620393 A | 6/2016 |
| CN | 105630290 A | 6/2016 |
| CN | 105653031 A | 6/2016 |
| CN | 105765967 A | 7/2016 |
| CN | 105981372 A | 9/2016 |
| CN | 105991915 A | 10/2016 |
| CN | 106067947 A | 11/2016 |
| CN | 106161956 A | 11/2016 |
| CN | 106210184 A | 12/2016 |
| CN | 106210550 A | 12/2016 |
| CN | 106257909 A | 12/2016 |
| CN | 106303280 A | 1/2017 |
| CN | 106303690 A | 1/2017 |
| CN | 106341611 A | 1/2017 |
| CN | 106375662 A | 2/2017 |
| CN | 106412214 A | 2/2017 |
| CN | 106412412 A | 2/2017 |
| CN | 106412445 A | 2/2017 |
| CN | 106445219 A | 2/2017 |
| CN | 106791377 A | 5/2017 |
| CN | 106921829 A | 7/2017 |
| CN | 107077274 A | 8/2017 |
| CN | 107079141 A | 8/2017 |
| CN | 107533356 A | 1/2018 |
| CN | 107566721 A | 1/2018 |
| CN | 107580693 A | 1/2018 |
| CN | 107770448 A | 3/2018 |
| CN | 107800945 A | 3/2018 |
| CN | 107820011 A | 3/2018 |
| CN | 107924113 A | 4/2018 |

(56) References Cited

FOREIGN PATENT DOCUMENTS

| | | |
|---|---|---|
| CN | 108353126 A | 7/2018 |
| CN | 108391053 A | 8/2018 |
| CN | 108513070 A | 9/2018 |
| CN | 108668083 A | 10/2018 |
| CN | 108848308 A | 11/2018 |
| CN | 108886569 A | 11/2018 |
| CN | 109005366 A | 12/2018 |
| CN | 109061985 A | 12/2018 |
| CN | 109496425 A | 3/2019 |
| CN | 109639970 A | 4/2019 |
| CN | 109644229 A | 4/2019 |
| DK | 201670753 A1 | 1/2018 |
| DK | 201670755 A1 | 1/2018 |
| DK | 201670627 A1 | 2/2018 |
| EP | 0651543 A2 | 5/1995 |
| EP | 0651543 A3 | 12/1997 |
| EP | 1278099 A1 | 1/2003 |
| EP | 1592212 A1 | 11/2005 |
| EP | 0651543 B1 | 9/2008 |
| EP | 2194508 A1 | 6/2010 |
| EP | 2430766 A2 | 3/2012 |
| EP | 2454872 A1 | 5/2012 |
| EP | 2482179 A2 | 8/2012 |
| EP | 2487613 A1 | 8/2012 |
| EP | 2487913 A2 | 8/2012 |
| EP | 2430766 A4 | 12/2012 |
| EP | 2579572 A1 | 4/2013 |
| EP | 2640060 A1 | 9/2013 |
| EP | 2682855 A2 | 1/2014 |
| EP | 2950198 A1 | 12/2015 |
| EP | 2966855 A2 | 1/2016 |
| EP | 2972677 A1 | 1/2016 |
| EP | 2430766 B1 | 3/2016 |
| EP | 3008575 A1 | 4/2016 |
| EP | 3012732 A1 | 4/2016 |
| EP | 3026636 A1 | 6/2016 |
| EP | 3033837 A1 | 6/2016 |
| EP | 3051525 A1 | 8/2016 |
| EP | 3107065 A1 | 12/2016 |
| EP | 3033837 A4 | 3/2017 |
| EP | 3209012 A1 | 8/2017 |
| EP | 3211587 A1 | 8/2017 |
| EP | 2194508 B1 | 12/2017 |
| EP | 3333544 A1 | 6/2018 |
| EP | 2556665 B1 | 8/2018 |
| EP | 3033837 B1 | 10/2018 |
| EP | 3393119 A1 | 10/2018 |
| EP | 3135028 B1 | 1/2019 |
| EP | 3457680 A1 | 3/2019 |
| EP | 3008575 B1 | 7/2019 |
| EP | 3633975 A1 | 4/2020 |
| GB | 2515797 A | 1/2015 |
| GB | 2519363 A | 4/2015 |
| GB | 2523670 A | 9/2015 |
| JP | 2-179078 A | 7/1990 |
| JP | 9-116792 A | 5/1997 |
| JP | 11-355617 A | 12/1999 |
| JP | 2000-207549 A | 7/2000 |
| JP | 2000-244905 A | 9/2000 |
| JP | 2001-298649 A | 10/2001 |
| JP | 2003-8964 A | 1/2003 |
| JP | 2003-18438 A | 1/2003 |
| JP | 2003-32597 A | 1/2003 |
| JP | 2003-241293 A | 8/2003 |
| JP | 2004-15595 A | 1/2004 |
| JP | 2004-135074 A | 4/2004 |
| JP | 2005-31466 A | 2/2005 |
| JP | 2005-191641 A | 7/2005 |
| JP | 3872041 B2 | 1/2007 |
| JP | 2007-28211 A | 2/2007 |
| JP | 2007-124398 A | 5/2007 |
| JP | 2008-66978 A | 3/2008 |
| JP | 2008-236534 A | 10/2008 |
| JP | 2009-105919 A | 5/2009 |
| JP | 2009-212899 A | 9/2009 |
| JP | 2009-545256 A | 12/2009 |
| JP | 2010-119147 A | 5/2010 |
| JP | 2010-160581 A | 7/2010 |
| JP | 2010-182023 A | 8/2010 |
| JP | 2010-268052 A | 11/2010 |
| JP | 2011-87167 A | 4/2011 |
| JP | 2011-91570 A | 5/2011 |
| JP | 2011-124864 A | 6/2011 |
| JP | 2011-211552 A | 10/2011 |
| JP | 2012-79302 A | 4/2012 |
| JP | 2012-89973 A | 5/2012 |
| JP | 2012-124608 A | 6/2012 |
| JP | 2012-147379 A | 8/2012 |
| JP | 2013-70303 A | 4/2013 |
| JP | 2013-106289 A | 5/2013 |
| JP | 2013-546238 A | 12/2013 |
| JP | 2014-23083 A | 2/2014 |
| JP | 2014-212415 A | 11/2014 |
| JP | 2015-1716 A | 1/2015 |
| JP | 2015-5255 A | 1/2015 |
| JP | 2015-22716 A | 2/2015 |
| JP | 2015-50713 A | 3/2015 |
| JP | 2015-76717 A | 4/2015 |
| JP | 2015-146619 A | 8/2015 |
| JP | 2015-149095 A | 8/2015 |
| JP | 2015-180987 A | 10/2015 |
| JP | 2016-66978 A | 4/2016 |
| JP | 2016-72965 A | 5/2016 |
| JP | 2016-129315 A | 7/2016 |
| JP | 2017-34474 A | 2/2017 |
| JP | 2019-62556 A | 4/2019 |
| JP | 2019-145108 A | 8/2019 |
| KR | 10-2012-0025872 A | 3/2012 |
| KR | 10-2012-0048397 A | 5/2012 |
| KR | 10-2012-0057696 A | 6/2012 |
| KR | 10-2012-0093322 A | 8/2012 |
| KR | 10-2013-0033445 A | 4/2013 |
| KR | 10-1341095 B1 | 12/2013 |
| KR | 10-2014-0049850 A | 4/2014 |
| KR | 10-2014-0062801 A | 5/2014 |
| KR | 10-2015-0014290 A | 2/2015 |
| KR | 10-2015-0024899 A | 3/2015 |
| KR | 10-2016-0016910 A | 2/2016 |
| KR | 10-2016-0019145 A | 2/2016 |
| KR | 10-2016-0020791 A | 2/2016 |
| KR | 10-2016-0075583 A | 6/2016 |
| KR | 10-1674959 B1 | 11/2016 |
| KR | 10-2017-0123125 A | 11/2017 |
| KR | 10-2017-0135975 A | 12/2017 |
| KR | 10-2018-0017227 A | 2/2018 |
| KR | 10-2018-0037076 A | 4/2018 |
| KR | 10-2018-0095331 A | 8/2018 |
| KR | 10-2018-0108847 A | 10/2018 |
| KR | 10-2018-0137610 A | 12/2018 |
| KR | 10-2019-0034248 A | 4/2019 |
| WO | 99/39307 A1 | 8/1999 |
| WO | 2005/043892 A1 | 5/2005 |
| WO | 2007/126707 A1 | 11/2007 |
| WO | 2008/014301 A2 | 1/2008 |
| WO | 2010/059426 A2 | 5/2010 |
| WO | 2010/077048 A2 | 7/2010 |
| WO | 2010/102678 A1 | 9/2010 |
| WO | 2010/077048 A3 | 10/2010 |
| WO | 2010/131869 A2 | 11/2010 |
| WO | 2010/134275 A1 | 11/2010 |
| WO | 2011/007264 A1 | 1/2011 |
| WO | 2010/131869 A3 | 2/2011 |
| WO | 2010/059426 A3 | 5/2011 |
| WO | 2012/001947 A1 | 1/2012 |
| WO | 2012/006251 A1 | 1/2012 |
| WO | 2012/051720 A2 | 4/2012 |
| WO | 2013/082325 A1 | 6/2013 |
| WO | 2013/152453 A1 | 10/2013 |
| WO | 2013/152454 A1 | 10/2013 |
| WO | 2013/189058 A1 | 12/2013 |
| WO | 2014/066115 A1 | 5/2014 |
| WO | 2014/105276 A1 | 7/2014 |
| WO | 2014/159779 A1 | 10/2014 |
| WO | 2014/165141 A1 | 10/2014 |

(56) References Cited

FOREIGN PATENT DOCUMENTS

| | | |
|---|---|---|
| WO | 2014/160819 A1 | 12/2014 |
| WO | 2014/200734 A1 | 12/2014 |
| WO | 2014/200798 A1 | 12/2014 |
| WO | 2015/023044 A1 | 2/2015 |
| WO | 2015/037211 A1 | 3/2015 |
| WO | 2015/080744 A1 | 6/2015 |
| WO | 2015/085042 A1 | 6/2015 |
| WO | 2015/112868 A1 | 7/2015 |
| WO | 2014/200798 A8 | 8/2015 |
| WO | 2015/144209 A1 | 10/2015 |
| WO | 2015/183438 A1 | 12/2015 |
| WO | 2015/187494 A1 | 12/2015 |
| WO | 2015/190666 A1 | 12/2015 |
| WO | 2016/028806 A1 | 2/2016 |
| WO | 2016/028807 A1 | 2/2016 |
| WO | 2016/028808 A1 | 2/2016 |
| WO | 2016/028809 A1 | 2/2016 |
| WO | 2016/064435 A1 | 4/2016 |
| WO | 2016/073804 A2 | 5/2016 |
| WO | 2016/073804 A3 | 7/2016 |
| WO | 2016/145129 A1 | 9/2016 |
| WO | 2016/172619 A1 | 10/2016 |
| WO | 2016/204936 A1 | 12/2016 |
| WO | 2017/058834 A1 | 4/2017 |
| WO | 2017/153771 A1 | 9/2017 |
| WO | 2017/201326 A1 | 11/2017 |
| WO | 2017/218193 A1 | 12/2017 |
| WO | 2018/006053 A1 | 1/2018 |
| WO | 2018/048838 A1 | 3/2018 |
| WO | 2018/049430 A2 | 3/2018 |
| WO | 2018/057268 A1 | 3/2018 |
| WO | 2018/099037 A1 | 6/2018 |
| WO | 2018/159864 A1 | 9/2018 |
| WO | 2018/212802 A1 | 11/2018 |

OTHER PUBLICATIONS

Notice of Allowance received for Chinese Patent Application No. 201810566134.8, dated Apr. 7, 2020, 2 pages (1 page of English Translation and 1 page of Official Copy).
Office Action received for Australian Patent Application No. 2020100189, dated Apr. 1, 2020, 3 pages.
Decision to Grant received for Japanese Patent Application No. 2018-243463, dated Aug. 17, 2020, 2 pages (1 pages of English Translation and 1 page of Official Copy).
Office Action received for Australian Patent Application No. 2020101043, dated Aug. 14, 2020, 5 pages.
Office Action received for Chinese Patent Application No. 201911219525.3, dated Jul. 10, 2020, 7 pages (1 page of English Translation and 6 pages of Official Copy).
Office Action received for Danish Patent Application No. PA201970601, dated Aug. 13, 2020, 3 pages.
Office Action received for Japanese Patent Application No. 2018-182607, dated Jul. 20, 2020, 5 pages (2 pages of English Translation and 3 pages of Official Copy).
Notice of Allowance received for Chinese Patent Application No. 201811512767.7, dated Jul. 27, 2020, 4 pages (1 page of English Translation and 3 pages of Official Copy).
Applicant-Initiated Interview Summary received for U.S. Appl. No. 16/584,100, dated Feb. 19, 2020, 3 pages.
Applicant-Initiated Interview Summary received for U.S. Appl. No. 16/586,344, dated Feb. 27, 2020, 3 pages.
Corrected Notice of Allowance received for U.S. Appl. No. 16/582,595, dated Apr. 7, 2020, 5 pages.
Corrected Notice of Allowance received for U.S. Appl. No. 16/582,595, dated Apr. 22, 2020, 5 pages.
Corrected Notice of Allowance received for U.S. Appl. No. 16/583,020, dated Mar. 24, 2020, 2 pages.
Corrected Notice of Allowance received for U.S. Appl. No. 16/584,044, dated Apr. 16, 2020, 3 pages.
Corrected Notice of Allowance received for U.S. Appl. No. 16/584,044, dated Jan. 29, 2020, 3 pages.
Corrected Notice of Allowance received for U.S. Appl. No. 16/584,044, dated Mar. 4, 2020., 2 pages.
Corrected Notice of Allowance received for U.S. Appl. No. 16/584,100, dated Feb. 21, 2020, 9 pages.
Corrected Notice of Allowance received for U.S. Appl. No. 16/584,693, dated Feb. 21, 2020, 15 pages.
Corrected Notice of Allowance received for U.S. Appl. No. 16/584,693, dated Mar. 4, 2020, 2 pages.
Corrected Notice of Allowance received for U.S. Appl. No. 16/584,693, dated Mar. 20, 2020, 2 pages.
Corrected Notice of Allowance received for U.S. Appl. No. 16/586,314, dated Apr. 8, 2020, 5 pages.
Corrected Notice of Allowance received for U.S. Appl. No. 16/586,314, dated Mar. 4, 2020, 3 pages.
Corrected Notice of Allowance received for U.S. Appl. No. 16/586,344, dated Apr. 7, 2020, 4 pages.
Corrected Notice of Allowance received for U.S. Appl. No. 16/586,344, dated Jan. 23, 2020, 4 pages.
Corrected Notice of Allowance received for U.S. Appl. No. 16/586,344, dated Mar. 17, 2020, 4 pages.
Non-Final Office Action received for U.S. Appl. No. 16/582,595, dated Nov. 26, 2019, 17 pages.
Non-Final Office Action received for U.S. Appl. No. 16/583,020, dated Nov. 14, 2019, 9 pages.
Notice of Allowance received for Chinese Patent Application No. 201780002533.5, dated Apr. 14, 2020, 2 pages (1 page of English Translation and 1 page of Official Copy).
Notice of Allowance received for Korean Patent Application No. 10-2019-7035478, dated Apr. 24, 2020, 4 pages (1 page of English Translation and 3 pages of Official Copy).
Notice of Allowance received for U.S. Appl. No. 16/582,595, dated Mar. 20, 2020, 9 pages.
Notice of Allowance received for U.S. Appl. No. 16/583,020, dated Apr. 1, 2020, 5 pages.
Notice of Allowance received for U.S. Appl. No. 16/583,020, dated Feb. 28, 2020, 5 pages.
Notice of Allowance received for U.S. Appl. No. 16/584,044, dated Dec. 11, 2019, 15 pages.
Notice of Allowance received for U.S. Appl. No. 16/584,044, dated Mar. 30, 2020, 16 pages.
Notice of Allowance received for U.S. Appl. No. 16/584,044, dated Nov. 14, 2019, 13 pages.
Notice of Allowance received for U.S. Appl. No. 16/584,100, dated Apr. 8, 2020, 12 pages.
Notice of Allowance received for U.S. Appl. No. 16/584,100, dated Jan. 14, 2020, 13 pages.
Notice of Allowance received for U.S. Appl. No. 16/584,693, dated Jan. 15, 2020, 15 pages.
Notice of Allowance received for U.S. Appl. No. 16/584,693, dated May 4, 2020, 12 pages.
Notice of Allowance received for U.S. Appl. No. 16/586,314, dated Apr. 1, 2020, 8 pages.
Notice of Allowance received for U.S. Appl. No. 16/586,314, dated Jan. 9, 2020, 10 pages.
Notice of Allowance received for U.S. Appl. No. 16/586,344, dated Dec. 16, 2019, 12 pages.
Notice of Allowance received for U.S. Appl. No. 16/586,344, dated Mar. 27, 2020, 12 pages.
Office Action received for Chinese Patent Application No. 201910692978.1, dated Apr. 3, 2020, 19 pages (8 pages of English Translation and 11 pages of Official Copy).
Office Action received for Danish Patent Application No. PA201970592, dated Mar. 2, 2020, 5 pages.
Office Action received for Danish Patent Application No. PA201970593, dated Apr. 16, 2020, 2 pages.
Office Action received for Danish Patent Application No. PA201970593, dated Mar. 10, 2020, 4 pages.
Office Action received for Danish Patent Application No. PA201970595, dated Mar. 10, 2020, 4 pages.
Office Action received for Danish Patent Application No. PA201970600, dated Mar. 9, 2020, 5 pages.

(56) References Cited

OTHER PUBLICATIONS

Office Action received for Danish Patent Application No. PA201970601, dated Jan. 31, 2020, 3 pages.
Office Action received for Danish Patent Application No. PA201970601, dated Nov. 11, 2019, 8 pages.
Office Action received for Danish Patent Application No. PA201970605, dated Mar. 10, 2020, 5 pages.
Search Report and Opinion received for Danish Patent Application No. PA201970592, dated Nov. 7, 2019, 8 pages.
Search Report and Opinion received for Danish Patent Application No. PA201970593, dated Oct. 29, 2019, 10 pages.
Search Report and Opinion received for Danish Patent Application No. PA201970595, dated Nov. 8, 2019, 16 pages.
Search Report and Opinion received for Danish Patent Application No. PA201970600, dated Nov. 5, 2019, 11 pages.
Search Report and Opinion received for Danish Patent Application No. PA201970603, dated Nov. 15, 2019, 9 pages.
Search Report and Opinion received for Danish Patent Application No. PA201970605, dated Nov. 12, 2019, 10 pages.
Advisory Action received for U.S. Appl. No. 16/144,629, dated Dec. 13, 2019, 9 pages.
Corrected Notice of Allowance received for U.S. Appl. No. 16/191,117, dated Feb. 28, 2020, 2 pages.
Extended European Search Report received for European Patent Application No. 19204230.7, dated Feb. 21, 2020, 7 pages.
Final Office Action received for U.S. Appl. No. 16/144,629, dated Sep. 18, 2019, 22 pages.
Intention to Grant received for European Patent Application No. 18176890.4, dated Feb. 28, 2020, 8 pages.
International Search Report and Written Opinion received for PCT Patent Application No. PCT/US2019/049101, dated Dec. 16, 2019, 26 pages.
Invitation to Pay Additional Fees and Partial International Search Report received for PCT Patent Application No. PCT/US2019/049101, dated Oct. 24, 2019, 17 pages.
Invitation to Pay Search Fees received for European Patent Application No. 19724959.2, dated Feb. 25, 2020, 3 pages.
Non-Final Office Action received for U.S. Appl. No. 16/144,629, dated Mar. 29, 2019, 18 pages.
Office Action received for Chinese Patent Application No. 201780002533.5, dated Feb. 3, 2020, 6 pages (3 pages of English Translation and 3 pages of Official Copy).
Office Action received for Danish Patent Application No. PA201870623, dated Jan. 30, 2020, 2 pages.
Office Action received for Danish Patent Application No. PA201870623, dated Jul. 12, 2019, 4 pages.
Office Action received for European Patent Application No. 18183054.8, dated Feb. 24, 2020, 6 pages.
PreAppeal Review Report received for Japanese Patent Application No. 2018-225131, dated Jan. 24, 2020, 8 pages (4 pages of English Translation and 4 pages of Official Copy).
PreAppeal Review Report received for Japanese Patent Application No. 2018-545502, dated Jan. 24, 2020, 8 pages (3 pages of English Translation and 5 pages of Official Copy).
Search Report and Opinion received for Danish Patent Application No. PA201870623, dated Dec. 20, 2018, 8 pages.
Decision to Grant received for European Patent Application No. 18176890.4, dated Jul. 9, 2020, 3 pages.
Final Office Action received for U.S. Appl. No. 16/528,941, dated Jul. 13, 2020, 15 pages.
Office Action received for Australian Patent Application No. 2019213341, dated Jun. 30, 2020, 6 pages.
Office Action received for Australian Patent Application No. 2020100720, dated Jul. 9, 2020, 7 pages.
Osxdaily, "How to Zoom the Camera on iPhone", Available Online at: https://osxdaily.com/2012/04/18/zoom-camera-iphone/, Apr. 18, 2012, 6 pages.
Schiffhauer Alexander, "See the Light with Night Sight", Available online at: https://www.blog.google/products/pixel/see-light-night-sight, Nov. 14, 2018, 6 pages.
Certificate of Examination received for Australian Patent Application No. 2020100189, dated May 12, 2020, 2 pages.
Office Action received for Chinese Patent Application No. 201811446867.4, dated May 6, 2020, 10 pages (5 pages of English Translation and 5 pages of Official Copy).
Office Action received for Korean Patent Application No. 10-2019-7027042, dated May 13, 2020, 6 pages (2 pages of English Translation and 4 pages of Official Copy).
AstroVideo, "AstroVideo enables you to use a low-cost,low-light video camera to capture astronomical images.", Available online at: https://www.coaa.co.uk/astrovideo.htm, Nov. 18, 2019, 5 pages.
Certificate of Examination received for Australian Patent Application No. 2019100420, dated Jul. 3, 2019, 2 pages.
Certificate of Examination received for Australian Patent Application No. 2019100794, dated Dec. 19, 2019, 2 pages.
Corrected Notice of Allowance received for U.S. Appl. No. 16/143,097, dated Nov. 8, 2019, 3 pages.
Corrected Notice of Allowance received for U.S. Appl. No. 16/191,117, dated Dec. 9, 2019, 2 pages.
Corrected Notice of Allowance received for U.S. Appl. No. 16/191,117, dated Nov. 20, 2019, 2 pages.
Decision to Refuse received for Japanese Patent Application No. 2018-225131, dated Jul. 8, 2019, 6 pages (4 pages of English Translation and 2 pages of Official Copy).
Decision to Refuse received for Japanese Patent Application No. 2018-243463, dated Jul. 8, 2019, 5 pages (3 pages of English Translation and 2 pages of Official Copy).
Decision to Refuse received for Japanese Patent Application No. 2018-545502, dated Jul. 8, 2019, 5 pages (3 pages of English Translation and 2 pages of Official Copy).
Gibson, Andrew S., "Aspect Ratio: What it is and Why it Matters", Retrieved from: https://web.archive.org/web/20190331225429/https:/digital-photography-school.com/aspect-ratio-what-it-is-and-why-it-matters/, Mar. 31, 2019, 10 pages.
Hernández, Carlos, "Lens Blur in the New Google Camera App", Available online at: https://research.googleblog.com/2014/04/lens-blur-in-new-google-camera-app.html, Apr. 16, 2014, 6 pages.
Iluvtrading, "Galaxy S10 / S10+: How to Use Bright Night Mode for Photos (Super Night Mode)", Online Available at: https://www.youtube.com/watch?v=SfZ7Us1S1Mk, Mar. 11, 2019, 4 pages.
Iluvtrading, "Super Bright Night Mode: Samsung Galaxy S1O vs Huawei P30 Pro (Review/How to/Explained)", Online Available at: https://www.youtube.com/watch?v=d4r3PWioY4Y, Apr. 26, 2019, 4 pages.
International Preliminary Report on Patentability received for PCT Patent Application No. PCT/US2018/015591, dated Dec. 19, 2019, 10 pages.
International Search Report and Written Opinion received for PCT Patent Application No. PCT/US2019/024067, dated Oct. 9, 2019, 18 pages.
Invitation to Pay Additional Fees received for PCT Patent Application No. PCT/US2019/024067, dated Jul. 16, 2019, 13 pages.
KK World, "Redmi Note 7 Pro Night Camera Test I Night Photography with Night Sight & Mode", Online Available at: https://www.youtube.com/watch?v=3EKjGBjX3PY, Mar. 26, 2019, 4 pages.
Notice of Acceptance received for Australian Patent Application No. 2018279787, dated Dec. 10, 2019, 3 pages.
Notice of Allowance received for Brazilian Patent Application No. 112018074765-3, dated Oct. 8, 2019, 2 pages (1 page of English Translation and 1 page of Official Copy).
Notice of Allowance received for Chinese Patent Application No. 201810664927.3, dated Jul. 19, 2019, 2 pages (1 page of English Translation and 1 page of Official Copy).
Notice of Allowance received for Japanese Patent Application No. 2018-171188, dated Jul. 16, 2019, 3 pages (1 page of English Translation and 2 pages of Official Copy).
Notice of Allowance received for Korean Patent Application No. 10-2018-7034780, dated Jun. 19, 2019, 4 pages (1 page of English Translation and 3 pages of Official Copy).
Notice of Allowance received for Korean Patent Application No. 10-2018-7036893, dated Jun. 12, 2019, 4 pages (1 page of English Translation and 3 pages of Official Copy).

(56) References Cited

OTHER PUBLICATIONS

Notice of Allowance received for U.S. Appl. No. 16/143,097, dated Aug. 29, 2019, 23 pages.
Notice of Allowance received for U.S. Appl. No. 16/191,117, dated Oct. 29, 2019, 9 pages.
Office Action received for Australian Patent Application No. 2019100794, dated Oct. 3, 2019, 4 pages.
Office Action received for Chinese Patent Application No. 201780002533.5, dated Apr. 25, 2019, 17 pages (7 pages of English Translation and 10 pages of Official Copy).
Office Action received for Chinese Patent Application No. 201780002533.5, dated Sep. 26, 2019, 21 pages (9 pages of English Translation and 12 pages of Official Copy).
Office Action received for Chinese Patent Application No. 201810566134.8, dated Aug. 13, 2019, 14 pages (8 pages of English Translation and 6 pages of Official Copy).
Office Action received for Chinese Patent Application No. 201811446867.4, dated Dec. 31, 2019, 12 pages (5 pages of English Translation and 7 pages of Official Copy).
Office Action received for Chinese Patent Application No. 201811512767.7, dated Dec. 20, 2019, 14 pages (7 pages of English Translation and 7 pages of Official Copy).
Office Action received for Danish Patent Application No. PA201770563, dated Jan. 28, 2020, 3 pages.
Office Action received for Danish Patent Application No. PA201770719, dated Jan. 17, 2020, 4 pages.
Office Action received for Danish Patent Application No. PA201870366, dated Aug. 22, 2019, 3 pages.
Office Action received for Danish Patent Application No. PA201870368, dated Oct. 1, 2019, 6 pages.
Office Action received for European Patent Application 17809168. 2, dated Jan. 7, 2020, 5 pages.
Office Action received for Korean Patent Application No. 10-2019-7035478, dated Jan. 17, 2020, 17 pages (9 pages of English Translation and 8 pages of Official Copy).
Shaw, et al., "Skills for Closeups Photography", Watson-Guptill Publications, Nov. 1999, 5 pages (Official Copy Only) {See Communication under 37 CFR § 1.98(a) (3)}.
shiftdelete.net, "Oppo Reno 10x Zoom On Inceleme—Huawei P30 Pro'ya rakip mi geliyor?", Available online at: https://www.youtube.com/watch?v=ev2wlUztdrg, Apr. 24, 2019, 2 pages.
"Sony Xperia XZ3 Camera Review—The Colors, Duke, The Colors!", Android Headlines—Android News & Tech News, Available online at: https://www.youtube.com/watch?v=mwpYXzWVOgw, Nov. 3, 2018, 3 pages.
Sony, "User Guide, Xperia XZ3, H8416/H9436/H9493", Sony Mobile Communications Inc., Retrieved from: https://www-support-downloads.sonymobile.com/h8416/userguide_EN_H8416-H9436-H9493_2_Android9.0.pdf, 2018, 121 pages.
The Nitpicker, "Sony Xperia XZ3 | in-depth Preview", Available online at: https://www.youtube.com/watch?v=TGCKxBuiO5c, Oct. 7, 2018, 3 pages.
Xeetechcare, "Samsung Galaxy S10—Super Night Mode & Ultra Fast Charging!", Online Available at: https://www.youtube.com/watch?v=3bguV4FX6aA, Mar. 28, 2019, 4 pages.
"[B612] Addition of facial recognition bear/cat stamps and AR background function having moving sparkles or hearts", Available Online at: <URL, htpps://apptopi.jp/2017/01/22/b612>, Jan. 22, 2017, 11 pages (Official copy only) (See Communication under 37 CFR § 1.98(a) (3)).
Intention to Grant received for European Patent Application No. 18214698.5, dated Apr. 21, 2020, 8 pages.
Office Action received for European Patent Application No. 18209460.7, dated Apr. 21, 2020, 5 pages.
Office Action received for European Patent Application No. 19724959.2, dated Apr. 23, 2020, 10 pages.
Office Action received for Japanese Patent Application No. 2018-182607, dated Apr. 6, 2020, 6 pages (3 pages of English Translation and 3 pages of Official Copy).

Android Police, "Galaxy S9+ In-Depth Camera Review", See Especially 0:43-0:53; 1:13-1:25; 1:25-1:27; 5:11-5:38; 6:12-6:26, Available Online at: https://www.youtube.com/watch?v=GZHYCdMCv-w, Apr. 19, 2018, 3 pages.
Certificate of Examination received for Australian Patent Application No. 2017100683, dated Jan. 16, 2018, 2 pages.
Channel Highway, "Virtual Makeover in Real-time and in full 3D", Available online at: https://www.youtube.com/watch?v=NgUbBzb5qZg, Feb. 16, 2016, 1 page.
Corrected Notice of Allowance received for U.S. Appl. No. 15/273,453, dated Dec. 21, 2017, 3 pages.
Corrected Notice of Allowance received for U.S. Appl. No. 15/273,453, dated Feb. 8, 2018, 2 pages.
Corrected Notice of Allowance received for U.S. Appl. No. 15/273,453, dated Nov. 27, 2017, 2 pages.
Corrected Notice of Allowance received for U.S. Appl. No. 15/273,503, dated Nov. 2, 2017, 2 pages.
Corrected Notice of Allowance received for U.S. Appl. No. 15/273,503, dated Nov. 24, 2017, 2 pages.
Corrected Notice of Allowance received for U.S. Appl. No. 15/858,175, dated Sep. 21, 2018, 2 pages.
Decision of Refusal received for Japanese Patent Application No. 2018-243463, dated Feb. 25, 2019, 8 pages.
Decision of Refusal received for Japanese Patent Application No. 2018-545502, dated Feb. 25, 2019, 11 pages.
Decision to Grant received for Danish Patent Application No. PA201670627, dated Nov. 29, 2018, 2 pages.
Decision to Grant received for Danish Patent Application No. PA201670753, dated Mar. 6, 2019, 2 pages.
Decision to Grant received for Danish Patent Application No. PA201670755, dated Mar. 6, 2019, 2 pages.
Digital Trends, "ModiFace Partners With Samsung to Bring AR Makeup to the Galaxy S9", Available online at: https://www.digitaltrends.com/mobile/modiface-samsung-partnership-ar-makeup-galaxy-s9/, 2018, 16 pages.
European Search Report received for European Patent Application No. 18209460.7, dated Mar. 15, 2019, 4 pages.
European Search Report received for European Patent Application No. 18214698.5, dated Mar. 21, 2019, 5 pages.
Extended Search Report received for European Patent Application 17809168.2, dated Jun. 28, 2018, 9 pages.
Fedko, Daria, "AR Hair Styles", Online Available at: https://www.youtube.com/watch?v=FrS6tHRbFE0, Jan. 24, 2017, 2 pages.
Final Office Action received for U.S. Appl. No. 15/728,147, dated Aug. 29, 2018, 39 pages.
Final Office Action received for U.S. Appl. No. 15/728,147, dated May 28, 2019, 45 pages.
Gadgets Portal, "Galaxy J5 Prime Camera Review! (vs J7 Prime) 4K", Available Online at: https://www.youtube.com/watch?v=Rf2Gy8QmDqc, Oct. 24, 2016, 3 pages.
Gavin's Gadgets, "Honor 10 Camera App Tutorial—How to use All Modes + 90 Photos Camera Showcase", See Especially 2:58-4:32, Available Online at: https://www.youtube.com/watch?v=M5XZwXJcK74, May 26, 2018, 3 pages.
GSM Arena, "Honor 10 Review: Camera", Available Online at: https://web.archive.org/web/20180823142417/https://www.gsmarena.com/honor_10-review-1771p5.php, Aug. 23, 2018, 11 pages.
Hall, Brent, "Samsung Galaxy Phones Pro Mode (S7/S8/S9/Note 8/Note 9): When, why, & How to Use It", See Especially 3:18-5:57, Available Online at: https://www.youtube.com/watch?v=KwPxGUDRkTg, Jun. 19, 2018, 3 pages.
HELPVIDEOSTV, "How to Use Snap Filters on Snapchat", Retrieved from: https://www.youtube.com/watch?v=oR-7cIWPszU&feature=youtu.be, Mar. 22, 2017, pp. 1-2.
Huawei Mobile PH, "Huawei P10 Tips & Tricks: Compose Portraits with Wide Aperture (Bokeh)", Available Online at: https://www.youtube.com/watch?v=WM4yo5-hrrE, Mar. 30, 2017, 2 pages.
Intention to Grant received for Danish Patent Application No. PA201670627, dated Jun. 11, 2018, 2 pages.
Intention to Grant received for Danish Patent Application No. PA201670753, dated Oct. 29, 2018, 2 pages.
Intention to Grant received for Danish Patent Application No. PA201670755, dated Nov. 13, 2018, 2 pages.

(56) References Cited

OTHER PUBLICATIONS

International Preliminary Report on Patentability received for PCT Patent Application No. PCT/US2017/035321, dated Dec. 27, 2018, 11 pages.
International Search Report and Written Opinion received for PCT Patent Application No. PCT/US2017/035321, dated Oct. 6, 2017, 15 pages.
International Search Report and Written Opinion received for PCT Patent Application No. PCT/US2018/015591, dated Jun. 14, 2018, 14 pages.
Invitation to Pay Addition Fees received for PCT Patent Application No. PCT/US2017/035321, dated Aug. 17, 2017, 3 pages.
Kozak, Tadeusz, "When You're Video Chatting on Snapchat, How Do You Use Face Filters?", Quora, Online Available at: https://www.quora.com/When-youre-video-chatting-on-Snapchat-how-do-you-use-face-filters, Apr. 29, 2018, 1 page.
Lang, Brian, "How to Audio & Video Chat with Multiple Users at the Same Time in Groups", Snapchat 101, Online Available at: https://smartphones.gadgethacks.com/how-to/snapchat-101-audio-video-chat-with-multiple-users-same-time-groups-0184113/, Apr. 17, 2018, 4 pages.
Mobiscrub, "Galaxy S4 mini camera review", Available Online at: https://www.youtube.com/watch?v=KYKOydw8QT8, Aug. 10, 2013, 3 pages.
Mobiscrub, "Samsung Galaxy S5 Camera Review—HD Video", Available Online at: https://www.youtube.com/watch?v=BFgwDtNKMjg, Mar. 27, 2014, 3 pages.
Modifacechannel, "Sephora 3D Augmented Reality Mirror", Available Online at: https://www.youtube.com/watch?v=wwBO4PU9EXI, May 15, 2014, 1 page.
Non-Final Office Action received for U.S. Appl. No. 15/273,522, dated Nov. 30, 2016, 15 pages.
Non-Final Office Action received for U.S. Appl. No. 15/273,544, dated May 25, 2017, 18 pages.
Non-Final Office Action received for U.S. Appl. No. 15/728,147, dated Feb. 22, 2018, 20 pages.
Non-Final Office Action received for U.S. Appl. No. 15/728,147, dated Jan. 31, 2019, 41 pages.
Non-Final Office Action received for U.S. Appl. No. 16/143,097, dated Feb. 28, 2019, 17 pages.
Notice of Acceptance received for Australian Patent Application No. 2017286130, dated Apr. 26, 2019, 3 pages.
Notice of Allowance received for Korean Patent Application No. 10-2018-7026743, dated Mar. 20, 2019, 7 pages.
Notice of Allowance received for Korean Patent Application No. 10-2018-7028849, dated Feb. 1, 2019, 4 pages.
Notice of Allowance received for U.S. Appl. No. 15/273,453, dated Oct. 12, 2017, 11 pages.
Notice of Allowance received for U.S. Appl. No. 15/273,503, dated Aug. 14, 2017, 9 pages.
Notice of Allowance received for U.S. Appl. No. 15/273,522, dated Mar. 28, 2017, 9 pages.
Notice of Allowance received for U.S. Appl. No. 15/273,522, dated May 19, 2017, 2 pages.
Notice of Allowance received for U.S. Appl. No. 15/273,522, dated May 23, 2017, 2 pages.
Notice of Allowance received for U.S. Appl. No. 15/273,544, dated Mar. 13, 2018, 8 pages.
Notice of Allowance received for U.S. Appl. No. 15/273,544, dated Oct. 27, 2017, 8 pages.
Notice of Allowance received for U.S. Appl. No. 15/728,147, dated Aug. 19, 2019, 13 pages.
Notice of Allowance received for U.S. Appl. No. 15/858,175, dated Jun. 1, 2018, 8 pages.
Notice of Allowance received for U.S. Appl. No. 15/858,175, dated Sep. 12, 2018, 8 pages.
Notice of Allowance received for U.S. Appl. No. 16/110,514, dated Apr. 29, 2019, 9 pages.
Notice of Allowance received for U.S. Appl. No. 16/110,514, dated Mar. 13, 2019, 11 pages.
Notice of Allowance received for U.S. Appl. No. 16/143,201, dated Feb. 8, 2019, 9 pages.
Notice of Allowance received for U.S. Appl. No. 16/143,201, dated Nov. 28, 2018, 14 pages.
Office Action received for Australian Patent Application No. 2017100683, dated Sep. 20, 2017, 3 pages.
Office Action received for Australian Patent Application No. 2017100684, dated Jan. 24, 2018, 4 pages.
Office Action received for Australian Patent Application No. 2017100684, dated Oct. 5, 2017, 4 pages.
Office Action Received for Australian Patent Application No. 2017286130, dated Jan. 21, 2019, 4 pages.
Office Action received for Chinese Patent Application No. 201810664927.3, dated Mar. 28, 2019, 11 pages.
Office Action received for Danish Patent Application No. PA201670627, dated Apr. 5, 2017, 3 pages.
Office Action received for Danish Patent Application No. PA201670627, dated Nov. 6, 2017, 2 pages.
Office Action received for Danish Patent Application No. PA201670627, dated Oct. 11, 2016, 8 pages.
Office Action received for Danish Patent Application No. PA201670753, dated Dec. 20, 2016, 7 pages.
Office Action received for Danish Patent Application No. PA201670753, dated Jul. 5, 2017, 4 pages.
Office Action received for Danish Patent Application No. PA201670753, dated Mar. 23, 2018, 5 pages.
Office Action received for Danish Patent Application No. PA201670755, dated Apr. 6, 2017, 5 pages.
Office Action received for Danish Patent Application No. PA201670755, dated Apr. 20, 2018, 2 pages.
Office Action received for Danish Patent Application No. PA201670755, dated Dec. 22, 2016, 6 pages.
Office Action received for Danish Patent Application No. PA201670755, dated Oct. 20, 2017, 4 pages.
Office Action received for Danish Patent Application No. PA201770563, dated Aug. 13, 2018, 5 pages.
Office Action received for Danish Patent Application No. PA201770563, dated Jun. 28, 2019, 5 pages.
Office Action received for Danish Patent Application No. PA201770719, dated Aug. 14, 2018, 6 pages.
Office Action received for Danish Patent Application No. PA201770719, dated Feb. 19, 2019, 4 pages.
Office Action received for Danish Patent Application No. PA201870366, dated Dec. 12, 2018, 3 pages.
Office Action received for Danish Patent Application No. PA201870367, dated Dec. 20, 2018, 5 pages.
Office Action received for Danish Patent Application No. PA201870368, dated Dec. 20, 2018, 5 pages.
Office Action received for European Patent Application No. 18176890.4, dated Oct. 16, 2018, 8 pages.
Office Action received for European Patent Application No. 18183054.8, dated Nov. 16, 2018, 8 pages.
Office Action received for European Patent Application No. 18209460.7, dated Apr. 10, 2019, 7 pages.
Office Action received for European Patent Application No. 18214698.5, dated Apr. 2, 2019, 8 pages.
Office Action received for Japanese Patent Application No. 2018-225131, dated Mar. 4, 2019, 10 pages.
Office Action received for Korean Patent Application No. 10-2018-7026743, dated Jan. 17, 2019, 5 pages.
Office Action received for Korean Patent Application No. 10-2018-7034780, dated Apr. 4, 2019, 11 pages.
Office Action received for Korean Patent Application No. 10-2018-7036893, dated Apr. 9, 2019, 6 pages.
Paine, Steve, "Samsung Galaxy Camera Detailed Overview—User Interface", Retrieved from: https://www.youtube.com/watch?v=td8UYSySuIo&feature=youtu.be, Sep. 18, 2012, pp. 1-2.
PC World, "How to make AR Emojis on the Samsung Galaxy S9", You Tube, Available Online: https://www.youtube.com/watch?v=8wQlCfulkz0, Feb. 25, 2018, 2 pages.
Phonearena, "Sony Xperia Z5 camera app and UI overview", Retrieved from: https://www.youtube.com/watch?v=UtDzdTsmkfU&feature=youtu.be, Sep. 8, 2015, pp. 1-3.

(56) References Cited

OTHER PUBLICATIONS

Search Report and Opinion received for Danish Patent Application No. PA201770563, dated Oct. 10, 2017, 9 pages.
Search Report and Opinion received for Danish Patent Application No. PA201870366, dated Aug. 27, 2018, 9 pages.
Search Report and Opinion received for Danish Patent Application No. PA201870367, dated Aug. 27, 2018, 9 pages.
Search Report and Opinion received for Danish Patent Application No. PA201870368, dated Sep. 6, 2018, 7 pages.
Search Report received for Danish Patent Application No. PA201770719, dated Oct. 17, 2017, 9 pages.
Smart Reviews, "Honor10 AI Camera's in Depth Review", See Especially 2:37-2:48; 6:39-6:49, Available Online at: https://www.youtube.com/watch?v=oKFqRvxeDBQ, May 31, 2018, 2 pages.
Snapchat Lenses, "How to Get All Snapchat Lenses Face Effect Filter on Android", Retrieved from: https://www.youtube.com/watch?v=0PfnF1RInfw&feature=youtu.be, Sep. 21, 2015, pp. 1-2.
Supplemental Notice of Allowance received for U.S. Appl. No. 16/143,201, dated Dec. 13, 2018, 2 pages.
Supplemental Notice of Allowance received for U.S. Appl. No. 16/143,201, dated Dec. 19, 2018, 2 pages.
Supplemental Notice of Allowance received for U.S. Appl. No. 16/143,201, dated Jan. 10, 2019, 2 pages.
Supplementary European Search Report received for European Patent Application No. 18176890.4, dated Sep. 20, 2018, 4 pages.
Supplementary European Search Report received for European Patent Application No. 18183054.8, dated Oct. 11, 2018, 4 pages.
Tech With Brett, "How to Create Your AR Emoji on the Galaxy S9 and S9+", Available online at: https://www.youtube.com/watch?v=HHMdcBpC8MQ, Mar. 16, 2018, 5 pages.
Techtag, "Samsung J5 Prime Camera Review | True Review", Available online at: https://www.youtube.com/watch?v=a_p906ai6PQ, Oct. 26, 2016, 3 pages.
Techtag, "Samsung J7 Prime Camera Review (Technical Camera)", Available Online at: https://www.youtube.com/watch?v=AJPcLP8GpFQ, Oct. 4, 2016, 3 pages.
Vickgeek, "Canon 80D Live View Tutorial | Enhance your image quality", Available online at: https://www.youtube.com/watch?v=JGNCiy6Wt9c, Sep. 27, 2016, 3 pages.
Vivo India, "Bokeh Mode | Vivo V9", Available Online at: https://www.youtube.com/watch?v=B5AIHhH5Rxs, Mar. 25, 2018, 3 pages.
Wong, Richard, "Huawei Smartphone (P20/P10/P9, Mate 10/9) Wide Aperture Mode Demo", Available Online at: https://www.youtube.com/watch?v=eLY3LsZGDPA, May 7, 2017, 2 pages.
X-Tech, "Test Make up via Slick Augmented Reality Mirror Without Putting It on", Available Online at: http://x-tech.am/test-make-up-via-slick-augmented-reality-mirror-without-putting-it-on/, Nov. 29, 2014, 5 pages.
Non-Final Office Action received for U.S. Appl. No. 16/144,629, dated Mar. 13, 2020, 24 pages.
Applicant-Initiated Interview Summary received for U.S. Appl. No. 16/144,629, dated Jul. 2, 2020, 5 pages.
Applicant-Initiated Interview Summary received for U.S. Appl. No. 16/528,941, dated Jun. 19, 2020, 3 pages.
Office Action received for Chinese Patent Application No. 201811512767.7, dated Jun. 4, 2020, 6 pages (3 pages of English Translation and 3 pages of Official Copy).
Advisory Action received for U.S. Appl. No. 16/144,629, dated Jan. 6, 2021, 10 pages.
Office Action received for Australian Patent Application No. 2020277216, dated Dec. 17, 2020, 5 pages.
Office Action received for Chinese Patent Application No. 202010287961.0, dated Dec. 30, 2020, 16 pages (8 pages of English Translation and 8 pages of Official Copy).
Office Action received for Chinese Patent Application No. 202010287975.2, dated Dec. 30, 2020, 17 pages (9 pages of English Translation and 8 pages of Official Copy).
Decision to Grant received for European Patent Application No. 18214698.5, dated Sep. 10, 2020, 3 pages.
Extended European Search Report received for European Patent Application No. 20168009.7, dated Sep. 11, 2020, 12 pages.
Final Office Action received for U.S. Appl. No. 16/144,629, dated Sep. 11, 2020, 22 pages.
Office Action received for Chinese Patent Application No. 201811446867.4, dated Sep. 8, 2020, 9 pages (4 pages of English Translation and 5 pages of Official Copy).
Telleen et al., "Synthetic Shutter Speed Imaging", University of California, Santa Cruz, vol. 26, No. 3, 2007, 8 pages.
Tico et al., "Robust method of digital 1-15 image stabilization", Nokia Research Center, ISCCSP, Malta, Mar. 12-14, 2008, pp. 316-321.
Intention to Grant received for Danish Patent Application No. PA201970601, dated Sep. 21, 2020, 2 pages.
Invitation to Pay Additional Fees received for PCT Patent Application No. PCT/US2020/031643, dated Sep. 9, 2020, 30 pages.
Notice of Allowance received for Chinese Patent Application No. 201911219525.3, dated Sep. 29, 2020, 2 pages (1 page of English Translation and 1 page of Official Copy).
Office Action received for Australian Patent Application No. 2020201969, dated Sep. 25, 2020, 5 pages.
Office Action received for European Patent Application No. 19204230.7, dated Sep. 28, 2020, 6 pages.
Result of Consultation received for European Patent Application No. 19204230.7, mailed on Sep. 24, 2020, 5 pages.
Notice of Acceptance received for Australian Patent Application No. 2019213341, dated Aug. 25, 2020, 3 pages.
Office Action received for Australian Patent Application No. 2020100720, dated Sep. 1, 2020, 5 pages.
Office Action received for Chinese Patent Application No. 201911202668.3, dated Aug. 4, 2020, 13 pages (7 pages of English Translation and 6 pages of Official Copy).
Office Action received for Japanese Patent Application No. 2018-225131, dated Aug. 17, 2020, 21 pages (6 pages of English Translation and 15 pages of Official Copy).
Office Action received for Japanese Patent Application No. 2018-545502, dated Aug. 17, 2020, 14 pages (6 pages of English Translation and 8 pages of Official Copy).
Office Action received for Japanese Patent Application No. 2020-070418, dated Aug. 3, 2020, 22 pages (14 pages of English Translation and 8 pages of Official Copy).
Office Action received for Korean Patent Application No. 10-2020-0052618, dated Aug. 18, 2020, 11 pages (5 pages of English Translation and 6 pages of Official Copy).
Result of Consultation received for European Patent Application No. 19724959.2, mailed on Sep. 4, 2020, 3 pages.
Office Action received for European Patent Application 17809168.2, dated Oct. 8, 2020, 4 pages.
European Search Report received for European Patent Application No. 20206196.6, dated Dec. 8, 2020, 4 pages.
International Search Report and Written Opinion received for PCT Patent Application No. PCT/US2020/031643, dated Dec. 2, 2020, 33 pages.
Notice of Acceptance received for Australian Patent Application No. 2020267151, dated Dec. 9, 2020, 3 pages.
Office Action received for Danish Patent Application No. PA201970592, dated Oct. 26, 2020, 5 pages.
Applicant-Initiated Interview Summary received for U.S. Appl. No. 16/144,629, dated Nov. 23, 2020, 3 pages.
Applicant-Initiated Interview Summary received for U.S. Appl. No. 16/528,941, dated Nov. 10, 2020, 2 pages.
Certificate of Examination received for Australian Patent Application No. 2020100720, dated Nov. 11, 2020, 2 pages.
Intention to Grant received for European Patent Application No. 18183054.8, dated Nov. 5, 2020, 6 pages.
International Preliminary Report on Patentability received for PCT Patent Application No. PCT/US2019/024067, dated Nov. 19, 2020, 12 pages.
International Search Report and Written Opinion received for PCT Patent Application No. PCT/US2020/031643, dated Nov. 2, 2020, 34 pages.

(56) References Cited

OTHER PUBLICATIONS

Notice of Allowance received for Korean Patent Application No. 10-2020-0143726, dated Nov. 10, 2020, 5 pages (2 pages of English Translation and 3 pages of Official Copy).
Office Action received for Australian Patent Application No. 2020101043, dated Oct. 30, 2020, 4 pages.
Office Action received for Danish Patent Application No. PA201770719, dated Nov. 16, 2020, 5 pages.
Office Action received for Danish Patent Application No. PA201970603, dated Nov. 4, 2020, 3 pages.
Result of Consultation received for European Patent Application No. 19204230.7, mailed on Nov. 16, 2020, 3 pages.
European Search Report received for European Patent Application No. 20206197.4, dated Nov. 30, 2020, 4 pages.
Examiner Initiated-Interview Summary received for U.S. Appl. No. 16/528,941, dated Dec. 1, 2020, 2 pages.
Non-Final Office Action received for U.S. Appl. No. 16/528,941, dated Dec. 7, 2020, 15 pages.
Notice of Acceptance received for Australian Patent Application No. 2019266049, dated Nov. 24, 2020, 3 pages.
Notice of Allowance received for Korean Patent Application No. 10-2019-7027042, dated Nov. 26, 2020, 4 pages (1 page of English Translation and 3 pages of Official Copy).
Notice of Allowance received for Korean Patent Application No. 10-2020-0155924, dated Nov. 23, 2020, 7 pages (2 pages of English Translation and 5 pages of Official Copy).
Office Action received for Chinese Patent Application No. 201910692978.1, dated Nov. 4, 2020, 4 pages (1 page of English Translation and 3 pages of Official Copy).
Office Action received for Korean Patent Application No. 10-2020-7021870, dated Nov. 11, 2020, 11 pages (5 pages of English Translation and 6 pages of Official Copy).
Office Action received for Korean Patent Application No. 10-2020-7031855, dated Nov. 24, 2020, 6 pages (2 pages of English Translation and 4 pages of Official Copy).
Certificate of Examination received for Australian Patent Application No. 2020101043, dated Dec. 22, 2020, 2 pages.
Decision to Grant received for European Patent Application No. 18183054.8, dated Jan. 21, 2021, 3 pages.
Intention to Grant received for Danish Patent Application No. PA201970603, dated Jan. 13, 2021, 2 pages.
Intention to Grant received for European Patent Application No. 18209460.7, dated Jan. 15, 2021, 8 pages.
Office Action received for European Patent Application No. 20206196.6, dated Jan. 13, 2021, 10 pages.
Office Action received for European Patent Application No. 20206197.4, dated Jan. 12, 2021, 9 pages.
Office Action received for Chinese Patent Application No. 202010218168.5, dated Feb. 9, 2021,21 pages (9 pages of English Translation and 12 pages of Official Copy).
Notice of Allowance received for U.S. Appl. No. 16/528,941, dated May 19, 2021, 5 pages.
Notice of Allowance received for U.S. Appl. No. 16/599,433, dated May 14, 2021, 11 pages.
Office Action received for European Patent Application No. 20210373.5, dated May 10, 2021, 9 pages.
Clover Juli, "Moment Pro Camera App for iOS Gains Zebra Striping for Displaying Over and Underexposed Areas", Online Available at https://web.archive.org/web/20190502081353/https://www.macrumors.com/2019/05/01/momentcamera-app-zebra-striping-and-more/, May 1, 2019, 8 pages.
Decision to Refuse received for European Patent Application No. 19724959.2, dated Jun. 22, 2021, 13 pages.
Imagespacetv, "Olympus OM-D E-M1 Mark II—Highlights & Shadows with Gavin Hoey", Online available at: https://www.youtube.com/watch?v=goEhh1n--hQ, Aug. 3, 2018, 3 pages.
Intention to Grant received for European Patent Application No. dated on Jun. 25, 2021, 8 pages.
Office Action received for Australian Patent Application No. 2020239717, dated Jun. 23, 2021, 7 pages.

Office Action received for Australian Patent Application No. 2020260413, dated Jun. 24, 2021, 2 pages.
Office Action received for Danish Patent Application No. PA201770719, dated Jun. 30, 2021, 3 pages.
"Procamera Capture the Moment", Online Available at: http://www.procamera-app.com/procamera_manual/ProCamera_Manual_EN.pdf, Apr. 21, 2016, 63 pages.
Applicant-Initiated Interview Summary received for U.S. Appl. No. 17/027,317, dated Dec. 21, 2020, 4 pages.
Corrected Notice of Allowance received for U.S. Appl. No. 16/835,651, dated Jun. 14, 2021, 2 pages.
Corrected Notice of Allowance received for U.S. Appl. No. 17/027,484, dated May 14, 2021, 5 pages.
Corrected Notice of Allowance received for U.S. Appl. No. 17/027,484, dated May 28, 2021, 5 pages.
Intention to Grant received for Danish Patent Application No. PA202070611, dated May 5, 2021, 2 pages.
Minutes of the Oral Proceedings received for European Patent Application No. 19724959.2, dated Jun. 14, 2021, 6 pages.
Non-Final Office Action received for U.S. Appl. No. 17/027,317, dated Nov. 17, 2020, 17 pages.
Notice of Allowance received for U.S. Appl. No. 17/027,317, dated Apr. 12, 2021, 7 pages.
Notice of Allowance received for U.S. Appl. No. 17/027,317, dated Jan. 13, 2021, 10 pages.
Notice of Allowance received for U.S. Appl. No. 17/027,484, dated May 3, 2021, 11 pages.
Office Action received for Danish Patent Application No. PA202070611, dated Dec. 22, 2020, 7 pages.
Office Action received for European Patent Application No. 21163791.3, dated Jun. 2, 2021, 8 pages.
Office Action received for Japanese Patent Application No. 2020-184470, dated May 10, 2021, 3 pages (1 page of English Translation and 2 pages of Official Copy).
Applicant-Initiated Interview Summary received for U.S. Appl. No. 16/599,433, dated Apr. 20, 2021, 7 pages.
Decision to Grant received for European Patent Application No. 18209460.7, dated Apr. 9, 2021, 2 pages.
European Search Report received for European Patent Application No. 20210373.5, dated Apr. 13, 2021, 4 pages.
European Search Report received for European Patent Application No. 21157252.4, dated Apr. 16, 2021, 4 pages.
Intention to Grant received for Danish Patent Application No. PA201970593, dated Apr. 13, 2021, 2 pages.
Notice of Acceptance received for Australian Patent Application No. 2020201969, dated Mar. 26, 2021, 3 pages.
Notice of Acceptance received for Australian Patent Application No. 2020277216, dated Mar. 15, 2021, 3 pages.
Office Action received for European Patent Application No. 20168009.7, dated Apr. 20, 2021, 6 pages.
Office Action received for Japanese Patent Application No. 2020-193703, dated Apr. 19, 2021, 4 pages (2 pages of English Translation and 2 pages of Official Copy).
Office Action received for Indian Patent Application No. 201917053025, dated Mar. 19, 2021, 7 pages.
Certificate of Examination received for Australian Patent Application No. 2020104220, dated Apr. 1, 2021, 2 pages.
Decision on Appeal received for Japanese Patent Application No. 2018-225131, dated Mar. 11, 2021,5 pages (4 pages of English Translation and 1 page of Official Copy).
Decision on Appeal received for Japanese Patent Application No. 2018-545502, dated Mar. 25, 2021, 3 pages (1 page of English Translation and 2 pages of Official Copy).
Decision to Grant received for Danish Patent Application No. PA201970601, dared Feb. 3, 2021, 2 pages.
Decision to Grant received for Japanese Patent Application No. 2020-070418, dated Feb. 8, 2021, 3 pages (1 page of English Translation and 2 pages of Official Copy).
International Preliminary Report on Patentability received for PCT Patent Application No. PCT/US2019/049101, dated Mar. 25, 2021, 17 pages.
Non-Final Office Action received for U.S. Appl. No. 16/599,433, dated Jan. 28, 2021, 16 pages.

(56) References Cited

OTHER PUBLICATIONS

Notice of Acceptance received for Australian Patent Application No. 2021201167, dated Mar. 15, 2021, 3 pages.
Notice of Allowance received for Chinese Patent Application No. 201910692978.1, dated Feb. 4, 2021, 6 pages (3 pages of English Translation and 3 pages of Official Copy).
Notice of Allowance received for Chinese Patent Application No. 201911202668.3, dated Feb. 4, 2021, 5 pages (2 pages of English Translation and 3 pages of Official Copy).
Notice of Allowance received for Chinese Patent Application No. 202010287953.6, dated Mar. 18, 2021, 7 pages (3 pages of English Translation and 4 pages of Official Copy).
Notice of Allowance received for Chinese Patent Application No. 202010287961.0, dated Mar. 9, 2021, 8 pages (4 pages of English Translation and 4 pages of Official Copy).
Notice of Allowance received for Chinese Patent Application No. 202010287975.2, dated Mar. 1, 2021, 7 pages (3 pages of English Translation and 4 pages of Official Copy).
Notice of Allowance received for Korean Patent Application No. 10-2020-0052618, dated Mar. 23, 2021, 5 pages (2 page of English Translation and 3 pages of Official Copy).
Notice of Allowance received for Korean Patent Application No. 10-2020-7031855, dated Mar. 22, 2021, 5 pages (1 page of English Translation and 4 pages of Official Copy).
Office Action received for Chinese Patent Application No. 202010287950.2, dated Feb. 20, 2021, 22 pages (10 pages of English Translation and 12 pages of Official Copy).
Office Action received for Chinese Patent Application No. 202010287953.6, dated Jan. 14, 2021, 14 pages (7 pages of English Translation and 7 pages of Official Copy).
Office Action received for Chinese Patent Application No. 202010287958.9, dated Jan. 5, 2021, 16 pages (8 pages of English Translation and 8 pages of Official Copy).
Office Action received for Danish Patent Application No. PA201970593, dated Feb. 2, 2021, 2 pages.
Office Action received for Indian Patent Application No. 201814036470, dated Feb. 26, 2021, 7 pages.
Office Action received for Korean Patent Application No. 10-2021-0022053, dated Mar. 1, 2021, 11 pages (5 pages of English Translation and 6 pages of Official Copy).
Office Action received for Korean Patent Application No. 10-2021-7000954, dated Jan. 28, 2021, 5 pages (2 pages of English Translation and 3 pages of Official Copy).
Pre-Appeal Review Report received for Japanese Patent Application No. 2018-182607, dated Jan. 21, 2021, 4 pages (2 pages of English Translation and 2 pages of Official Copy).
Summons to Attend Oral Proceedings received for European Patent Application No. 19724959.2, dated Feb. 1, 2021, 9 pages.
Summons to Attend Oral Proceedings received for European Patent Application No. 19724959.2, dated Mar. 31, 2021, 3 pages.
Neurotechnology, "Sentimask SDK", Available at https://www.neurotechnology.com/sentimask.html, Apr. 22, 2018, 5 pages.
European Search Report received for European Patent Application No. 21163791.3, dated May 6, 2021, 5 pages.
Non-Final Office Action received for U.S. Appl. No. 16/825,879, dated May 5, 2021, 12 pages.
Notice of Allowance received for Korean Patent Application No. 10-2020-7021870, dated Apr. 26, 2021, 4 pages (1 page of English Translation and 3 pages of Official Copy).
Office Action received for European Patent Application No. 21157252.4, dated Apr. 23, 2021, 8 pages.
Office Action received for Indian Patent Application No. 202018006172, dated May 5, 2021, 6 pages.
Decision to Grant received for Danish Patent Application No. PA201970603, dated May 21, 2021, 2 pages.
Invitation to Pay Search Fees received for European Patent Application No. 18704732.9, dated Jun. 2, 2021, 3 pages.
Notice of Allowance received for U.S. Appl. No. 16/835,651, dated Jun. 1, 2021, 10 pages.

Office Action received for Chinese Patent Application No. 202010600151.6, dated Apr. 29, 2021, 11 pages (5 pages of English Translation and 6 pages of Official copy).
Office Action received for Japanese Patent Application No. 2020-184471, dated May 10, 2021, 3 pages (1 page of English Translation and 2 pages of Official Copy).
Summons to Attend Oral Proceedings received for European Patent Application No. 19204230.7, dated May 25, 2021, 10 pages.
Office Action received for Korean Patent Application No. 10-2021-7020693, dated Jul. 14, 2021, 7 pages (3 pages of English Translation and 4 pages of Official Copy).
Corrected Notice of Allowance received for U.S. Appl. No. 16/599,433, dated Aug. 13, 2021, 5 pages.
Corrected Notice of Allowance received for U.S. Appl. No. 16/825,879, dated Aug. 13, 2021, 2 pages.
Corrected Notice of Allowance received for U.S. Appl. No. 16/825,879, dated Jul. 23, 2021, 2 pages.
Corrected Notice of Allowance received for U.S. Appl. No. 16/825,879, dated Sep. 15, 2021, 2 pages.
Corrected Notice of Allowance received for U.S. Appl. No. 16/835,651, dated Aug. 10, 2021, 4 pages.
Corrected Notice of Allowance received for U.S. Appl. No. dated on Aug. 13, 2021, 2 pages.
Corrected Notice of Allowance received for U.S. Appl. No. 16/835,651, dated Jul. 28, 2021, 4 pages.
Decision to Grant received for Danish Patent Application No. PA201970593, dated Sep. 7, 2021, 2 pages.
Decision to Grant received for Japanese Patent Application No. 2020-184470, dated Jul. 1, 2021, 3 pages (1 page of English Translation and 2 pages of Official Copy).
Decision to Grant received for Japanese Patent Application No. 2020-184471, dated Jul. 1, 2021, 3 pages (1 page of English Translation and 2 pages of Official Copy).
Decision to Grant received for Japanese Patent Application No. 2020-193703, dated Aug. 10, 2021, 3 pages (1 page of English Translation and 2 pages of Official Copy).
Decision to Grant received for Japanese Patent Application No. 2021-051385, dated Jul. 8, 2021, 3 pages (1 page of English Translation and 2 pages of Official Copy).
Examiner's Answer to Appeal Brief received for U.S. Appl. No. 16/144,629, dated Jul. 21, 2021, 21 pages.
Invitation to Pay Additional Fees received for PCT Patent Application No. PCT/US2021/034304, dated Aug. 20, 2021, 16 pages.
Non-Final Office Action received for U.S. Appl. No. 16/528,257, dated Jul. 30, 2021, 12 pages.
Notice of Acceptance received for Australian Patent Application No. 2021203210, dated Jul. 9, 2021, 3 pages.
Notice of Allowance received for Chinese Patent Application No. 202010218168.5, dated Aug. 25, 2021, 6 pages (3 pages of English Translation and 3 pages of Official Copy).
Notice of Allowance received for Chinese Patent Application No. 202010287958.9, dated Aug. 27, 2021, 6 pages (3 pages of English Translation and 3 pages of Official Copy).
Notice of Allowance received for Chinese Patent Application No. 202010600151.6, dated Aug. 13, 2021, 2 pages (1 page of English Translation and 1 page of Official Copy).
Notice of Allowance received for Korean Patent Application No. 10-2021-7000954, dated Aug. 18, 2021, 5 pages (2 pages of English Translation and 3 pages of Official Copy).
Notice of Allowance received for Korean Patent Application No. 10-2021-7019525, dated Jul. 13, 2021, 5 pages (1 page of English Translation and 4 pages of Official Copy).
Notice of Allowance received for U.S. Appl. No. 16/528,941, dated Aug. 10, 2021, 5 pages.
Notice of Allowance received for U.S. Appl. No. 16/825,879, dated Jul. 13, 2021, 9 pages.
Notice of Allowance received for U.S. Appl. No. 16/835,651, dated Jul. 23, 2021, 8 pages.
Office Action received for Australian Patent Application No. 2021103004, dated Aug. 12, 2021, 5 pages.
Office Action received for Chinese Patent Application No. 202010287950.2, dated Aug. 10, 2021, 12 pages (6 pages of English Translation and 6 pages of Official Copy).

(56) References Cited

OTHER PUBLICATIONS

Office Action received for Chinese Patent Application No. 202010600197.8, dated Jul. 2, 2021, 14 pages (6 pages of English Translation and 8 pages of Official Copy).
Office Action received for Chinese Patent Application No. 202010601484.0, dated Jun. 3, 2021, 13 pages (6 pages of English Translation and 7 pages of Official Copy).
Office Action received for Chinese Patent Application No. 202011480411.7, dated Aug. 2, 2021, 12 pages (6 pages of English Translation and 6 pages of Official Copy).
Office Action received for European Patent Application No. 18704732.9, dated Sep. 7, 2021, 10 pages.
Office Action received for European Patent Application No. 20206197.4, dated Aug. 27, 2021, 6 pages.
Office Action received for Japanese Patent Application No. 2019-203399, dated Aug. 10, 2021, 4 pages (2 pages of English Translation and 2 pages of Official Copy).
Feng et al., "3D Direct Human-Computer Interface Paradigm Based on Free Hand Tracking", Chinese Journal of Computers, vol. 37, No. 6, Jun. 30, 2014, 15 pages (Official copy only) (See communication under 37 CFR § 1.98(a) (3)).
Certificate of Examination received for Australian Patent Application No. 2021103004, dated Sep. 13, 2021, 2 pages.
Notice of Allowance received for U.S. Appl. No. 16/825,879, dated Sep. 28, 2021, 8 pages.
Office Action received for European Patent Application No. 20168009.7, dated Sep. 13, 2021, 8 pages.
Office Action received for Japanese Patent Application No. 2018-182607, dated Sep. 8, 2021, 7 pages (4 pages of English Translation and 3 pages of Official Copy).
"Nikon Digital Camera D7200 User's Manual", Online available at https://download.nikonimglib.com/archive3/dbHI400jWws903mGr6q98a4k8F90/D7200UM_SG(En)05.pdf, 2005, 416 pages.
Notice of Allowance received for U.S. Appl. No. 16/599,433, dated Oct. 4, 2021, 13 pages.
Office Action received for Australian Patent Application No. 2020239717, dated Sep. 28, 2021, 6 pages.
Office Action received for Indian Patent Application No. 201817024430, dated Sep. 27, 2021, 8 pages.

\* cited by examiner

700

702
Concurrently display, on the display a camera application user interface, wherein the camera application user interface includes:

704
A digital viewfinder including a live preview of a field of view of one or more cameras.

706
A representation of a filter picker user interface overlaid on the digital viewfinder.

708
The representation of the filter picker user interface includes a representation of the first filter, a representation of a second filter, and a representation of a third filter.

710
A value of a visual characteristic of the representation of the first filter is different than a value of the visual characteristic of the representation of the second filter and the value of the visual characteristic of the representation of the third filter.

712
The representation of the filter picker user interface is a representation of a three-dimensional object having a plurality of faces.

720
In response to detecting the first input:

722
In accordance with a determination that first criteria are met, wherein the first criteria include a requirement that a filter picker user interface is overlaid on the respective portion of the live preview when the first input is detected:

724
Apply a preview of a first filter to the live preview of the field of view of the camera that was not applied before the first input was detected.

726
In accordance with a determination that the filter picker user interface is not overlaid on the respective portion of the live preview when the first input is detected:

728
Perform a respective operation in the camera application without applying the preview of the first filter to the live preview.

730
Performing the respective operation includes selecting a focus point for media capture at an object located in the field of view of the camera at the respective portion of the live preview at which the input is detected.

726
In accordance with a determination that the filter picker user interface is not overlaid on the respective portion of the live preview when the first input is detected:

(C)

744
While the filter picker user interface is displayed and not overlaid on the respective portion of the live preview:

746
Detect a second input that starts at a location corresponding to the filter picker user interface.

748
In response to detecting the second input, expand the filter picker user interface to overlay the respective portion of the live preview.

902
Receive, at the device, image data and depth map information associated with the representation of image data.

904
Display, on the display, a representation of image data associated with depth map information.

906
The representation of the image data is a live preview of image data captured within the field of view of the one or more cameras displayed in a digital viewfinder.

908
The image data associated with the depth map information associated with the image data includes information corresponding to at least three different depth levels.

910
The image data associated with depth map information associated with the image data includes information identifying depth contours of an object in the representation of the image data.

912
While displaying, on the display, the representation of the image data:

(B)

┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ 920
│ In response to the first input, apply, to the live preview, a placeholder filter without
│ applying the first lighting effect to the live preview.
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘

┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ 922
│ After displaying the live preview without applying the first lighting effect to the live
│ preview, detect that the first criteria have been met.
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘

924
In accordance with detecting the first input, apply a first lighting effect to the
representation of image data, wherein the first lighting effect is based on the depth map
information.

┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ 926
│ Applying the first lighting effect includes: applying, to the representation of
│ the image data displayed in the viewfinder, a placeholder filter wherein the
│ placeholder filter is based on the first lighting effect and is applied without
│ regard to whether or not the first criteria are met.
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘

┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ 928
│ Applying the first lighting effect includes: applying, to the representation of
│ the image data displayed in the viewfinder, a simulation of one or more point-
│ of-light sources in space based on the depth map information associated with
│ the image data.
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘

```
┌─────────────────────────────────────────────────────────────────────┐
│                              912                                    │
│  While displaying, on the display, the representation of the image data: │
│                                                                     │
│                              (C)                                    │
│                               ▼                                     │
│  ┌───────────────────────────────────────────────────────────────┐  │
│  │                            930                                │  │
│  │      Detect, via the one or more input devices, a second input. │  │
│  └───────────────────────────────────────────────────────────────┘  │
│                               ▼                                     │
│  ┌───────────────────────────────────────────────────────────────┐  │
│  │                            932                                │  │
│  │  In accordance with detecting the second input, apply a second lighting effect different than │
│  │  the first lighting effect to the representation of image data, wherein the second lighting │
│  │        effect is based on the depth map information.          │  │
│  │  ┌─────────────────────────────────────────────────────────┐  │  │
│  │  │                        934                              │  │  │
│  │  │  Applying the second lighting effect includes: applying, to the representation │  │  │
│  │  │  of the image data displayed in the digital viewfinder, a simulation of one or │  │  │
│  │  │  more point-of-light sources in space based on the depth information of the │  │  │
│  │  │                     image data.                         │  │  │
│  │  └─────────────────────────────────────────────────────────┘  │  │
│  └───────────────────────────────────────────────────────────────┘  │
│                                                                     │
│  ┌───────────────────────────────────────────────────────────────┐  │
│  │                            936                                │  │
│  │  The lighting effects change the appearance of the representation of the image data based │
│  │        on a location and curvature of the contours of the object. │  │
│  └───────────────────────────────────────────────────────────────┘  │
└─────────────────────────────────────────────────────────────────────┘
```

1102
Concurrently display, on the display: a representation of image data and a filter selection interface.

1104
Detect, via the one or more input devices, a first input that corresponds to selection of a first image filter of the representation of image data that has a first appearance.

1106
The representation of the image data is a live preview of image data captured within the field of view of the one or more cameras.

1108
The first input is detected while displaying the filter selection user interface.

1110
The filter selection user interface includes a plurality of filter representations including a representation of the first image filter, wherein the first input correspond to a selection of the representation of the first image filter.

1112
In response to detecting the first input, apply the first image filter to the representation of image data, including:

1122
After applying the first image filter to the representation of image data, display, on the display, the representation of the respective image with the first filter applied to the representation of image data.

1124
In accordance with a determination that the image data includes a third color value, shift the third color value using a third level of color value adjustment.

1126
In accordance with a determination that the image data does not have associated with it depth information, uniformly apply the first image filter to the representation of image data with the first level of adjustment.

1302
Display, on the display, a filter selection interface which includes representations of a plurality of filters in a set of filters.

1304
The representation of a first filter corresponds to a no filter option.

1306
The representation of the first filter corresponds to a most recently used filter option.

1308
The representation of the first filter does not correspond to the most recently applied filter and does not correspond to a no filter option.

1310
The representation of the first filter in the filter selection interface includes a live preview of the field of view of the one or more cameras of the device with the first filter applied.

1312
The representation of a second filter in the filter selection interface includes a live preview of the field of view of the one or more cameras of the device with the second filter applied.

1314
The filter selection interface further includes a visual indicator identifying a representation of a third filter, wherein the third filter is a most recently used filter.

1332
The first subset of representations of filters of the set of filters includes:

( C )

1340
Two or more filters of the plurality of filters except:

1342
The representation of the first filter and a representation of a fourth filter corresponding to a most recently applied filter.

1344
The representation of the first filter and a representation of a fifth filter corresponding to a no filter option.

1346
The representation of the first filter, the representation of a sixth filter corresponding to a most recently applied filter, and the representation of a seventh filter corresponding to a no filter option.

1506
In accordance with a determination, based on data from the sensor, that the device meets alignment-guide display criteria:

1516
Display, on the display, an alignment guide in the camera viewfinder.

1518
The appearance of the alignment guide changes as the orientation of the plane of focus of the camera changes relative to the predetermined orientation.

1520
The alignment guide includes at least two visual indicators.

1522
At least one of the at least two indicators remains stationary as the orientation of the plane of focus of the camera changes relative to the predetermined orientation.

1524
A distance between the two visual indicators is dynamically based on the relative difference between the orientation of the plane of focus of the camera and the predetermined orientation.

 

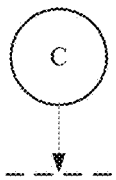

1526
While displaying the alignment guide and while the orientation of the plane of focus of the camera is a first orientation, detect, based on data from the sensor, a change in orientation of the plane of focus of the camera from the first orientation to a second orientation.

1528
In response to detecting the change in orientation of the plane of focus of the camera from the first orientation to the second orientation:

1530
Change a displayed position of a first visual indicator of the at least two visual indicators, wherein the displayed position of the first visual indicator is changed based on the relative difference between the first orientation and the second orientation.

1532
In accordance with a determination that the relative difference between the second orientation of the plane of focus of the camera and the predetermined orientation is not within a first visual indicator alignment threshold, display the first visual indicator at the updated display position.

1534
In accordance with a determination that the relative difference between the second orientation of the plane of focus of the camera and the predetermined orientation is within the first visual indicator alignment threshold, display the first visual indicator at a predetermined display position.

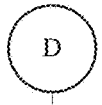

1544
While the orientation of the plane of focus of the camera is at a seventh orientation having a relative difference to the predetermined orientation that is within the respective alignment threshold and while a third visual indicator of the at least two visual indicator is displayed, detect, based on data from the sensor, a change in orientation of the plane of focus of the camera from the seventh orientation to an eighth orientation.

1546
In response to detecting the change in orientation of the plane of focus of the camera from the seventh orientation to the eight orientation:

1548
In in accordance with a determination that a relative difference between the eighth orientation of the plane of focus of the camera and the predetermined orientation is within the visual indicator alignment threshold, maintain display of the third visual indicator.

1550
In accordance with a determination that the relative difference between the eighth orientation of the plane of focus of the camera and the predetermined orientation is not within the visual indicator alignment threshold, cease display of the third visual indicator.

1702
Display, on the display, a representation of image data associated with depth map information.

1704
The representation of the image data is a live preview of image data captured within the field of view of the one or more cameras displayed in the digital viewfinder.

1706
The image data associated with the depth map information associated with the image data includes information corresponding to at least three different depth levels.

1708
The image data associated with depth map information associated with the image data includes information identifying depth contours of an object in the representation of the image data.

1710
While displaying, on the display, the representation of the image data:

1712
Detect, via the one or more input devices, a first input that selects a respective filter of a plurality of lighting effects that are based on the depth map information.

1714
The first input is an input received while first criteria are met, wherein the first criteria include a requirement that a subject is detected in the field of view within a predetermined distance from the electronic device in order for the first criteria to be met.

1716
The first input is an input received while the first criteria are not met, wherein the first criteria include a requirement that a subject is detected in the field of view within a predetermined distance from the electronic device in order for the first criteria to be met.

```
┌─────────────────────────────────────────────────────────────────────┐
│                              1710                                   │
│   While displaying, on the display, the representation of the image data: │
│                                                                     │
│                              (B)                                    │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │
│  │                           1718                               │  │
│  │  In response to detecting the first input, prepare to capture image data using the respective │  │
│  │                        filter, including:                    │  │
│  │                                                              │  │
│  │  ┌ ─ ─ ─ ─ ─ ─ ─ ─ ─ ─ ─ ─ ─ ─ ─ ─ ─ ─ ─ ─ ─ ─ ─ ─ ─ ─ ┐   │  │
│  │  │                         1720                           │   │  │
│  │  │  In accordance with a determination that the respective lighting effect is the │ │  │
│  │  │  first lighting effect, display a capture user interface for the first lighting effect │ │  │
│  │  │   that causes a first change in appearance of a portion of the representation of │ │  │
│  │  │   the image data when a subject in the field of view of the one or more cameras │ │  │
│  │  │                   meets the first criteria.            │   │  │
│  │  │                         (C)                            │   │  │
│  │  └ ─ ─ ─ ─ ─ ─ ─ ─ ─ ─ ─ ─ ─ ─ ─ ─ ─ ─ ─ ─ ─ ─ ─ ─ ─ ─ ┘   │  │
│  │                                                              │  │
│  │  ┌ ─ ─ ─ ─ ─ ─ ─ ─ ─ ─ ─ ─ ─ ─ ─ ─ ─ ─ ─ ─ ─ ─ ─ ─ ─ ─ ┐   │  │
│  │  │                         1722                           │   │  │
│  │  │  In accordance with a determination that the respective lighting effect is the │ │  │
│  │  │  second lighting effect, display a capture user interface for the second lighting │ │  │
│  │  │   effect that causes a second change in appearance of a portion of the │ │  │
│  │  │  representation of the image data when a subject in the field of view of the one │ │  │
│  │  │                 or more cameras meets the first criteria. │   │  │
│  │  └ ─ ─ ─ ─ ─ ─ ─ ─ ─ ─ ─ ─ ─ ─ ─ ─ ─ ─ ─ ─ ─ ─ ─ ─ ─ ─ ┘   │  │
│  │                              (E)                             │  │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │
└─────────────────────────────────────────────────────────────────────┘
```

1720
In accordance with a determination that the respective lighting effect is the first lighting effect, display a capture user interface for the first lighting effect that causes a first change in appearance of a portion of the representation of the image data when a subject in the field of view of the one or more cameras meets the first criteria.

1724
Wherein displaying the capture user interface for the first lighting effect includes concurrently displaying: the representation of the image data; and an alignment guide displayed at a first area within the representation of the image data, and wherein the first criteria include a requirement that a representation of a face of the subject displayed in the representation of the image data is within the alignment guide in order for the first criteria to be met.

1726
Wherein the first criteria include a requirement that a representation of a face of the subject detected in a first area within the representation of the image data in order for the first criteria to be met.

1728
Applying the first change in appearance to the image data includes changing an appearance of the representation of the image data displayed in a second area within the representation of the image data as compared to an appearance of the representation of the image data displayed in a first area within the representation of the image data, wherein the second area is distinct from the first area.

(D)

1730
Wherein displaying the capture user interface for the first lighting effect includes: applying, to the representation of the image data displayed in the digital viewfinder, a placeholder filter, wherein the placeholder filter is based on the first lighting effect and is applied without regard to whether or not the first criteria are met.

__1732__
While the first change in appearance to the representation of image data is being applied:

__1734__
Determine that the first criteria are not met.

__1736__
In response to the determination that the first criteria are not met.

__1738__
Cease to apply the first change in appearance to the representation of image data.

__1740__
Display, on the display, the representation of image data without a first change in appearance applied.

__1742__
Display, on the display, a graphical indication of the first criteria that are not met.

```
┌─────────────────────────────────────────────────────────────────────────┐
│                              1710                                       │
│   While displaying, on the display, the representation of the image data: │
│                                                                         │
│                               (E)                                       │
│                                ▼                                        │
│   ┌─────────────────────────────────────────────────────────────────┐   │
│   │                          1744                                   │   │
│   │ After detecting the first input, detect a second input that     │   │
│   │ corresponds to a request to capture image data corresponding    │   │
│   │ to a field of view of the one or more cameras.                  │   │
│   └─────────────────────────────────────────────────────────────────┘   │
│                                ▼                                        │
│   ┌─────────────────────────────────────────────────────────────────┐   │
│   │                          1746                                   │   │
│   │ In response to detecting the second input, capture image data   │   │
│   │ corresponding to the field of view of the one or more cameras,  │   │
│   │ including:                                                      │   │
│   │                                                                 │   │
│   │   ┌─────────────────────────────────────────────────────────┐   │   │
│   │   │                       1748                              │   │   │
│   │   │ In accordance with a determination that the respective  │   │   │
│   │   │ lighting effects selected based on the first input is a │   │   │
│   │   │ first lighting effect, capture image data corresponding │   │   │
│   │   │ to the field of view of the one or more cameras and     │   │   │
│   │   │ associating the first lighting effect with the          │   │   │
│   │   │ representation of image data, wherein the first         │   │   │
│   │   │ lighting effect is based on the depth map information.  │   │   │
│   │   └─────────────────────────────────────────────────────────┘   │   │
│   │                                                                 │   │
│   │   ┌─────────────────────────────────────────────────────────┐   │   │
│   │   │                       1750                              │   │   │
│   │   │ In accordance with a determination that the respective  │   │   │
│   │   │ lighting effects selected based on the first input is a │   │   │
│   │   │ second lighting effect that is different from the       │   │   │
│   │   │ first lighting effect, capture image data corresponding │   │   │
│   │   │ to the field of view of the one or more cameras and     │   │   │
│   │   │ associating the second lighting effect with the         │   │   │
│   │   │ representation of image data, wherein the second        │   │   │
│   │   │ lighting effect is based on the depth map information.  │   │   │
│   │   └─────────────────────────────────────────────────────────┘   │   │
│   └─────────────────────────────────────────────────────────────────┘   │
└─────────────────────────────────────────────────────────────────────────┘
                                 ▼
                                (F)
```

---
1752
After capturing image data corresponding to the field of view of the one or more cameras, receive a request to display image data captured in response to the second input.

---

1754
In response to receiving the request to display image data captured in response to the second input:

1756
In accordance with a determination that the image data was captured while the first lighting effect was selected, display the representation of image data with the first lighting effect applied.

1758
In accordance with a determination that the image data was captured while the first lighting effect was selected, display the representation of image data with the first lighting effect applied.

*FIG. 17G*

USER INTERFACE CAMERA EFFECTS

This application is a continuation of U.S. patent application Ser. No. 15/728,147, entitled "USER INTERFACE CAMERA EFFECTS," filed on Oct. 9, 2017, which claims priority to U.S. provisional patent application No. 62/556,414, entitled "USER INTERFACE CAMERA EFFECTS," filed on Sep. 9, 2017, and U.S. provisional patent application No. 62/514,947, entitled "USER INTERFACE CAMERA EFFECTS," filed on Jun. 4, 2017. The content of which are hereby incorporated by reference in their entirety for all purposes.

FIELD

The present disclosure relates generally to computer user interfaces of electronic devices, particularly devices with built in cameras.

BACKGROUND

The use of electronic devices for recording videos and taking pictures has increased significantly in recent years. Exemplary electronic devices for recording videos and takin pictures include smart phones and hand-held cameras. Such devices frequently include a viewfinder, which the user can use for previewing before taking a picture or recording a video.

BRIEF SUMMARY

Some techniques for managing camera effects using electronic devices, however, are generally cumbersome and inefficient. For example, modifying the visual effects in viewfinders such that captured images and recorded videos exhibit the visual effects often requires extensive user input and is imprecise. Existing techniques require more time than necessary, wasting user time and device energy. This latter consideration is particularly important in battery-operated devices.

Accordingly, the present technique provides electronic devices with faster, more efficient methods and interfaces for managing camera effects. Such methods and interfaces optionally complement or replace other methods for managing camera effects. Such methods and interfaces reduce the cognitive burden on a user and produce a more efficient human-machine interface. For battery-operated computing devices, such methods and interfaces conserve power and increase the time between battery charges. In some examples, the techniques provide simulated visual effects in camera viewfinders and captured images without requiring additional hardware components. In some examples, the techniques provide the ability to quickly transition between user interfaces with limited user input. In some examples, the techniques efficiently provide enhanced image editing capabilities that result in visual pleasing results for a displayed digital viewfinder and for captured videos. In some examples, the techniques efficiently provide user interfaces for transitioning between different sets of options with minimal input. In some examples, the techniques efficiently provide user interfaces to provide additional functionality without any direct input. Such techniques reduce the number of required user inputs and conserve battery power.

An exemplary method includes, at an electronic device with one or more cameras, one or more input devices, and a display: concurrently displaying, on the display a camera application user interface, wherein the camera application user interface includes: a digital viewfinder including a live preview of a field of view of one or more cameras; and a representation of a filter picker user interface overlaid on the digital viewfinder; while concurrently displaying the digital viewfinder and the representation of the filter picker user interface, detecting a first input that starts at a location corresponding to a respective portion of the live preview, via the one or more input devices; and in response to detecting the first input: in accordance with a determination that first criteria are met, wherein the first criteria include a requirement that a filter picker user interface is overlaid on the respective portion of the live preview when the first input is detected, applying a preview of a first filter to the live preview of the field of view of the camera that was not applied before the first input was detected; and in accordance with a determination that the filter picker user interface is not overlaid on the respective portion of the live preview when the first input is detected, performing a respective operation in the camera application without applying the preview of the first filter to the live preview.

An exemplary non-transitory computer-readable storage medium stores one or more programs configured to be executed by one or more processors of an electronic device with one or more cameras, one or more input devices, and a display. The one or more programs include instructions for: concurrently displaying, on the display a camera application user interface, wherein the camera application user interface includes: a digital viewfinder including a live preview of a field of view of one or more cameras; and a representation of a filter picker user interface overlaid on the digital viewfinder; while concurrently displaying the digital viewfinder and the representation of the filter picker user interface, detecting a first input that starts at a location corresponding to a respective portion of the live preview, via the one or more input devices; and in response to detecting the first input: in accordance with a determination that first criteria are met, wherein the first criteria include a requirement that a filter picker user interface is overlaid on the respective portion of the live preview when the first input is detected, applying a preview of a first filter to the live preview of the field of view of the camera that was not applied before the first input was detected; and in accordance with a determination that the filter picker user interface is not overlaid on the respective portion of the live preview when the first input is detected, performing a respective operation in the camera application without applying the preview of the first filter to the live preview.

An exemplary transitory computer-readable storage medium stores one or more programs configured to be executed by one or more processors of an electronic device with one or more cameras, one or more input devices, and a display. The one or more programs include instructions for: concurrently displaying, on the display a camera application user interface, wherein the camera application user interface includes: a digital viewfinder including a live preview of a field of view of one or more cameras; and a representation of a filter picker user interface overlaid on the digital viewfinder; while concurrently displaying the digital viewfinder and the representation of the filter picker user interface, detecting a first input that starts at a location corresponding to a respective portion of the live preview, via the one or more input devices; and in response to detecting the first input: in accordance with a determination that a first criteria are met, wherein the first criteria include a requirement that a filter picker user interface is overlaid on the respective portion of the live preview when the first input is detected, applying a preview of a first filter to the live preview of the field of view of the camera that was not applied before the first input was detected; and in accordance with a determination that the filter picker user interface is not overlaid on the respective portion of the live preview when the first input is detected, performing a respective operation in the camera application without applying the preview of the first filter to the live preview.

An exemplary electronic device comprises one or more cameras, one or more input devices, a display, one or more processors, and memory storing one or more programs configured to be executed by the one or more processors. The one or more programs include instructions for: concurrently displaying, on the display a camera application user interface, wherein the camera application user interface includes: a digital viewfinder including a live preview of a field of view of one or more cameras; and a representation of a filter picker user interface overlaid on the digital viewfinder; while concurrently displaying the digital viewfinder and the representation of the filter picker user interface, detecting a first input that starts at a location corresponding to a respective portion of the live preview, via the one or more input devices; and in response to detecting the first input: in accordance with a determination that a first criteria are met, wherein the first criteria include a requirement that a filter picker user interface is overlaid on the respective portion of the live preview when the first input is detected, applying a preview of a first filter to the live preview of the field of view of the camera that was not applied before the first input was detected; and in accordance with a determination that the filter picker user interface is not overlaid on the respective portion of the live preview when the first input is detected, performing a respective operation in the camera application without applying the preview of the first filter to the live preview.

An exemplary electronic device comprises: one or more cameras; one or more input devices; a display; means for concurrently displaying, on the display a camera application user interface, wherein the camera application user interface includes: a digital viewfinder including a live preview of a field of view of one or more cameras; and a representation of a filter picker user interface overlaid on the digital viewfinder; means, while concurrently displaying the digital viewfinder and the representation of the filter picker user interface, for detecting a first input that starts at a location corresponding to a respective portion of the live preview, via the one or more input devices; and means, responsive to detecting the first input, for: in accordance with a determination that a first criteria are met, wherein the first criteria include a requirement that a filter picker user interface is overlaid on the respective portion of the live preview when the first input is detected, applying a preview of a first filter to the live preview of the field of view of the camera that was not applied before the first input was detected; and in accordance with a determination that the filter picker user interface is not overlaid on the respective portion of the live preview when the first input is detected, performing a respective operation in the camera application without applying the preview of the first filter to the live preview.

An exemplary method includes, at an electronic device with one or more input devices and a display: displaying, on the display, a representation of image data associated with depth map information; while displaying, on the display, the representation of the image data: detecting, via the one or more input devices, a first input; in accordance with detecting the first input, applying a first lighting effect to the representation of image data, wherein the first lighting effect is based on the depth map information; detecting, via the one or more input devices, a second input; and in accordance with detecting the second input, applying a second lighting effect different than the first lighting effect to the representation of image data, wherein the second lighting effect is based on the depth map information.

An exemplary non-transitory computer-readable storage medium stores one or more programs configured to be executed by one or more processors of an electronic device with one or more input devices and a display. The one or more programs including instructions for: displaying, on the display, a representation of image data associated with depth map information; while displaying, on the display, the representation of the image data: detecting, via the one or more input devices, a first input; in accordance with detecting the first input, applying a first lighting effect to the representation of image data, wherein the first lighting effect is based on the depth map information; detecting, via the one or more input devices, a second input; and in accordance with detecting the second input, applying a second lighting effect different than the first lighting effect to the representation of image data, wherein the second lighting effect is based on the depth map information.

An exemplary transitory computer-readable storage medium stores one or more programs configured to be executed by one or more processors of an electronic device with one or more input devices and a display. The one or more programs including instructions for: displaying, on the display, a representation of image data associated with depth map information; while displaying, on the display, the representation of the image data: detecting, via the one or more input devices, a first input; in accordance with detecting the first input, applying a first lighting effect to the representation of image data, wherein the first lighting effect is based on the depth map information; detecting, via the one or more input devices, a second input; and in accordance with detecting the second input, applying a second lighting effect different than the first lighting effect to the representation of image data, wherein the second lighting effect is based on the depth map information.

An exemplary electronic device comprises: one or more input devices; a display; one or more processors; and memory storing one or more programs configured to be executed by the one or more processors, the one or more programs including instructions for: displaying, on the display, a representation of image data associated with depth map information; while displaying, on the display, the representation of the image data: detecting, via the one or more input devices, a first input; in accordance with detecting the first input, applying a first lighting effect to the representation of image data, wherein the first lighting effect is based on the depth map information; detecting, via the one or more input devices, a second input; and in accordance with detecting the second input, applying a second lighting effect different than the first lighting effect to the representation of image data, wherein the second lighting effect is based on the depth map information.

An exemplary electronic device, comprises: one or more cameras; one or more input devices; a display; means for displaying, on the display, a representation of image data associated with depth map information; means, while displaying, on the display, the representation of the image data, for: detecting, via the one or more input devices, a first input; in accordance with detecting the first input, applying a first lighting effect to the representation of image data, wherein the first lighting effect is based on the depth map information; detecting, via the one or more input devices, a second input; and in accordance with detecting the second input, applying a second lighting effect different than the first lighting effect to the representation of image data, wherein the second lighting effect is based on the depth map information.

An exemplary method includes, at an electronic device with one or more input devices and a display: detecting, via the one or more input devices, a first input that corresponds to selection of a first image filter of a representation of image data that has a first appearance; and in response to detecting the first input, applying the first image filter to the representation of image data, including: in accordance with a determination that the image data has associated with it a depth information, wherein the depth information enables a foreground region of the representation of image data to be distinguished from a background region of the representation of image data: applying the first image filter to the foreground region of the representation of image data with a first level of adjustment to change the appearance of the foreground region of the representation of image data, wherein the first level adjustment indicates a first degree to which the first image filter changes the appearance of the representation of image data; applying the first image filter to the background region of the representation of image data with a second level of adjustment to change the appearance of the background region of the representation of image data, wherein the second level adjustment indicates a second degree to which the first image filter changes the appearance of the representation of image data, wherein the first level of adjustment and the second level of adjustment are different; and after applying the first image filter to the representation of image data, displaying, on the display, the representation of the respective image with the first filter applied to the representation of image data.

An exemplary non-transitory computer-readable storage medium stores one or more programs configured to be executed by one or more processors of an electronic device with one or more input devices and a display. The one or more programs including instructions for: detecting, via the one or more input devices, a first input that corresponds to selection of a first image filter of a representation of image data that has a first appearance; and in response to detecting the first input, applying the first image filter to the representation of image data, including: in accordance with a determination that the image data has associated with it a depth information, wherein the depth information enables a foreground region of the representation of image data to be distinguished from a background region of the representation of image data: applying the first image filter to the foreground region of the representation of image data with a first level of adjustment to change the appearance of the foreground region of the representation of image data, wherein the first level adjustment indicates a first degree to which the first image filter changes the appearance of the representation of image data; applying the first image filter to the background region of the representation of image data with a second level of adjustment to change the appearance of the background region of the representation of image data, wherein the second level adjustment indicates a second degree to which the first image filter changes the appearance of the representation of image data, wherein the first level of adjustment and the second level of adjustment are different; and after applying the first image filter to the representation of image data, displaying, on the display, the representation of the respective image with the first filter applied to the representation of image data.

An exemplary transitory computer-readable storage medium stores one or more programs configured to be executed by one or more processors of an electronic device with one or more input devices and a display. The one or more programs including instructions for: detecting, via the one or more input devices, a first input that corresponds to selection of a first image filter of a representation of image data that has a first appearance; and in response to detecting the first input, applying the first image filter to the representation of image data, including: in accordance with a determination that the image data has associated with it a depth information, wherein the depth information enables a foreground region of the representation of image data to be distinguished from a background region of the representation of image data: applying the first image filter to the foreground region of the representation of image data with a first level of adjustment to change the appearance of the foreground region of the representation of image data, wherein the first level adjustment indicates a first degree to which the first image filter changes the appearance of the representation of image data; applying the first image filter to the background region of the representation of image data with a second level of adjustment to change the appearance of the background region of the representation of image data, wherein the second level adjustment indicates a second degree to which the first image filter changes the appearance of the representation of image data, wherein the first level of adjustment and the second level of adjustment are different; and after applying the first image filter to the representation of image data, displaying, on the display, the representation of the respective image with the first filter applied to the representation of image data.

An exemplary electronic device comprises: one or more input devices; a display; one or more processors; and memory storing one or more programs configured to be executed by the one or more processors, the one or more programs including instructions for: detecting, via the one or more input devices, a first input that corresponds to selection of a first image filter of a representation of image data that has a first appearance; and in response to detecting the first input, applying the first image filter to the representation of image data, including: in accordance with a determination that the image data has associated with it a depth information, wherein the depth information enables a foreground region of the representation of image data to be distinguished from a background region of the representation of image data: applying the first image filter to the foreground region of the representation of image data with a first level of adjustment to change the appearance of the foreground region of the representation of image data, wherein the first level adjustment indicates a first degree to which the first image filter changes the appearance of the representation of image data; applying the first image filter to the background region of the representation of image data with a second level of adjustment to change the appearance of the background region of the representation of image data, wherein the second level adjustment indicates a second degree to which the first image filter changes the appearance of the representation of image data, wherein the first level of adjustment and the second level of adjustment are different; and after applying the first image filter to the representation of image data, displaying, on the display, the representation of the respective image with the first filter applied to the representation of image data.

An exemplary electronic device comprises: one or more input devices; a display; means for detecting, via the one or more input devices, a first input that corresponds to selection of a first image filter of a representation of image data that has a first appearance; and means, responsive to detecting the first input, for applying the first image filter to the representation of image data, including means for: in accordance with a determination that the image data has associated with it a depth information, wherein the depth information enables a foreground region of the representation of image data to be distinguished from a background region of the representation of image data: applying the first image filter to the foreground region of the representation of image data with a first level of adjustment to change the appearance of the foreground region of the representation of image data, wherein the first level adjustment indicates a first degree to which the first image filter changes the appearance of the representation of image data; applying the first image filter to the background region of the representation of image data with a second level of adjustment to change the appearance of the background region of the representation of image data, wherein the second level adjustment indicates a second degree to which the first image filter changes the appearance of the representation of image data, wherein the first level of adjustment and the second level of adjustment are different; and after applying the first image filter to the representation of image data, displaying, on the display, the representation of the respective image with the first filter applied to the representation of image data.

An exemplary method includes, at an electronic device with one or more input devices and a display: displaying, on the display, a filter selection interface which includes representations of a plurality of filters in a set of filters; while concurrently displaying, on the display, a representation of image data and the filter selection interface, detecting, via the one or more input devices, a first input at a location corresponding to the filter selection interface while a first filter of the set of filters satisfies selection criteria; and in response to detecting the first input: ceasing to display a first subset of representations of filters of the set of filters, wherein the first subset of representations of filters of the set of filters includes one or more filters in a first direction from the representation of the first filter in the filter selection user interface and one or more filters in a second direction from the representation of the first filter; and maintaining display of a second subset of representations of filters of the set of filters, the second subset of representations of filters including at least the representation of the first filter.

An exemplary non-transitory computer-readable storage medium stores one or more programs configured to be executed by one or more processors of an electronic device with one or more input devices and a display. The one or more programs including instructions for: displaying, on the display, a filter selection interface which includes representations of a plurality of filters in a set of filters; while concurrently displaying, on the display, a representation of image data and the filter selection interface, detecting, via the one or more input devices, a first input at a location corresponding to the filter selection interface while a first filter of the set of filters satisfies selection criteria; and in response to detecting the first input: ceasing to display a first subset of representations of filters of the set of filters, wherein the first subset of representations of filters of the set of filters includes one or more filters in a first direction from the representation of the first filter in the filter selection user interface and one or more filters in a second direction from the representation of the first filter; and maintaining display of a second subset of representations of filters of the set of filters, the second subset of representations of filters including at least the representation of the first filter.

An exemplary transitory computer-readable storage medium stores one or more programs configured to be executed by one or more processors of an electronic device with one or more input devices and a display. The one or more programs including instructions for: displaying, on the display, a filter selection interface which includes representations of a plurality of filters in a set of filters; while concurrently displaying, on the display, a representation of image data and the filter selection interface, detecting, via the one or more input devices, a first input at a location corresponding to the filter selection interface while a first filter of the set of filters satisfies selection criteria; and in response to detecting the first input: ceasing to display a first subset of representations of filters of the set of filters, wherein the first subset of representations of filters of the set of filters includes one or more filters in a first direction from the representation of the first filter in the filter selection user interface and one or more filters in a second direction from the representation of the first filter; and maintaining display of a second subset of representations of filters of the set of filters, the second subset of representations of filters including at least the representation of the first filter.

An exemplary electronic device, comprises: one or more input devices; a display; one or more processors; and memory storing one or more programs configured to be executed by the one or more processors, the one or more programs including instructions for: displaying, on the display, a filter selection interface which includes representations of a plurality of filters in a set of filters; while concurrently displaying, on the display, a representation of image data and the filter selection interface, detecting, via the one or more input devices, a first input at a location corresponding to the filter selection interface while a first filter of the set of filters satisfies selection criteria; and in response to detecting the first input: ceasing to display a first subset of representations of filters of the set of filters, wherein the first subset of representations of filters of the set of filters includes one or more filters in a first direction from the representation of the first filter in the filter selection user interface and one or more filters in a second direction from the representation of the first filter; and maintaining display of a second subset of representations of filters of the set of filters, the second subset of representations of filters including at least the representation of the first filter.

An exemplary electronic device, comprises: one or more input devices; a display; means for displaying, on the display, a filter selection interface which includes representations of a plurality of filters in a set of filters; means, while concurrently displaying, on the display, a representation of image data and the filter selection interface, for detecting, via the one or more input devices, a first input at a location corresponding to the filter selection interface while a first filter of the set of filters satisfies selection criteria; and means, responsive to detecting the first input, for: ceasing to display a first subset of representations of filters of the set of filters, wherein the first subset of representations of filters of the set of filters includes one or more filters in a first direction from the representation of the first filter in the filter selection user interface and one or more filters in a second direction from the representation of the first filter; and maintaining display of a second subset of representations of filters of the set of filters, the second subset of representations of filters including at least the representation of the first filter.

An exemplary method includes, at an electronic device with a camera, a sensor, one or more input devices, and a display: displaying, on the display a camera viewfinder for capturing media; and while displaying the camera viewfinder: in accordance with a determination, based on data from the sensor, that the device meets alignment-guide display criteria, wherein the alignment-guide display criteria include a requirement that a relative difference between an orientation of the plane of focus of the camera and a predetermined orientation is within a respective alignment threshold in order for the alignment-guide display criteria to be met, displaying, on the display, an alignment guide in the camera viewfinder, wherein the appearance of the alignment guide changes as the orientation of the plane of focus of the camera changes relative to the predetermined orientation; and in accordance with a determination, based on data from the sensor, that the alignment-guide display criteria are not met, forgoing displaying the alignment guide in the camera viewfinder.

An exemplary non-transitory computer-readable storage medium storing one or more programs configured to be executed by one or more processors of an electronic device with a camera, a sensor, one or more input devices, and a display. The one or more programs include instructions for: displaying, on the display a camera viewfinder for capturing media; and while displaying the camera viewfinder: in accordance with a determination, based on data from the sensor, that the device meets alignment-guide display criteria, wherein the alignment-guide display criteria include a requirement that a relative difference between an orientation of the plane of focus of the camera and a predetermined orientation is within a respective alignment threshold in order for the alignment-guide display criteria to be met, displaying, on the display, an alignment guide in the camera viewfinder, wherein the appearance of the alignment guide changes as the orientation of the plane of focus of the camera changes relative to the predetermined orientation; and in accordance with a determination, based on data from the sensor, that the alignment-guide display criteria are not met, forgoing displaying the alignment guide in the camera viewfinder.

An exemplary transitory computer-readable storage medium storing one or more programs configured to be executed by one or more processors of an electronic device with a camera, a sensor, one or more input devices, and a display. The one or more programs include instructions for: displaying, on the display a camera viewfinder for capturing media; and while displaying the camera viewfinder: in accordance with a determination, based on data from the sensor, that the device meets alignment-guide display criteria, wherein the alignment-guide display criteria include a requirement that a relative difference between an orientation of the plane of focus of the camera and a predetermined orientation is within a respective alignment threshold in order for the alignment-guide display criteria to be met, displaying, on the display, an alignment guide in the camera viewfinder, wherein the appearance of the alignment guide changes as the orientation of the plane of focus of the camera changes relative to the predetermined orientation; and in accordance with a determination, based on data from the sensor, that the alignment-guide display criteria are not met, forgoing displaying the alignment guide in the camera viewfinder.

An exemplary electronic device, comprises: a camera; a sensor; one or more input devices; a display; one or more processors; and memory storing one or more programs configured to be executed by the one or more processors, the one or more programs including instructions for: displaying, on the display a camera viewfinder for capturing media; and while displaying the camera viewfinder: in accordance with a determination, based on data from the sensor, that the device meets alignment-guide display criteria, wherein the alignment-guide display criteria include a requirement that a relative difference between an orientation of the plane of focus of the camera and a predetermined orientation is within a respective alignment threshold in order for the alignment-guide display criteria to be met, displaying, on the display, an alignment guide in the camera viewfinder, wherein the appearance of the alignment guide changes as the orientation of the plane of focus of the camera changes relative to the predetermined orientation; and in accordance with a determination, based on data from the sensor, that the alignment-guide display criteria are not met, forgoing displaying the alignment guide in the camera viewfinder.

An exemplary electronic device, comprises: a camera; a sensor; one or more input devices; a display; means for displaying, on the display a camera viewfinder for capturing media; and means, while displaying the camera viewfinder, for: in accordance with a determination, based on data from the sensor, that the device meets alignment-guide display criteria, wherein the alignment-guide display criteria include a requirement that a relative difference between an orientation of the plane of focus of the camera and a predetermined orientation is within a respective alignment threshold in order for the alignment-guide display criteria to be met, displaying, on the display, an alignment guide in the camera viewfinder, wherein the appearance of the alignment guide changes as the orientation of the plane of focus of the camera changes relative to the predetermined orientation; and in accordance with a determination, based on data from the sensor, that the alignment-guide display criteria are not met, forgoing displaying the alignment guide in the camera viewfinder.

An exemplary method includes, at an electronic device with one or more input devices, one or more cameras, and a display: displaying, on the display, a representation of image data associated with depth map information; while displaying, on the display, the representation of the image data: detecting, via the one or more input devices, a first input that selects a respective filter of a plurality of lighting effects that are based on the depth map information; after detecting the first input, detecting a second input that corresponds to a request to capture image data corresponding to a field of view of the one or more cameras; and in response to detecting the second input, capturing image data corresponding to the field of view of the one or more cameras, including: in accordance with a determination that the respective lighting effects selected based on the first input is a first lighting effect, capturing image data corresponding to the field of view of the one or more cameras and associating the first lighting effect to the representation of image data, wherein the first lighting effect is based on the depth map information; and in accordance with a determination that the respective lighting effects selected based on the first input is a second lighting effect that is different from the first lighting effect, capturing image data corresponding to the field of view of the one or more cameras and associating the second lighting effect to the representation of image data, wherein the second lighting effect is based on the depth map information.

An exemplary non-transitory computer-readable storage medium stores one or more programs configured to be executed by one or more processors of an electronic device with one or more input devices, one or more cameras, and a display. The one or more programs including instructions for: displaying, on the display, a representation of image data associated with depth map information; while displaying, on the display, the representation of the image data: detecting, via the one or more input devices, a first input that selects a respective filter of a plurality of lighting effects that are based on the depth map information; after detecting the first input, detecting a second input that corresponds to a request to capture image data corresponding to a field of view of the one or more cameras; and in response to detecting the second input, capturing image data corresponding to the field of view of the one or more cameras, including: in accordance with a determination that the respective lighting effects selected based on the first input is a first lighting effect, capturing image data corresponding to the field of view of the one or more cameras and associating the first lighting effect to the representation of image data, wherein the first lighting effect is based on the depth map information; and in accordance with a determination that the respective lighting effects selected based on the first input is a second lighting effect that is different from the first lighting effect, capturing image data corresponding to the field of view of the one or more cameras and associating the second lighting effect to the representation of image data, wherein the second lighting effect is based on the depth map information.

An exemplary transitory computer-readable storage medium stores one or more programs configured to be executed by one or more processors of an electronic device with one or more input devices, one or more cameras, and a display. The one or more programs including instructions for: displaying, on the display, a representation of image data associated with depth map information; while displaying, on the display, the representation of the image data: detecting, via the one or more input devices, a first input that selects a respective filter of a plurality of lighting effects that are based on the depth map information; after detecting the first input, detecting a second input that corresponds to a request to capture image data corresponding to a field of view of the one or more cameras; and in response to detecting the second input, capturing image data corresponding to the field of view of the one or more cameras, including: in accordance with a determination that the respective lighting effects selected based on the first input is a first lighting effect, capturing image data corresponding to the field of view of the one or more cameras and associating the first lighting effect to the representation of image data, wherein the first lighting effect is based on the depth map information; and in accordance with a determination that the respective lighting effects selected based on the first input is a second lighting effect that is different from the first lighting effect, capturing image data corresponding to the field of view of the one or more cameras and associating the second lighting effect to the representation of image data, wherein the second lighting effect is based on the depth map information.

An exemplary electronic device comprises: one or more input devices; one or more cameras; a display; one or more processors; and memory storing one or more programs configured to be executed by the one or more processors, the one or more programs including instructions for: displaying, on the display, a representation of image data associated with depth map information; while displaying, on the display, the representation of the image data: detecting, via the one or more input devices, a first input that selects a respective filter of a plurality of lighting effects that are based on the depth map information; after detecting the first input, detecting a second input that corresponds to a request to capture image data corresponding to a field of view of the one or more cameras; and in response to detecting the second input, capturing image data corresponding to the field of view of the one or more cameras, including: in accordance with a determination that the respective lighting effects selected based on the first input is a first lighting effect, capturing image data corresponding to the field of view of the one or more cameras and associating the first lighting effect to the representation of image data, wherein the first lighting effect is based on the depth map information; and in accordance with a determination that the respective lighting effects selected based on the first input is a second lighting effect that is different from the first lighting effect, capturing image data corresponding to the field of view of the one or more cameras and associating the second lighting effect to the representation of image data, wherein the second lighting effect is based on the depth map information.

An exemplary electronic device, comprises: one or more input devices; one or more cameras; a display; means for displaying, on the display, a representation of image data associated with depth map information; means, while displaying, on the display, the representation of the image data, for: displaying, on the display, a representation of image data associated with depth map information; while displaying, on the display, the representation of the image data: detecting, via the one or more input devices, a first input that selects a respective filter of a plurality of lighting effects that are based on the depth map information; after detecting the first input, detecting a second input that corresponds to a request to capture image data corresponding to a field of view of the one or more cameras; and in response to detecting the second input, capturing image data corresponding to the field of view of the one or more cameras, including: in accordance with a determination that the respective lighting effects selected based on the first input is a first lighting effect, capturing image data corresponding to the field of view of the one or more cameras and associating the first lighting effect to the representation of image data, wherein the first lighting effect is based on the depth map information; and in accordance with a determination that the respective lighting effects selected based on the first input is a second lighting effect that is different from the first lighting effect, capturing image data corresponding to the field of view of the one or more cameras and associating the second lighting effect to the representation of image data, wherein the second lighting effect is based on the depth map information.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing camera effect, thereby increasing the effectiveness, efficiency, and user satisfaction with such devices. Such methods and interfaces may complement or replace other methods for managing camera effects.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7F is a flow diagram illustrating a method for managing camera lighting effects, in accordance with some embodiments.

FIGS. 9A-9D is a flow diagram illustrating a method for applying camera lighting effects, in accordance with some embodiments.

FIGS. 11A-11C is a flow diagram illustrating a method for managing filter effects, in accordance with some embodiments.

FIGS. 13A-13F is a flow diagram illustrating a method for managing a filter user interface, in accordance with some embodiments.

FIGS. 15A-15E is a flow diagram illustrating a method for capturing an image, in accordance with some embodiments.

FIGS. 17A-17G is a flow diagram illustrating a method for capturing an image, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

Electronic device are being designed and manufactured with more advanced camera features and sensors. However, some electronic devices, by nature of their design, are unable to capture the richness of point-of-light photography without additional hardware. Many of the point-of-light photography techniques require numerous and expensive light sources to be positioned around a subject as well as a separate backdrop. However, many electronic devices have only a single flash emitting light in one direction. As a result, many of the point-of-light photography techniques simply cannot be accomplished via traditional electronic devices.

The embodiments described herein include electronic devices that utilize depth map information to provide improved camera capabilities. In some embodiments, depth map information is used when applying filter to an image. In some embodiments, a visual aid is provided to help a user capture the perfect image. The described embodiments also include complementary user interfaces that enable these improved camera capabilities.

Together, the described embodiments permit efficient packaging and production of thin and light devices, while improving the performance of the device's camera capabilities. The use of fixed focal length cameras is beneficial as they are thinner and smaller Below, FIGS. 1A-1B, 2, 3, 4A-4B, and 5A-5H provide a description of exemplary devices for performing the techniques for managing event notifications. FIGS. 6A-6N illustrate exemplary user interfaces for managing a user interface. FIG. 7 is a flow diagram illustrating methods of managing a user interface in accordance with some embodiments. The user interfaces in FIGS. 6A-6G are used to illustrate the processes described below, including the processes in FIG. 7.

FIGS. 8A-8J illustrate exemplary user interfaces for applying a simulated lighting effect. FIG. 9 is a flow diagram illustrating methods of simulating a lighting effect in accordance with some embodiments. The user interfaces in FIGS. 8A-8D are used to illustrate the processes described below, including the processes in FIG. 9.

Figure 10A:
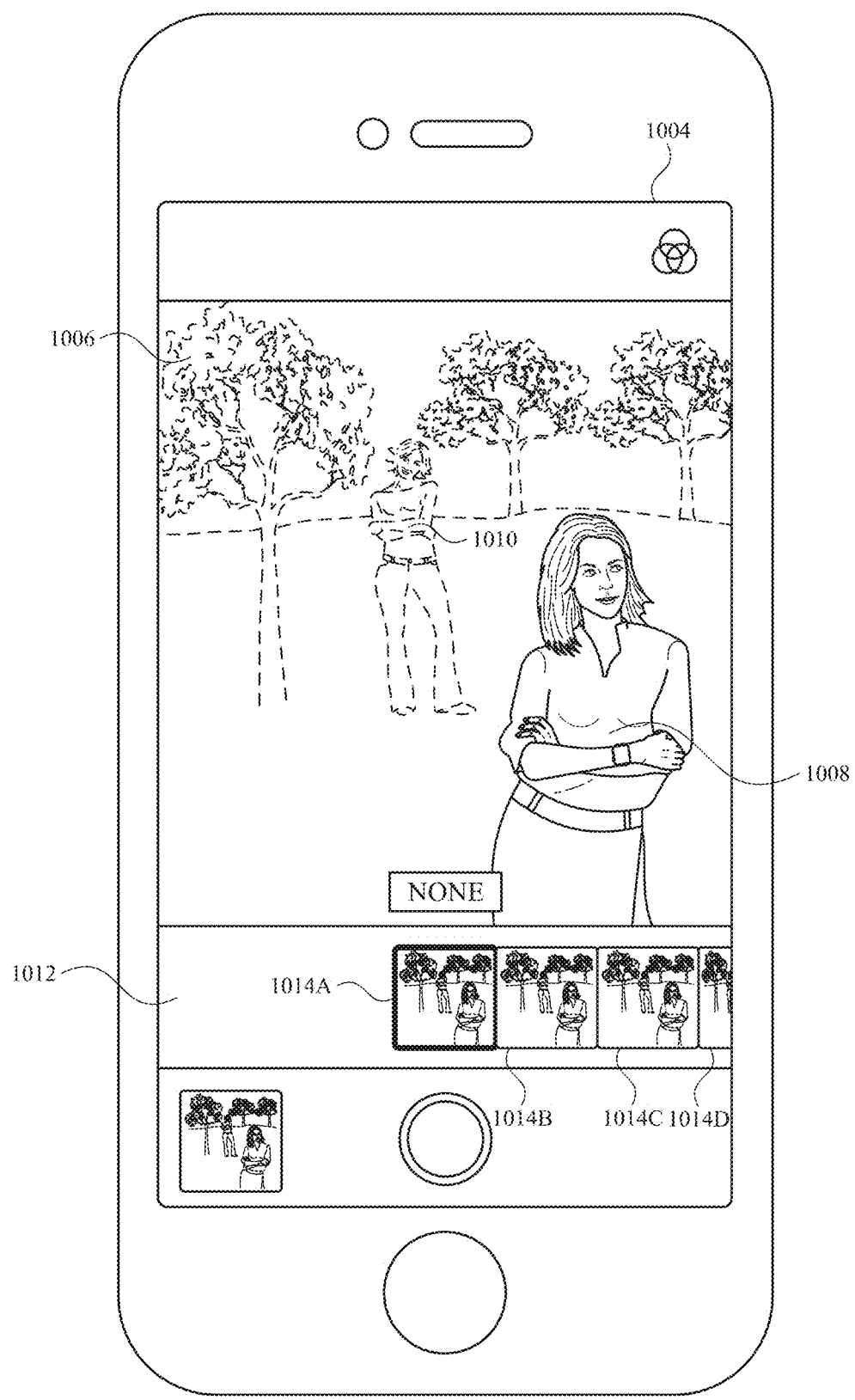
FIGS. 10A-10N illustrate exemplary devices and user interfaces for managing filter effects, in accordance with some embodiments.
Figure 10B:
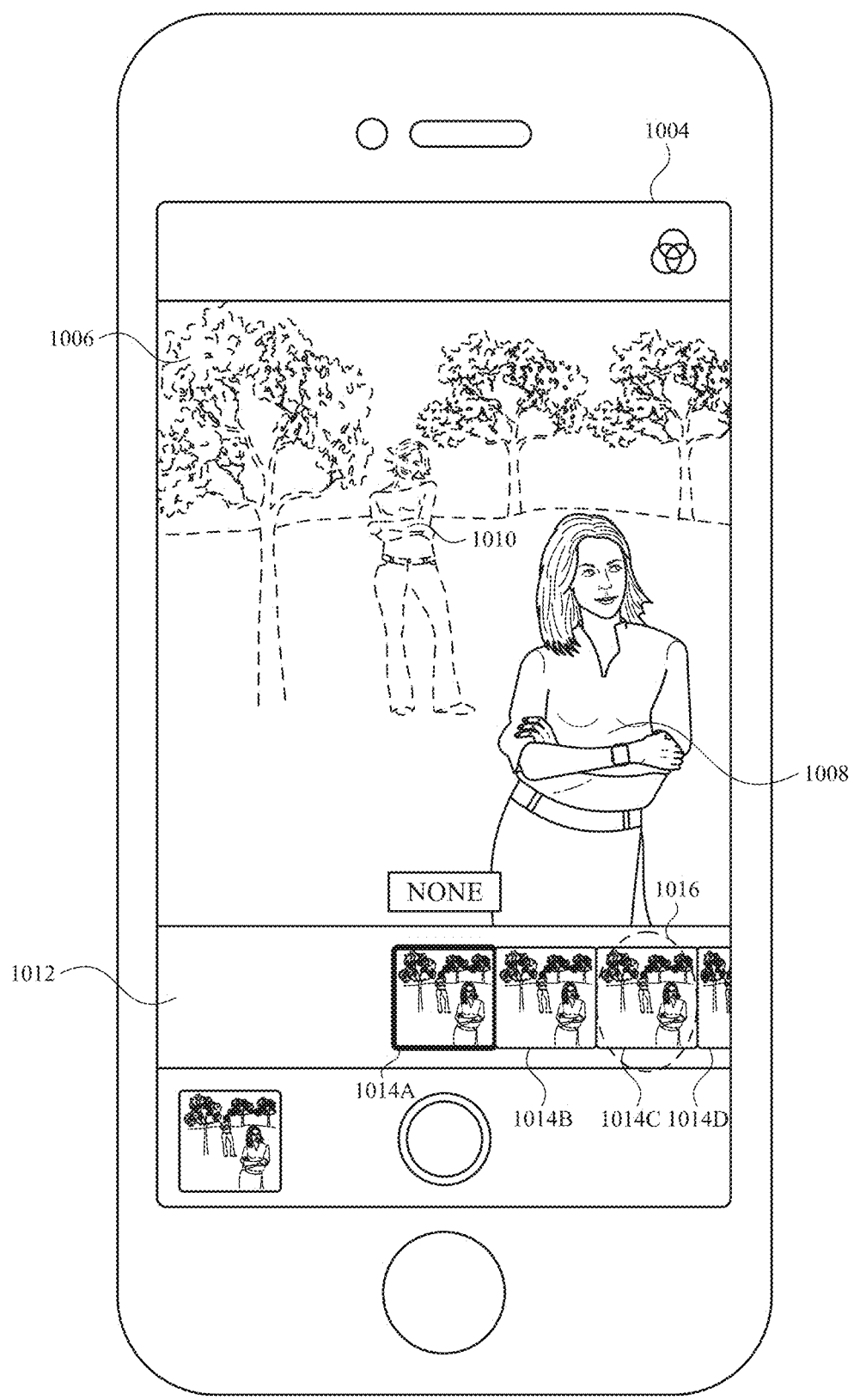
Figure 10C:
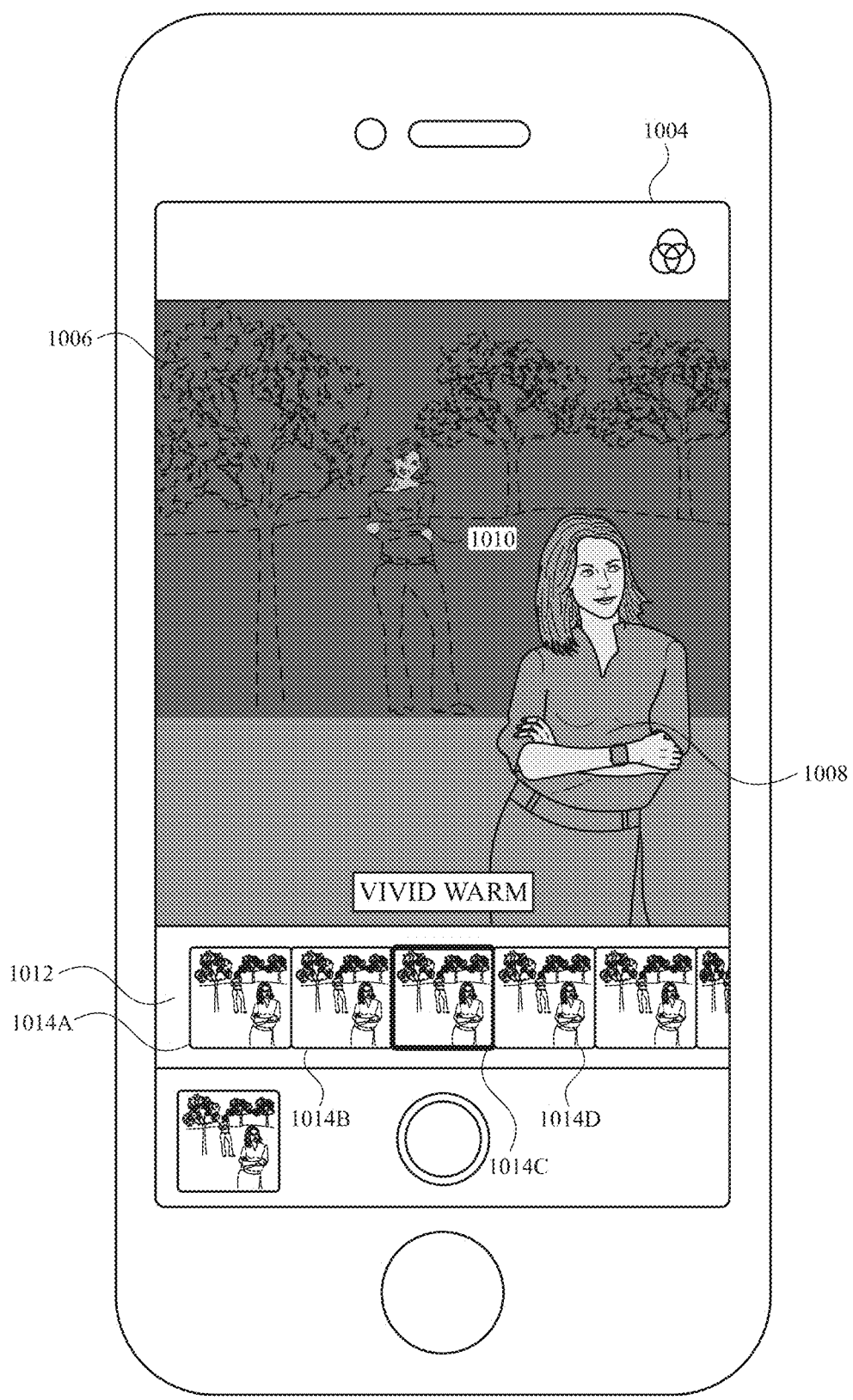
Figure 10D:
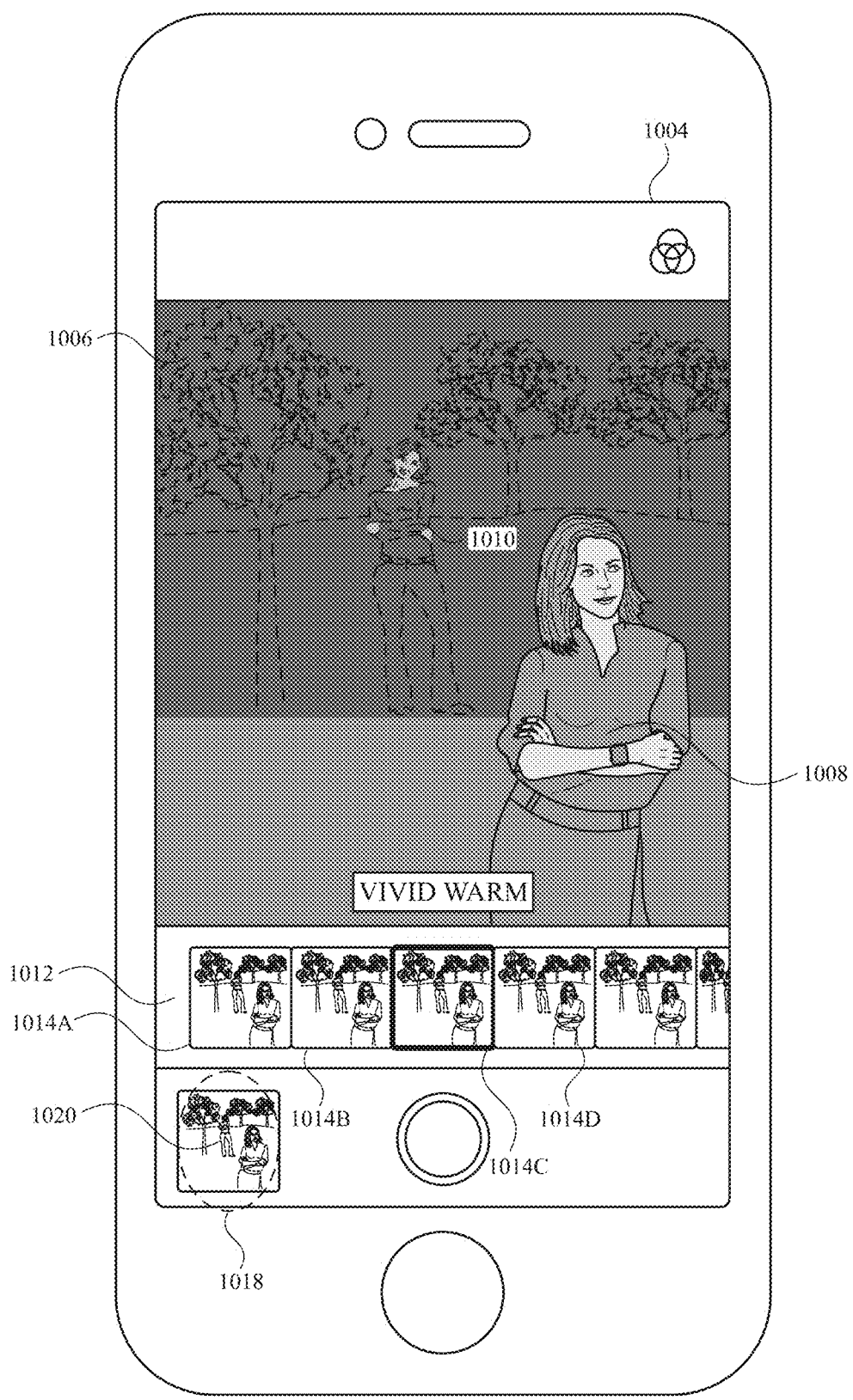
Figure 10E:
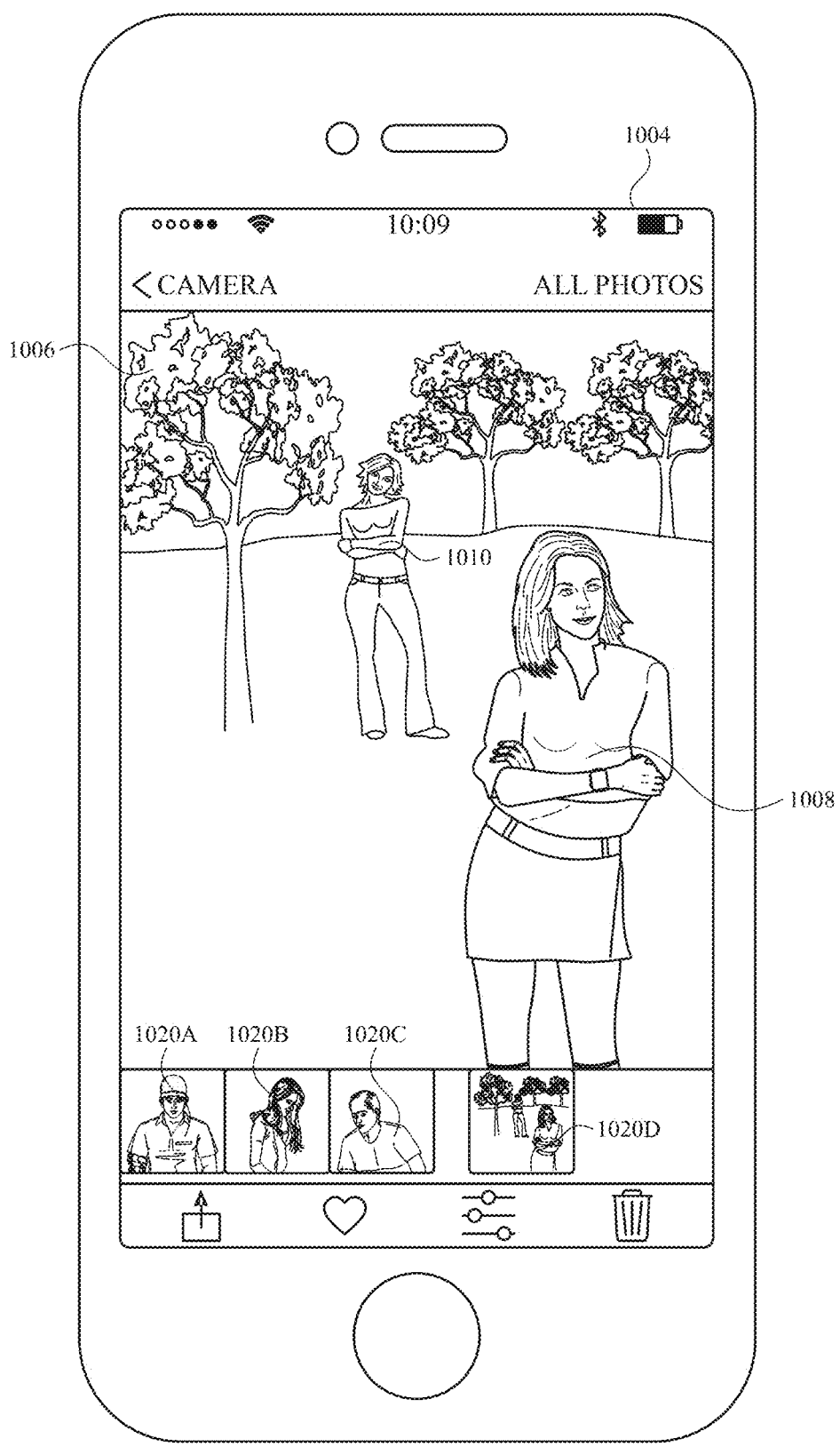
Figure 10F:
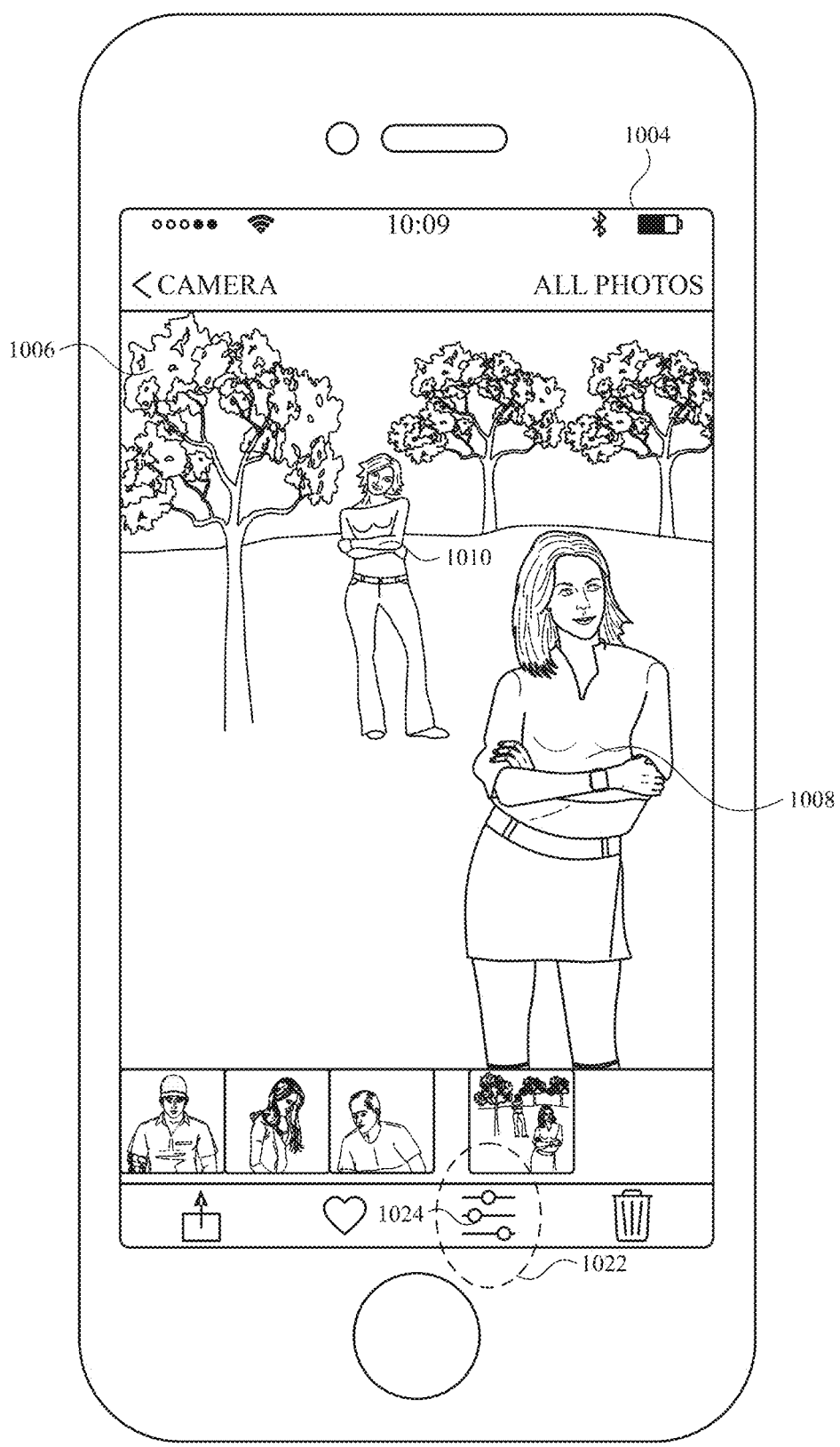
Figure 10G:
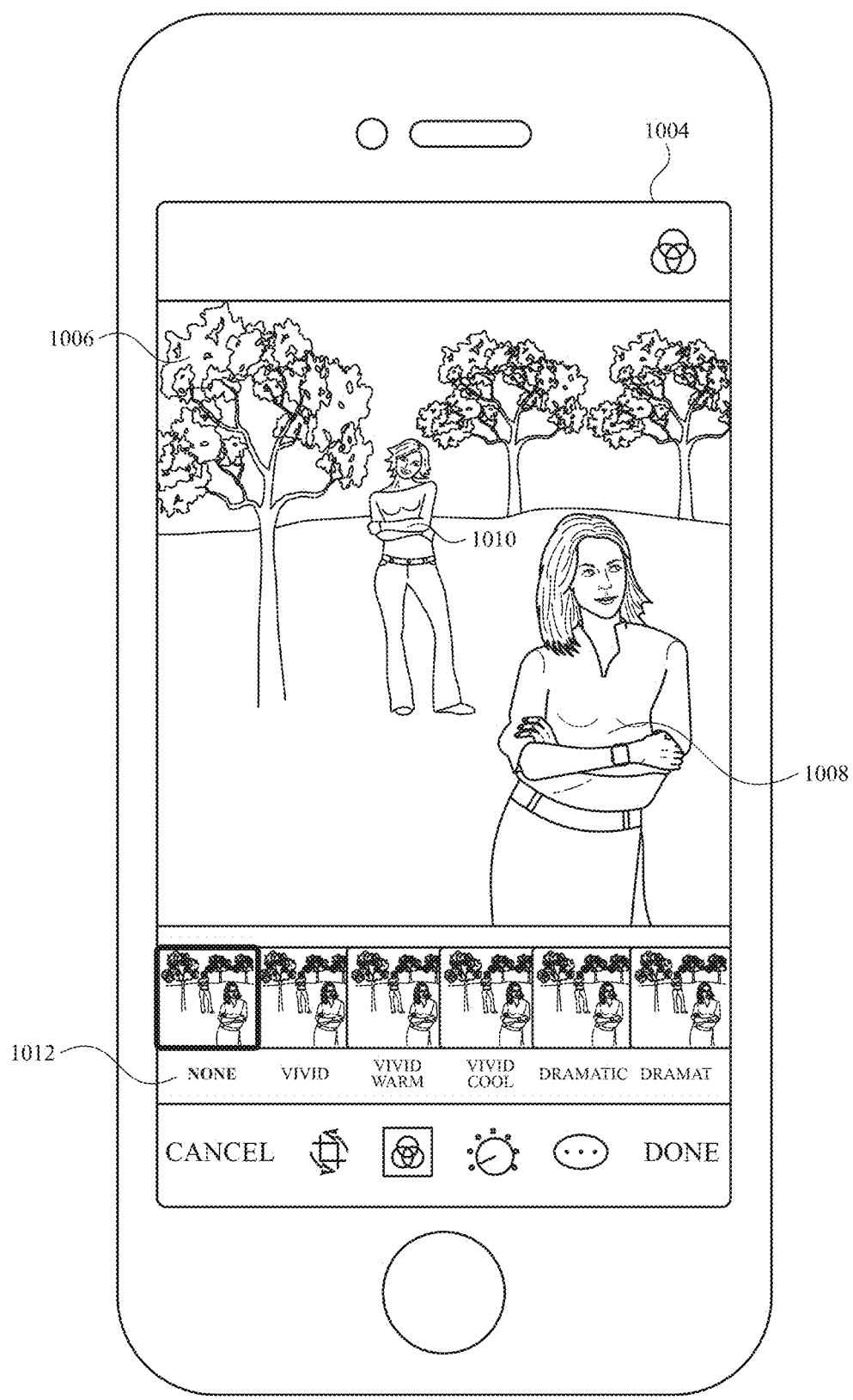
Figure 10H:
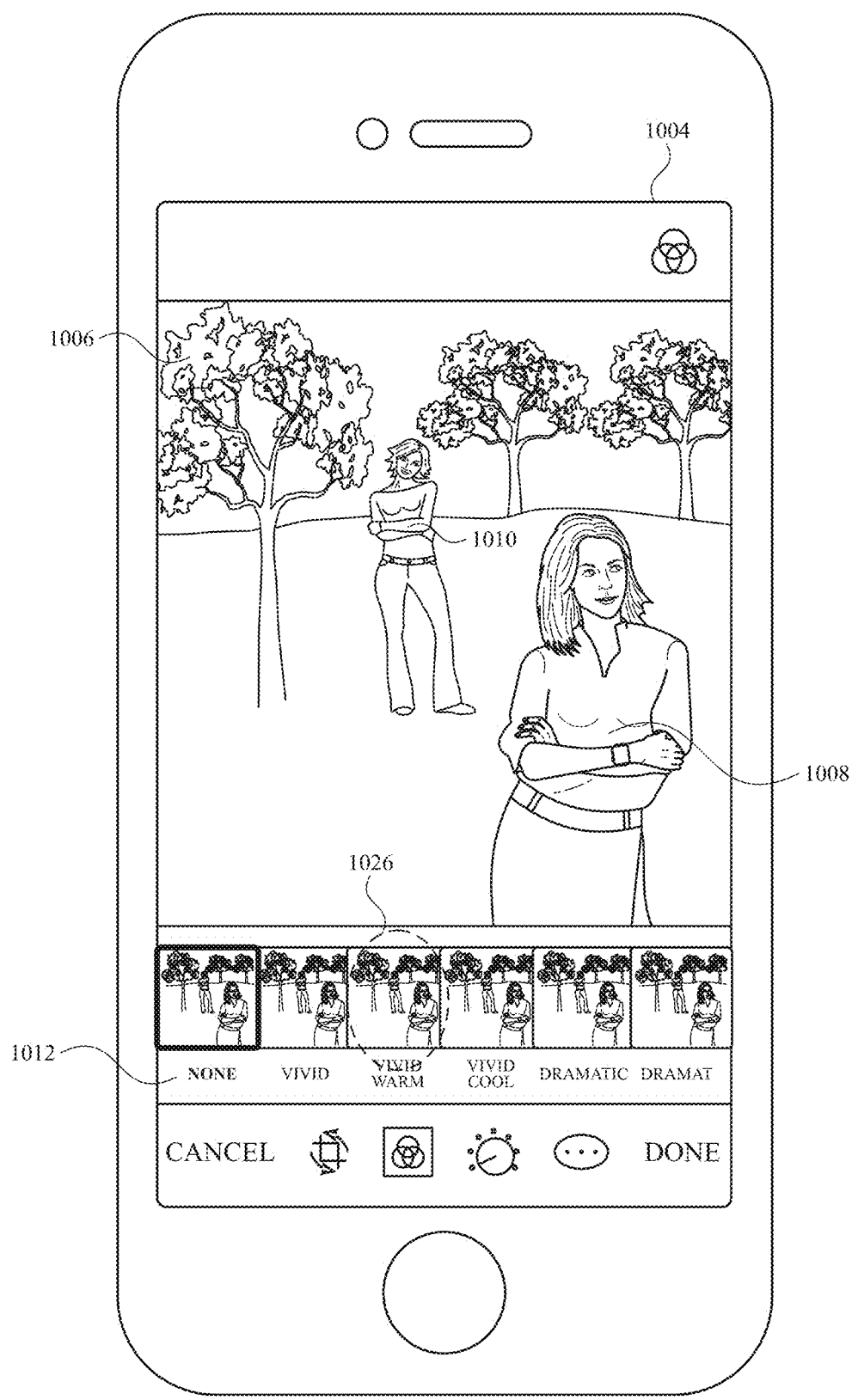
Figure 10I:
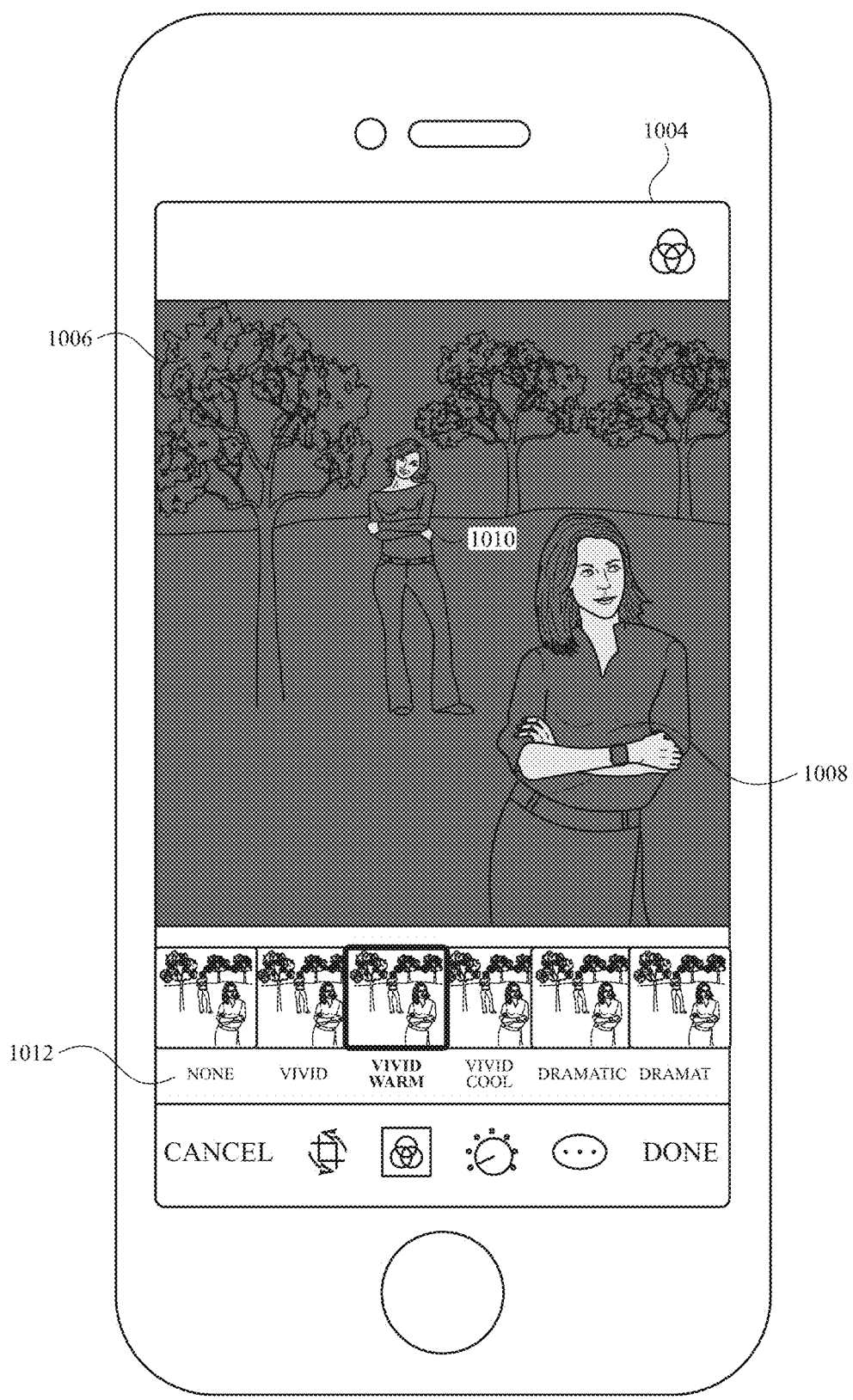
Figure 10J:
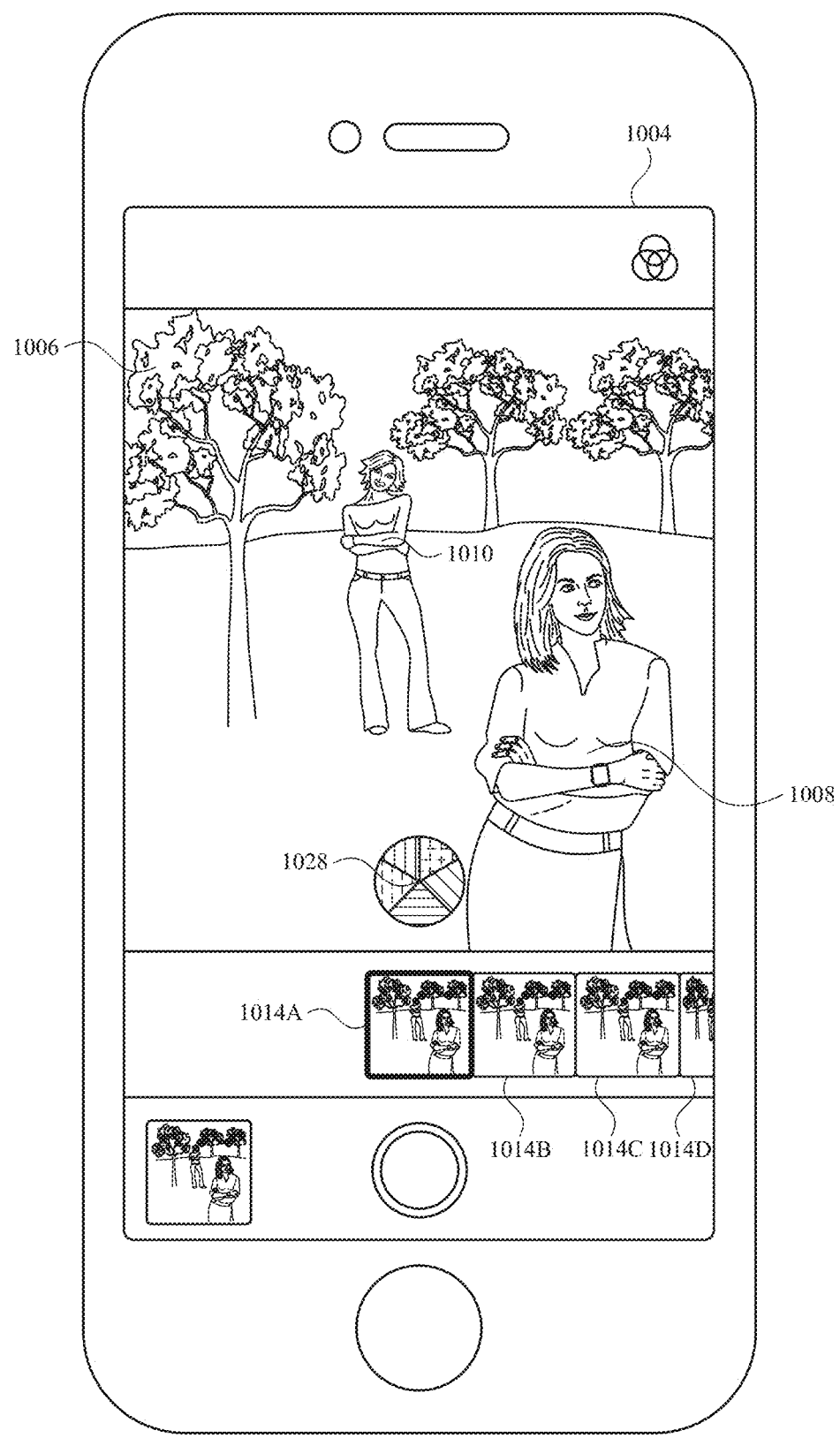
Figure 10K:
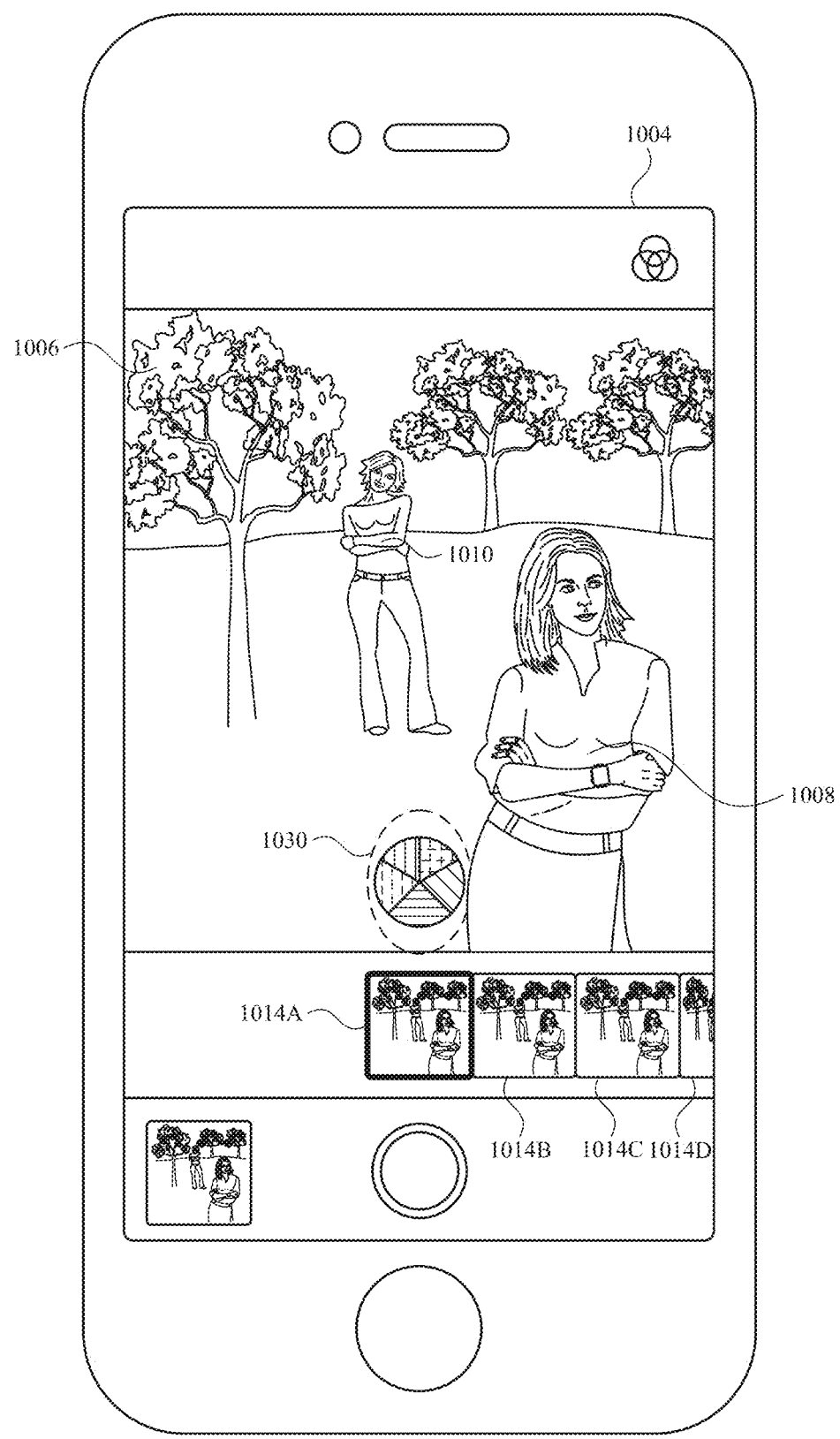
Figure 10L:
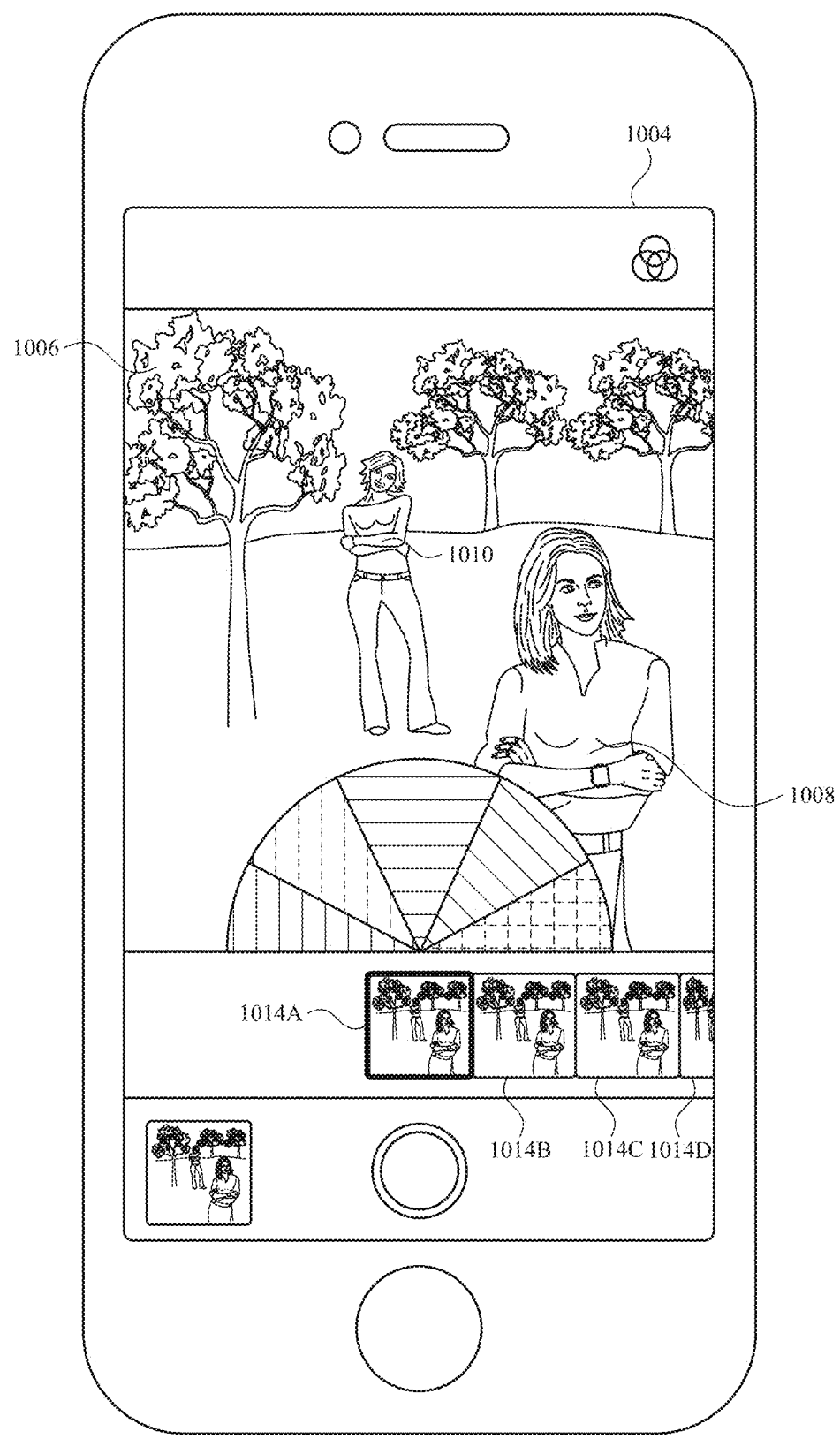
Figure 10M:
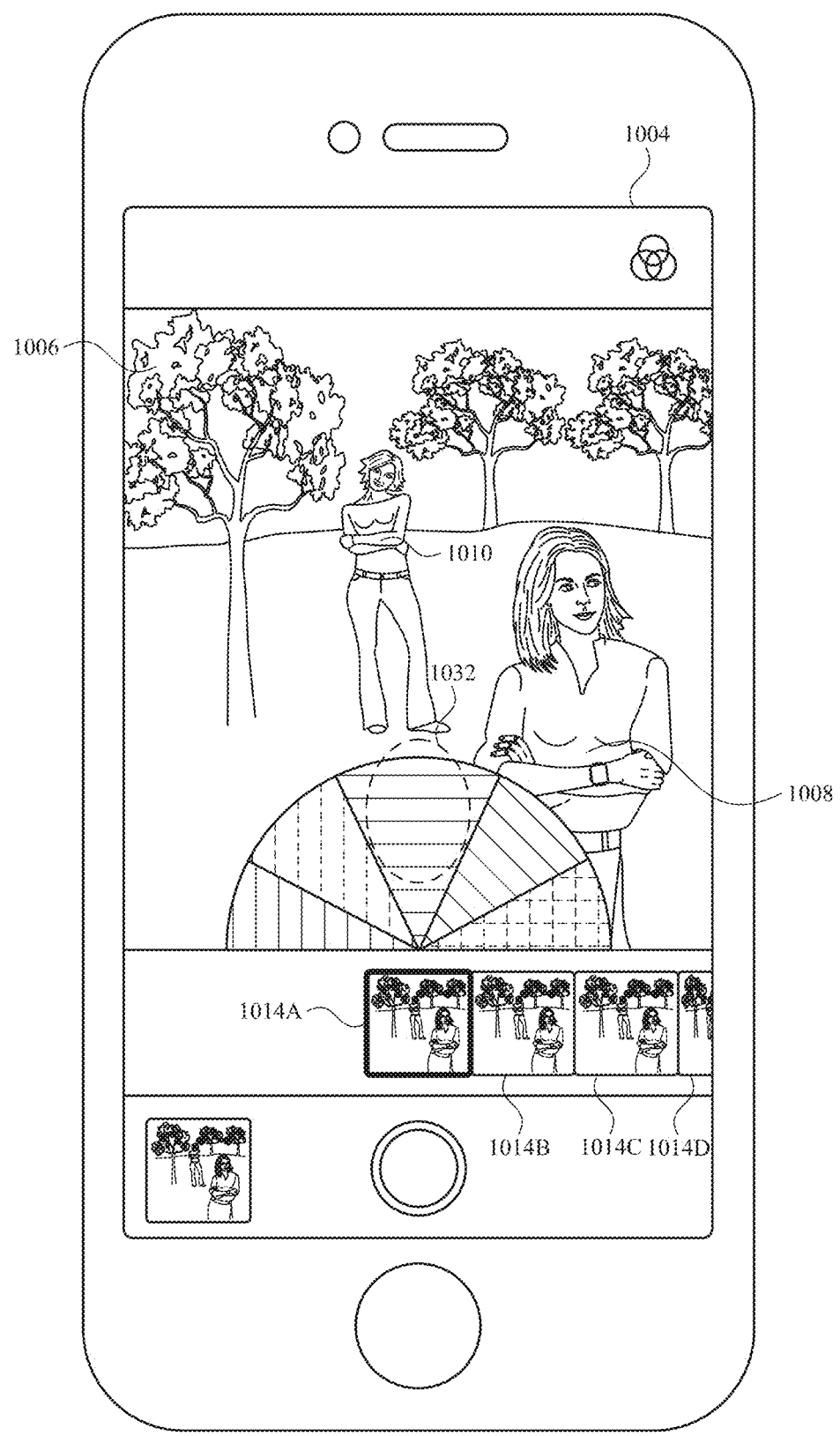
Figure 10N:
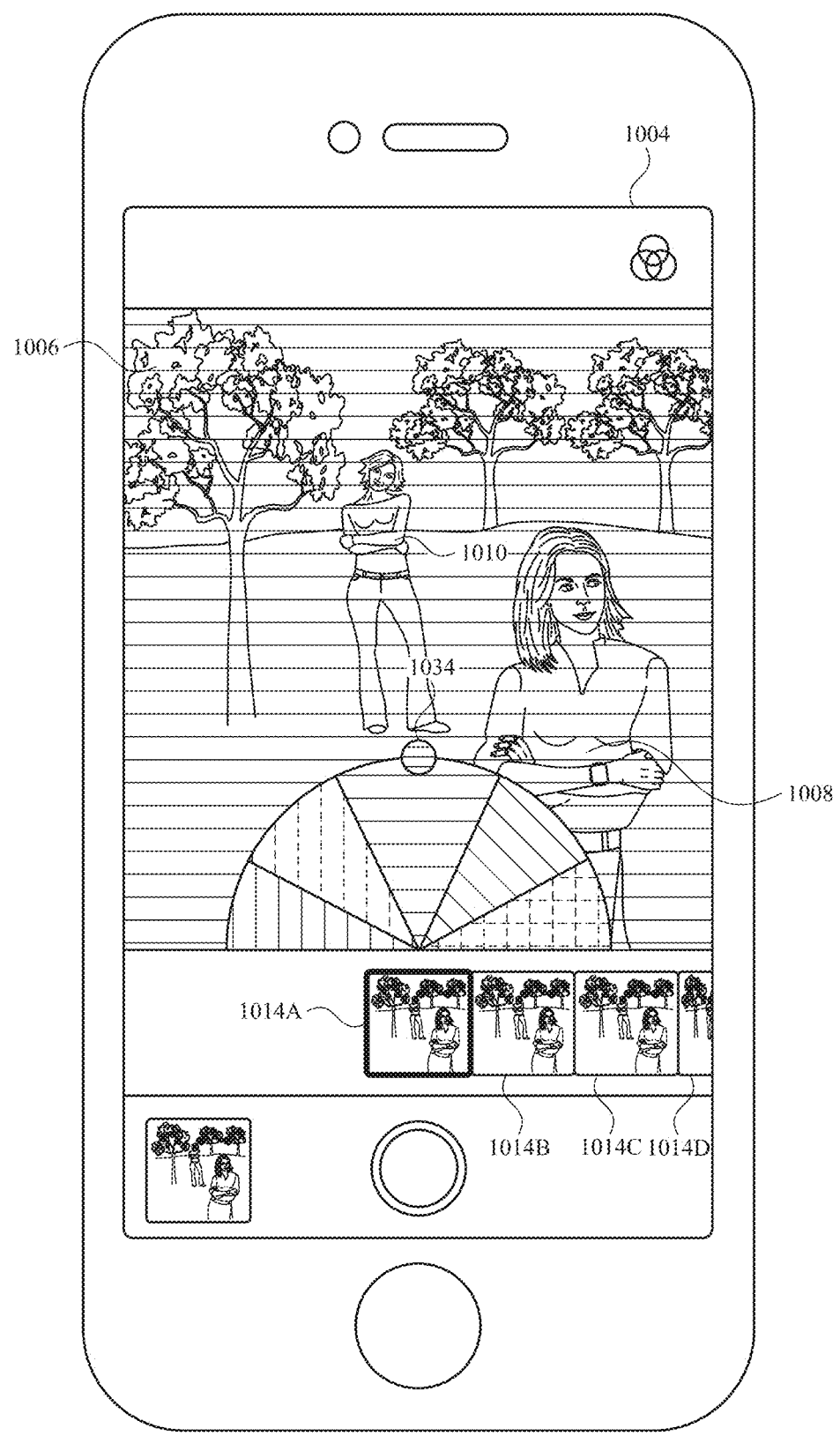

FIGS. 10A-10N illustrate exemplary user interfaces for applying a filter to an image. FIG. 11 is a flow diagram illustrating methods of applying a filter to an image in accordance with some embodiments. The user interfaces in FIGS. 10A-10D are used to illustrate the processes described below, including the processes in FIG. 11.

Figure 12A:
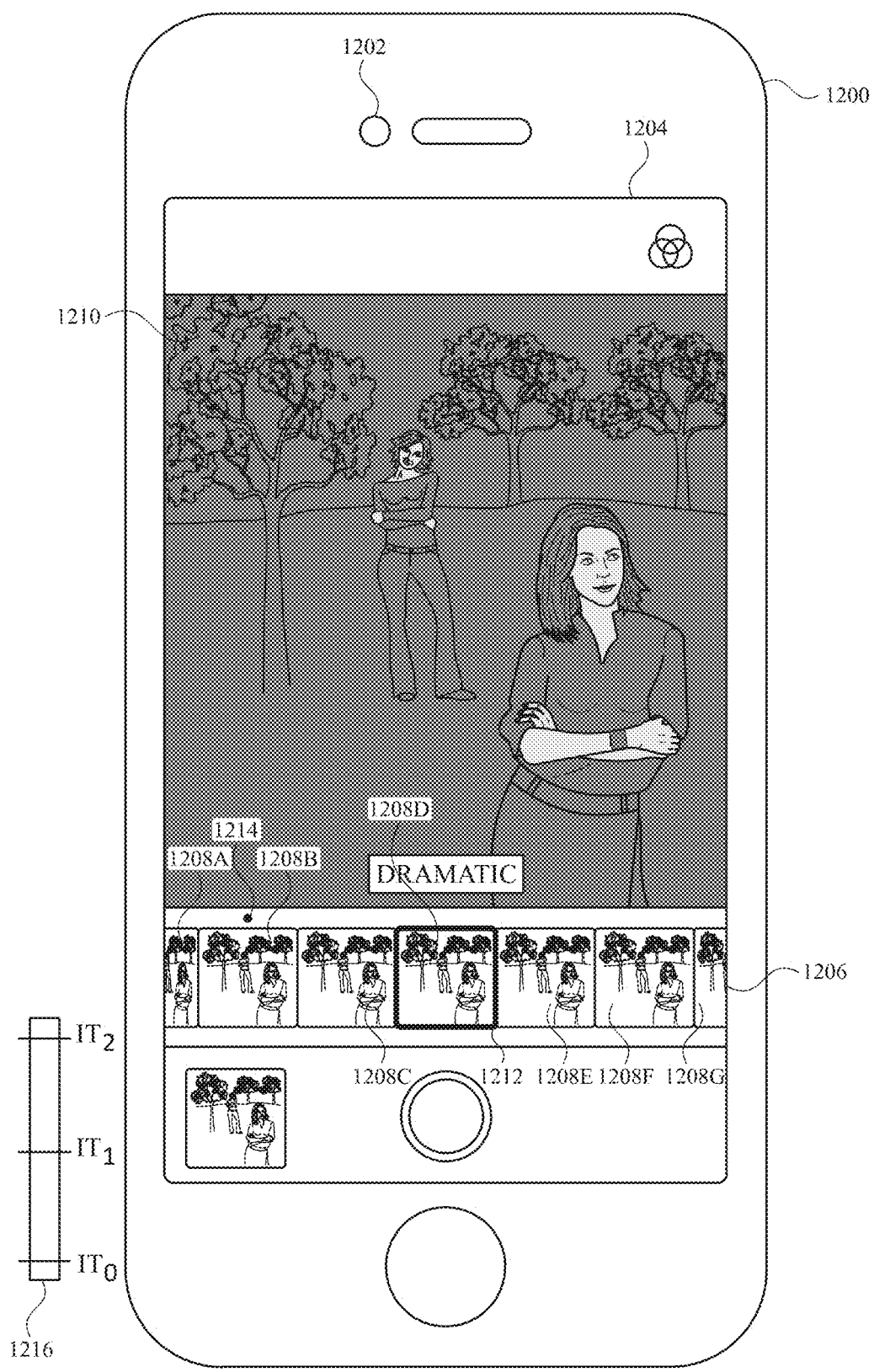
FIGS. 12A-12P illustrate exemplary devices and user interfaces for managing a filter user interface, in accordance with some embodiments.
Figure 12B:
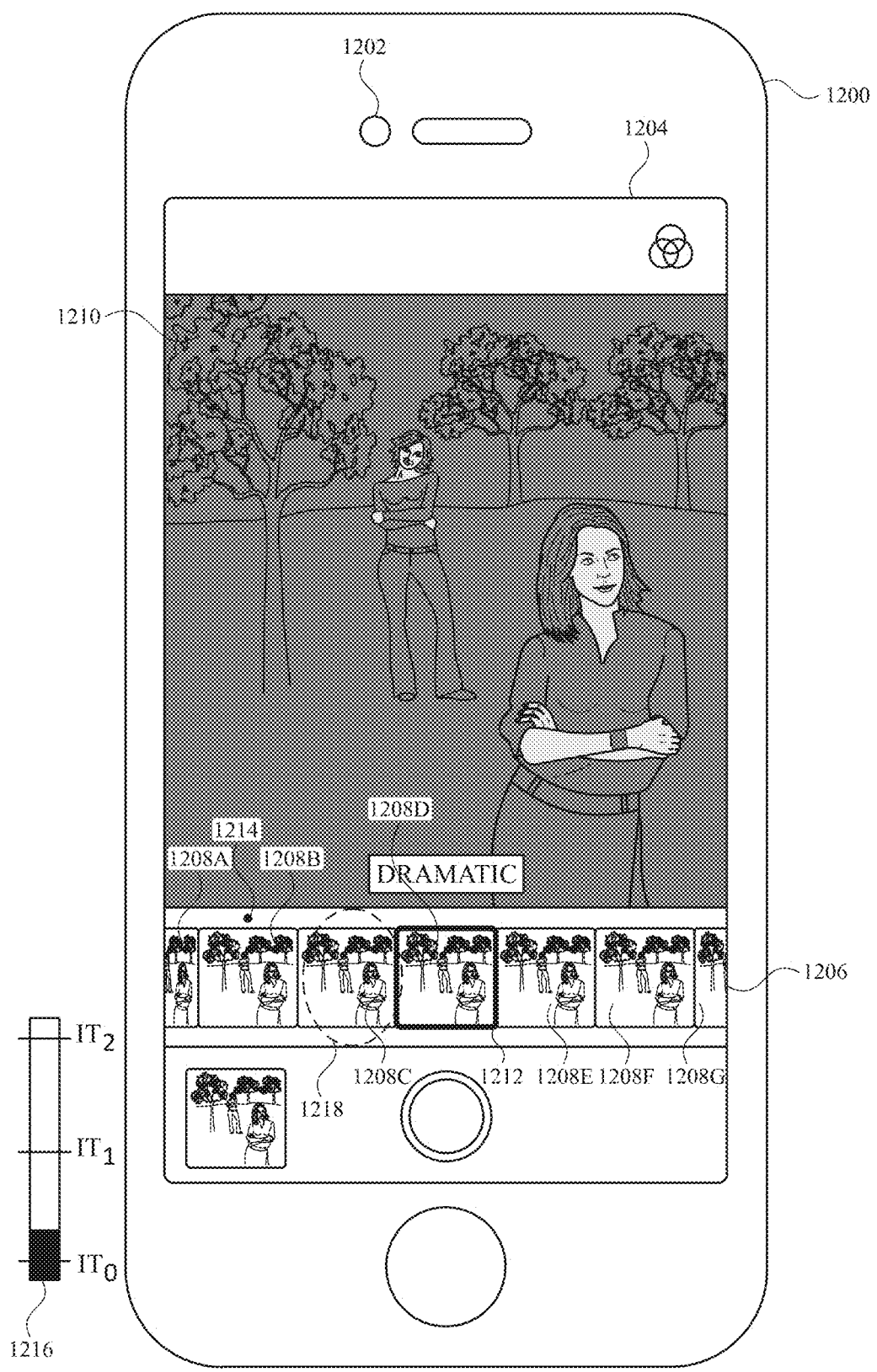
Figure 12C:
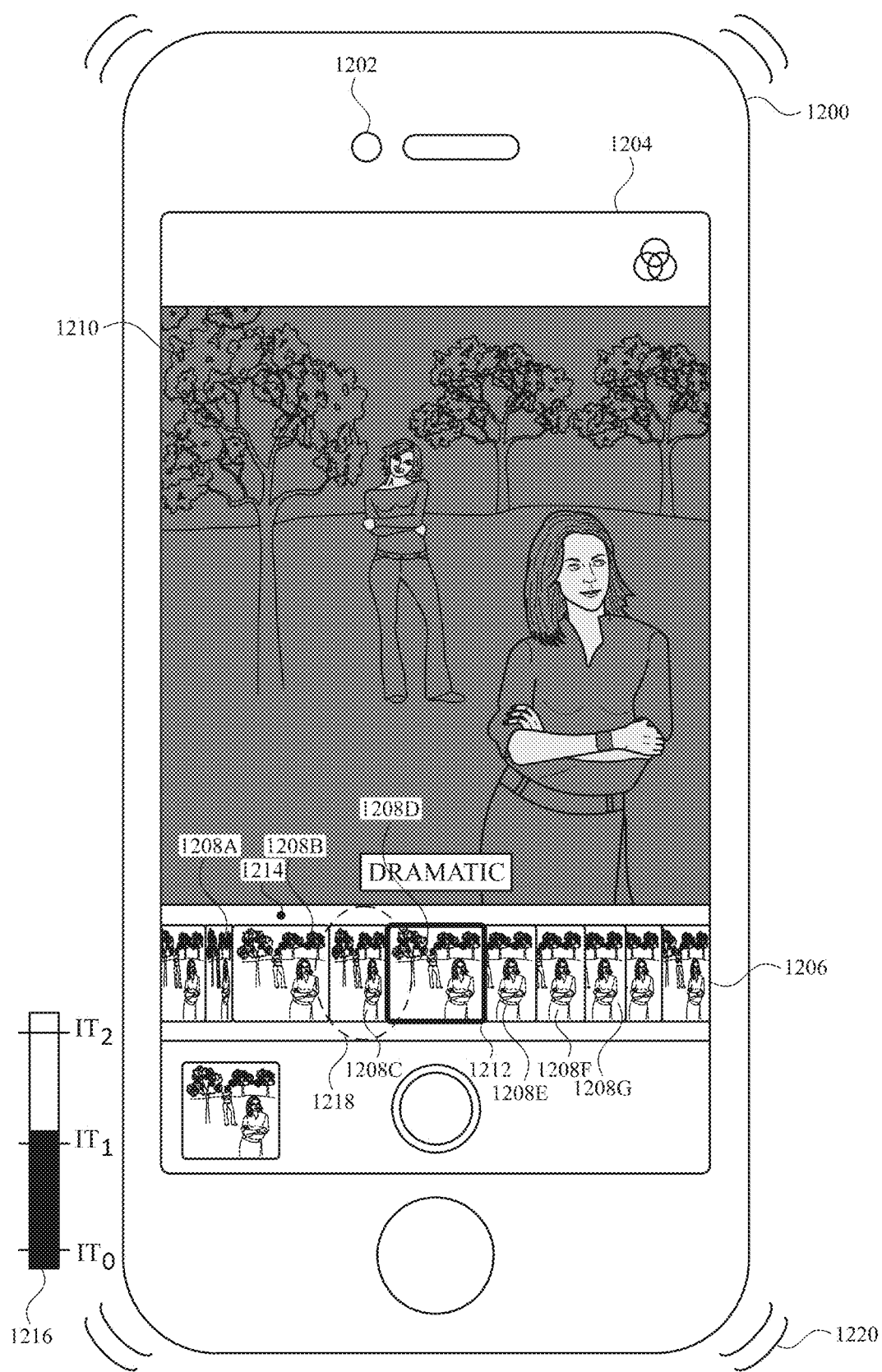
Figure 12D:
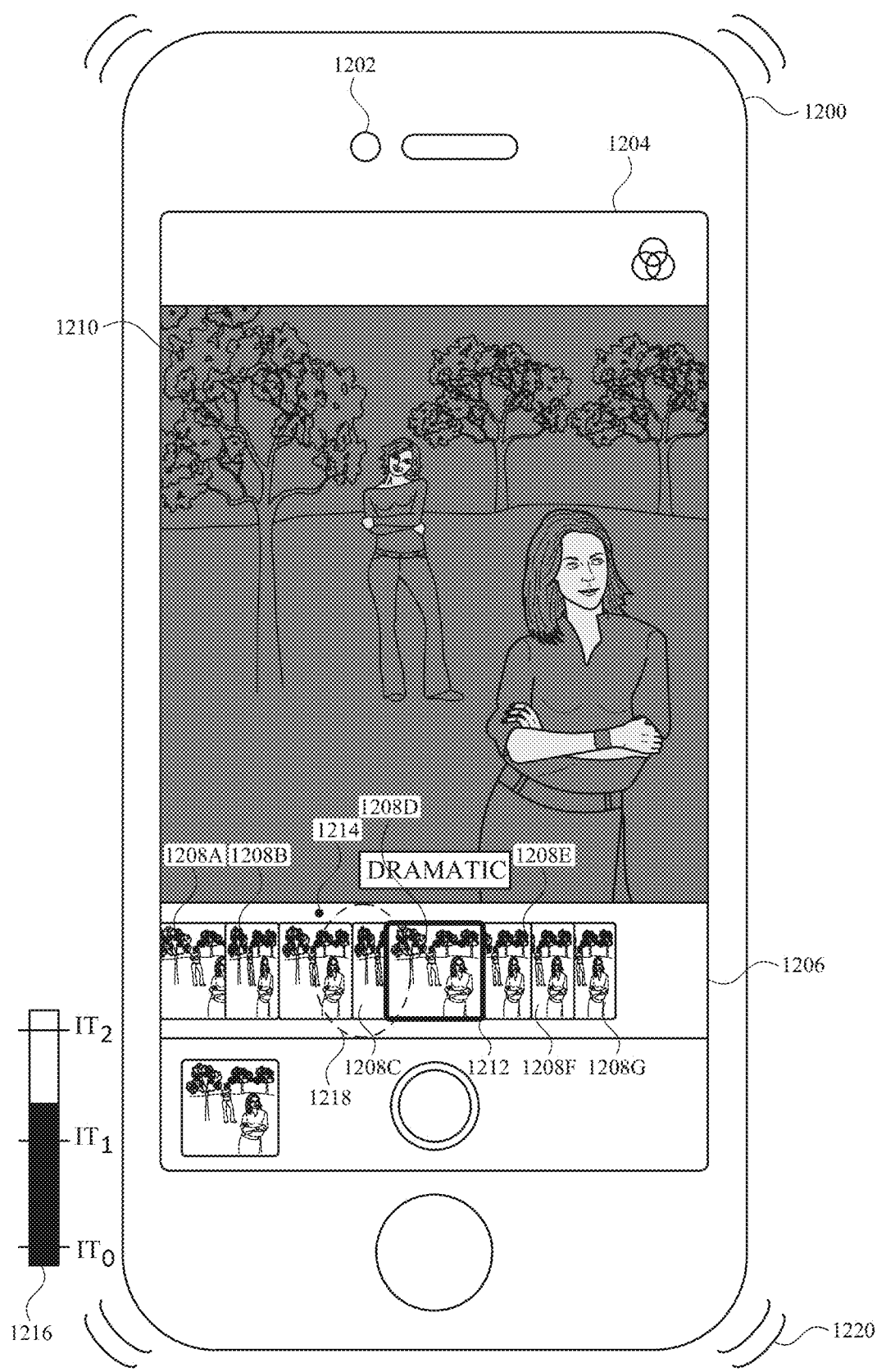
Figure 12E:
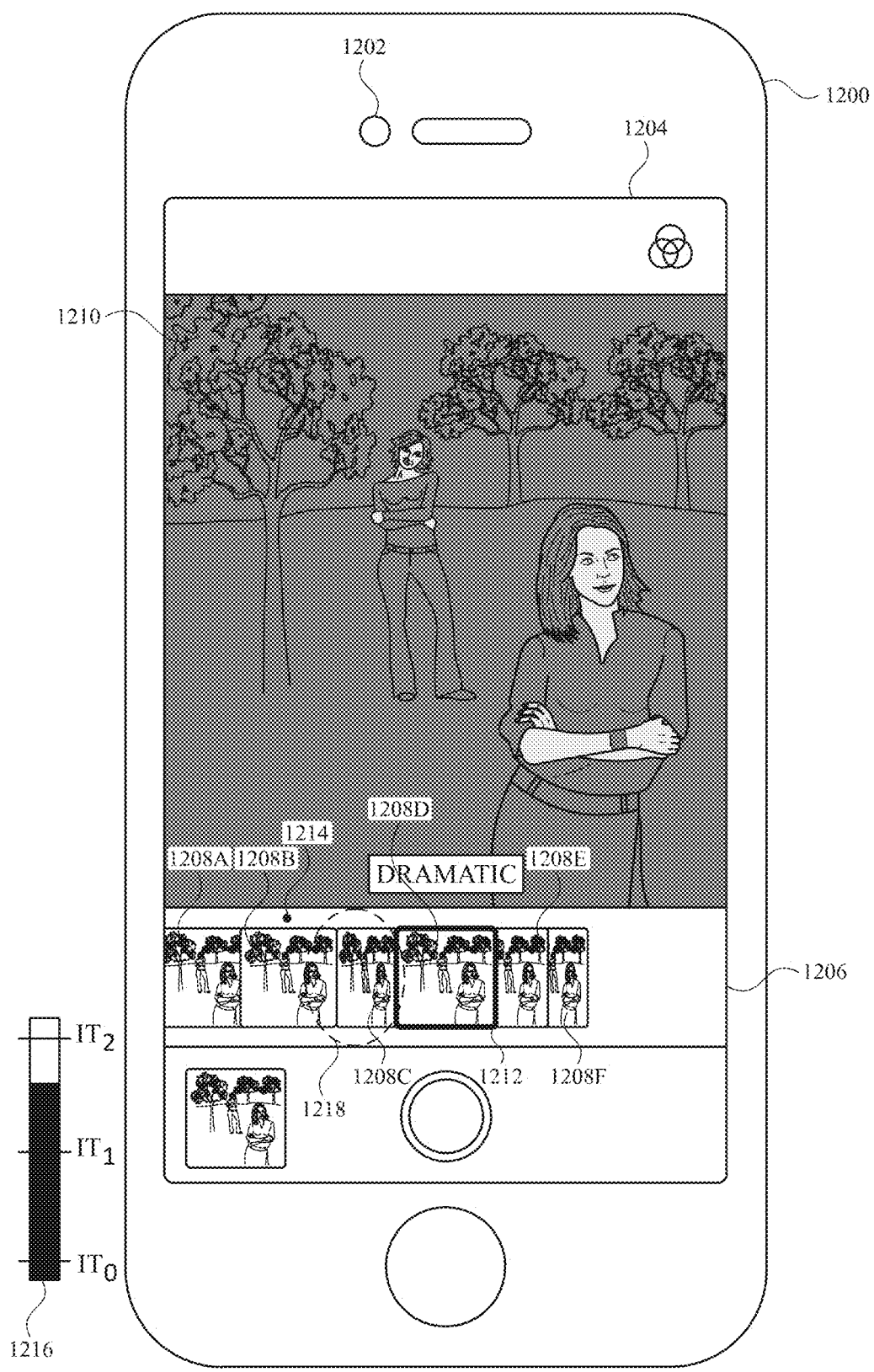
Figure 12F:
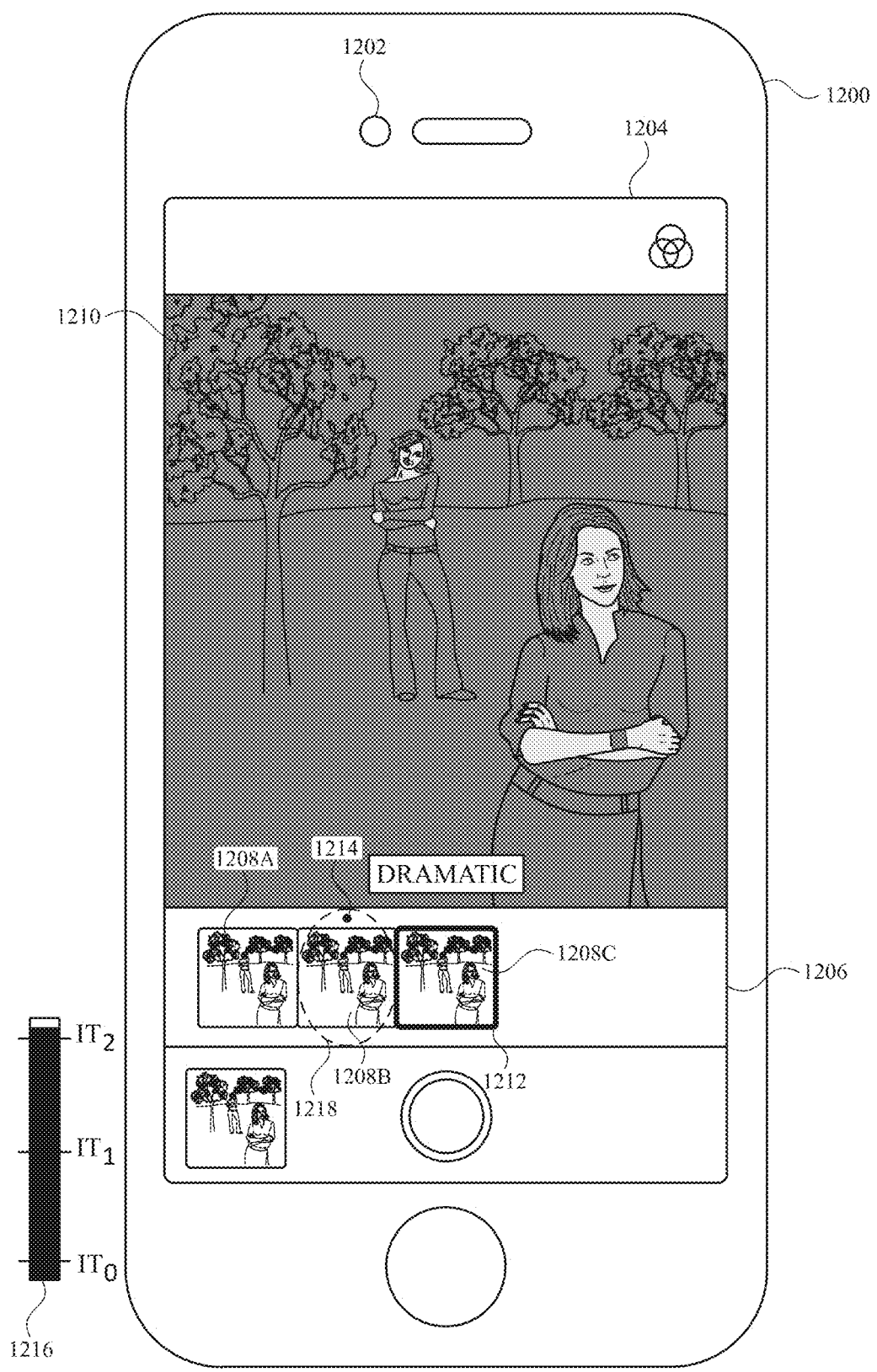
Figure 12G:
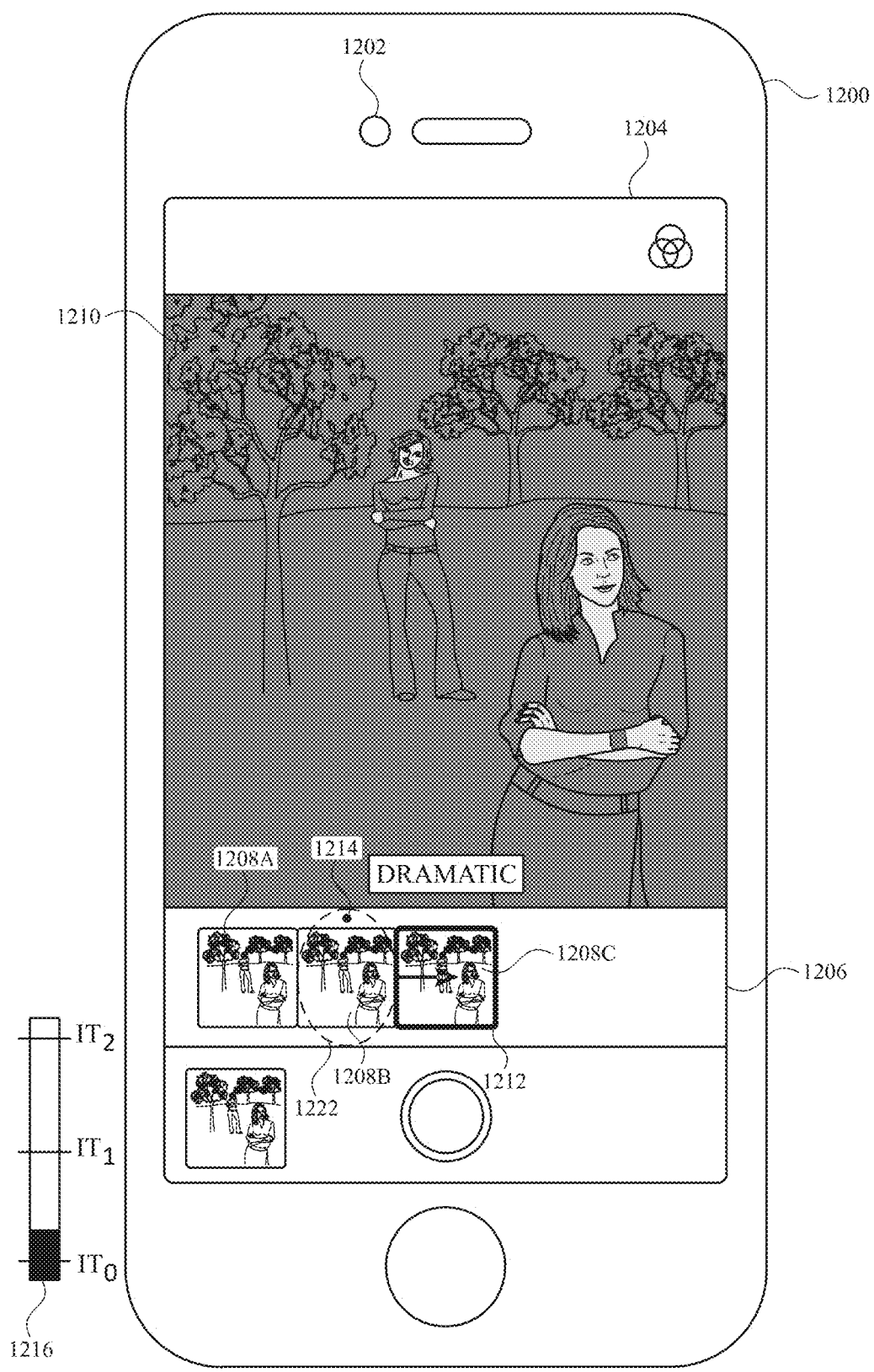
Figure 12H:
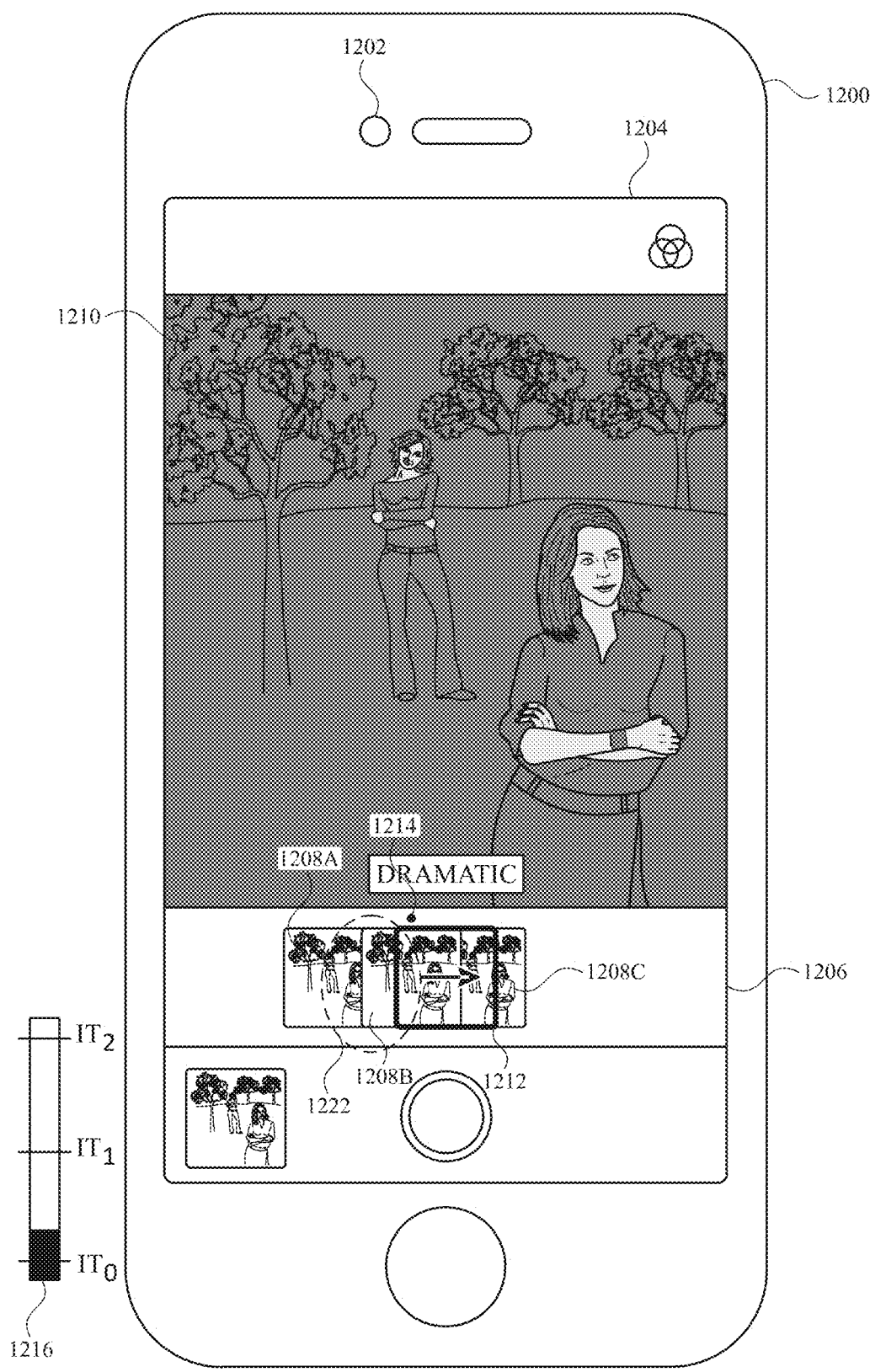
Figure 12I:
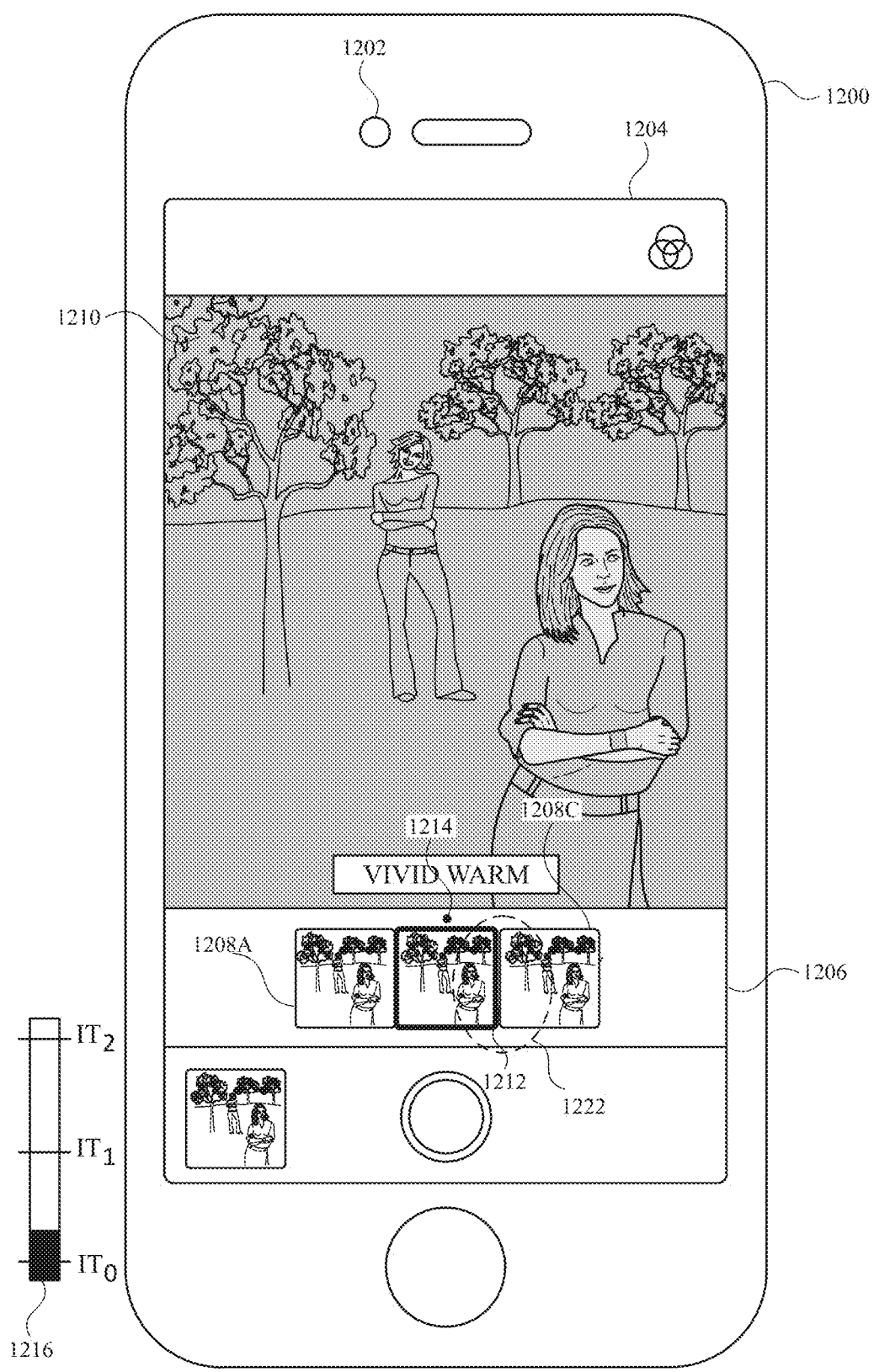
Figure 12J:
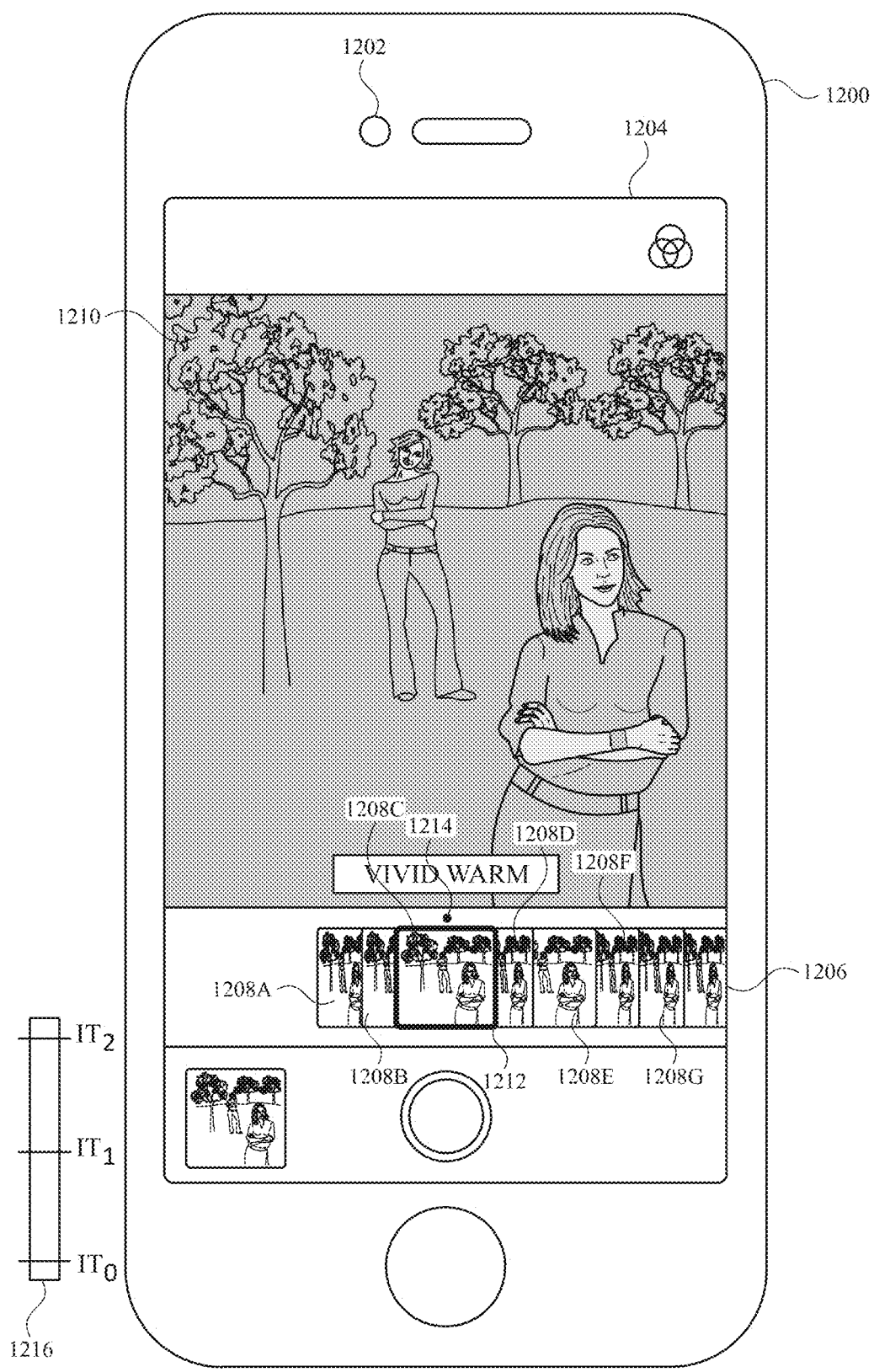
Figure 12K:
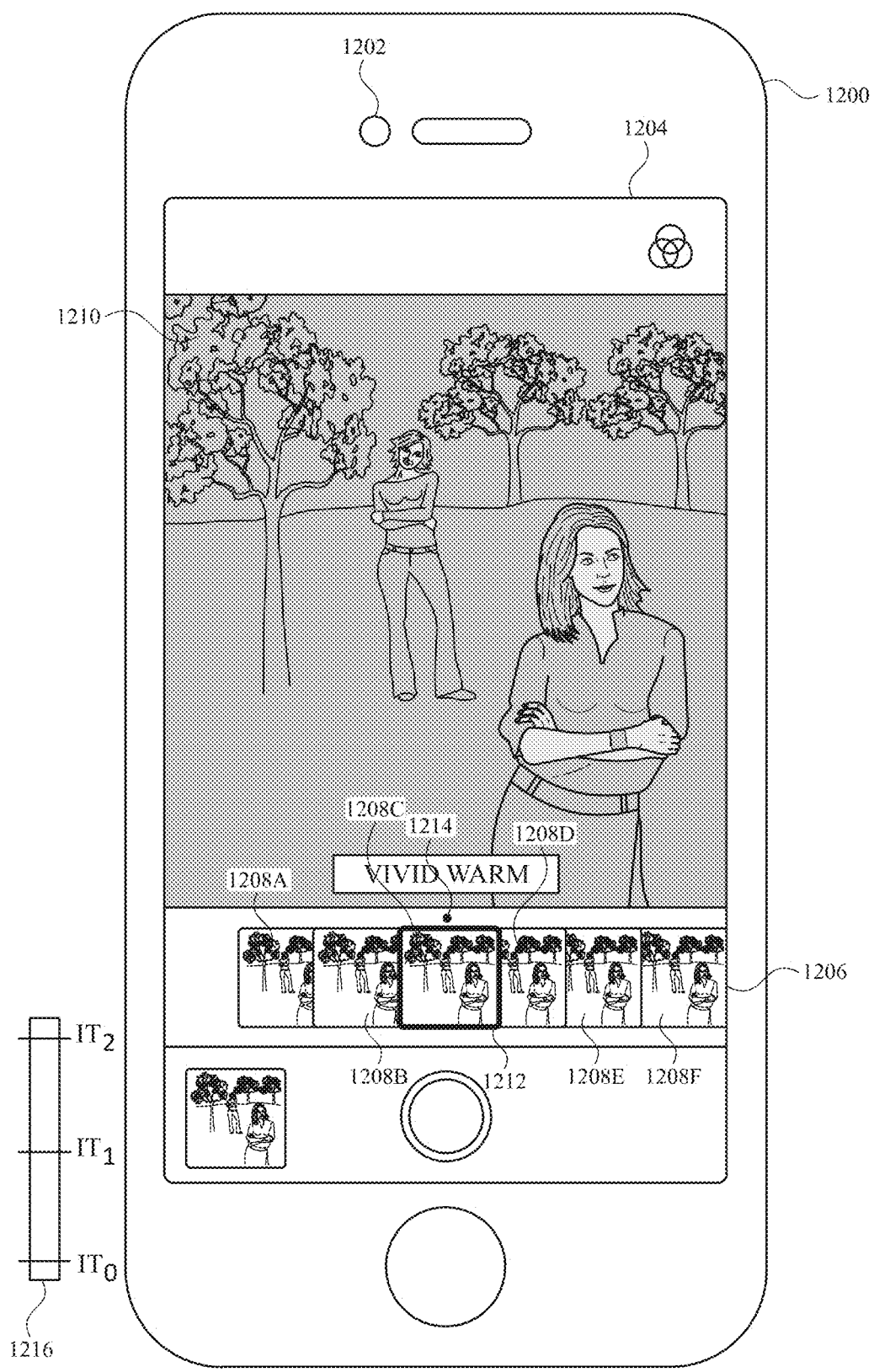
Figure 12L:
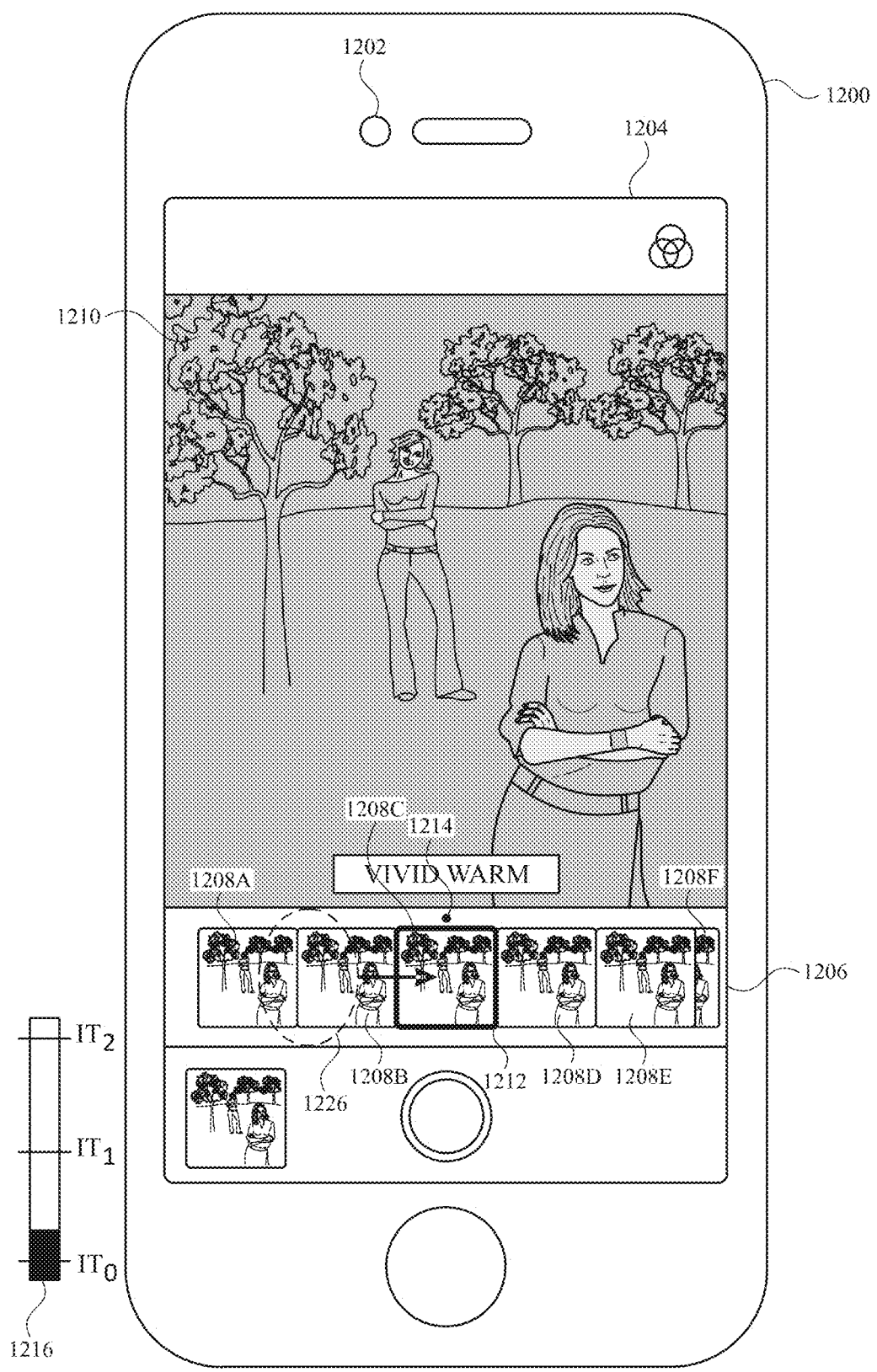
Figure 12M:
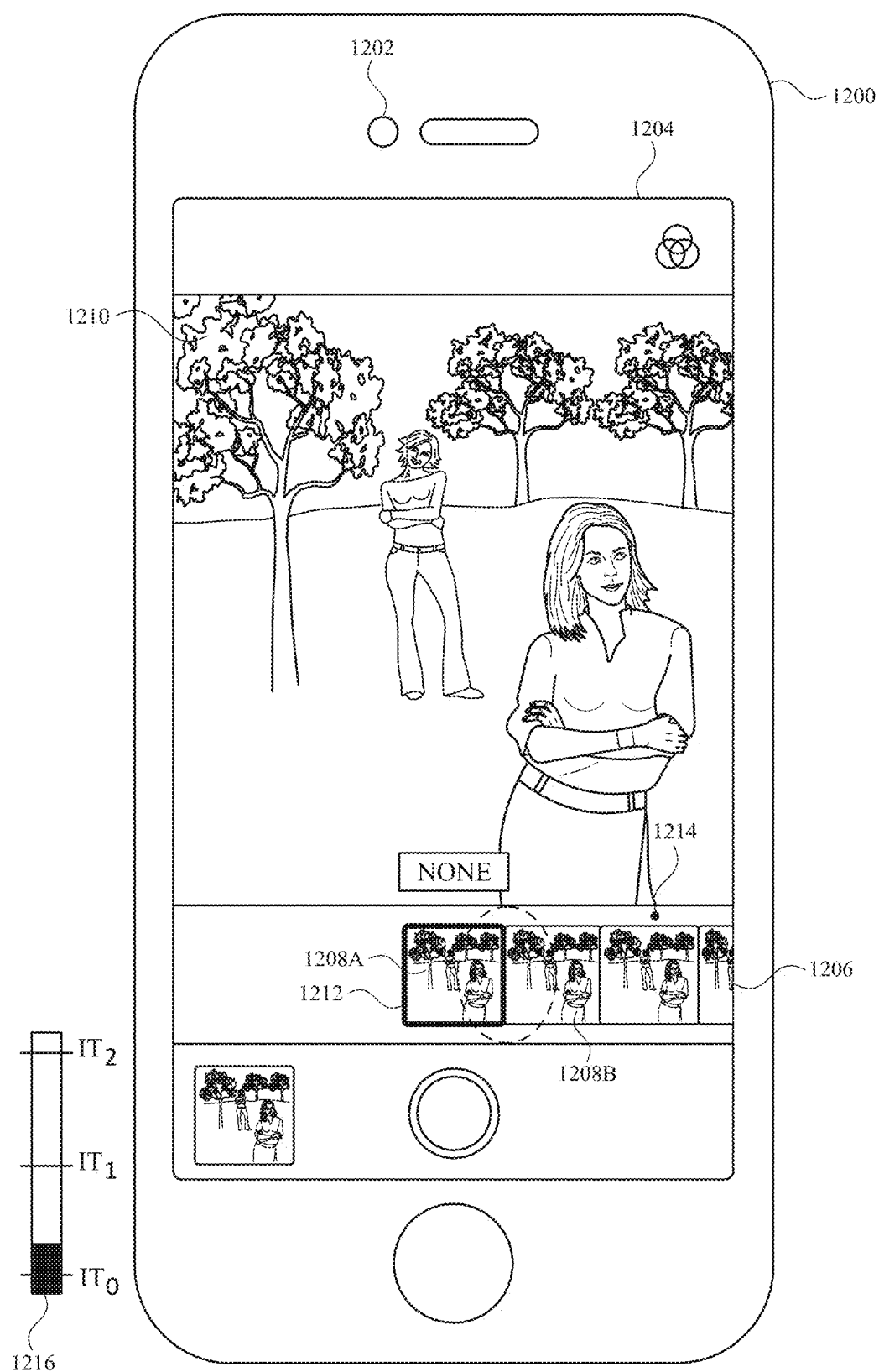
Figure 12N:
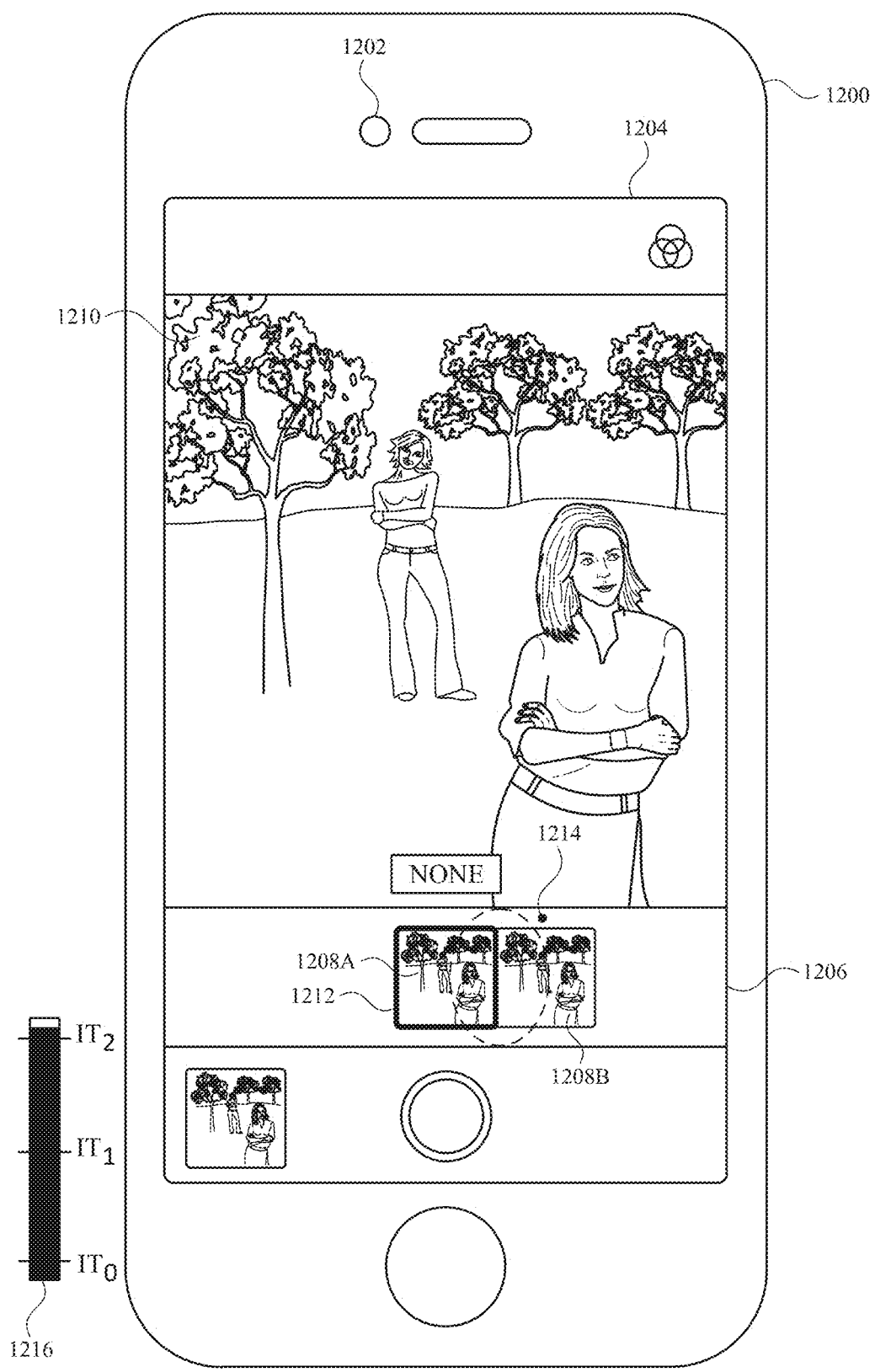
Figure 12O:
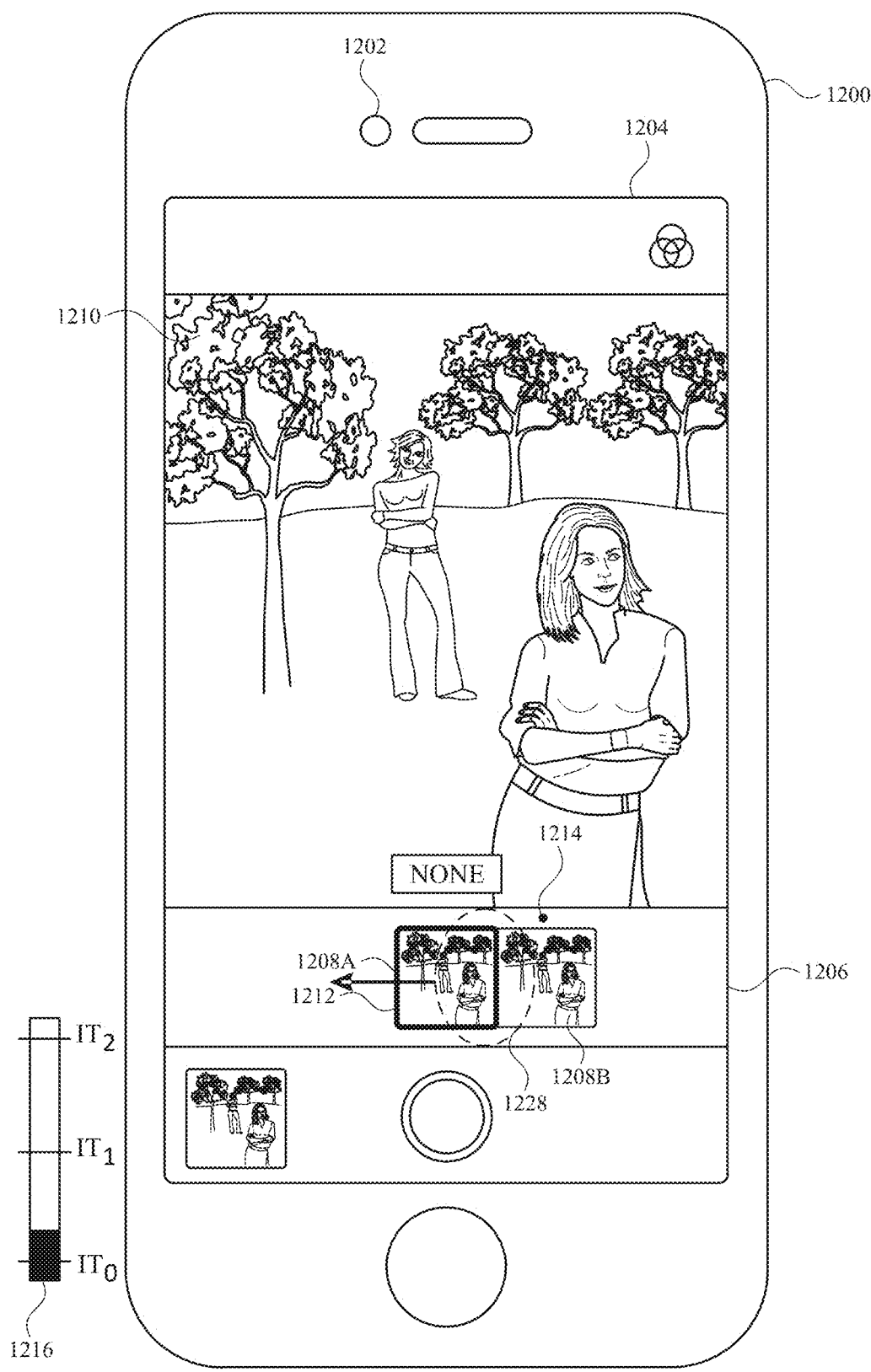
Figure 12P:
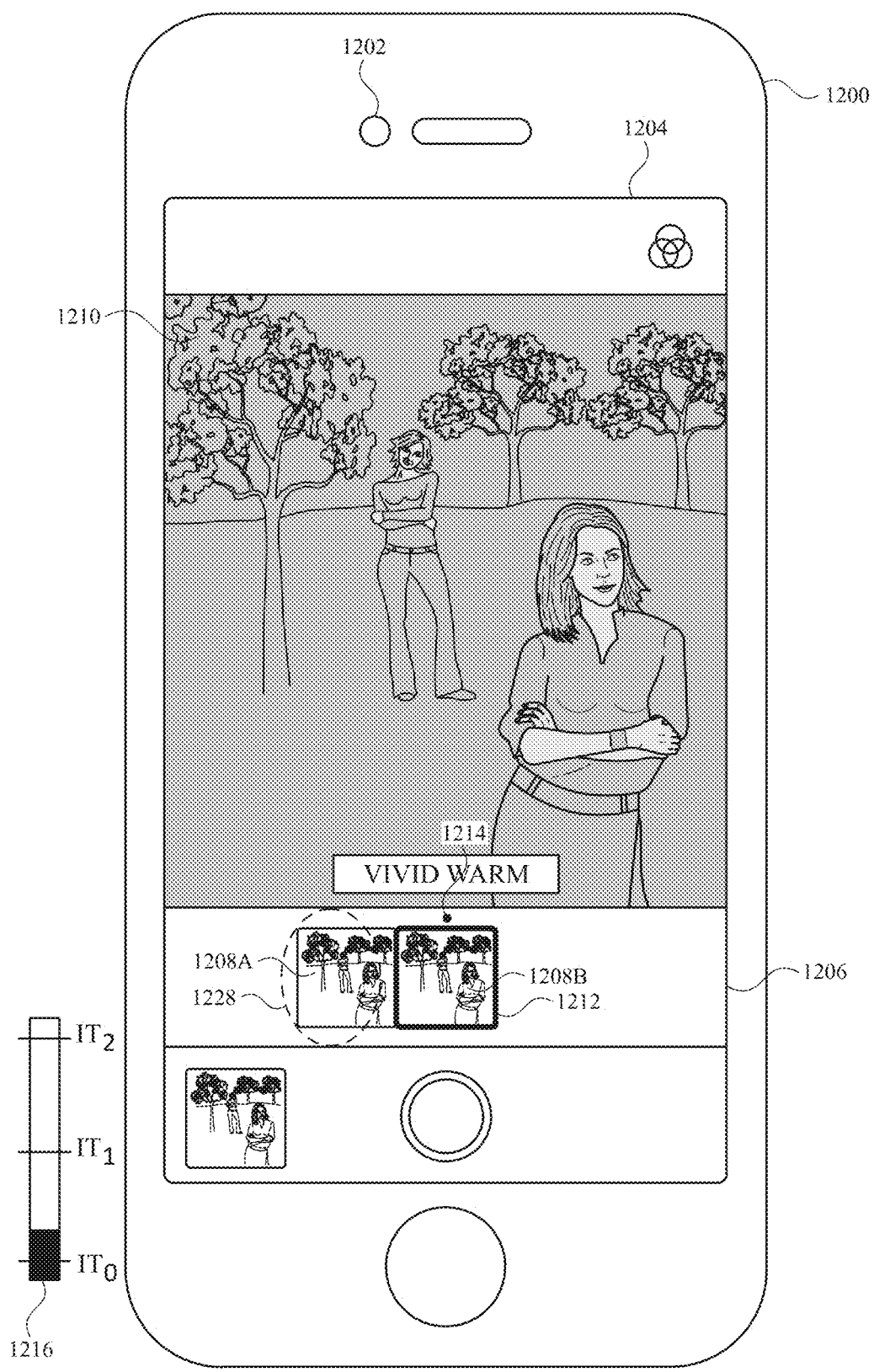
Figure 13B:
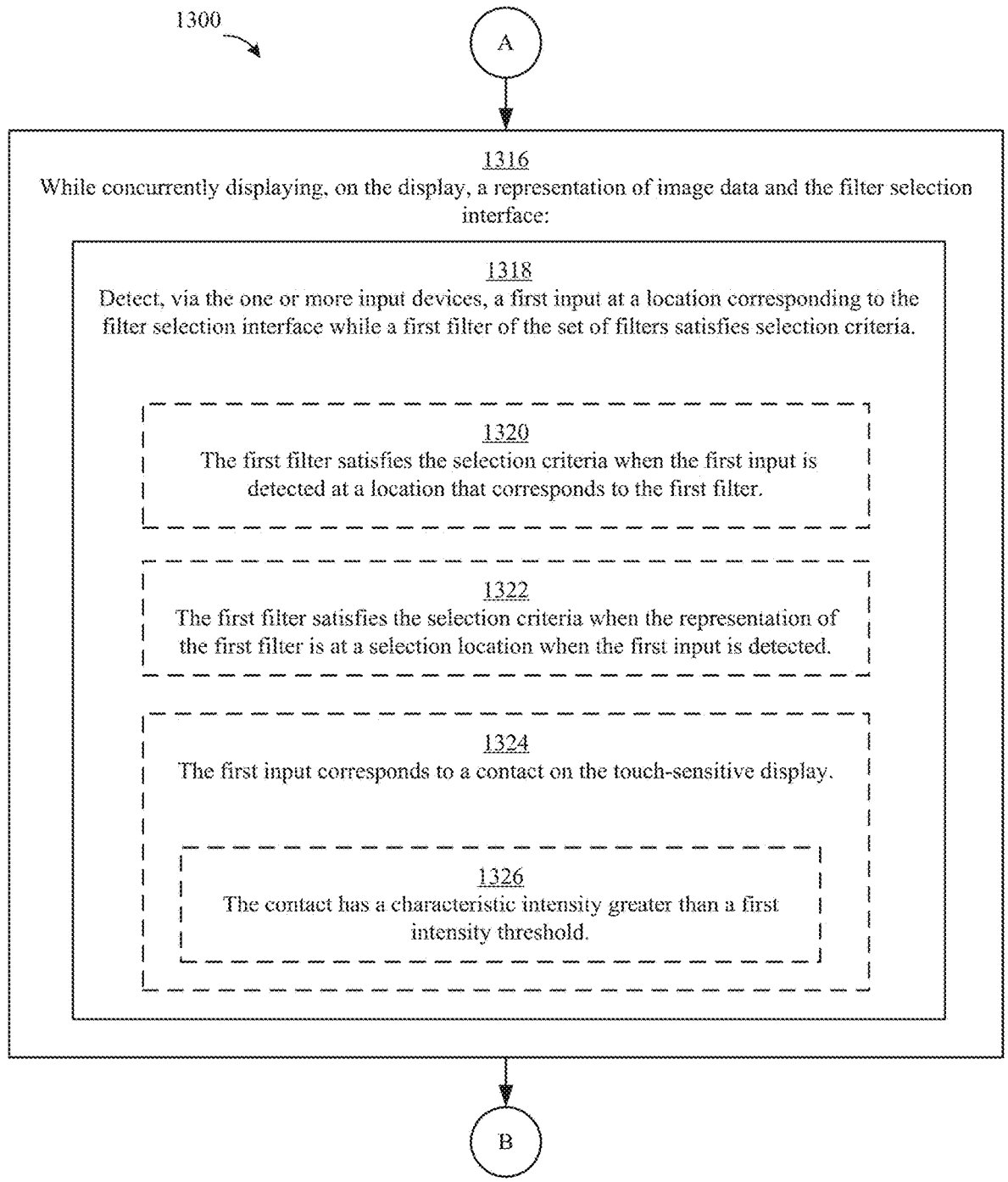
Figure 13C:
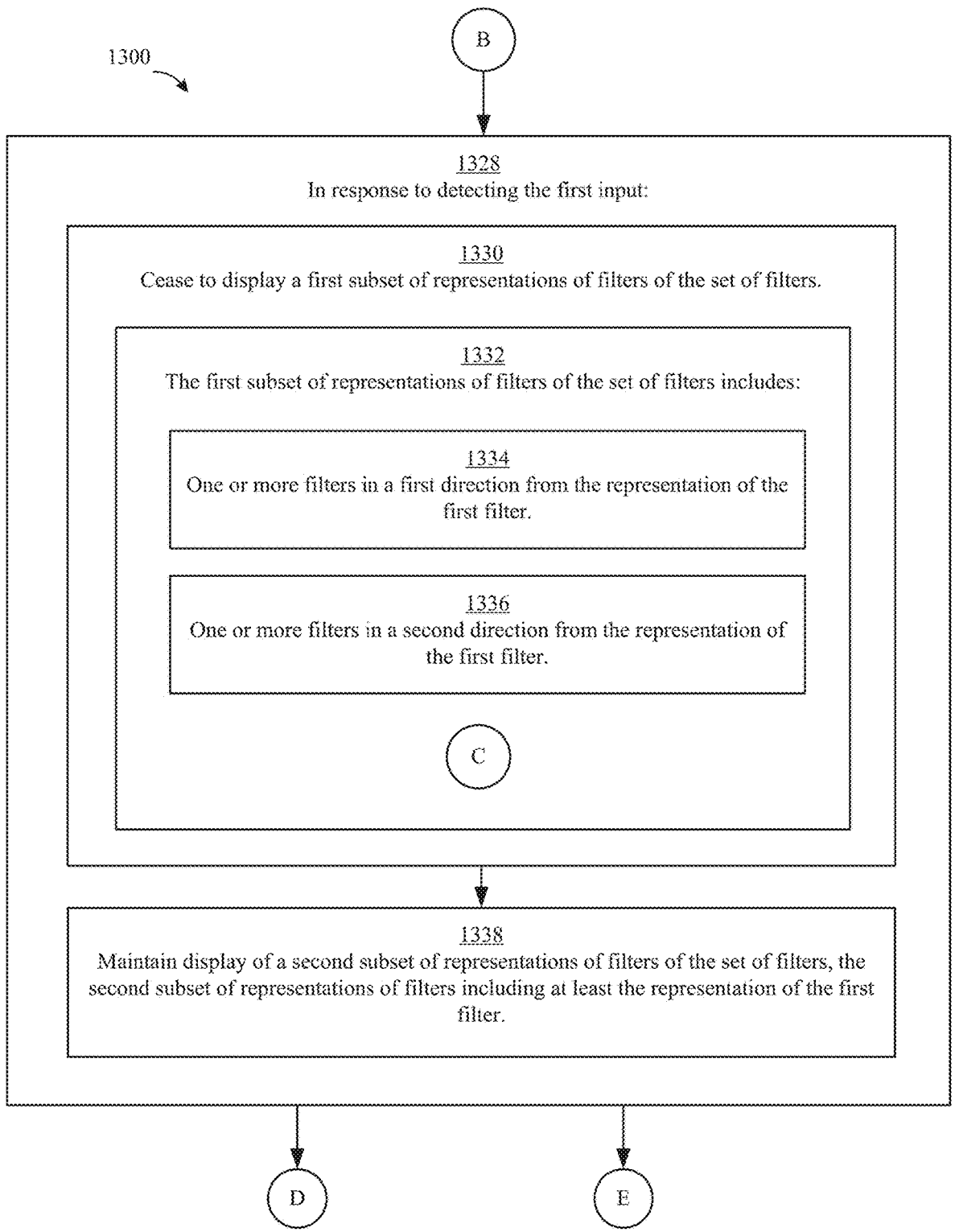
Figure 13E:
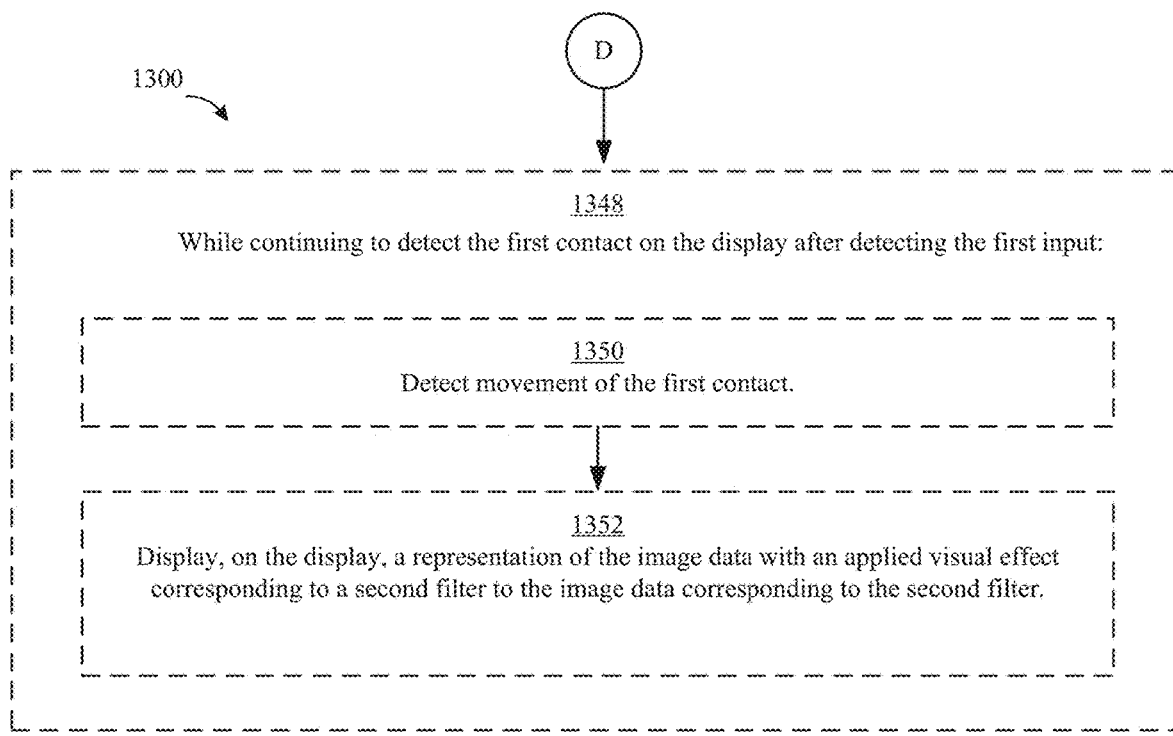
Figure 13F:
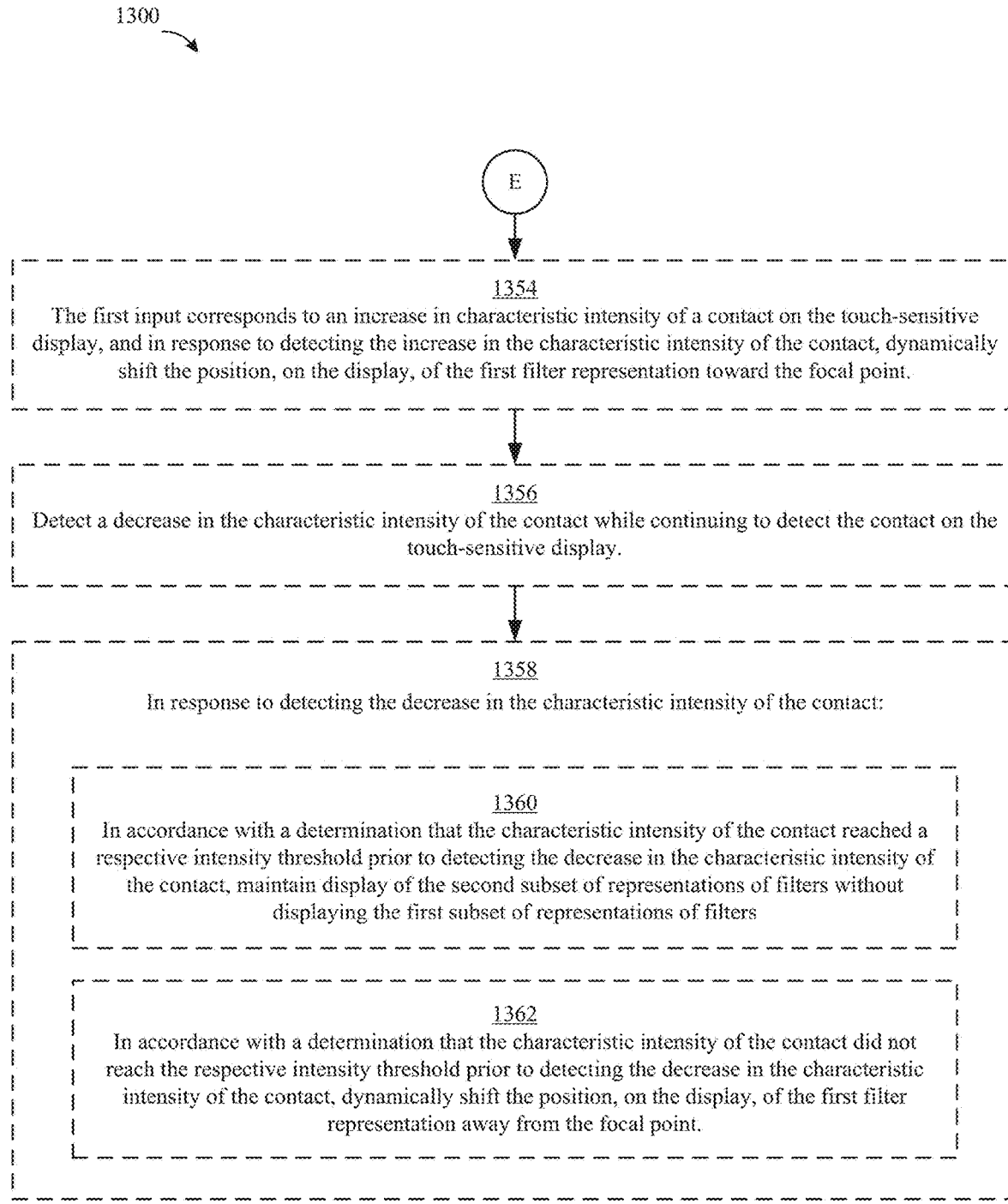

FIGS. 12A-12P illustrate exemplary user interfaces for displaying a reduced filter user interface. FIG. 13 is a flow diagram illustrating methods of displaying a reduced filter user interface in accordance with some embodiments. The user interfaces in FIGS. 12A-12D are used to illustrate the processes described below, including the processes in FIG. 13.

FIGS. 14A-14K illustrate exemplary user interfaces for providing a visual aid. FIG. 15 is a flow diagram illustrating methods of providing a visual aid in accordance with some embodiments. The user interfaces in FIGS. 14A-14D are used to illustrate the processes described below, including the processes in FIG. 15.

FIGS. 16A-16J illustrate exemplary user interfaces for providing a visual aid when applying a simulated optical effect. FIG. 17 is a flow diagram illustrating methods of providing a visual aid when applying a simulated optical effect in accordance with some embodiments. The user interfaces in FIGS. 16A-16J are used to illustrate the processes described below, including the processes in FIG. 17.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
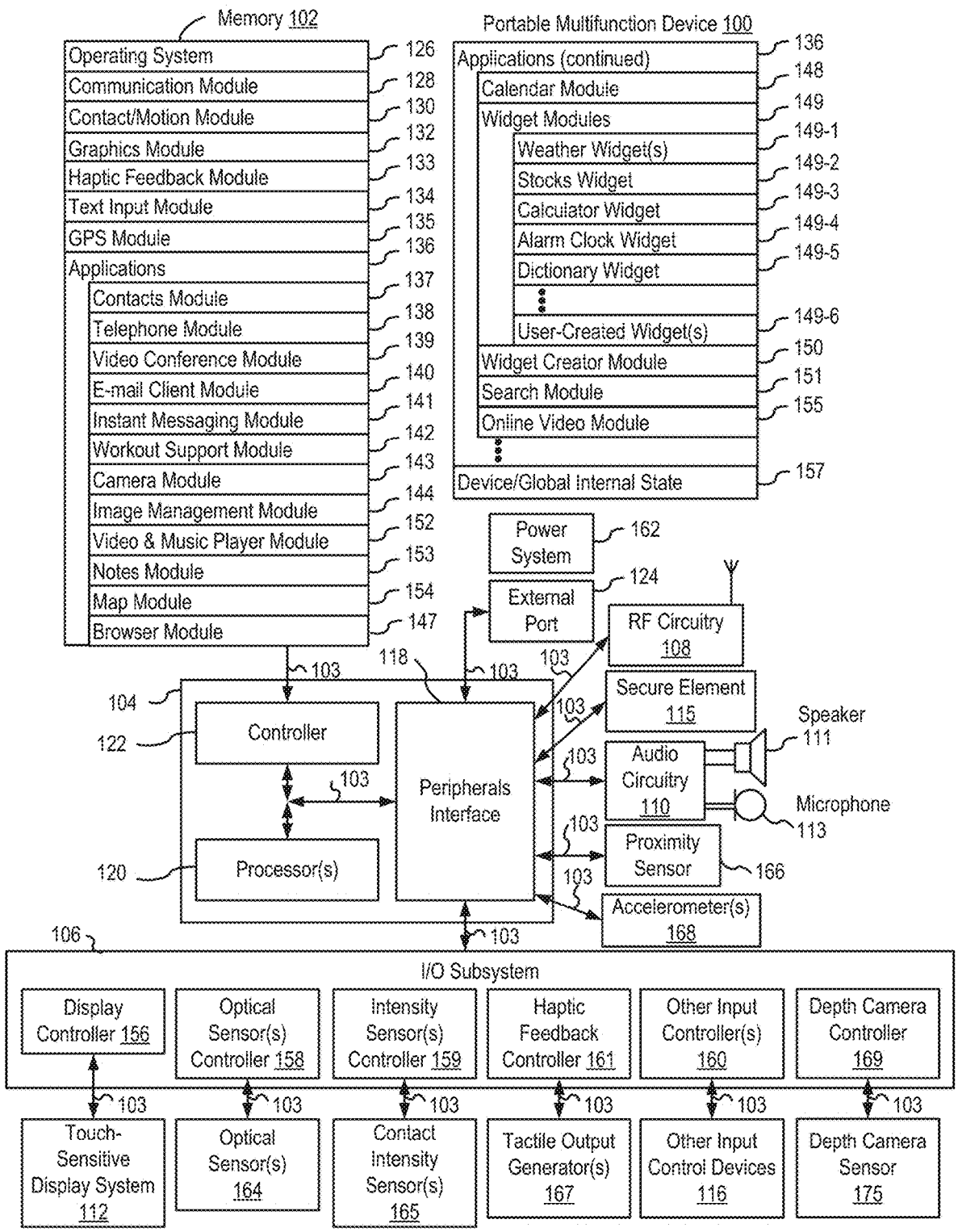
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, depth camera controller 169, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Device 100 optionally also includes one or more depth camera sensors 175. FIG. 1A shows a depth camera sensor coupled to depth camera controller 169 in I/O subsystem 106. Depth camera sensor 175 receives data from the environment, projected through a sensor. In conjunction with imaging module 143 (also called a camera module), depth camera sensor 175 camera is optionally used to determine a depth map of different portions of an image captured by the imaging module 143. In some embodiments, an depth camera sensor is located on the front of device 100 so that the user's image with depth information is, optionally, obtained for video conferencing while the user views the other video conference participants on the touch screen display and to capture selfies with depth map data. In some embodiments, the position of depth camera sensors 175 can be changed by the user (e.g., by rotating the lens and the sensor in the device housing) so that a depth camera sensors 175 is used along with the touch screen display for both video conferencing and still and/or video image acquisition.

Figure 3:
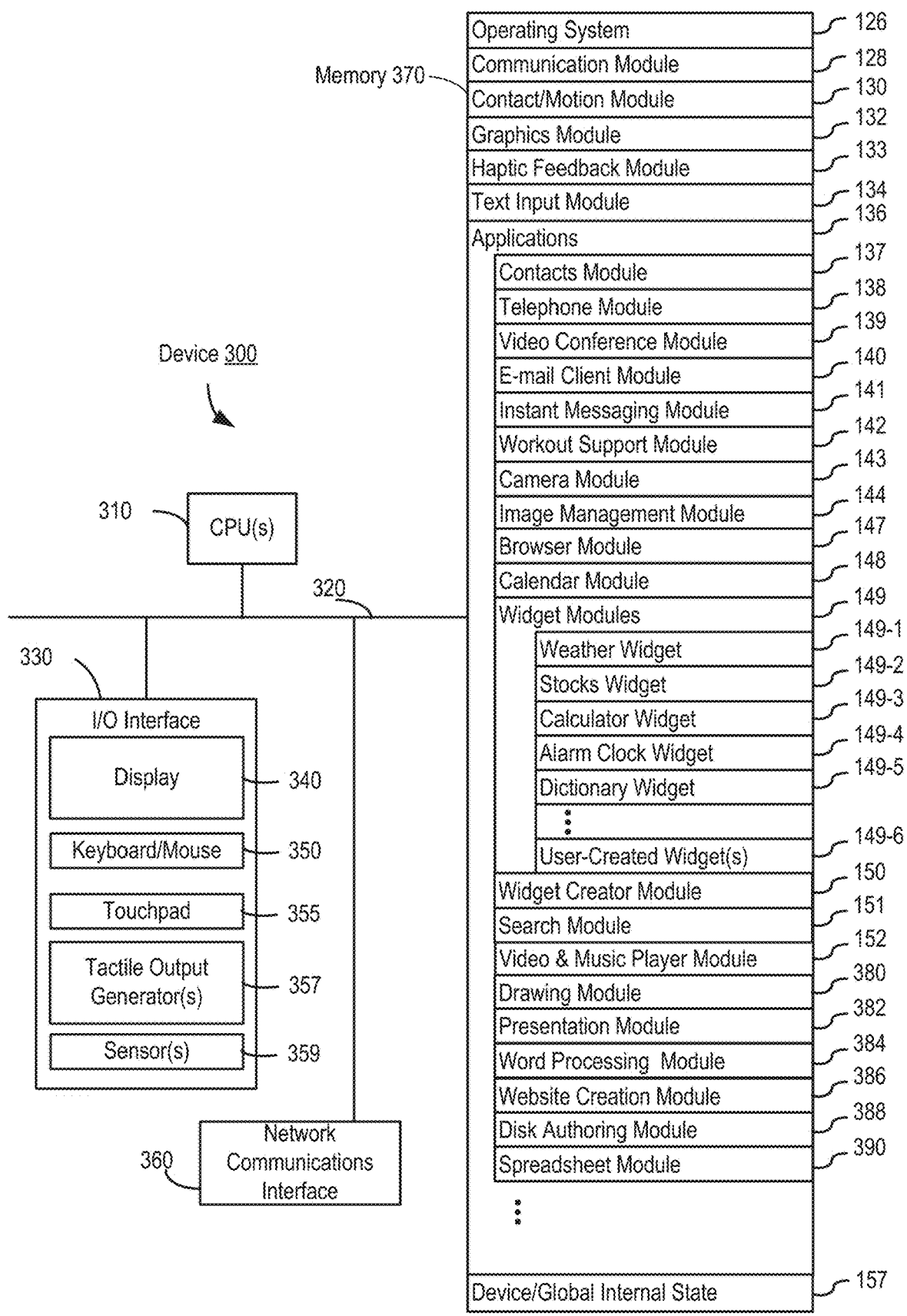
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
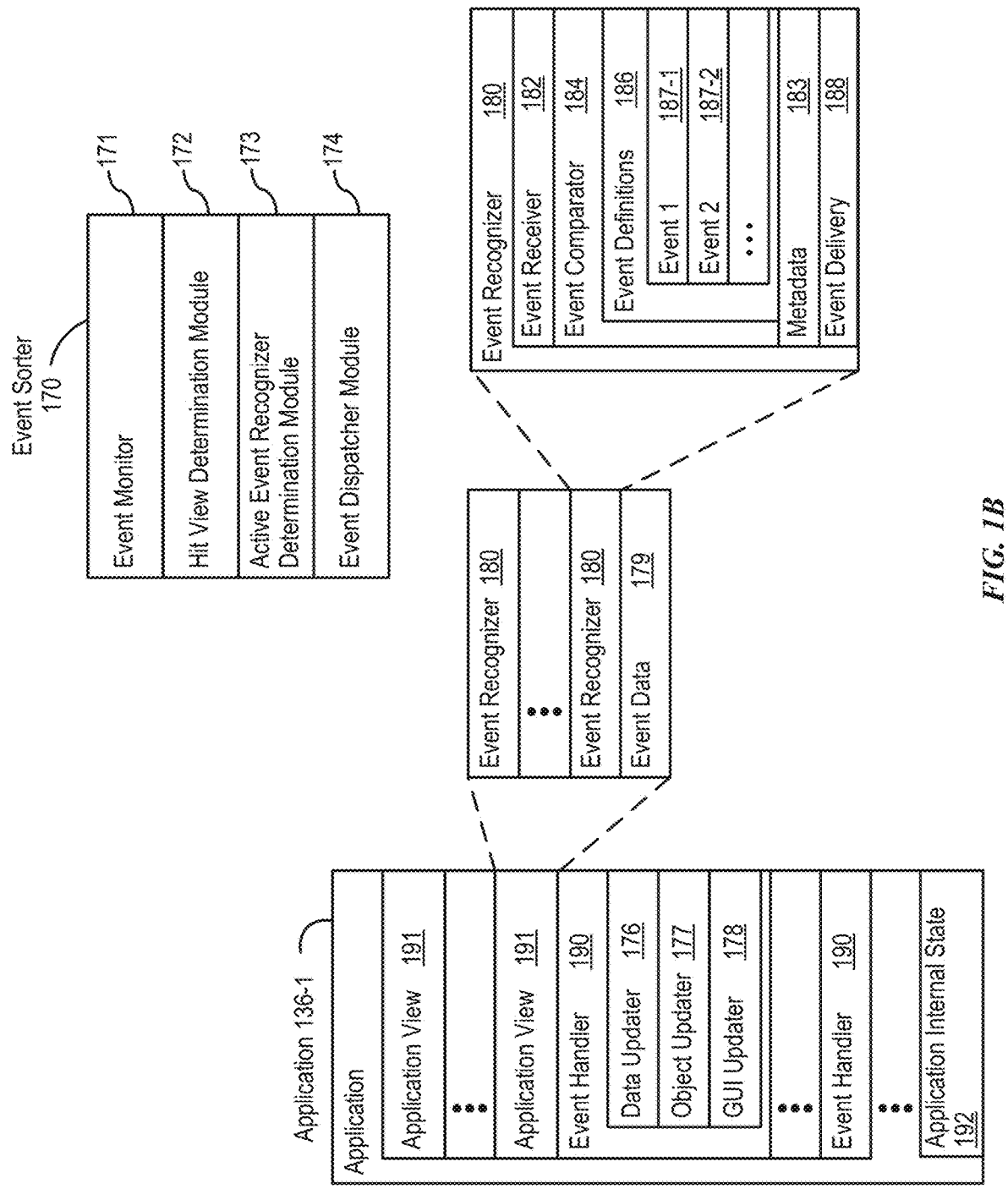
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object.

In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
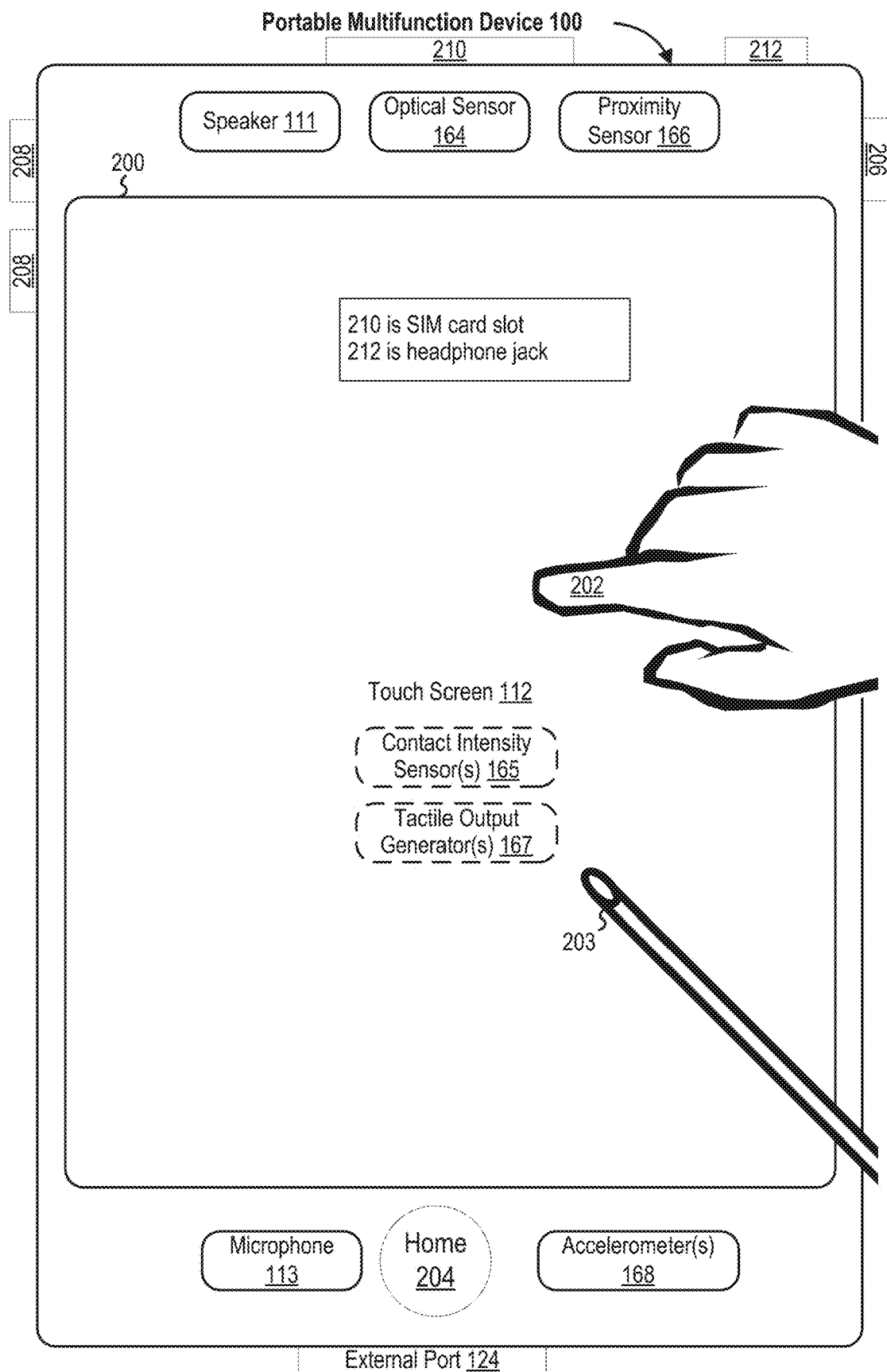
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiments, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
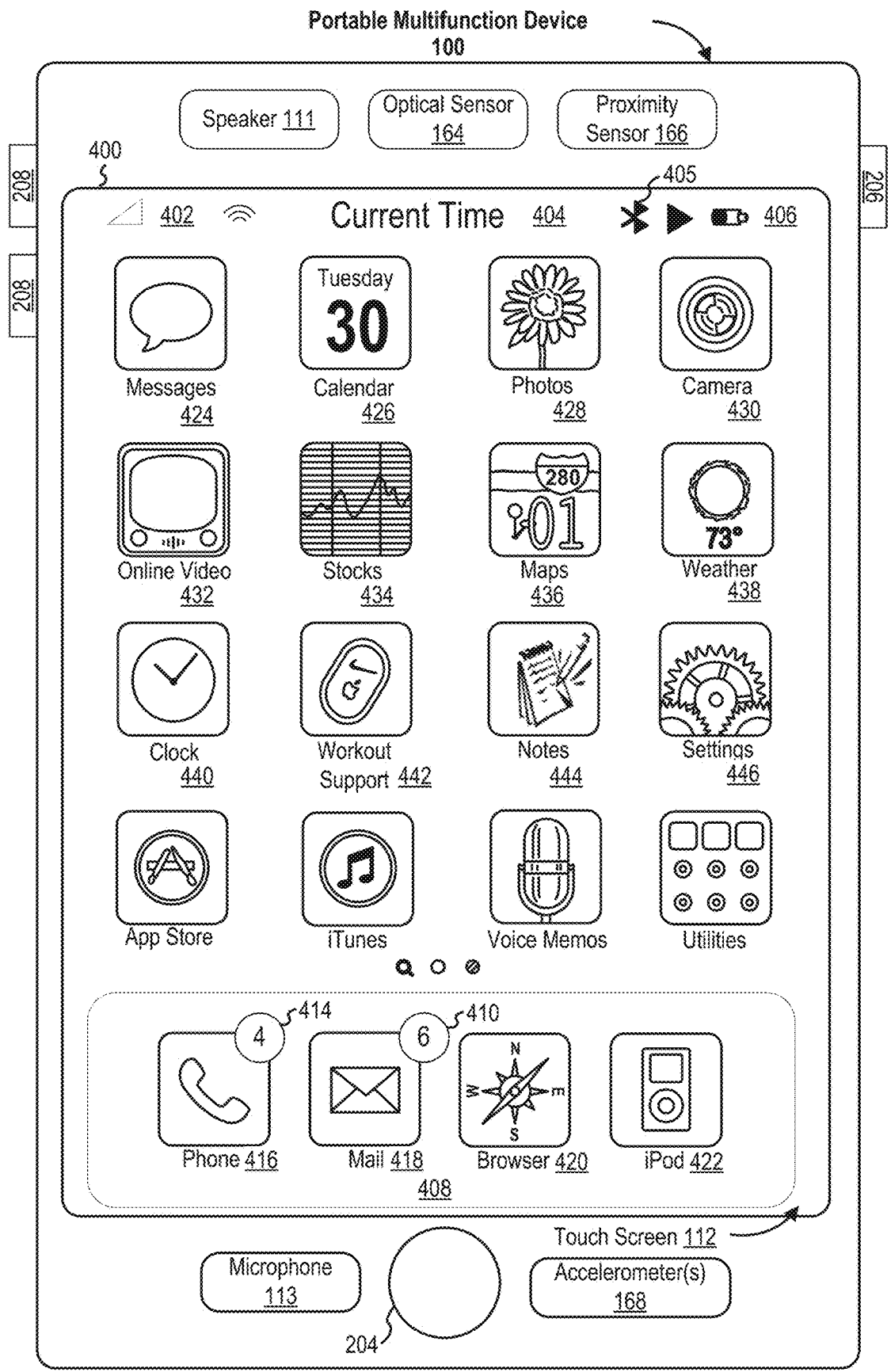
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser;" and
    Icon 422 for video and music player module 152, also referred to as iPod (trademark of Apple Inc.) module 152, labeled "iPod;" and
Icons for other applications, such as:
    Icon 424 for IM module 141, labeled "Messages;"
    Icon 426 for calendar module 148, labeled "Calendar;"
    Icon 428 for image management module 144, labeled "Photos;"
    Icon 430 for camera module 143, labeled "Camera;"
    Icon 432 for online video module 155, labeled "Online Video;"
    Icon 434 for stocks widget 149-2, labeled "Stocks;"
    Icon 436 for map module 154, labeled "Maps;"
    Icon 438 for weather widget 149-1, labeled "Weather;"
    Icon 440 for alarm clock widget 149-4, labeled "Clock;"
    Icon 442 for workout support module 142, labeled "Workout Support;"
    Icon 444 for notes module 153, labeled "Notes;" and
    Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
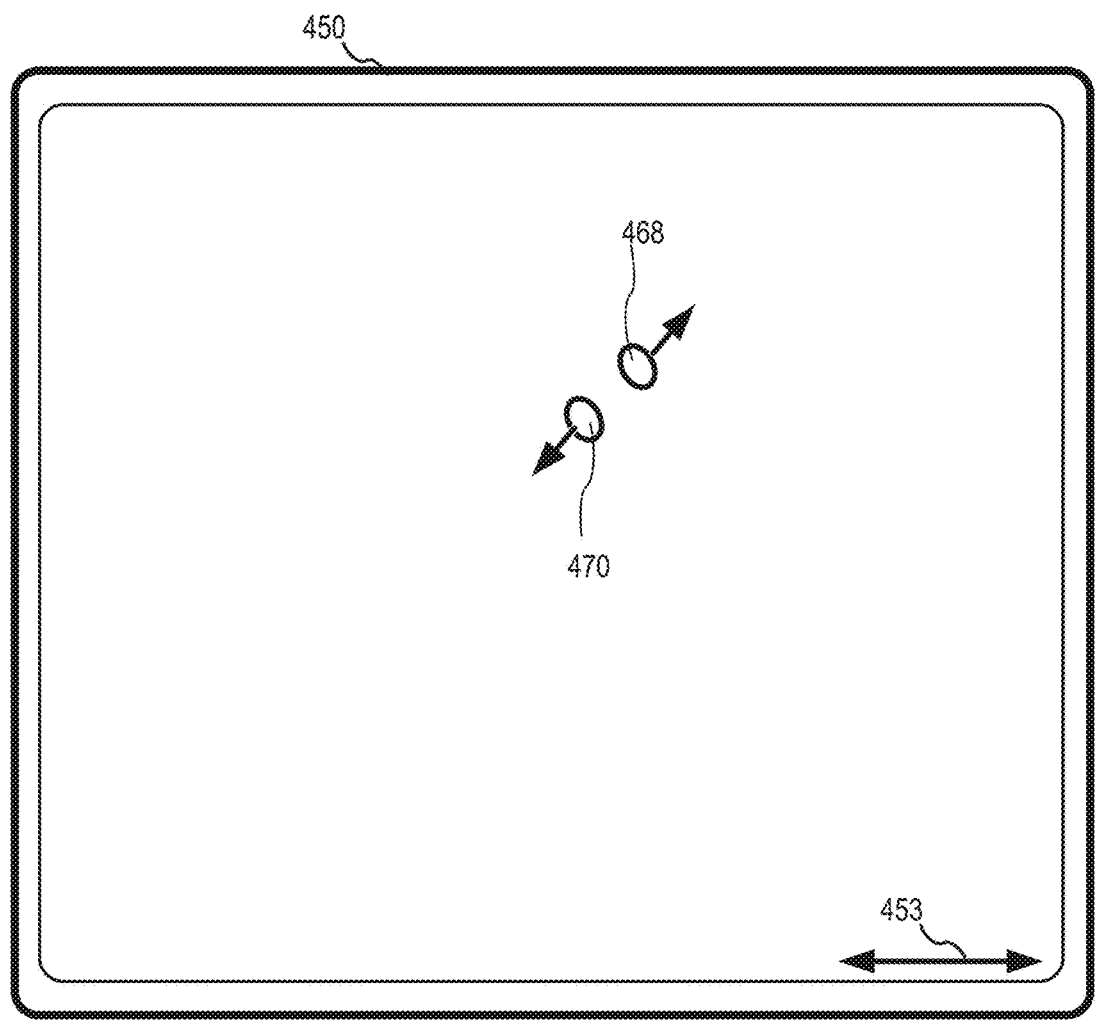
FIG. 4B illustrates an exemplary user interface for a multifunction device with a touch-sensitive surface that is separate from the display in accordance with some embodiments.
Figure 4B:
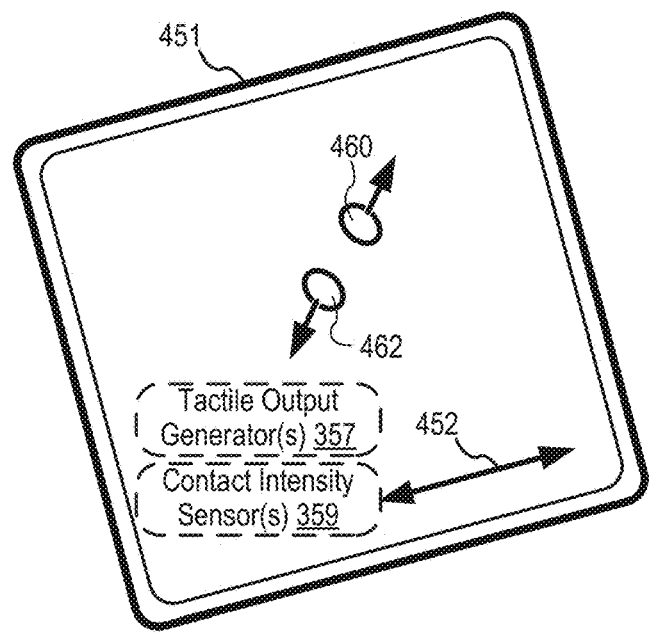

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
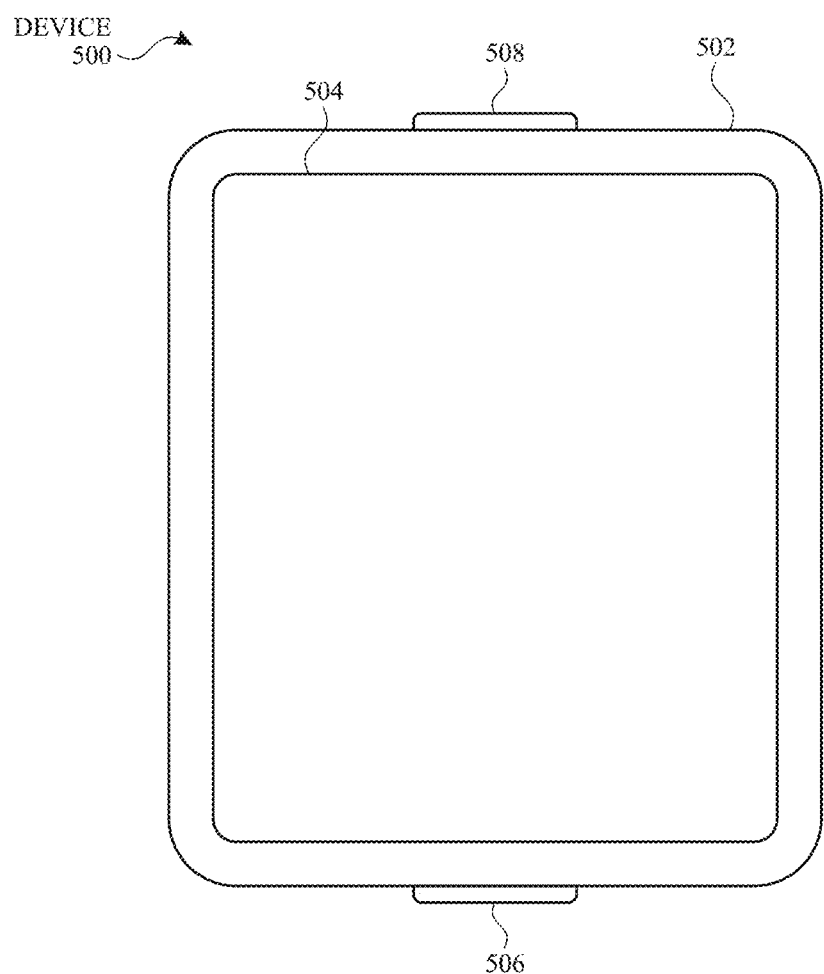
FIG. 5A illustrates a personal electronic device in accordance with some embodiments.
Figure 6A:
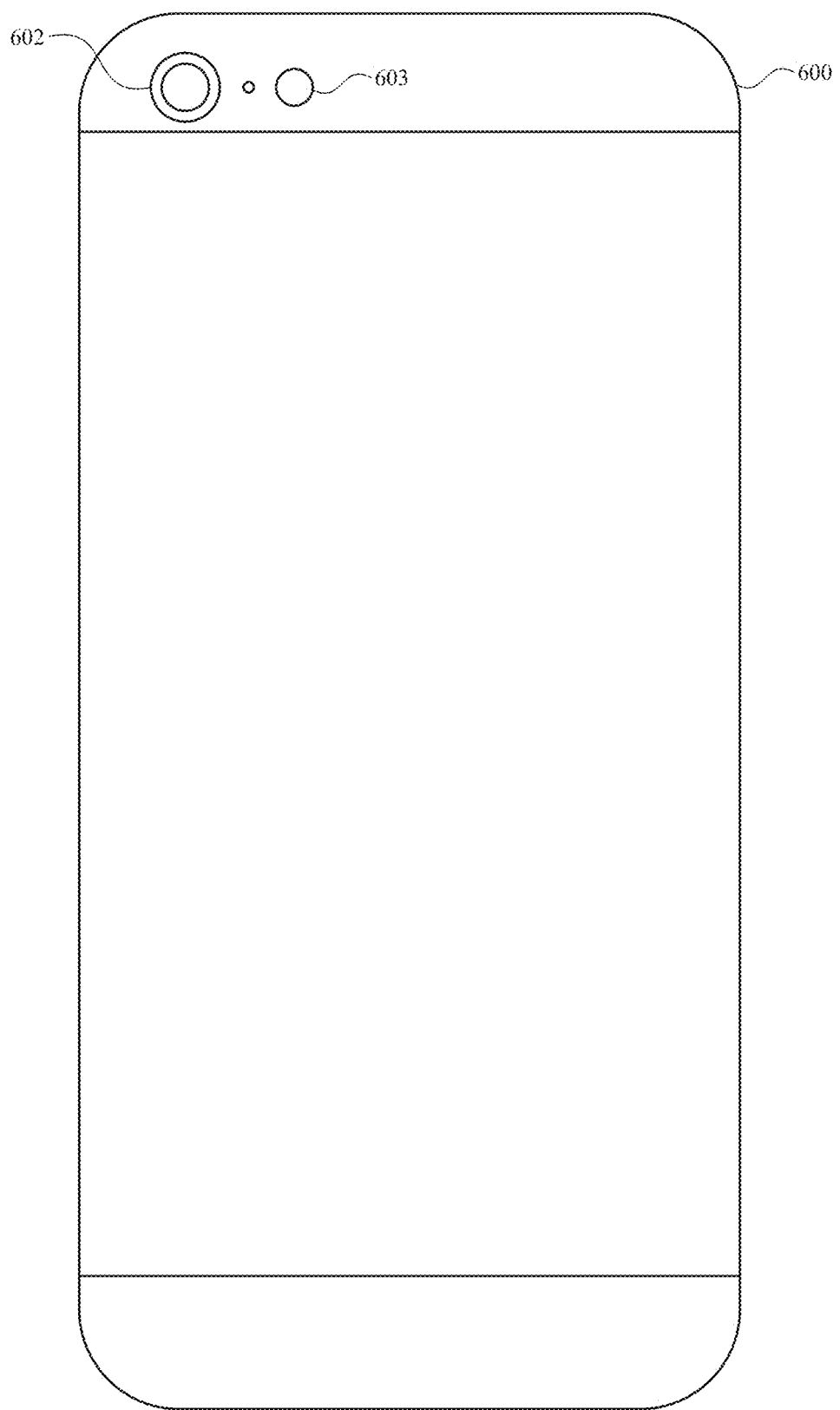
FIGS. 6A-6N illustrate exemplary devices and user interfaces for managing camera lighting effects, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
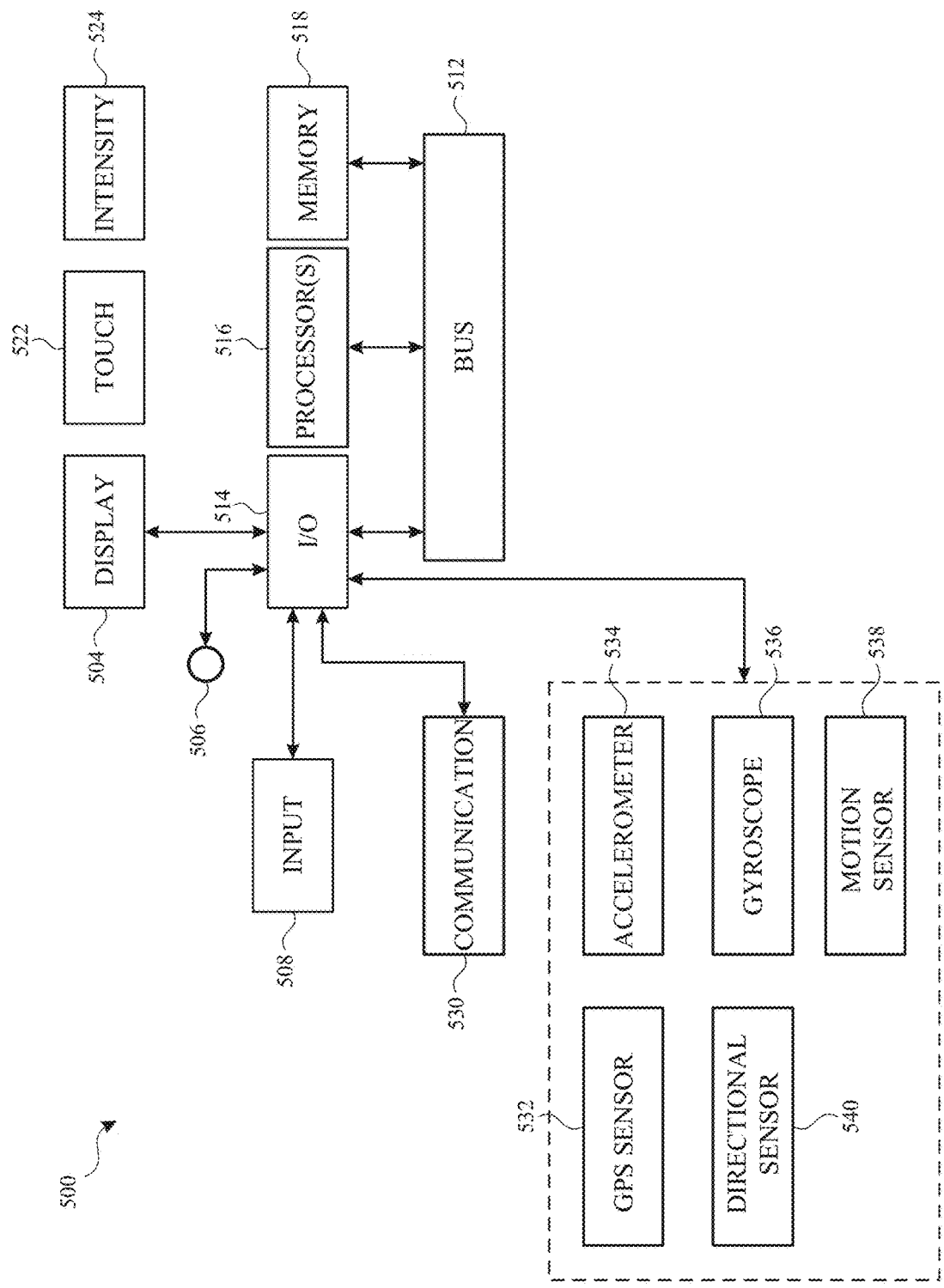
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300, 1500, and 1700 (FIGS. 7, 9, 11, 13, 15, and 17). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
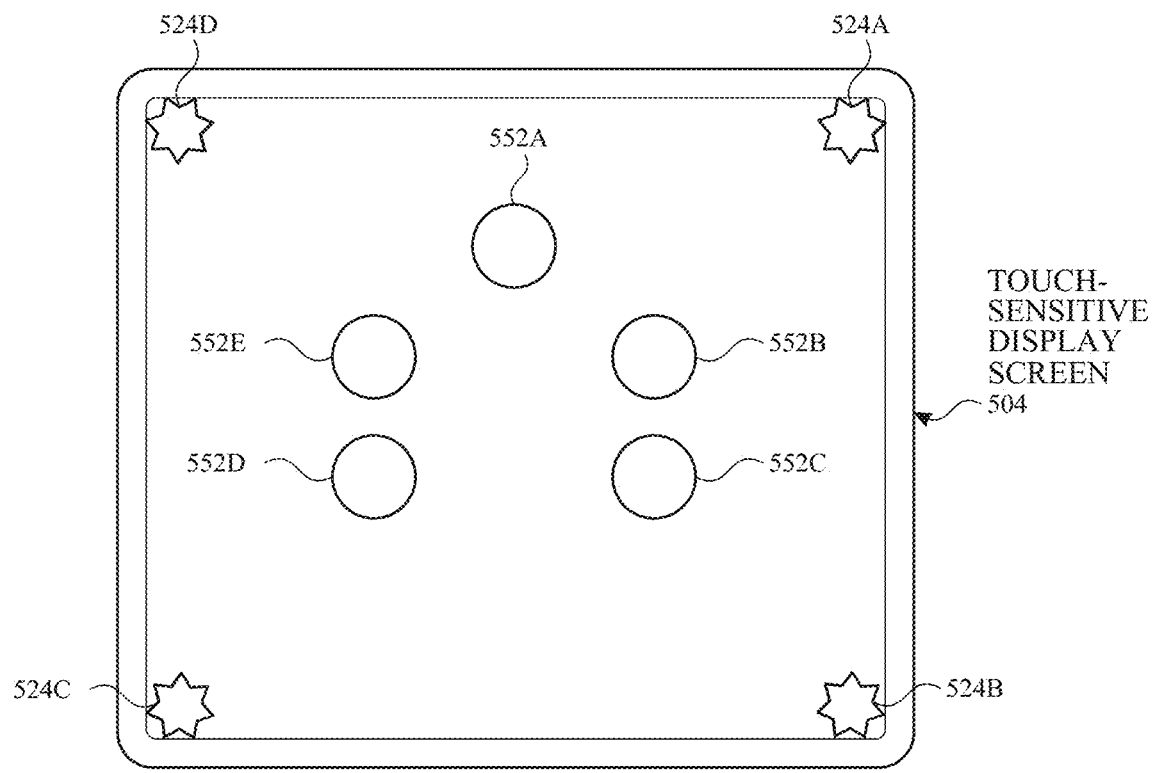
FIGS. 5C-5D illustrate exemplary components of a personal electronic device having a touch-sensitive display and intensity sensors in accordance with some embodiments.
Figure 5C:
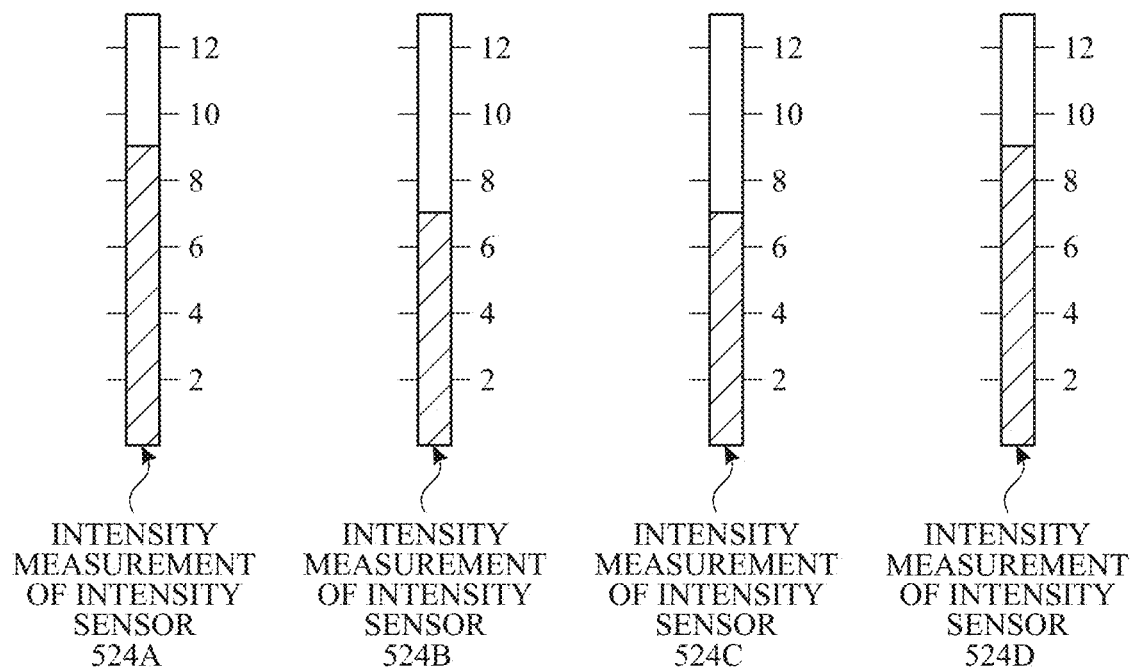
Figure 5D:
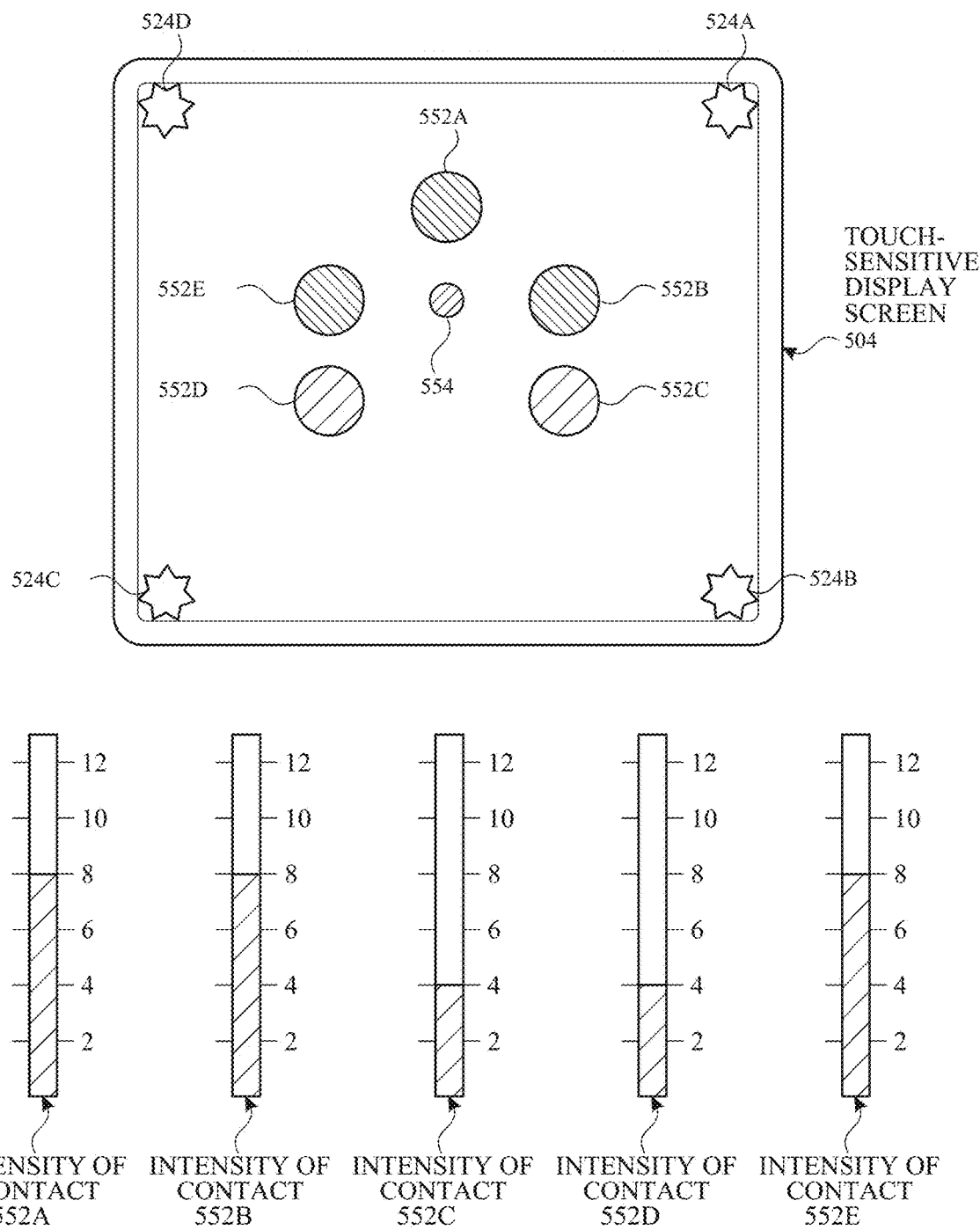

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
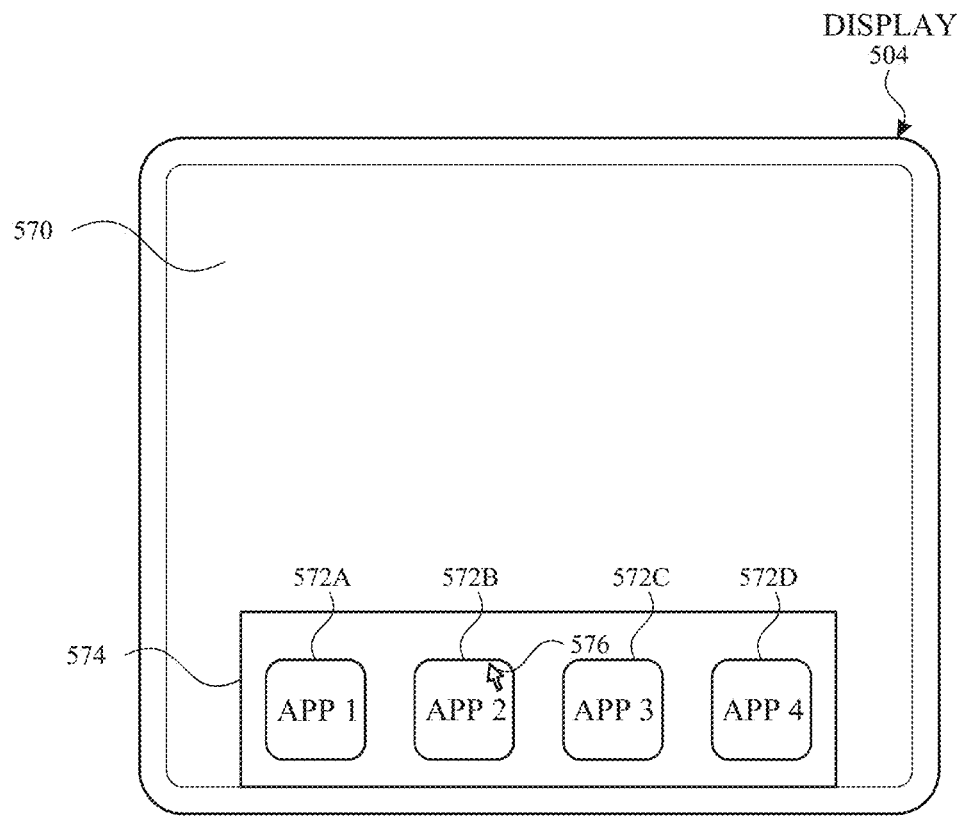
FIGS. 5E-5H illustrate exemplary components and user interfaces of a personal electronic device in accordance with some embodiments.
Figure 5E:
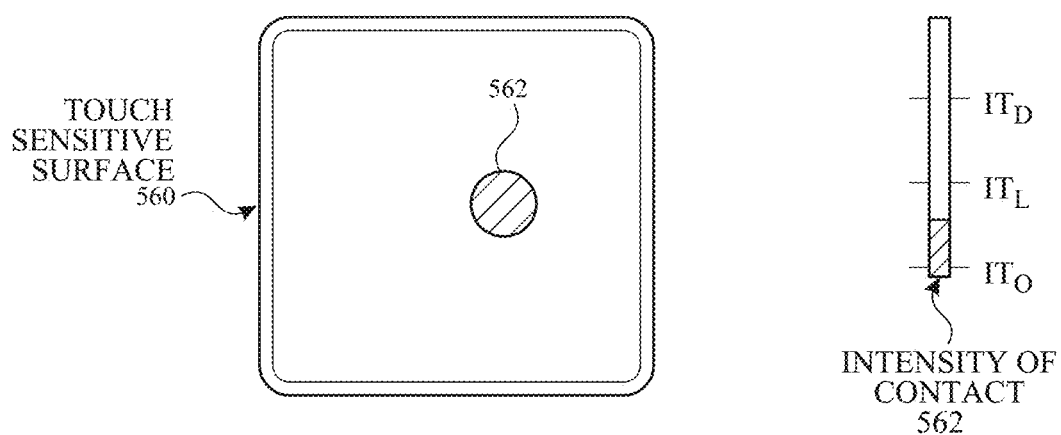
Figure 5F:
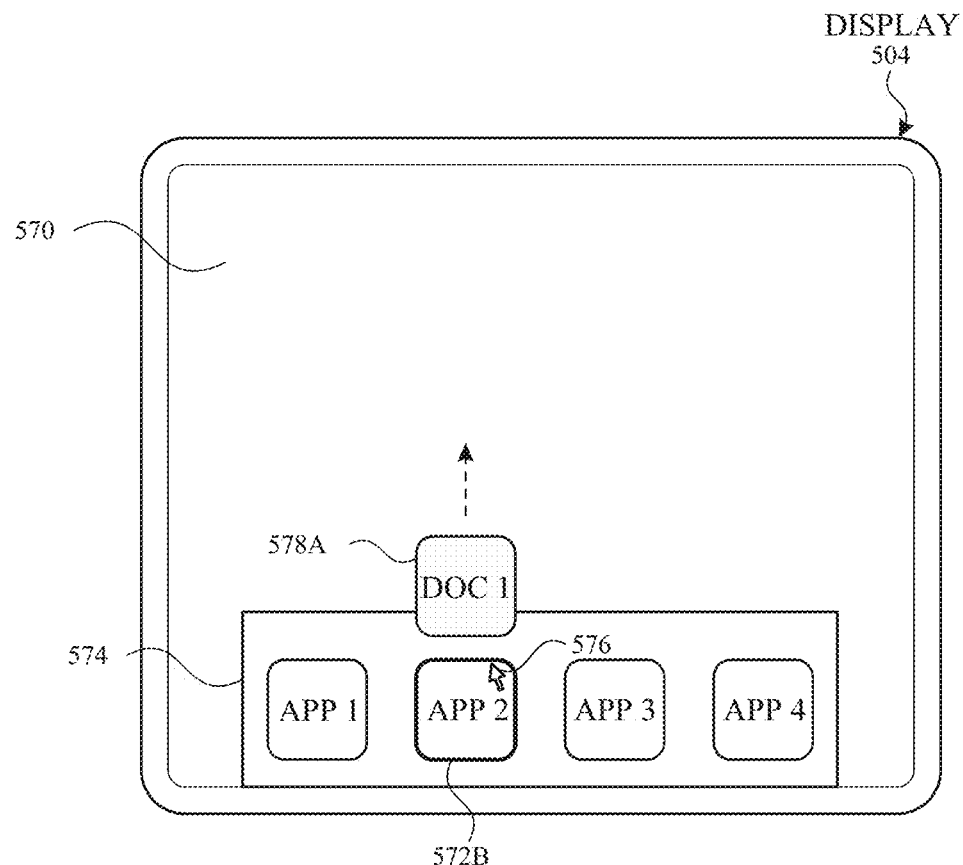
Figure 5F:
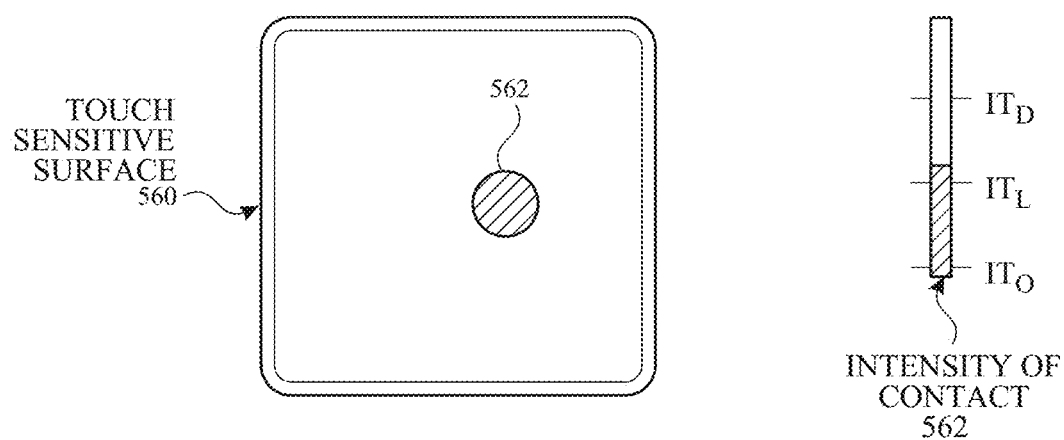
Figure 5G:
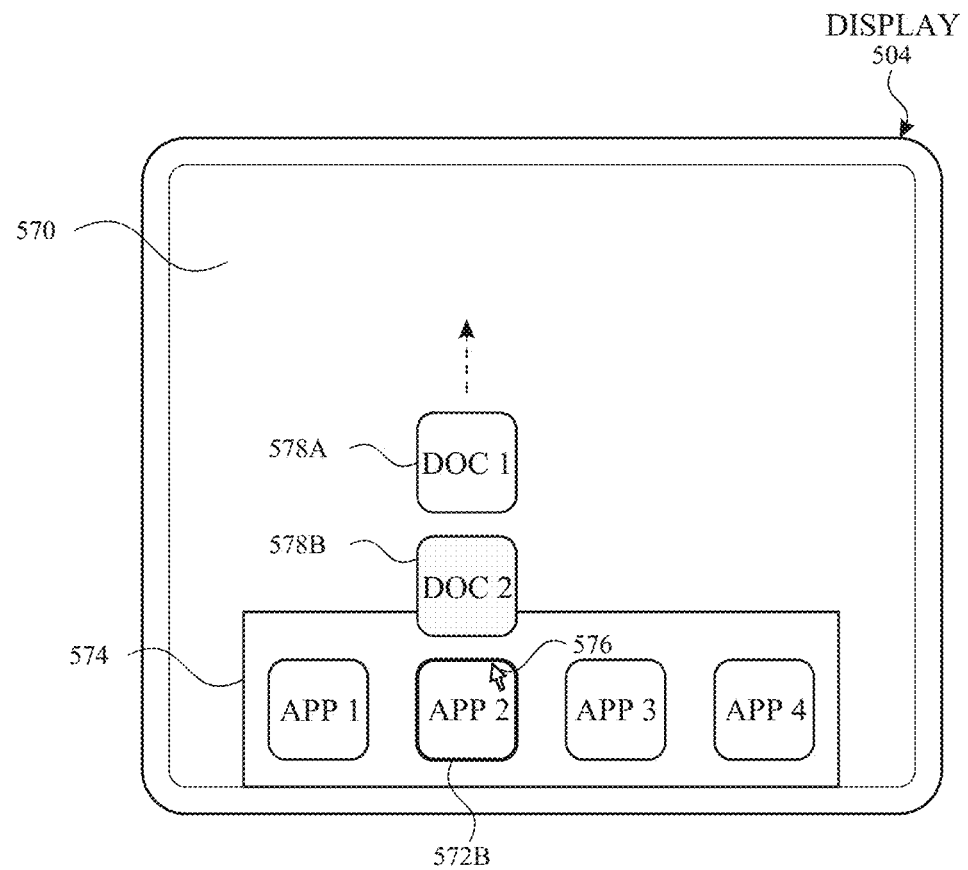
Figure 5G:
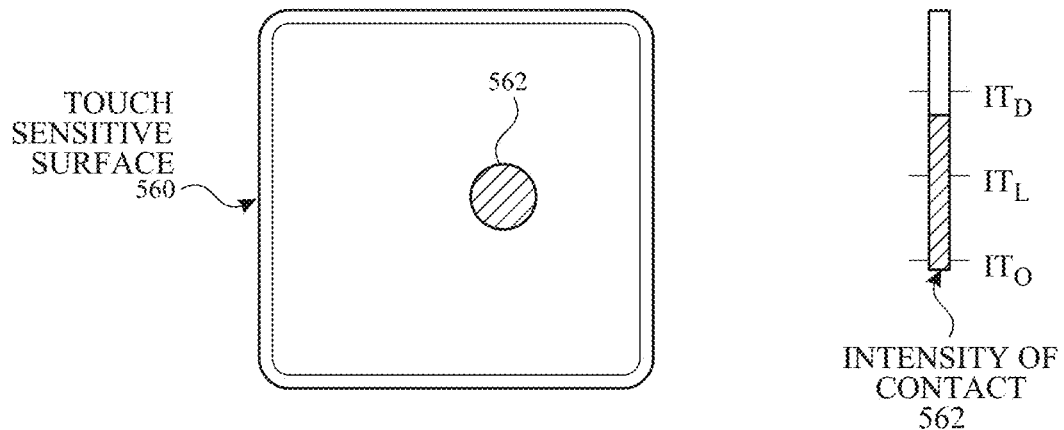
Figure 5H:
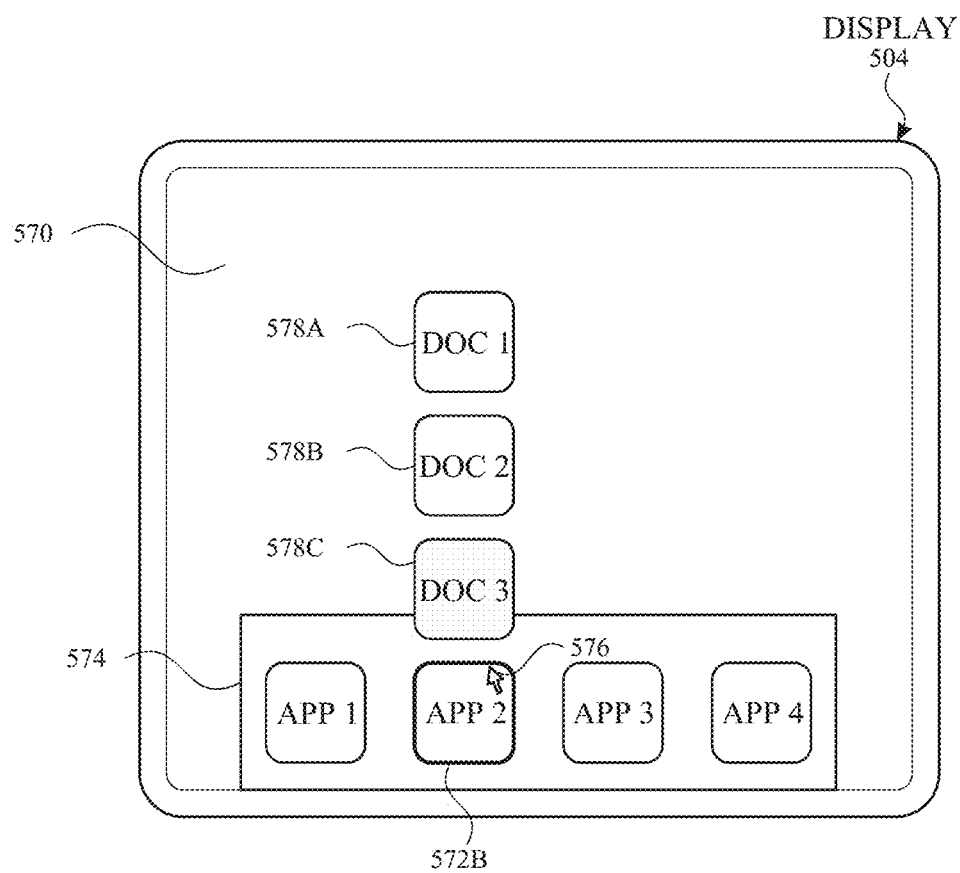
Figure 5H:
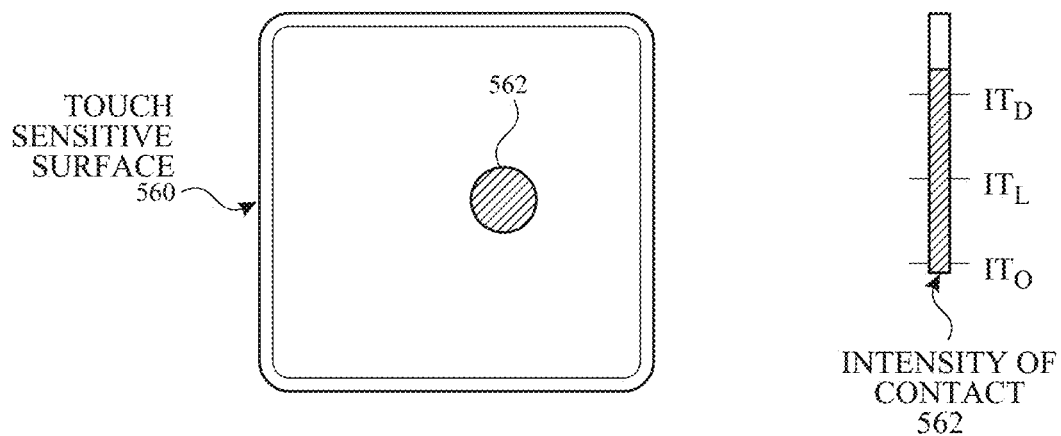

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITS"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6N illustrate exemplary user interfaces for managing camera effects, in accordance with some embodiments. The user interfaces in these figures are used to illustrate the processes described below, including the processes in FIG. 7.

FIG. 6A illustrates an electronic device 600 with multiple cameras 602 and 603 (e.g., on the rear of the electronic device 600). In some embodiments, device 600 includes one or more features of devices 100, 300, and/or 500. In some examples, the electronic device (e.g., 600) has multiple cameras with fixed, but different, focal lengths. In some examples, the multiple cameras are on the front, the back, or both sides of the electronic device (e.g., 600). In some embodiments, in addition to having different fixed focal lengths, multiple cameras have different fixed fields of view and different fixed optical magnification properties. In some embodiments, the camera (e.g., 602) captures image data using a plurality of focal lengths. In some embodiments, one camera (e.g., 602) captures a plurality of focal lengths, thus, producing the same result as a plurality of cameras with fixed, but different, focal lengths. In some examples, the electronic device includes a depth camera, such as an infrared camera, a thermographic camera, or a combination thereof. In some examples, the device further includes a light-emitting device (e.g., light projector), such an IR flood light, a structured light projector, or a combination thereof. The light-emitting device is, optionally, used to illuminate the subject during capture of the image by a visible light camera and a depth camera (e.g., an IR camera) and the information from the depth camera and the visible light camera are used to determine a depth map of different portions of subject captured by the visible light camera. In some embodiments, the lighting effects described herein are displayed using disparity information from two cameras (e.g., two visual light cameras) for rear facing images and using depth information from a depth camera combined with image data from a visual light camera for front facing images (e.g., selfie images). In some embodiments, the same user interface is used when the two visual light cameras are used to determine the depth information and when the depth camera is used to determine the depth information, providing the user with a consistent experience, even when using dramatically different technologies to determine the information that is used when generating the lighting effects. In some embodiments, while displaying the camera user interface with one of the lighting effects applied, the device detects selection of a camera switching affordance and switches from the front facing cameras (e.g., a depth camera and a visible light camera) to the rear facing cameras (e.g., two visible light cameras that are spaced apart from each other) (or vice versa) while maintaining display of the user interface controls for applying the lighting effect and replacing display of the field of view of the front facing cameras to the field of view of the rear facing cameras (or vice versa).

Figure 6B:
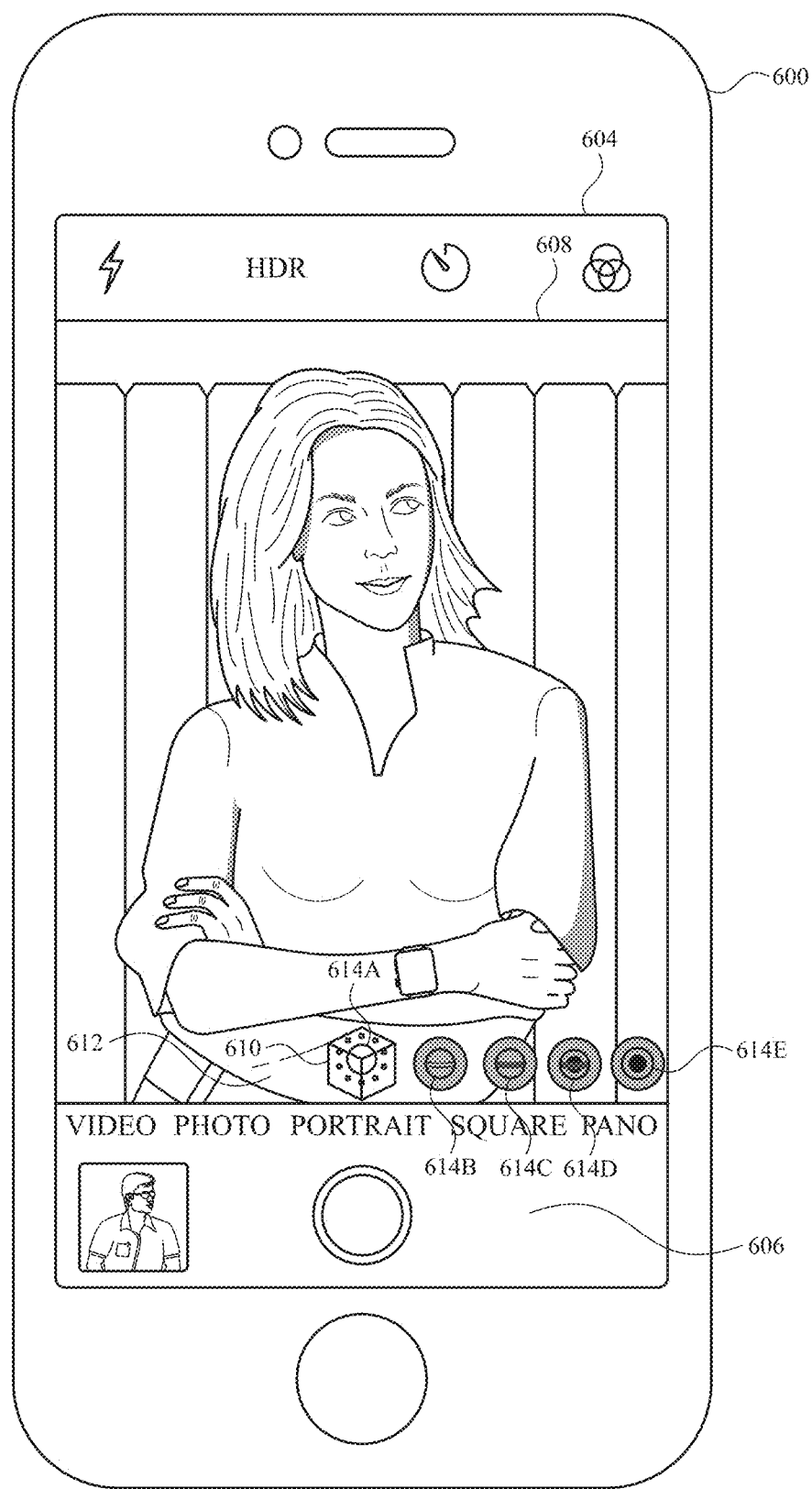
Figure 7B:
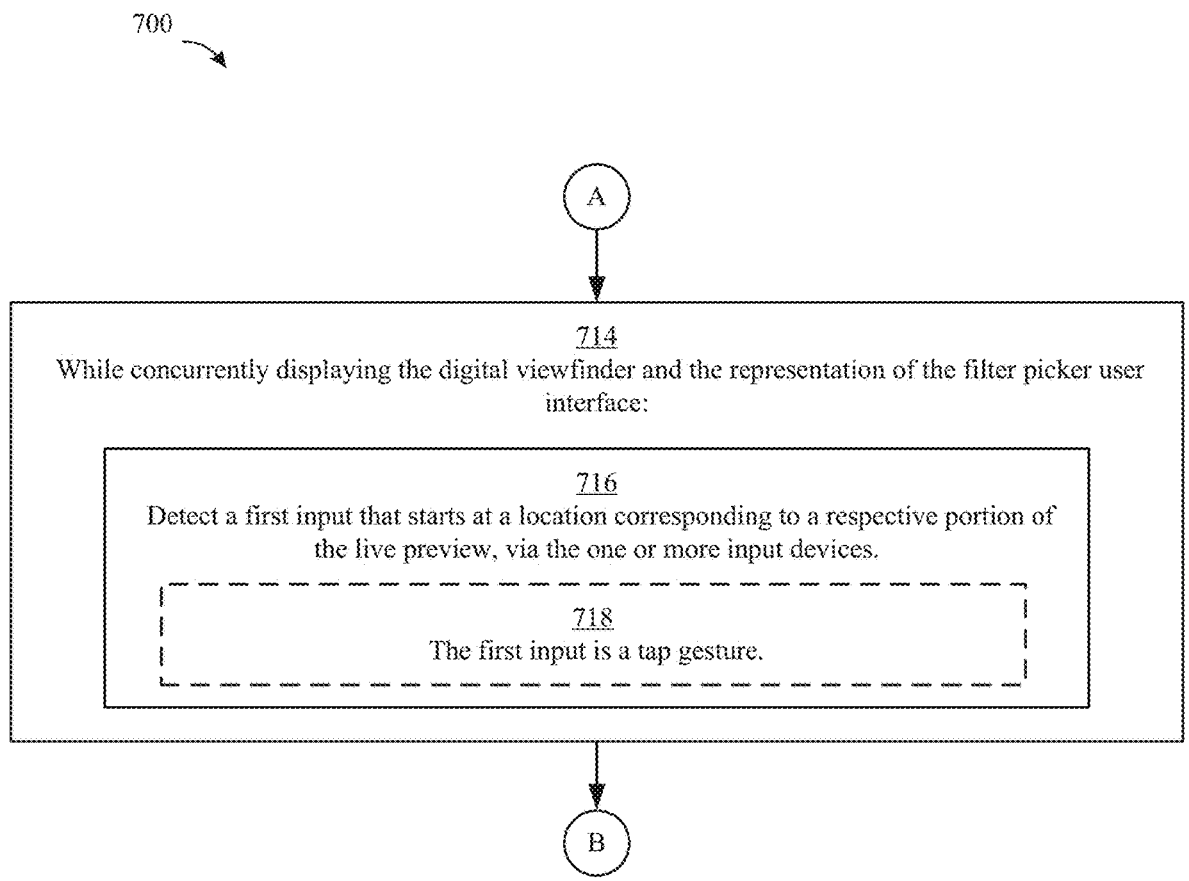
Figure 7E:
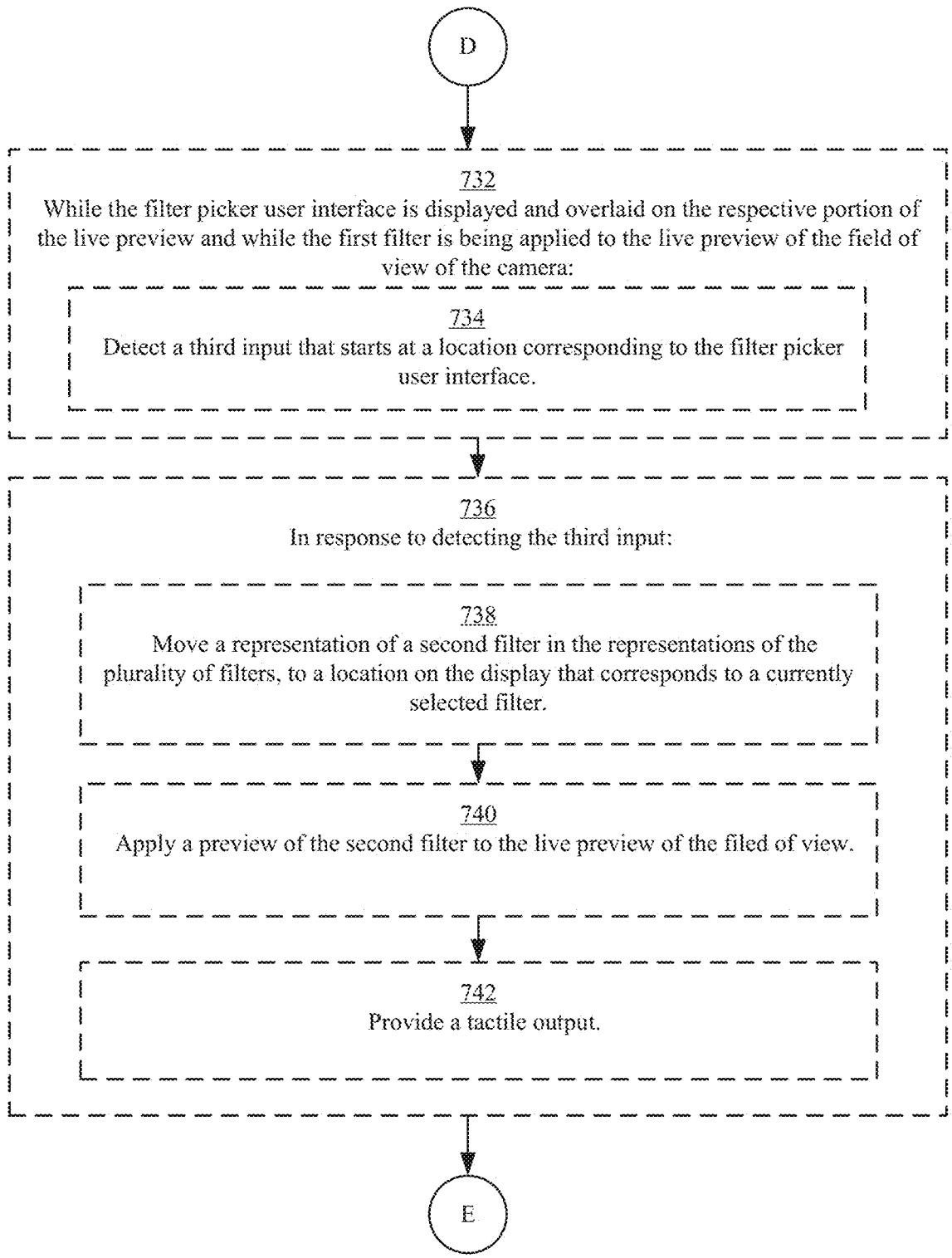
Figure 7F:
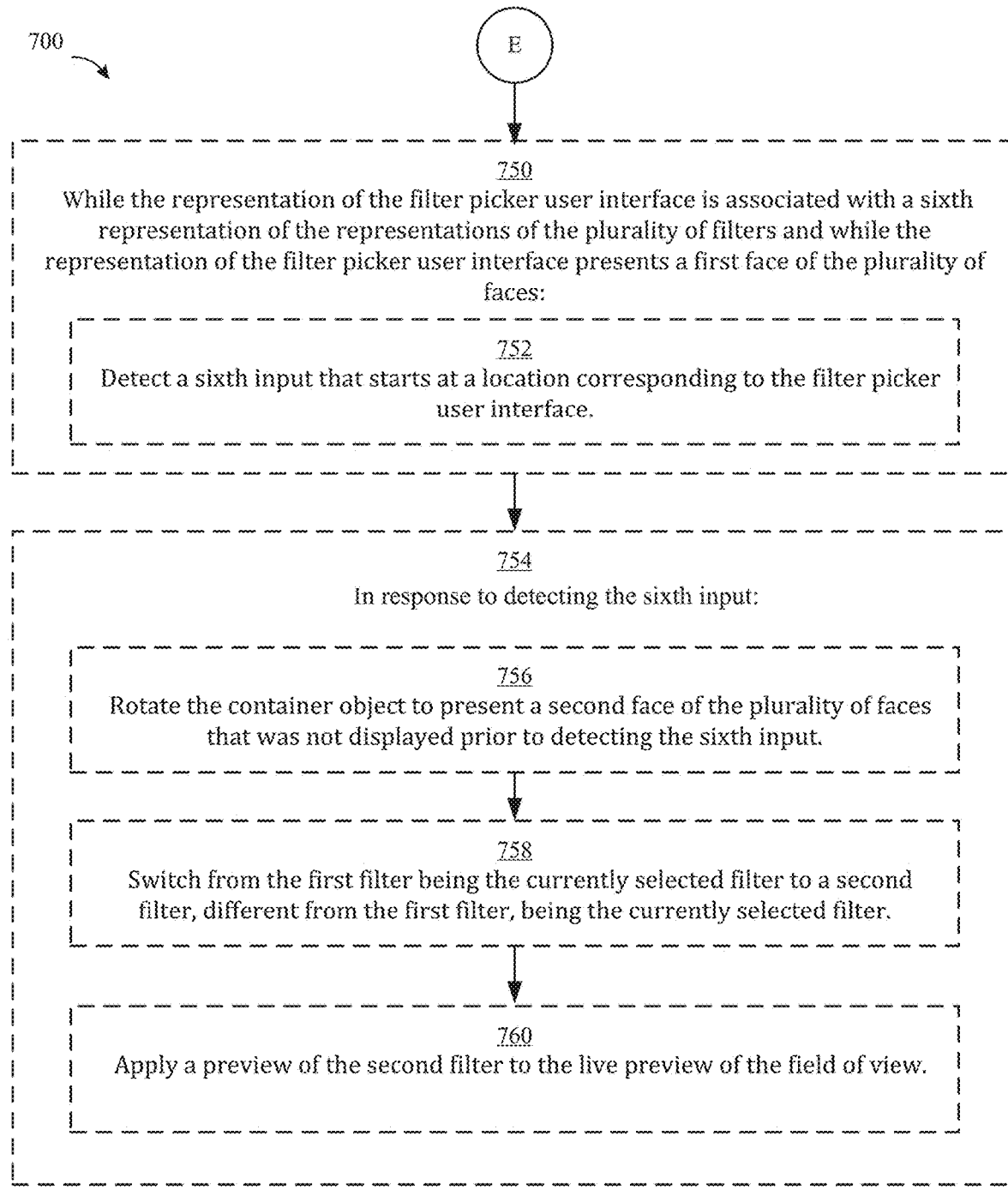

As illustrated in FIG. 6B, the electronic device 600 includes a display 604 which is touch sensitive (e.g., touch screen) and the display displays image data received from the camera 602. In some embodiments, the display is distinct from a touch sensitive surface.

FIG. 6B further illustrates the electronic device 600 displaying, on the display 604, a camera application user interface 606 for capturing images with camera 602 and/or 603. The camera application user interface 606 further includes a digital viewfinder 608 which includes a live preview of a field of view of camera 602. As shown in FIG. 6B, the field of view of camera includes a subject (e.g., person) in the foreground and a subject in the background (e.g., fence).

Furthermore, in FIG. 6B, the camera application user interface includes a filter container 610 represented as a hexagon overlaid on the digital viewfinder 608. In some examples, the filter container (e.g., 610) is represented as circle, triangle, or any other geometric shape. In some examples, the filter container (e.g., 610) is an image, icon, or a textual representation providing an indication to a user as to the currently filter. In the embodiment of FIG. 6B, the filter container (e.g., 610) is a transparent representation of an object (e.g., hexagon) allowing for various filter representations to appear as though they are moving through the transparent object. In some embodiments, the filter container may be displayed above, below, to the left, or to the right of the digital viewfinder (e.g., 608) (e.g., not overlapping the viewfinder).

The user interface of FIG. 6B further illustrates a filter picker user interface 612 in a collapsed (e.g., minimized) state. The collapsed filter picker user interface 612 is positioned along the edge of the digital viewfinder 608. In some examples, the collapsed filter picker user interface is, optionally, displayed above, below, to the left, or to the right of the digital viewfinder (e.g., 608). In some examples, the collapsed filter picker user interface (e.g., 612) includes one or more icons corresponding to a plurality of filter representations arranged in one or more rows and columns or icons positioned in a circular orientation. In some examples, the collapsed filter picker user interface (e.g., 612) is displayed at any location corresponding to the digital viewfinder. In some examples, the collapsed filter picker user interface (e.g., 612) is delineated with an outline (e.g., a boundary) to distinguish the filter picker user interface from the digital viewfinder (e.g., 608). In some embodiments, the collapsed filter picker user interface (e.g., 612), is translucent (or partially translucent) and, has no visible boundary. As a result, in some examples, the boundaries of the collapsed filter picker user interface blend in (e.g., are indistinguishable) with the digital viewfinder (e.g., 608).

As shown in FIG. 6B, the collapsed filter picker user interface 612 includes one or more filter representations (e.g., 614A, 614B, 614C, 614D, 614E) displayed on the display 604. In some examples, the collapsed filter picker user interface (e.g., 612), optionally, includes filter representations which are not displayed on the display (e.g., they are off screen). The filter representations which are not displayed within the collapsed filter picker user interface (e.g., 612), are, optionally, displayed upon the device detecting an input (e.g., a swipe gesture) which would result in the filter representations scrolling through the filter container (e.g., 610).

As further illustrated in FIG. 6B, the electronic device 600 displays a filter representation (e.g., 614A) within the filter container (e.g., 610) to indicate the filter that is applied to the live preview displayed within the digital viewfinder 608. In some embodiments, the filter representation 614A corresponds to a "Natural Light" lighting (e.g., filter) option. Consequently, the subject within the digital viewfinder 608 (e.g., person) is displayed without any additional lighting effect applied to the image. In some examples, the filter representation (e.g., 614A) corresponds to "Studio Light" lighting effect filter, "Contour Light" lighting effect filter, "Stage Light" lighting effect filter, or "Stage Light Mono" lighting effect filter. Each of the preceding lighting effect filters affects a visual characteristic of the image displayed within the digital viewfinder 608 (e.g., by simulating the effect of shining different sets of lights on the face of the subject within the digital viewfinder based on a depth map of the face of the subject). In some embodiments, the "Natural Light" lighting option includes modifying the image based on depth information without applying additional lighting effects such as by blurring a background of the image without blurring at least a portion of the foreground of the image.

As further illustrated in FIG. 6B, when the filter picker is in the collapsed state, the filter representations (e.g., 614B, 614C, 614D, 614E) not displayed within the filter container are displayed using a different visual characteristic (e.g., shading) than the filter representation (e.g., 614A) displayed within the filter container. In some examples, the different visual characteristic includes color, shape and size. As further illustrated in FIG. 6B, the filter representations not displayed (e.g., 614B, 614C, 614D, 614E) within the filter container are displayed at varying (e.g., progressively shorter, progressively longer) distances from one another based on their position within a list of filter representations in the collapsed filter picker user interface (e.g., 612). Thus, in some examples, the further in a list a filter representation (e.g., 614E) is from the filter container (e.g., 610), the closer it will be positioned on the display to the adjacent filter representation (e.g., 614D).

In some examples, in response to receiving an input (e.g., tap) at a location corresponding to one of the representations of filters (e.g., 614B, 614C, 614D, 614E) within the collapsed filter picker user interface (e.g., 612), the electronic device (e.g., 600) applies a filter corresponding to the filter representation corresponding to the location of the input. Thus, a user tapping on the one of the filters not in the filter container would result in the filter representation which was tapped to be scrolled to the filter container and the electronic device 600 would apply the filter corresponding to the filter representation in the filter container (e.g., 610). In some examples, a swipe input would result in a scroll input and the filter representations would scroll through the filter container. Consequently, if the filter in the filter container has change, the electronic device would apply the filter which is currently within the filter container (e.g., 610).

Figure 6C:
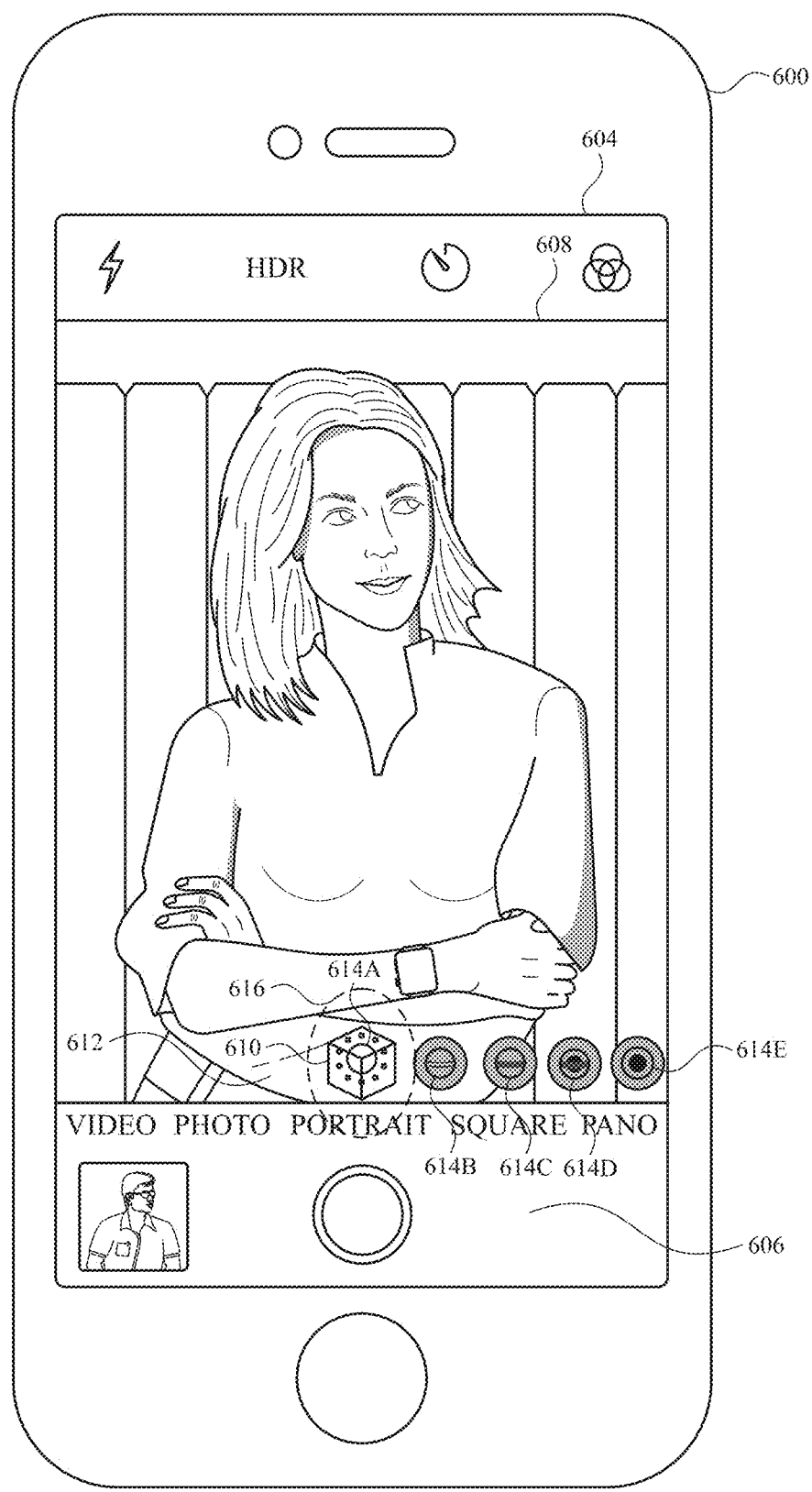
Figure 6D:
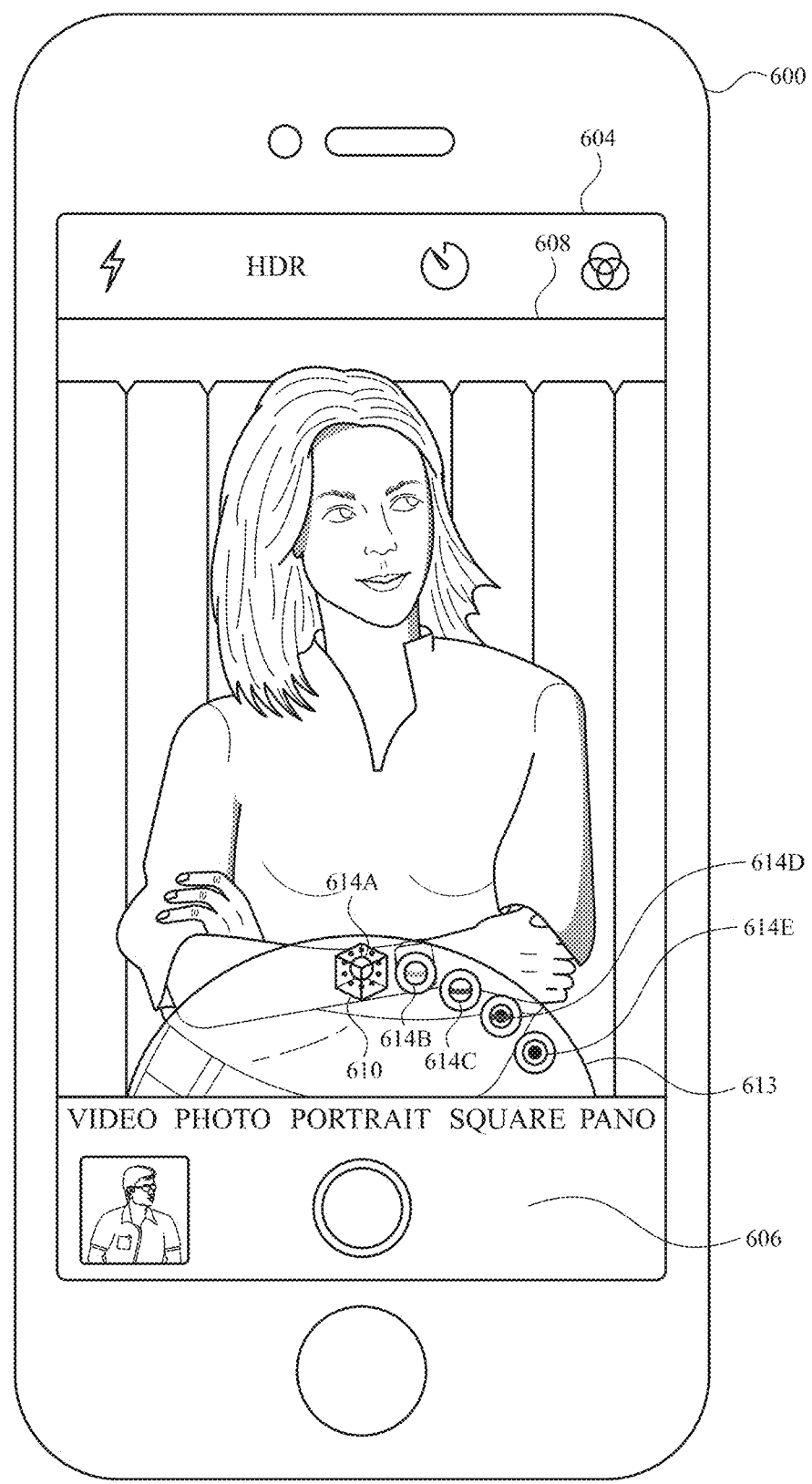
Figure 6E:
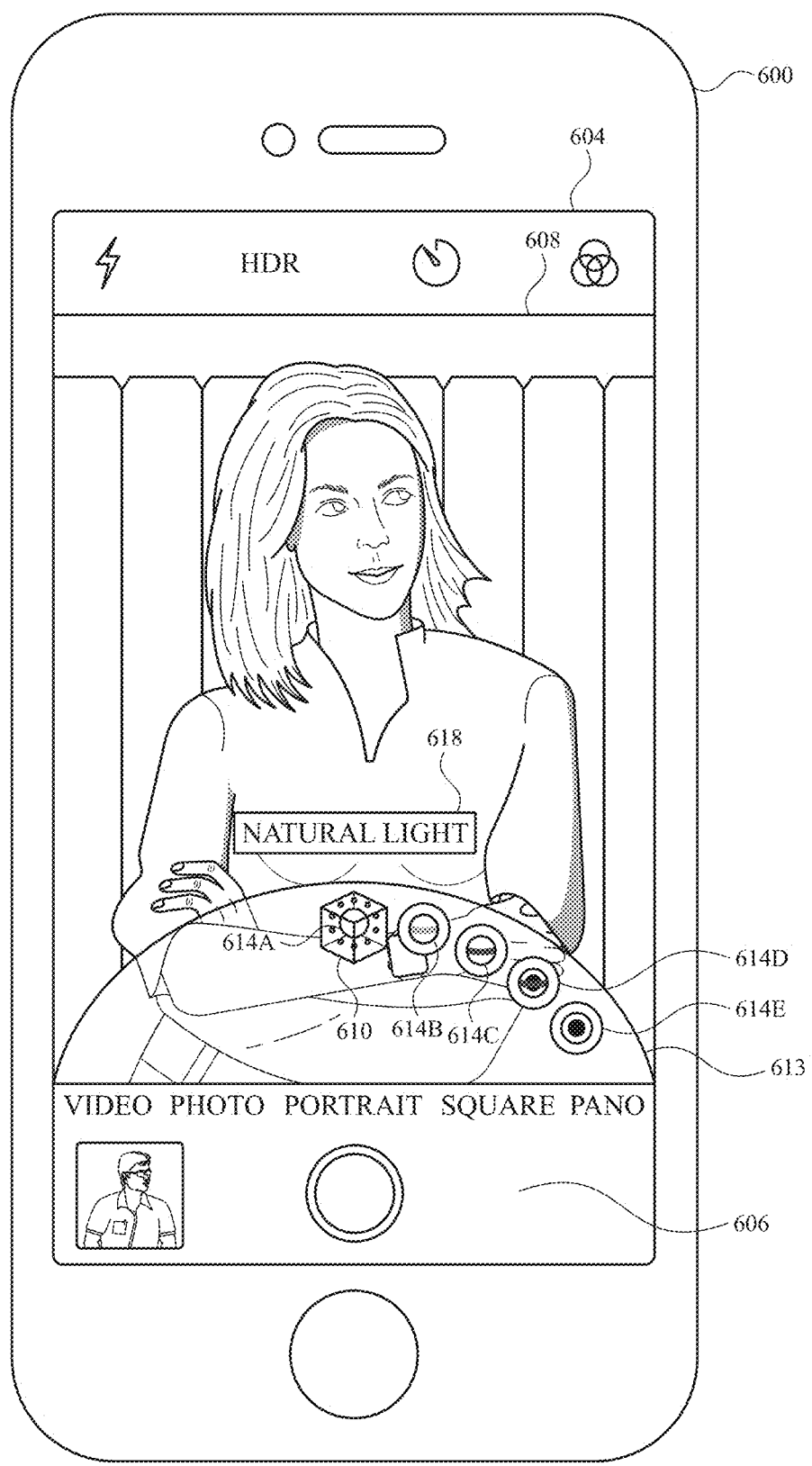

FIGS. 6C-6E illustrate a user interface which shows an activation of an expanded filter picker user interface. As illustrated in FIG. 6C, the electronic device 600 receives a tap input 616 at the location of filter container 610. In some examples, the tap input is over any area along the edge of the digital viewfinder 608. In some examples, the tap input is over any area that corresponds to a collapsed filter picker user interface 612. In some examples, the input corresponds to a swipe gesture, tap and hold (e.g., tapping and holding for a predetermined period of time) gesture, or an input with a characteristic intensity that is above a respective intensity threshold.

As illustrated in FIG. 6D, in response to receiving a tap input 616), electronic device 600 displays the transformation of the previously collapsed (e.g., minimized) filter picker user (e.g., 612) interface of FIG. 6B to an expanded filter picker user interface 613. In some embodiments, the filter picker user interface which was displayed in the collapsed state in FIG. 6B begins to transform into an arc (e.g., wheel) shaped object in FIG. 6D. In some examples, as the expanded filter picker user interface (e.g., 613) expands on to the display (e.g., overlays more of the digital viewfinder), it transforms into a shape of a wheel or rectangle. In some examples, as the expanded filter picker user interface (e.g., 613) expands from an edge of the digital viewfinder (e.g., 608) toward the center the display 604 so that the filter picker user interface (e.g., 612) overlaps the digital viewfinder 608. In some examples, the expanded filter picker user interface (e.g., 613) is translucent, semi-translucent, transparent, or semi-transparent. In some examples, the expanded filter picker user interface (e.g., 613) is displayed as opaque or semi-opaque. In FIG. 6D, when the expanded filter picker user interface (e.g., 613) begins to expand, the filter container 610 shifts upward to correspond with the expanding filter picker user interface (e.g., 613).

As illustrated in FIG. 6E, when expanded filter picker user interface (e.g., 613) is fully expanded, the filter container 610 has shifted upward to the top of the expanded filter picker user interface 613. In some embodiments, additional information (e.g., 618) about a filter corresponding to the filter representation (e.g., 614A) displayed within the filter container (e.g., 610). In some examples, the additional information is displayed within the expanded filter picker user interface. In some examples, the additional information (e.g., 618) is displayed at a location near the filter picker user interface (e.g., above, below). In some examples, the additional information is represented as an icon, text, or graphic.

Figure 6F:
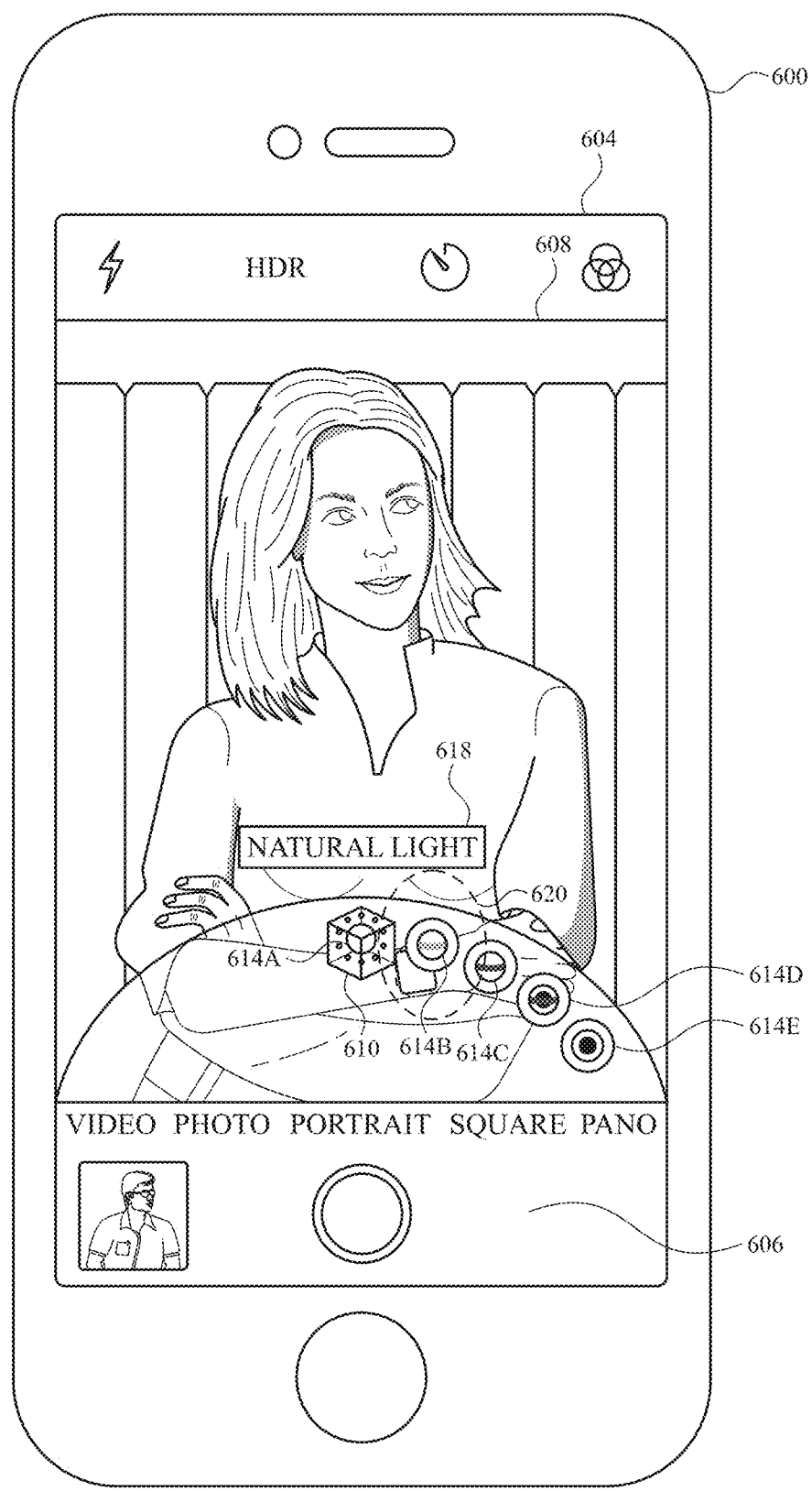

As illustrated in FIG. 6F, the electronic device 600 receives an input (e.g., tap 620) at a location corresponding to a representation of one of the filters (e.g., 614B) which is not in within the filer container. In response to the tap input, in some embodiments, the electronic device applies a filter corresponding to the filter representation (e.g., 614B) corresponding to the location on the display 604 of the tap input. In some examples, the input is, optionally, a swipe, press and hold, or an input with a characteristic intensity that is above a respective intensity threshold. In some examples, an input with a characteristic intensity that is above a respective intensity threshold on a representation of one of the filters (614A-614F), optionally, results in a display of additional functionality for the corresponding filter representation associated with the location of the input with a characteristic intensity that is above a respective intensity threshold.

Figure 6G:
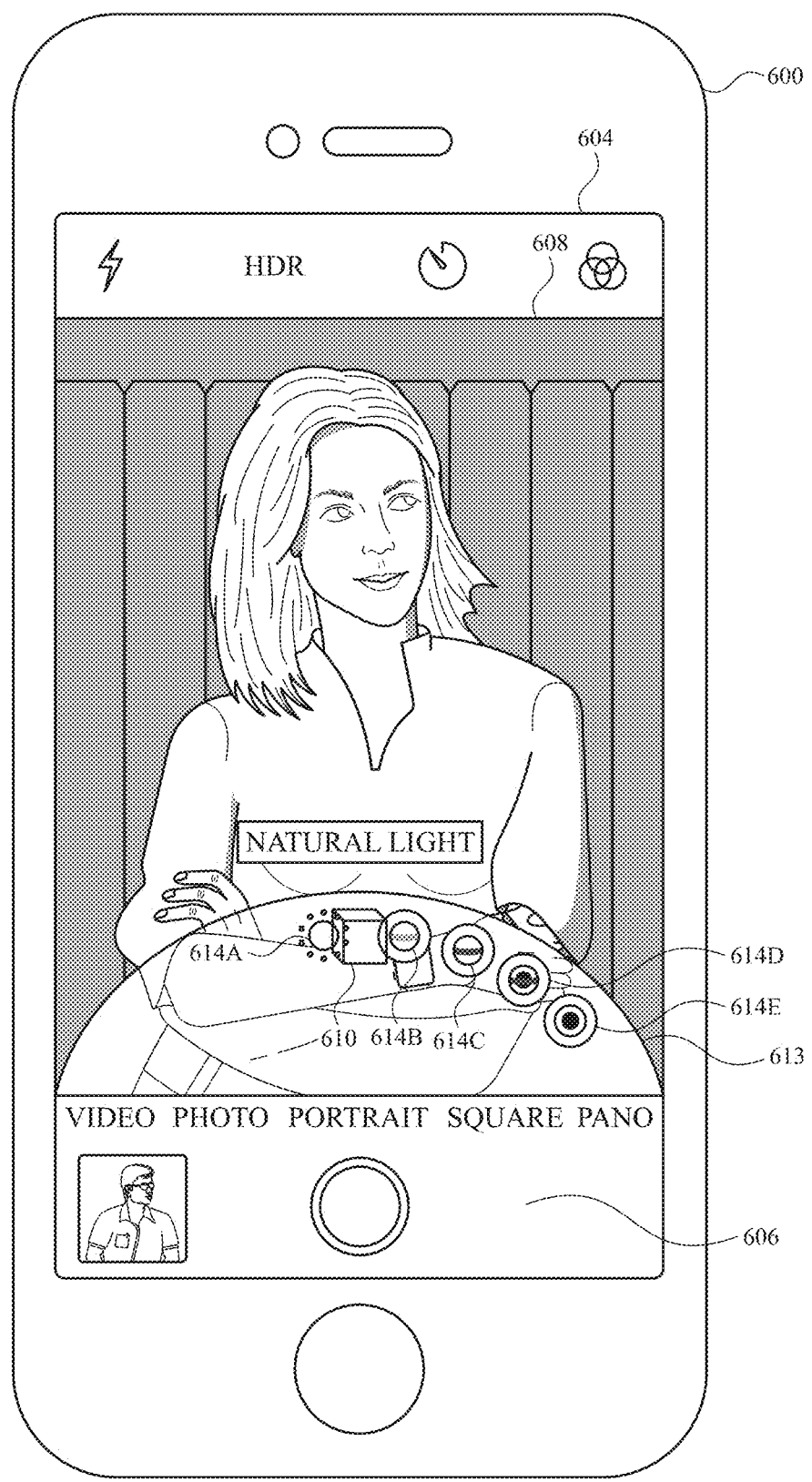
Figure 6H:
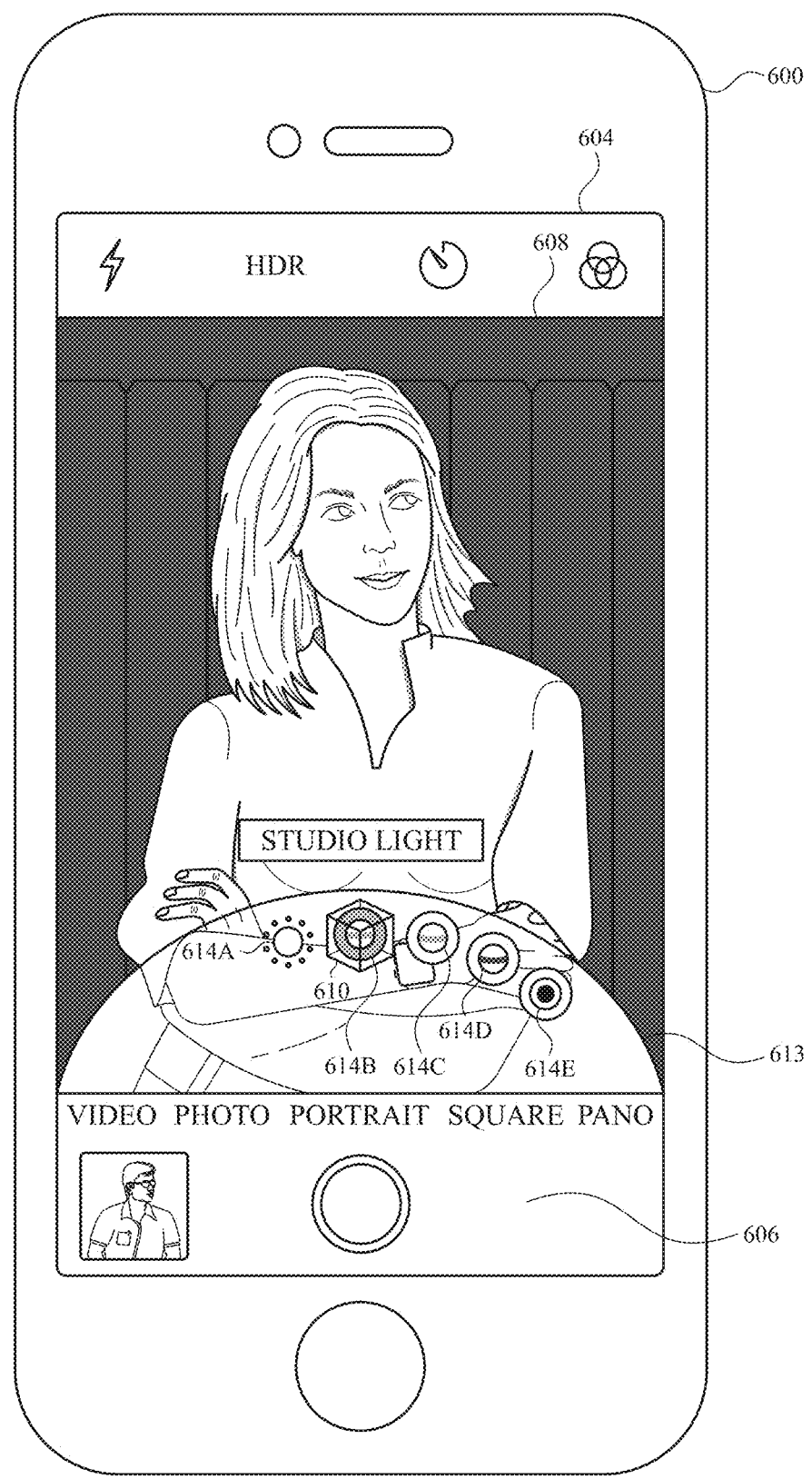

FIG. 6G-6H illustrate the transition of the filter container 610 as result of the electronic device 600 receiving the input (e.g. tap 620) in FIG. 6F. As illustrated in FIG. 6G, the filter container 610 is displayed as appearing to rotate as the filter representations (e.g., 614A-614E) scroll through it. As shown in FIG. 6G, the filter container 610 appears to be a three-dimensional object (e.g., cube) during the rotation. In some embodiments, when filter container (e.g., 610) is stationary, it is represented as a two-dimensional image (e.g., hexagon). In some examples, the three-dimensional representation of the filter container, optionally, a sphere, or cone. In some examples, the filter container appears to be two-dimensional when filter representations traverse through it. As further illustrated in FIG. 6G, the electronic device 600 gradually applies the filter corresponding to the filter representation 614B to the live preview displayed in the digital viewfinder as the filter representation scrolls through the filter container.

As further illustrated in FIG. 6H, the filter container visually changes when a new representation of a filter (e.g., 614B) is displayed within the container. In some embodiments, the visual change of the filter container 610 is based on the filter type (e.g., the type of visual/lighting effect applied to the live preview in the digital viewfinder) within the filter container. In some examples, the different sides (e.g., faces) of the filter container (e.g., 610), will reflect the visual (e.g., lighting) effect of the filter corresponding to the filter representation 614B. In some examples, the volume (e.g., the inner portion) of the filter container (e.g., 610), will reflect the visual effect of the filter corresponding to the filter representation 614B.

In some examples, the filter representations (e.g., icons 614A-614E) correspond to filters which the electronic device 600 simulates by applying various lighting effects corresponding to point-of-light sources. Accordingly, the visual characteristic of the filter container (e.g., 610) will change to simulate point-of-light sources of the corresponding filter. In some examples, the filter displayed within the filter container (e.g., 610) corresponds to a simulated studio light visual effect (e.g., 614B) which simulates a plurality of point-of-light sources. As a result, the filter container is visually modified to simulate the plurality of point-of-light sources corresponding to the studio lighting filter effect. In some examples, the plurality of point-of-light sources are simulated and displayed on the three-dimensional objects faces during the filter selection transition. In some examples, the point-of-light sources are displayed on the two-dimensional object's (e.g., hexagon's) faces when a corresponding filter is displayed within the filter container (e.g., 610). In some examples, the filter representation 614E will be visually distinguished (e.g., different representation) while it is within the boundaries of the filter container as compared to when it is outside the boundaries of the filter container (e.g., 610).

As further illustrated in FIGS. 6F-6H, in some embodiments, the electronic device 600 gradually applies the filter corresponding to the newly selected filter representation 614B to the digital viewfinder during the transition. As illustrated in FIG. 6G, the electronic device 600 initially applies the filter corresponding to the filter representation 614B to the digital viewfinder at 50% intensity. The filter corresponding to the filter representation 614B is fully applied (e.g. 100% intensity), by the electronic device, in FIG. 6H. In some examples, the electronic device applies the filter in intensity increments (e.g., 10%, 25%, 50%, 75%) during the filter transition until the transition is complete.

Figure 6I:
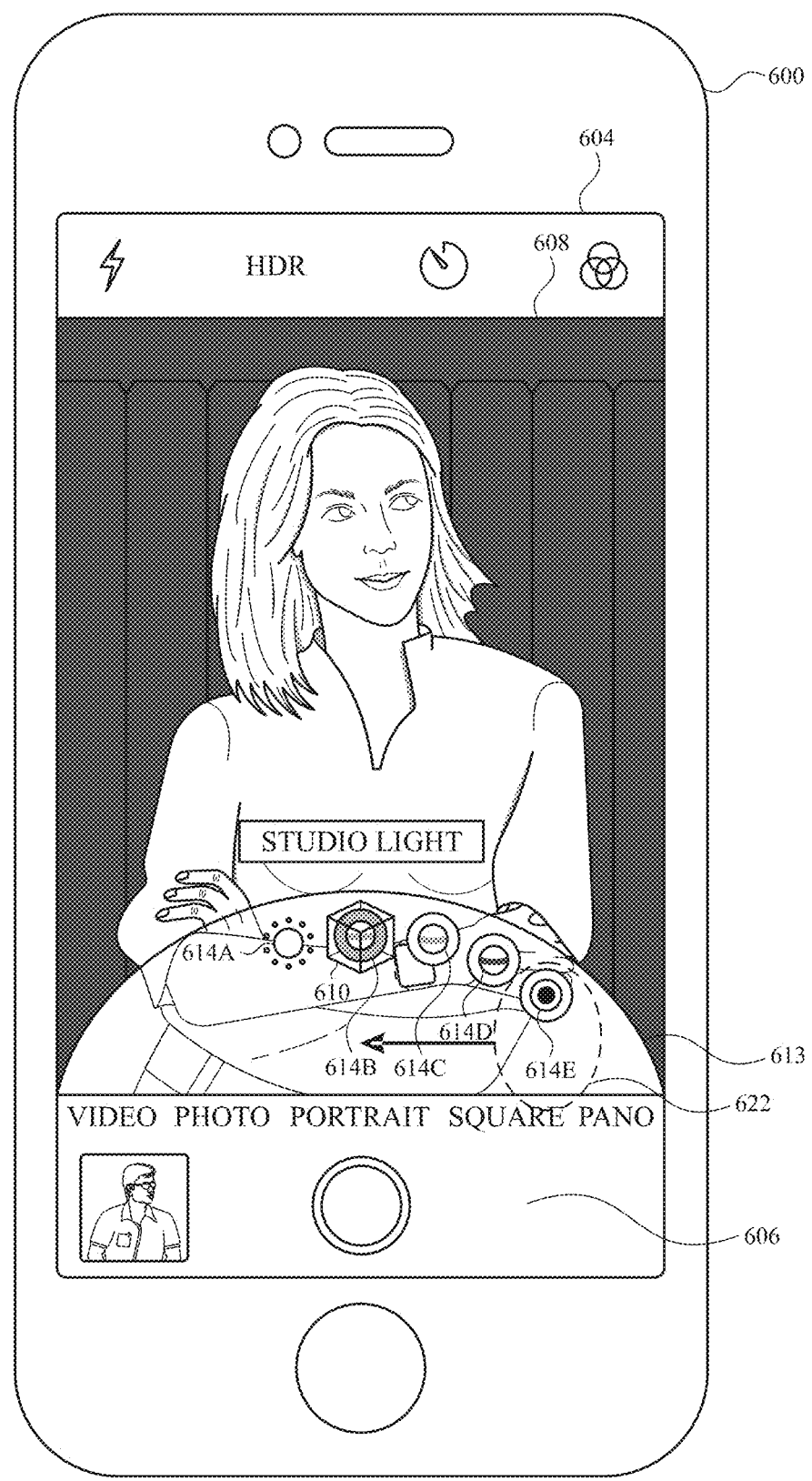
Figure 6J:
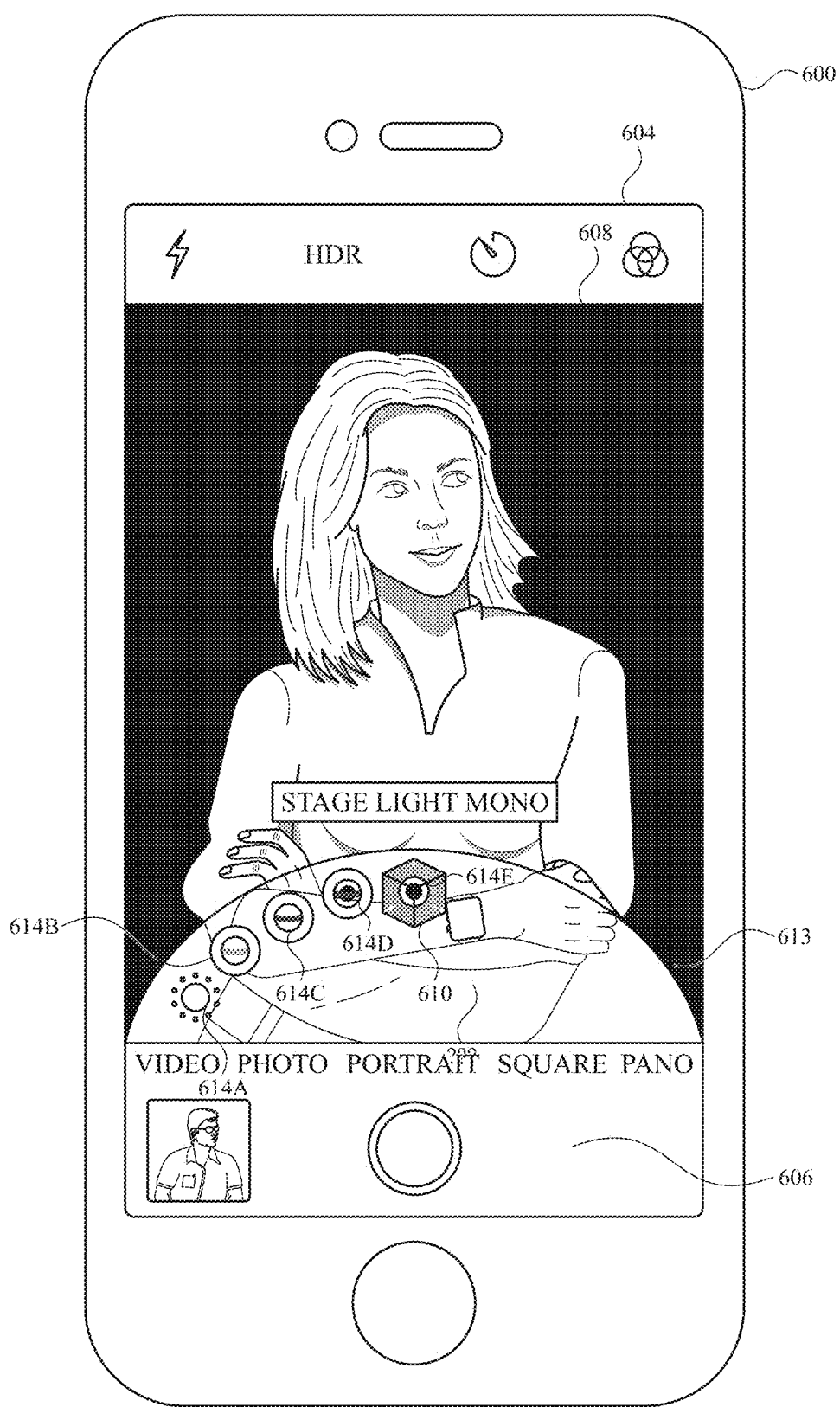

As illustrated in FIGS. 6I-6J, an input (e.g., swipe 622) received at the electronic device, will cause the representation of filters (614A-E) to scroll through the filter container (e.g., 610). In some embodiments, in response to the swipe gesture (e.g., 622) the representations of the filters displayed will scroll to the left across the top of the filter picker user interface. In some examples, a single swipe gesture will result in the incremental scroll (e.g., filters move by one) of the filter representations. In some embodiments, the number of filter representations scrolled will be dependent on the magnitude of the swipe gesture. Thus, in some examples, a longer swipe will cause a longer scroll than a shorter swipe. FIG. 6J illustrates the result of the swipe gesture in FIG. 6I where the "Stage Light Mono" lighting filter was applied to the live preview in the digital viewfinder (e.g., by simulating shining the set of lights corresponding to "Stage Light Mono" on to the face of the subject in the field of view of the camera based on a depth map of the face of the subject).

In some examples, the electronic device 600 must continue to detect contact with the filter picker user interface (e.g., 613) to maintain the filter picker user interface (e.g., 613) in the expanded mode. In some examples, if the electronic device detects a lift-off of a contact, the expanded filter picker user interface (e.g., 613) would begin to collapse until it reached the collapsed filter picker user interface state (e.g., 612) (e.g., minimized). In some examples, the expanded filter picker user interface (e.g., 613) would remain displayed in the expanded mode until a predetermined time period has been reached without an additional contact. When the electronic device 600 detects that a predetermined period of time was reached, the expanded filter picker user interface would be displayed as contracting until it reached the collapsed filter picker user interface state (e.g., 612) (e.g., minimized).

Figure 6K:
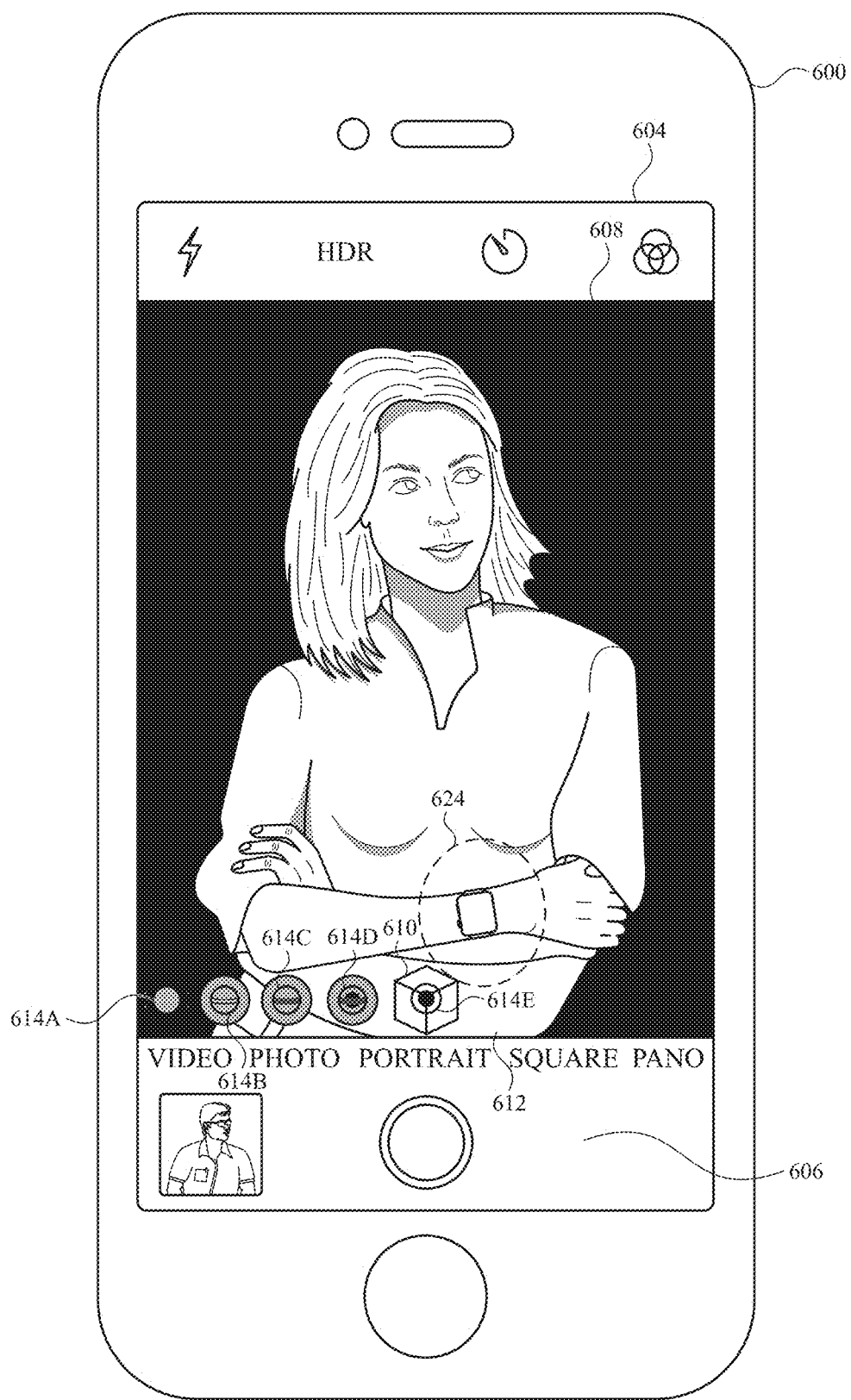
Figure 6L:
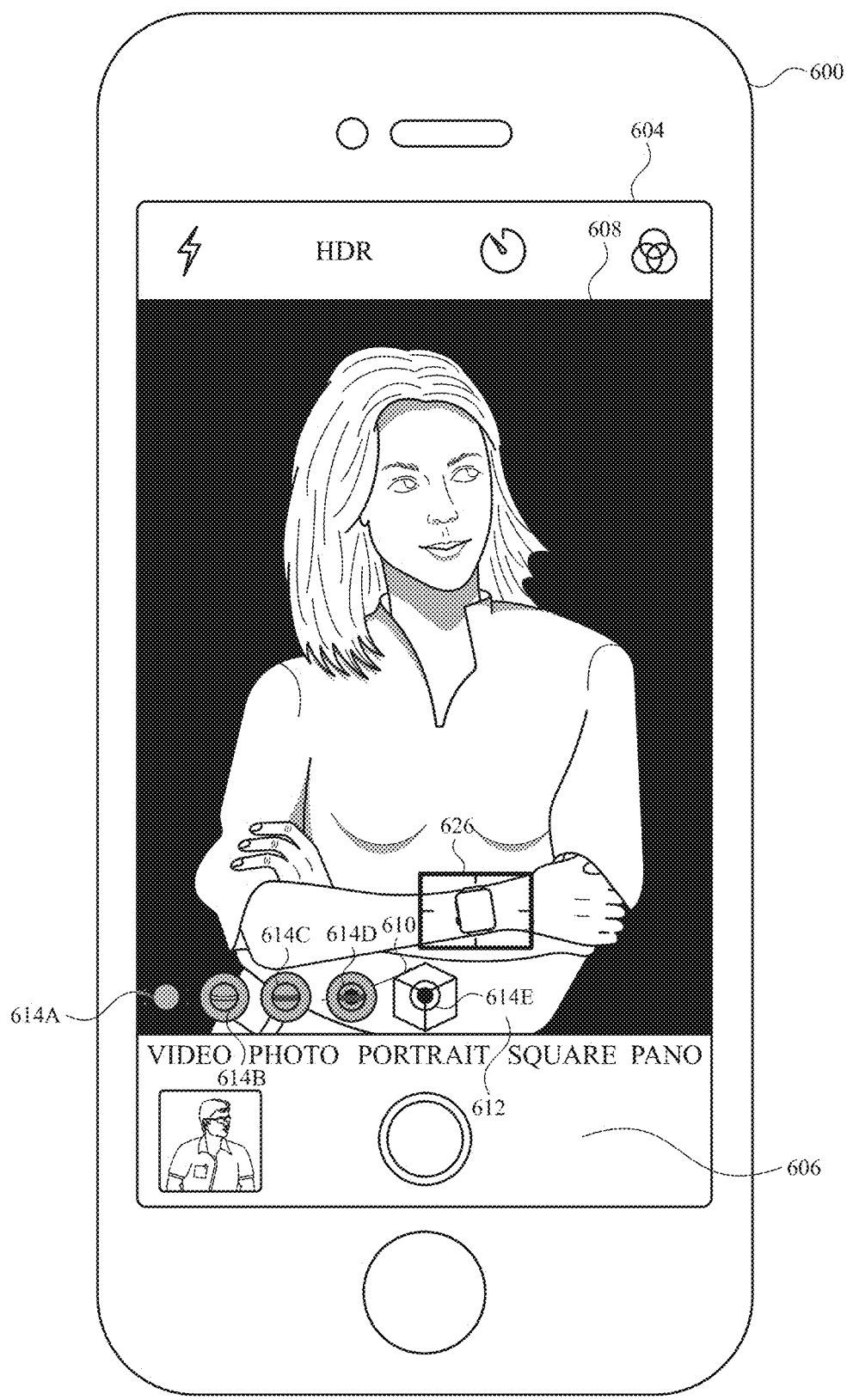

In FIG. 6K, the filter picker user interface is once again in the collapsed state (e.g., 612). As illustrated in FIG. 6K, the electronic device receives an input (e.g., tap 624) at a location corresponding to a location where the expanded filter picker user interface (e.g., 613) would be if it was overlaid on the digital viewfinder. Because the expanded filter picker user interface is not displayed, as illustrated in FIG. 6L, the electronic device interprets the input as a focus command and a bounding box (e.g., 626) is displayed at a location corresponding to the location of the tap input (e.g., 624). As shown in 6L, processing of the focus command occurs without any changes in filter application or in presentation of the filter representations.

Figure 6M:
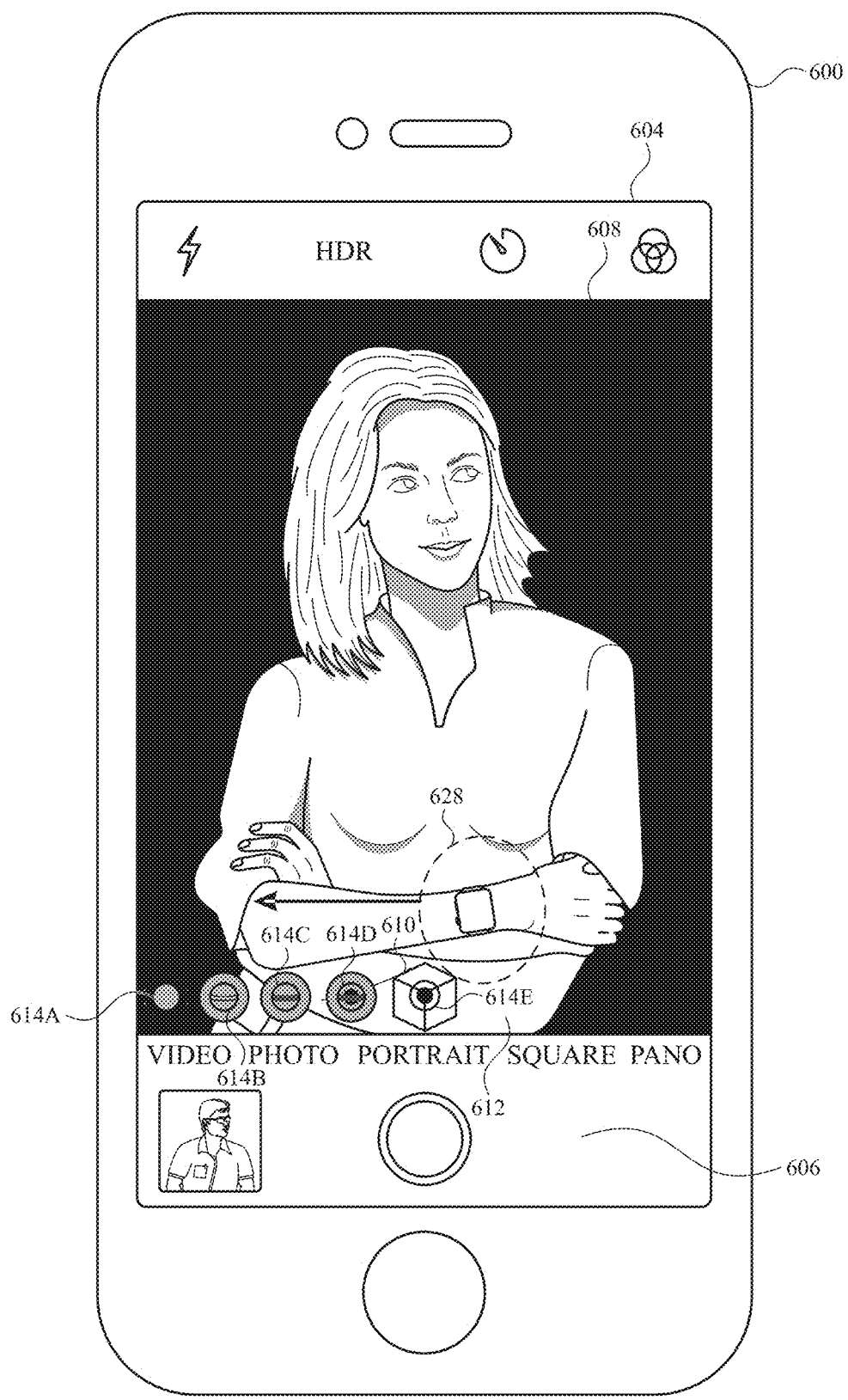
Figure 6N:
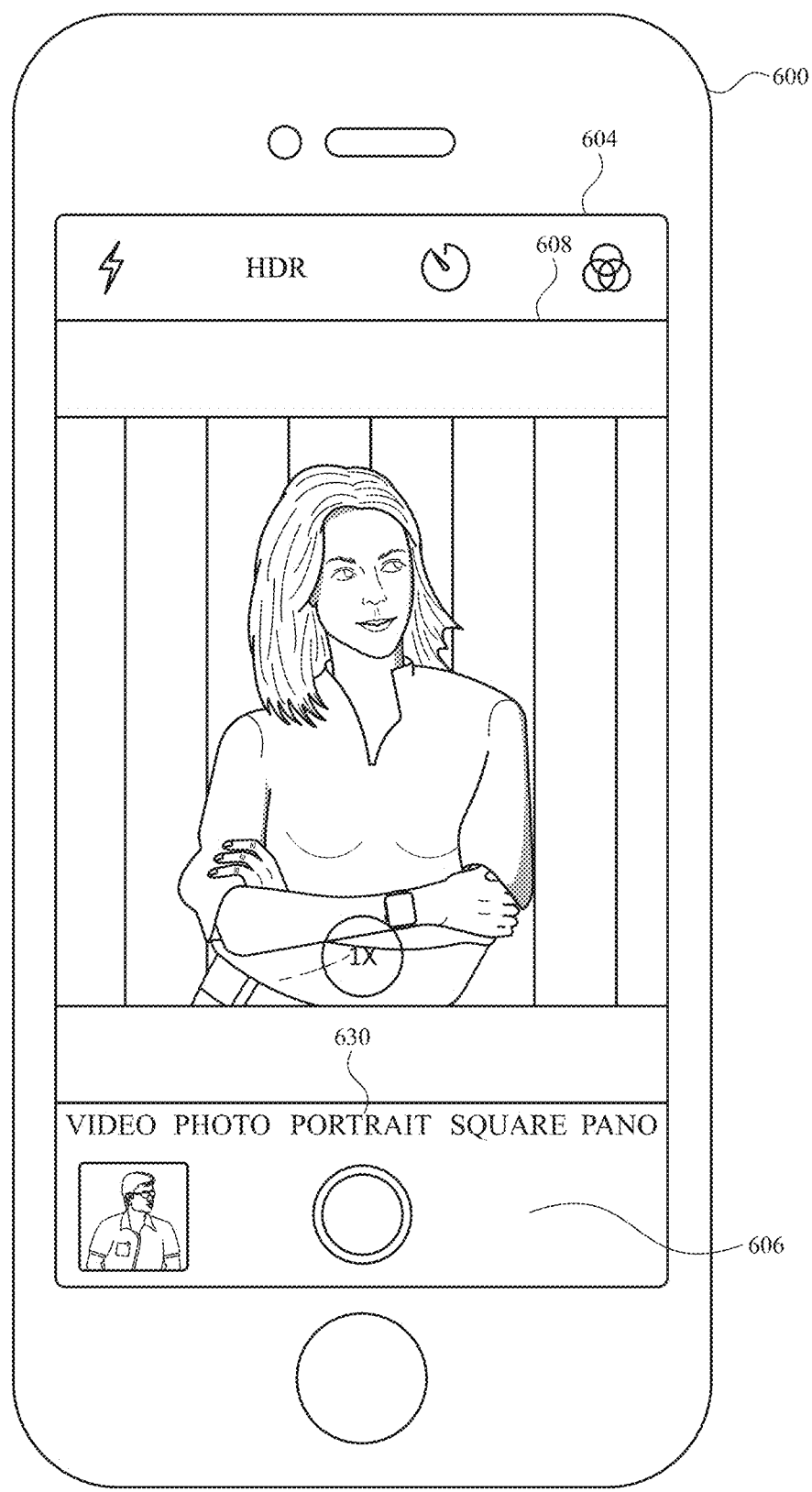

As illustrated in FIG. 6M, the electronic device receives a swipe gesture 628 at a location corresponding to a location where the expanded filter picker user interface (e.g., 613) would be if the expanded filter picker user interface was overlaid on the digital viewfinder. Because the expanded filter picker user interface is not displayed, as illustrated in FIG. 6N, the electronic device interprets swipe gesture 628 as a change-of-mode command and the electronic device (e.g., 600) changes the camera selection user interface (e.g., 606) to a different camera mode (e.g., a "square" camera mode 630, a video camera mode, a non-portrait camera mode, a slow-motion camera mode, a time elapse camera mode, or a panorama camera mode).

FIGS. 7A-7F are a flow diagram illustrating a method for changing a simulated lighting effect to a representation of image data using an electronic device in accordance with some embodiments. Method 900 is performed at a device (e.g., 100, 300, 500, 600) with one or more input devices (e.g., a touch-sensitive surface, keyboard, mouse) and a display. In some embodiments, the display is a touch-sensitive display. In some embodiments, the display is not a touch sensitive display. In some embodiments, the electronic device includes a plurality of cameras. In some embodiments, the electronic device only has one camera. Some operations in method 700 are, optionally, combined, the orders of some operations are, optionally, changed, and some operations are, optionally, omitted.

As described below, method 700 provides an intuitive way for changing a simulated lighting effect to a representation of image data. The method reduces the cognitive burden on a user for providing inputs corresponding to functions, thereby creating a more efficient human-machine interface. For battery-operated computing devices, enabling a user to initiate various functions faster and more efficiently conserves power and increases the time between battery charges.

At blocks 702-706, the electronic device (e.g., 600) concurrently displays, on the display (e.g., 604) a camera application user interface (e.g., 606), wherein the camera application user interface (e.g., 606) includes a digital viewfinder (e.g., 608) (e.g., that includes live or near-live preview images) including a live preview of a field of view of one or more cameras (e.g., 602 and 603) and a representation of a filter picker user interface (e.g., 610, 612) (at a first location) overlaid on the digital viewfinder (e.g., 608) (e.g., an image, icon, textual representation indicating a respective filter that is currently applied to the live preview). In some embodiments, the representation of the filter picker user interface (e.g., 610) is at a first location. In some embodiments, the representation of the filter picker user interface (e.g., 610) initially starts at a first location and transitions to a second location. In some embodiments, the filter picker user interface (e.g., 610) is for picking between filters which apply different lighting effects to an image based on depth map information (e.g., as described in greater detail below with reference to method 900). Concurrently displaying the digital viewfinder (e.g., 608) and the filter picker user interface (e.g., 613) provides the user with visual feedback about objects in the camera's (e.g., 602, 603) field of view and filters available to be applied to the preview. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, at blocks 708-710, the representation of the filter picker user interface (e.g., 612) includes a representation of the first filter (e.g., 614A), a representation of a second filter (e.g., 614B), and a representation of a third filter (e.g., 614C), and a value of a visual characteristic (e.g. size, shading, color) of the representation of the first filter is different than a value of the visual characteristic of the representation of the second filter and the value of the visual characteristic of the representation of the third filter. In some embodiments, the filter representations are displayed within the filter picker user interface (e.g., 612) and are displayed using a different visual characteristic (e.g. they are smaller, different shading, different color) than the first filter displayed within the representation of the filter picker user interface (e.g., 612). In some embodiments, the second and third filters have the same value of the visual characteristic. Visually differentiating the various representations of filters provides the user with feedback about which filter is currently selected or, additionally or alternatively, provides the user with feedback about the type of filter effect that respective filters provide. Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, at block 712, the representation of the filter picker user interface (e.g., 610) is a representation of a first three-dimensional object (e.g., 610) having a plurality of faces.

At blocks 714-716, while concurrently displaying the digital viewfinder (e.g., 608) and the representation of the filter picker user interface (e.g., 612), the electronic device (e.g., 600) detects a first input (e.g., 616) that starts at a location corresponding to a respective portion of the live preview (e.g., swipe, tap and hold, tap, button press) (e.g., on or near the filter indicator icon), via the one or more input devices. In some embodiments, the input may be at any location along the entire edge of the digital viewfinder (e.g., 608). In some embodiments, at block 718, the first input (e.g., 616) is a tap gesture.

At blocks 720-724, in response to detecting the first input (e.g., 616), in accordance with a determination that first criteria are met (e.g., a filter application criteria), wherein the first criteria include a requirement that a filter picker user interface is overlaid on the respective portion of the live preview (e.g., the filter picker user interface (e.g., 613) is an expanded mode of operation where it extends further into the live preview than when in a collapsed mode of operation) when the first input is detected, the electronic device (e.g., 600) applies a preview of a first filter to the live preview of the field of view of the camera (e.g., 602, 603) that was not applied before the first input was detected (e.g., to indicate that the first filter will be applied to media captured while the first filter is a currently selected filter).

At blocks 720 and 726-728, in response to detecting the first input (e.g., 616), in accordance with a determination that the filter picker user interface (e.g., 613) is not overlaid on the respective portion of the live preview (e.g., the filter picker user interface (e.g., 613) is in a collapsed mode of operation where it does not extend as far into the live preview, compared to the expanded state) when the first input is detected, the electronic device (e.g., 600) performs a respective operation in the camera application without applying the preview of the first filter to the live preview. Performing an operation (applying a filter to the preview or performing a respective operation without applying the filter) based on the first criteria being met provides the user with visual feedback (in the form of updates in the viewfinder) on whether initiating capture of images and/or recording of video will include the filter. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently. Collapsing and expanding the filter user interface as access to less or more filters are needed removes obstructions from the viewfinder, which enables the user to perform camera operations (e.g., focus, brightness, camera mode switching) on more viewfinder elements captured in the camera's field of view while providing an interface to easily switch between filters. Expanding the filter user interface when the user is using it makes it easier for the user to manipulate the filters, collapsing the filter user interface when the user is not using it makes it easier for the user to perform the camera operations (e.g., focus, brightness, camera mode switching). Providing additional controls while limiting obstruction of relevant user interface elements enhances the operability of the device and makes the user-device interface more efficient (e.g., by helping the user to achieve an intended result and reducing user mistakes when operating/interacting with the device) which, additionally, reduces power usage and improves battery life of the device by enabling the user to use the device more quickly and efficiently.

In some embodiments, at block 730, performing the respective operation includes selecting a focus point for media capture at an object located in the field of view of the camera (e.g., 602, 603) at the respective portion of the live preview at which the input is detected (e.g., and, optionally, updating display of the digital viewfinder (e.g., 608) to focus (e.g., represented by box 626) on a representation of a respective object of one or more objects in a field of view of the one or more cameras (e.g., 602, 603)). Receiving a tap gesture that targets an object for focusing provides the user with a precise targeting mechanism to select an object for focus and avoids the need to provide multiple or extended inputs to vary a focus until the desired object is placed into focus, thus reducing the number of inputs need to select the focus point. Reducing the number of inputs needed to select the focus point enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, at block 732-734, while the filter picker user interface (e.g., 613) is displayed and overlaid on the respective portion of the live preview (e.g., while the filter picker user interface (e.g., 613) is displayed in an expanded state) and while the first filter is being applied to the live preview of the field of view of the camera (e.g., 602, 603), the electronic device (e.g., 600) detects a third input (e.g., 620) (e.g., swipe or tap) that starts at a location corresponding to the filter picker user interface (e.g., 613).

In some embodiments, at block 736-740, in response to detecting the third input (e.g., 620) the electronic device (e.g., 600) moves a representation of a second filter (e.g., 614B) in the representations of the plurality of filters, to a location on the display (e.g., 604) that corresponds to a currently selected filter, and (e.g., different filter representation is displayed within the representation of the filter picker UI) the electronic device (e.g., 600) applies a preview of the second filter (e.g., 614B) to the live preview of the field of view (e.g., to indicate that the second filter will be applied to media captured while the second filter is a currently selected filter). Moving the representation of the selected filter to the location corresponding to a currently selected filter provides the user with visual feedback about the state of the device, including the filter that is (or will be) applied to the live preview. Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, at block 742, the electronic device (e.g., 600) provides a tactile output (e.g., a tactile output is provided when switching the currently selected filter from one filter to another filter).

In some embodiments, at blocks 744-746, while the filter picker user interface (e.g., 613) is displayed and not overlaid on the respective portion of the live preview (e.g., while the filter picker is displayed in a collapsed state), the electronic device (e.g., 600) detect a second input (e.g., 616) that starts at a location corresponding to the filter picker user interface (e.g., 612). In some examples, an input corresponding to any displayed portion of the collapsed filter picker user interface causes the interface to expand.

At block 748, in response to detecting the second input, the electronic device (e.g., 600) expands the filter picker user interface (e.g., 613) to overlay the respective portion of the live preview. Expanding the filter picker user interface (e.g., 613) provides the user with the ability to more accurately target a desired filter by, for example, spreading out the individual representations of filters such that less precise inputs can be used to accurately select the desired target. Providing more accurate targeting controls enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, at blocks 750-752, while the representation of the filter picker user interface (e.g., 610) is associated with a sixth representation of the representations of the plurality of filters and while the representation of the filter picker user interface (e.g., 610) presents a first face of the plurality of faces, detecting a sixth input (e.g., 620) (e.g., swipe or tap) that starts at a location corresponding to the filter picker user interface (e.g., 613).

In some embodiments, at blocks 754-760, in response to detecting the sixth input (e.g., 620), the electronic device (e.g., 600) rotates the container object to present a second face of the plurality of faces that was not displayed prior to detecting the sixth input, switches from the first filter being the currently selected filter to a second filter, different from the first filter, being the currently selected filter, and applies a preview of the second a filter to the live preview of the field of view. In some examples, the three dimensional object (e.g., 610) appears as a two dimensions object until it begins to animate (e.g., spin). In some embodiments, if the amount of filter is greater than the amount of faces available on the three dimensional object (e.g., 610), a single face may be used to show two or more different filters. As one example, the first face of a cube (e.g., 610) displays the first filter and after four rotations of the cube, the first face would display the fifth filter from a plurality of filters. Rotating the container object to present the currently selected filter provides the user with visual feedback about the state of the device, including that the applied filter is being changed. Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, the filter picker user interface (e.g., 613) includes the representation of the filter picker user interface (e.g., 610) and representations of a plurality of filters. In some embodiments, the filter picker user interface (e.g., 613) overlaps the digital viewfinder (e.g., 608). In some embodiments, the filter picker user interface (e.g., 613) is a displayed as a wheel, dial, semi-dial, a portion of a dial, or slider. In some embodiments, the filter picker user interface (e.g., 613) is rectangular.

In some embodiments, expanding the filter picker user interface (e.g., 613) to overlay the respective portion of the live preview occurs without applying a preview of a filter to the live preview of the field of view of the camera (e.g., 602, 603) that was not applied before the second input was detected.

In some embodiments, the representation of the filter picker user interface (e.g., 610), when in a first state (e.g., in motion, expanded), is a representation of a container object (e.g., 610) having a plurality of faces enclosing an internal volume that contains a representation of a second three-dimensional object. In some embodiments, the representation of the filter picker user interface (e.g., 610) looks like a 2D object (e.g., it's a simulated cube that is positioned so that it looks like a hexagon) when it is not in motion. Representing the container object, while in the first state, as having an internal volume that contains a three-dimensional object provides the user with feedback about the positioning of sources, such as light sources, within a virtual three-dimensional environment corresponding to an environment being previewed. Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, the representation of the filter picker user interface (e.g., 610) is in a second state (e.g., stationary, minimized) different than the first state, the representation of the container object is changed to remove shading and/or lighting effects (e.g., so that the representation of the container object appears to flatten into a 2D object such as a hexagon). Changing the representation of the container object to remove shading and/or lighting effects reduces visual distractions to the user and helps to avoid drawing the user's attention away from the camera's viewfinder. Further, removing such effects when the effects are not needed reduces the number of computing processing needing. Reducing visual distractions and reducing computing processing enhances the operability of the device and makes the user-device interface more efficient (e.g., by helping the user to achieve an intended result and reducing user mistakes when operating/interacting with the device) and, additionally, reduces power usage and improves battery life of the device.

In some embodiments, the representation of the filter picker user interface (e.g., 610) is in the first state (e.g., in motion, expanded), one or more of the faces of the plurality of faces or the internal volume has a visual appearance based on a currently selected filter represented of the plurality of filters. (e.g., shows lighting on the sides of the cube to indicate changes in lighting) In some embodiments, a different filter representation is displayed within the representation of the filter picker UI when the cube spins. Basing the visual appearance of the plurality of faces or the internal volume of the representation of the container object, while in the first state, on a currently selected filter provides the user with feedback about the positioning of sources, such as light sources, within a virtual three-dimensional environment corresponding to an environment being previewed and provides the user with feedback about the state of the light sources (enabled, disabled, level of brightness). Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In accordance with some embodiments, the representation of the filter picker user interface (e.g., 610) is in a second state (e.g., stationary, minimized) different than the first state, the visual appearance of the representation of the filter picker user interface (e.g., 610) is not based on the currently selected filter of the plurality of filters displayed within the internal volume. In some embodiments, the effects of the filter are not displayed when representation for the filter picker UI is minimized or stationary but are displayed when filter picker expands and is displayed as a 3D representation.

In some embodiments, while the filter picker user interface (e.g., 613) is displayed and not overlaid on the respective portion of the live preview (e.g., while the filter picker is displayed in a collapsed state), the representation of the filter picker user interface (e.g., 610) and the representations of a plurality of filters are positioned along a line substantially parallel to an edge of the display (e.g., 604). Positioning the representation of the filter picker user interface (e.g., 610) and the representations of the plurality of filters along a line substantially parallel to an edge of the display (e.g., 604) increases the visibility of the subject in the live preview while providing a reminder to user of the available lighting effects and enables the user to more easily perform camera operations (e.g., focus, brightness, camera mode switching) on viewfinder elements. Providing additional controls while maintaining the visibility of relevant viewfinder elements enhances the operability of the device and makes the user-device interface more efficient (e.g., by helping the user to achieve an intended result and reducing user mistakes when operating/interacting with the device) which, additionally, reduces power usage and improves battery life of the device by enabling the user to use the device more quickly and efficiently. In some embodiments, the additional filter options are positioned along the edge of the display (e.g., 604) extending in both directions away from the representation of the filter picker user interface (e.g., 610), in some embodiments, the additional filter options are positioned along the edge of the display (e.g., 604) extending in one direction from the representation of the filter picker user interface (e.g., 610)). In some embodiments, the representation of the filter picker user interface (e.g., 610) is displayed near an edge of the live preview.

In some embodiments while the filter picker user interface (e.g., 613) is overlaid on the respective portion of the live preview (e.g., while the filter picker user interface (e.g., 613) is displayed in an expanded state), the representation of the filter picker user interface (e.g., 610) and the representations of the plurality of filters are positioned along a curved line (e.g., a line that is not parallel to an edge of the display (e.g., 604)). In some embodiments, the shifted position will appear to be an arc or wheel. In some embodiments, interaction includes using a gesture (swipe or tap) along any part of the bottom edge of the display (e.g., 604). Causing the shifted position to appear as an arc or wheel and using gestures (swipe or tap) along the bottom edge of the display (e.g., 604) to interact with the arc or wheel provides continuity in the user interface to reduce user confusion, which results in users providing fewer inputs to perform desired operations. Reducing the number of inputs needed to perform an operation enhances the operability of the device and makes the user-device interface more efficient (e.g., by helping the user to achieve an intended result and reducing user mistakes when operating/interacting with the device) which, additionally, reduces power usage and improves battery life of the device by enabling the user to use the device more quickly and efficiently.

In some embodiments, the first input is a tap gesture and wherein the location corresponding to the respective portion of the live preview is a location corresponding to a representation of the first filter in the representations of the plurality of filters. In some embodiments, the expanded filter picker UI will be displayed in an expanded state. In some embodiments, the filter picker user interface (e.g., 613) will be displayed in a collapsed state.

In some embodiments, the representation of the second filter is in first direction from the representation of the first filter, the representation of the third filter is in the first direction from the representation of the second filter, and the value of the visual characteristic progressively change in a first direction (e.g., monotonically increases or monotonically decreases) from the representation of the first filter to the representation of the second filter to the representation of the third filter (e.g., the representations of the filter gradually get smaller and/or decrease in opacity the further away they are from a representation of a currently selected filter). The value of the visual characteristic progressively changing in a first direction from the representation of the first filter to the representation of the second filter to the representation of the third filter reduces user distraction, improves the visibility of the live preview, and provides a structured system that enables easier identification and access to the filters. Providing improved visual feedback enhances the operability of the device and makes the user-device interface more efficient (e.g., by helping the user to achieve an intended result and reducing user mistakes when operating/interacting with the device) which, additionally, reduces power usage and improves battery life of the device by enabling the user to use the device more quickly and efficiently. In some embodiments, the filter representations are displayed within the filter picker user interface (e.g., 613) and are displayed using a different visual characteristic based on the distance each corresponding filter representation is from the representation of the filter picker user interface (e.g., 610).

In some embodiments, the filter picker user interface (e.g., 613) is overlaid on the respective portion of the live preview (e.g., while the filter picker user interface (e.g., 613) is displayed in an expanded state), the filter picker user interface (e.g., 613) includes additional information (e.g., displaying a name of the filter) about the first filter displayed in association with the representation of the first filter.

In accordance with some embodiments, the first input is a swipe gesture (e.g., 628) and wherein performing the respective operation includes changing a camera capture mode of the electronic device (e.g., 600) (e.g., the mode is changed to either a video, photo, portrait, square, pano, slo-mo, time-lapse).

In some embodiments, applying preview of the second filter includes gradually transitioning between application of the preview of the first filter and application of the preview of the second filter. In some embodiments, gradually transitioning includes at a 1st time 100% 1st, 0% 2nd, at 2nd time, 90% first, 10% second, etc.

Note that details of the processes described above with respect to method 700 (e.g., FIGS. 7A-7F) are also applicable in an analogous manner to the methods described below. For example, method 900, 1100, 1300, 1500, 1700 optionally includes one or more of the characteristics of the various methods described above with reference to method 700. For example, elements of the filter user interface, affordances, and controls from among the various methods can be combined. For another example, the viewfinder in method 700 is analogous to the viewfinder in methods 900, 1100, 1300, 1500, 1700. For brevity, these details are not repeated below.

In some embodiments, the electronic device 800 includes some or all of the components of device 600, as illustrated in FIG. 6A. In some embodiments, the device 800 includes multiple cameras 602 and 603 (e.g., on the rear of the electronic device 800). In some embodiments, device 800 includes one or more features of devices 100, 300, and/or 500. In some examples, the electronic device (e.g., 800) has multiple cameras with fixed, but different, focal lengths. In some examples, the multiple cameras are on the front, the back, or both sides of the electronic device (e.g., 800). In some embodiments, in addition to having different fixed focal lengths, multiple cameras have different fixed fields of view and different fixed optical magnification properties. In some embodiments, the camera (e.g., 602) captures image data using a plurality of focal lengths. In some embodiments, one camera (e.g., 602) captures a plurality of focal lengths, thus, producing the same result as a plurality of cameras with fixed, but different, focal lengths. In some examples, the electronic device (e.g., 800) includes a depth camera, such as an infrared camera, a thermographic camera, or a combination thereof. In some examples, the device further includes a light-emitting device (e.g., light projector), such an IR flood light, a structured light projector, or a combination thereof. The light-emitting device is, optionally, used to illuminate the subject during capture of the image by a visible light camera and a depth camera (e.g., an IR camera) and the information from the depth camera and the visible light camera are used to determine a depth map of different portions of subject captured by the visible light camera. In some embodiments, the lighting effects described herein are displayed using disparity information from two cameras (e.g., two visual light cameras) for rear facing images and using depth information from a depth camera combined with image data from a visual light camera for front facing images (e.g., selfie images). In some embodiments, the same user interface is used when the two visual light cameras are used to determine the depth information and when the depth camera is used to determine the depth information, providing the user with a consistent experience, even when using dramatically different technologies to determine the information that is used when generating the lighting effects. In some embodiments, while displaying the camera user interface with one of the lighting effects applied, the device detects selection of a camera switching affordance and switches from the front facing cameras (e.g., a depth camera and a visible light camera) to the rear facing cameras (e.g., two visible light cameras that are spaced apart from each other) (or vice versa) while maintaining display of the user interface controls for applying the lighting effect and replacing display of the field of view of the front facing cameras to the field of view of the rear facing cameras (or vice versa).

Figure 8A:
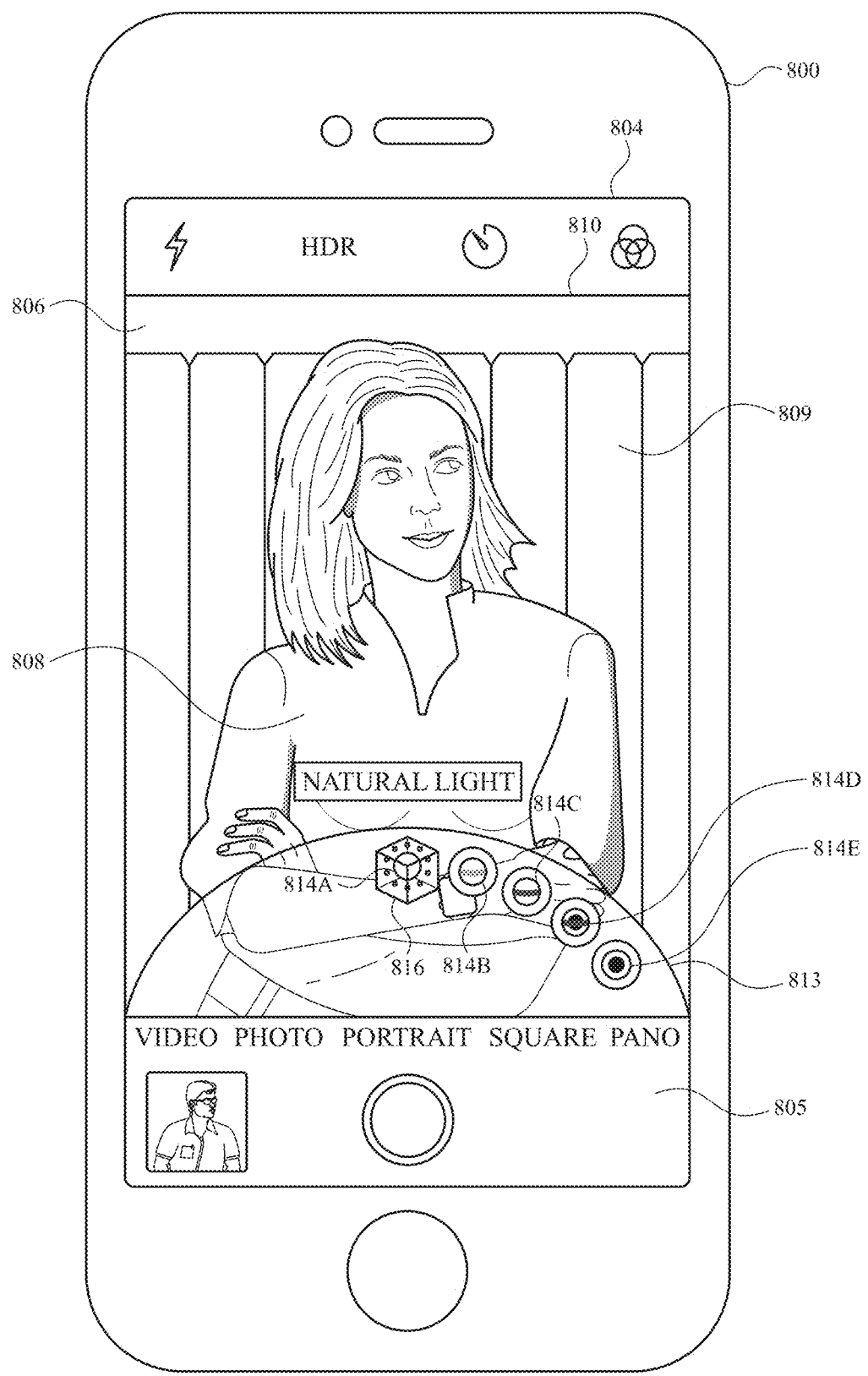
FIGS. 8A-8J illustrate exemplary devices and user interfaces for applying camera lighting effects, in accordance with some embodiments.
Figure 9B:
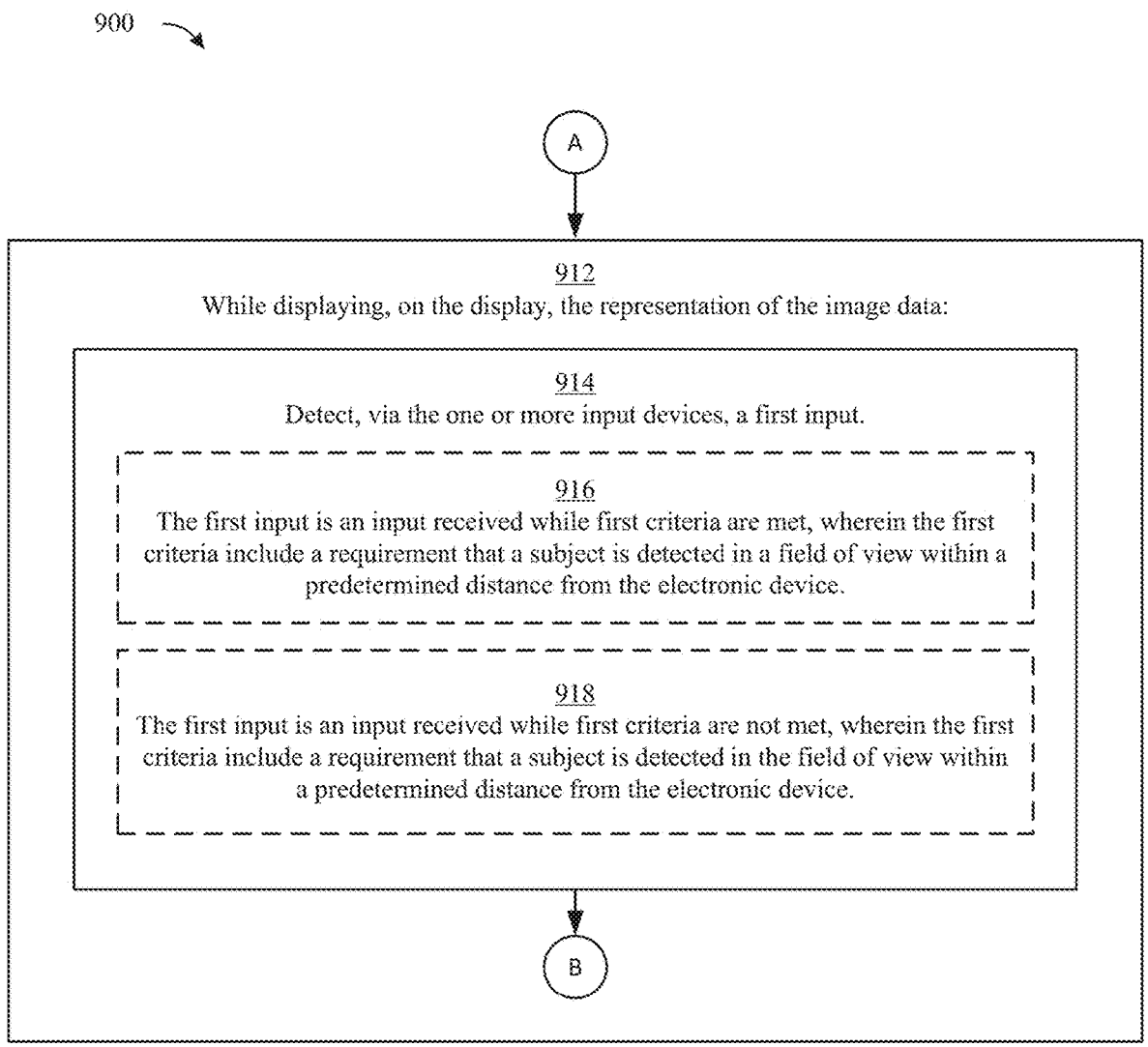

As illustrated in FIG. 8A, the electronic device 800 includes display 804 which is touch sensitive (e.g., touch screen) and the display displays image data received from the camera (e.g., 602). In some embodiments, the display is distinct from a touch sensitive surface. In some examples, the multiple cameras (e.g., 602 and 603) are positioned on the front, back, or both sides of the electronic device (e.g., 800).

FIG. 8A further illustrates the electronic device 800 displaying, on the display 804, a camera application user interface 805 for capturing images with the camera (e.g., 602). The camera application user interface 805 further includes a digital viewfinder 810 which includes a live preview of a field of view of a camera (e.g., 602 or 603). In some embodiments, the camera captures, in real time, depth information associated with the image data. FIG. 8A further illustrates the camera capturing distinct depth levels in the field of view; including a subject (e.g., woman) in foreground region (e.g., 808), and a fence (e.g., 811) in the background region. In some examples, the camera (e.g., 602) captures 3, 4, 5, 10, 20, or more depth levels in a field of view. The electronic device 800 utilizes the various depth levels when applying a filter to the representation of image data (e.g., 806) displayed within the digital viewfinder (e.g. 810), as discussed in more detail below.

Furthermore, FIG. 8A illustrates the electronic device 800 displaying a filter picker user interface 813 in an expanded state. The filter picker user interface 813 is positioned along the edge of the digital viewfinder 810. In some examples, the filter picker user interface (e.g., 813) is, optionally, displayed above, below, to the left, or to the right of the digital viewfinder (e.g., 810). In some examples, the filter picker user interface (e.g., 813) includes one or more representation of filters (e.g., representations of visual effects) arranged in one or more rows and columns or positioned in a circular orientation.

In some examples, the expanded filter picker user interface (e.g., 813) is displayed at any location corresponding to the digital viewfinder. In some examples, the filter picker user interface (e.g., 813) is delineated with an outline (e.g., a boundary) to distinguish the filter picker user interface from the digital viewfinder. In some embodiments, the filter picker user interface (e.g., 813), when in the collapsed state, is translucent (or partially translucent) and has no visible boundary. As a result, in some examples, the filter picker user interface (e.g., 813) appears to blend in (e.g., indistinguishable) with the digital viewfinder.

As shown in FIG. 8A, the electronic device 800 displays the filter picker user interface 813, which includes one or more filter representations (e.g., 814A, 814B, 814C, 814D, 814E) corresponding to visual effects. In some examples, the filter picker user interface (e.g., 813), optionally, includes filter representations which are not displayed on the display (e.g., they are off screen). In some examples, the filter representations which are not displayed are displayed when the electronic device receives an input (e.g., a swipe gesture) which would result in the filter representations to scroll through the filter container (e.g., 816).

As further illustrated in FIG. 8A, in some embodiments, the electronic device 800, displays a filter representation (e.g., 814A) within the expanded filter picker user interface (e.g., 813) to indicate the currently selected visual effect. In some embodiments, the filter representation 814A corresponds to a "Natural Light" lighting effect filter. Consequently, the foreground region 808 and the background region 809 are displayed with the "Natural Light" lighting effect filter (e.g., using the natural lighting from the scene). Because the image representation in in FIG. 8A is depicted without using any synthetic light, the natural light from the scene creates varying shadows on the subject (e.g., face, neck, and clothing). In some examples, the possible filter representations (e.g., 814A-814E) corresponding to lighting effects include the "Studio Light" lighting effect, the "Contour Light" lighting effect, the "Stage Light" lighting effect, and the "Stage Light Mono" lighting effect. Each of the preceding lighting effects, when applied to the representation of image data (e.g., 806), affects a visual characteristic of the representation of image data displayed on the display 804.

In some embodiments, when the electronic device 800 applies the natural lighting effect, no synthetic lighting is added to an image (e.g. the original image is displayed). In contrast, the studio lighting effect includes modelling of multiple discrete point-of-light sources (e.g., lights within a photography studio) positioned uniformly around the subject (e.g. creates a bright fill lighting effect). The contour lighting effect includes modelling of multiple discrete point-of-light sources positioned along a circumference of a subject (e.g., creates a slimming effect, creates shadows on side of a subject's face and/or over the subject's chin). The stage light lighting effect includes modelling of a single discrete point-light-source positioned above the subject (e.g., creates a spotlight effect). The stage light mono lighting effect includes modelling in black and white of a single discrete point light source positioned above the subject (e.g., creates a spotlight effect in a black and white).

In some examples, the electronic device (e.g., 800) detects a subject's face in the representation of image data. Consequently, the electronic device uses the image data's depth map information and the corresponding facial features when applying a lighting effect. As a result, the lighting effect is applied with greater precision around the subject's face and certain facial features may be lighted differently based on a selected lighting effect (e.g., increasing or decreasing shadows around the subject's chin and/or cheek bones). In some examples, the image data includes depth map information which includes depth contours of objects. As a result, the electronic device uses the contour data to more accurately apply a lighting effect around the subject.

Figure 8B:
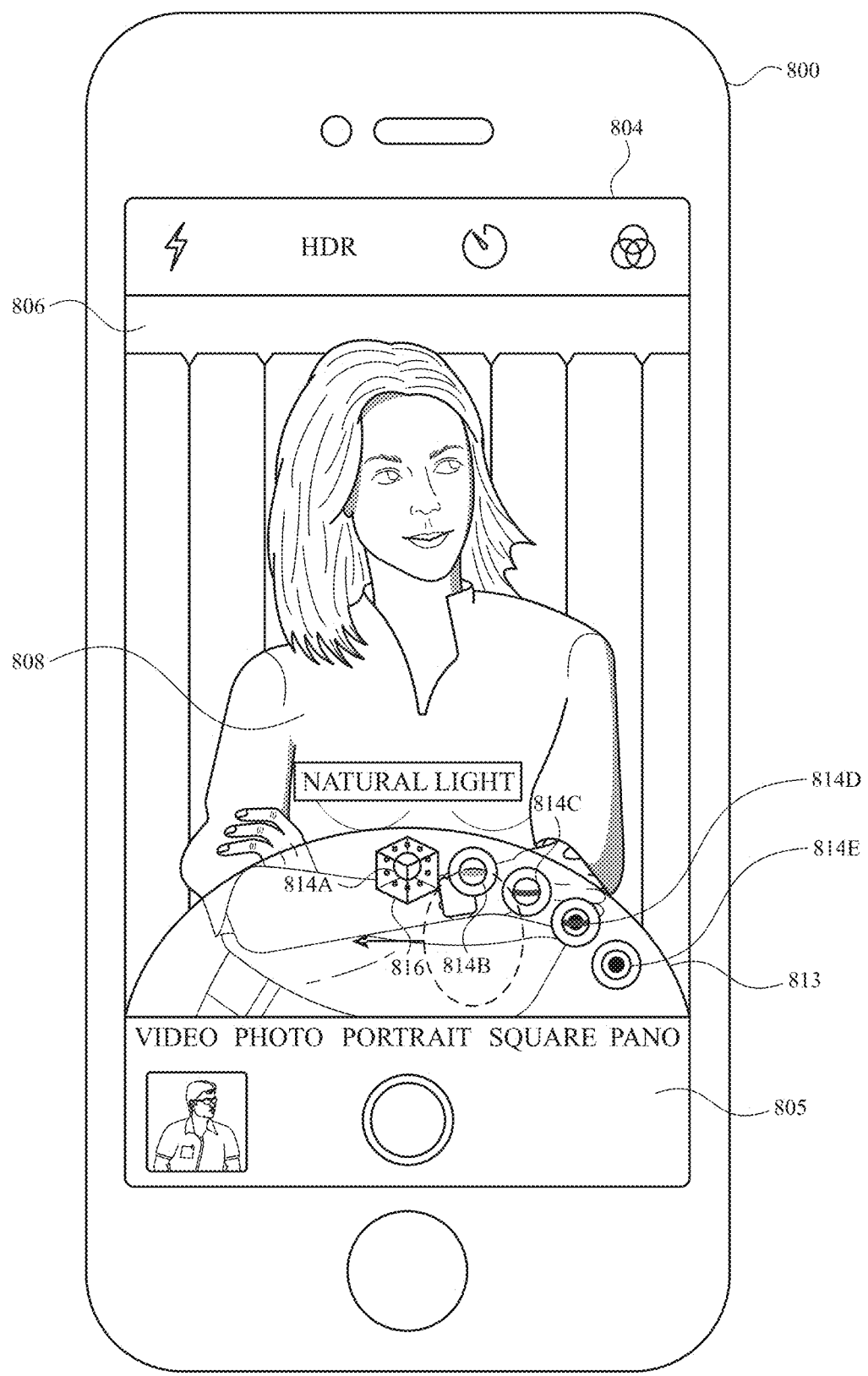
Figure 8C:
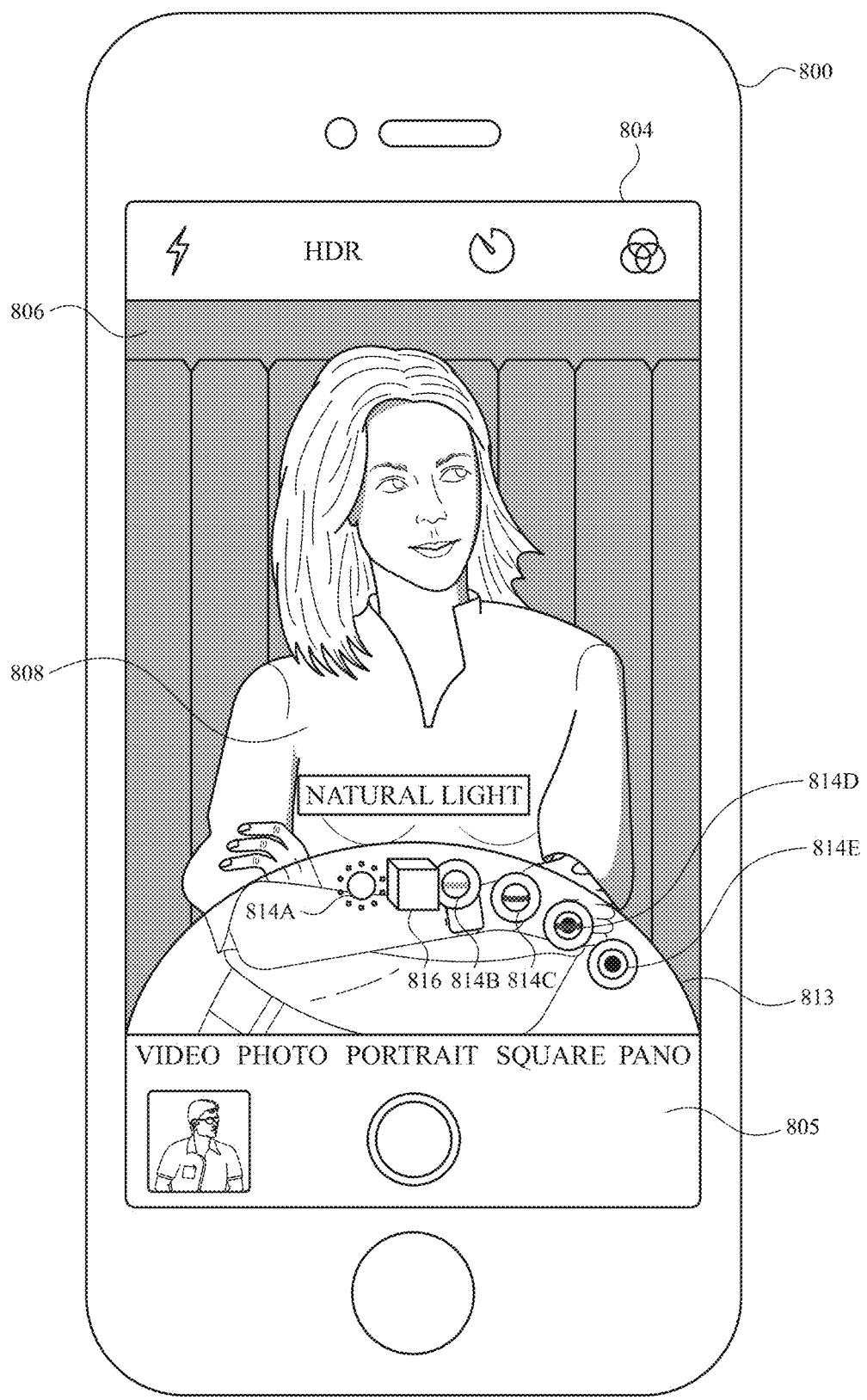

As illustrated in FIG. 8B, the electronic device 800 receives an input (e.g., swipe 818) at a location corresponding to the expanded filter picker user interface (e.g., 813). As shown in FIG. 8C, the input (e.g., swipe 818) causes the filter representations (814A-E) to scroll through the filter container (e.g., 816). In some embodiments, in response to the input (e.g., swipe 818) the filter representations will scroll to the left across the top boundary of the filter picker user interface (e.g., 813). In some examples, a single swipe gesture will result in the incremental scroll of the filter representations. In some embodiments, the number of filter representations scrolled will be dependent the magnitude of the swipe gesture. Thus, in some examples, a longer swipe will cause a longer scroll than a shorter swipe.

In response to the input (e.g., 818 swipe), in some embodiments, the electronic device 800 applies a lighting effect corresponding to the filter representation (e.g., 814B) corresponding to the location on the display 804 of the tap input. In some examples, the input is a swipe, press and hold, or an input with a characteristic intensity that is above a respective intensity threshold. In some examples, an input with a characteristic intensity that is above a respective intensity threshold detected on a representation of one of the filters (814A-814F), optionally, results in a display of additional functionality for the corresponding filter representation associated with the location of the input with a characteristic intensity that is above a respective intensity threshold.

In some embodiments, an additional visual effect may be applied to the entire representation of image data (e.g., 806) prior to applying the lighting effect corresponding to the filter representation (e.g., 814B). For example, a slight gradient fill may be applied to the representation of image data (e.g., 806) prior to applying the stage lighting filter so as to more fluidly transition from no filter to a lighting effect filter.

Figure 8D:
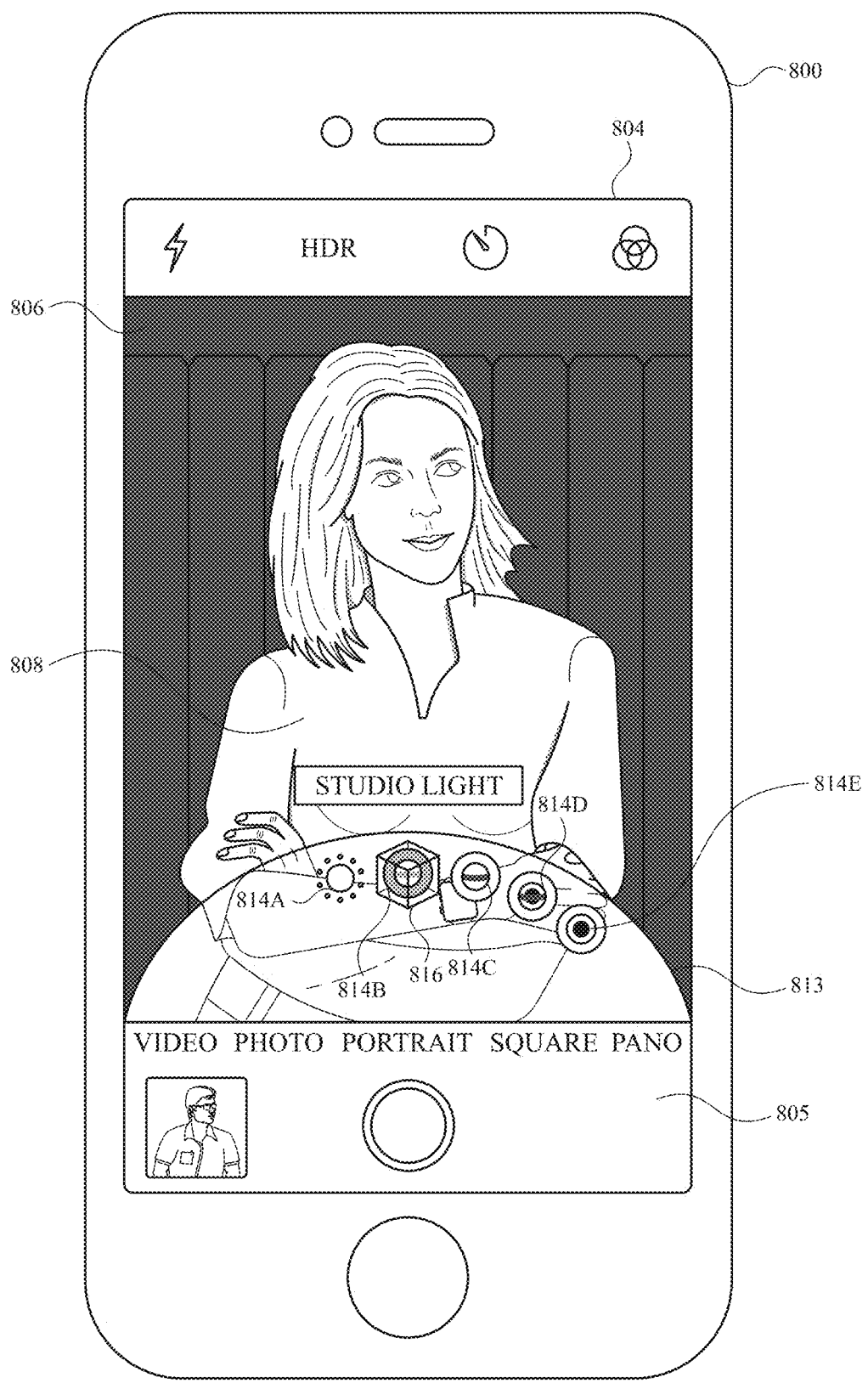

FIGS. 8C-8D illustrate the electronic device 800 gradually applying the lighting effect as result of the electronic device receiving the input (e.g., swipe 818) in FIG. 8B. In some embodiments, the lighting effect corresponding to the newly selected filter representation 814B is gradually applied to the representation of image data (e.g., 806) in the live preview. Because the selected lighting effect is a "Studio Light," the corresponding visual effect simulates multiple point-of light sources affecting the subject in the foreground region 808. As a result, during the transition stage (FIG. 8C), the lighting effect corresponding to the filter representation 814B is applied to the live preview at 50% intensity. The filter corresponding to the filter representation 814B is fully applied (e.g. 100%) in FIG. 8D. In some examples, the filter is applied in increments (10%, 25%, 50%, 75%) while the electronic device 800 applies the lighting effect until the transition is complete. In some examples, the background region (e.g., 809) is completely darkened when the electronic device 800 applies the "Studio Light" light effect to the representation of image data. In some embodiments, the background region (e.g., 809) is partially darkened when the electronic device 800 applies the "Studio Light" light effect to the representation of image data.

As illustrated in FIGS. 8C-8D, because the image data captured by the camera (e.g., 602) includes depth map information associated with the image data, the electronic device is able to use the available depth map information and is able to simulate the effect of various point-of light sources on representation of image data 806. In some embodiments, the same lighting effect is applied differently in the background region as compared to the foreground region based on the depth map information associate with the image data. As a result, a subject in the foreground may appear more prominently and the subject in the background may be made less prominent via a darkening effect. Additionally, as illustrated in FIG. 8D, because the lighting effects simulate point-of-light sources, the depth map information is used to cast varying shadows on a subject's face in the foreground region (e.g., 808). As illustrates in FIG. 8D, because the "Studio Light" lighting effect simulates a plurality of point-of-light sources, the electronic device 800 uses the depth map information to lessen the shadows on a subject's face as compared to the "Natural Light" lighting effect.

Figure 8E:
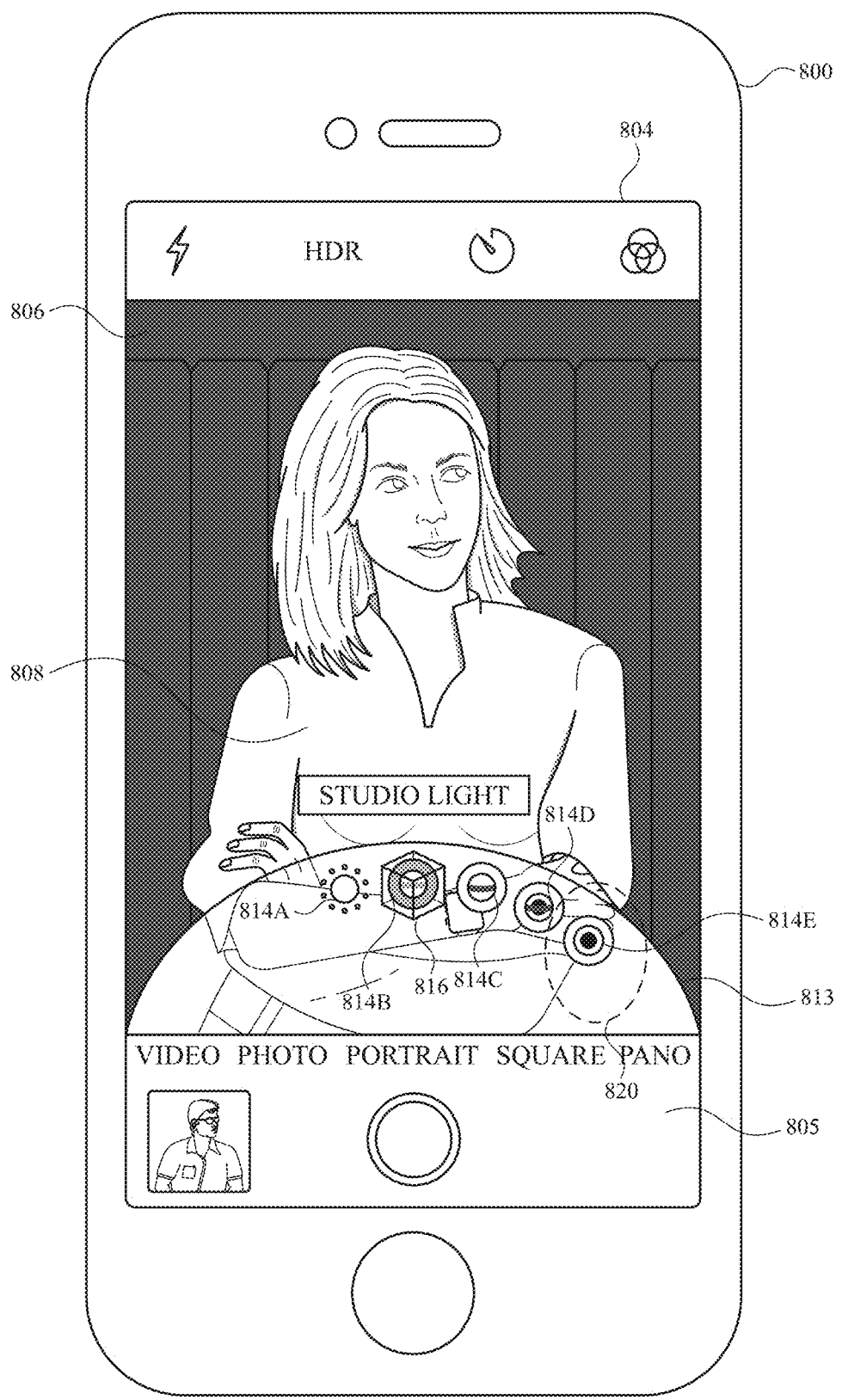
Figure 8F:
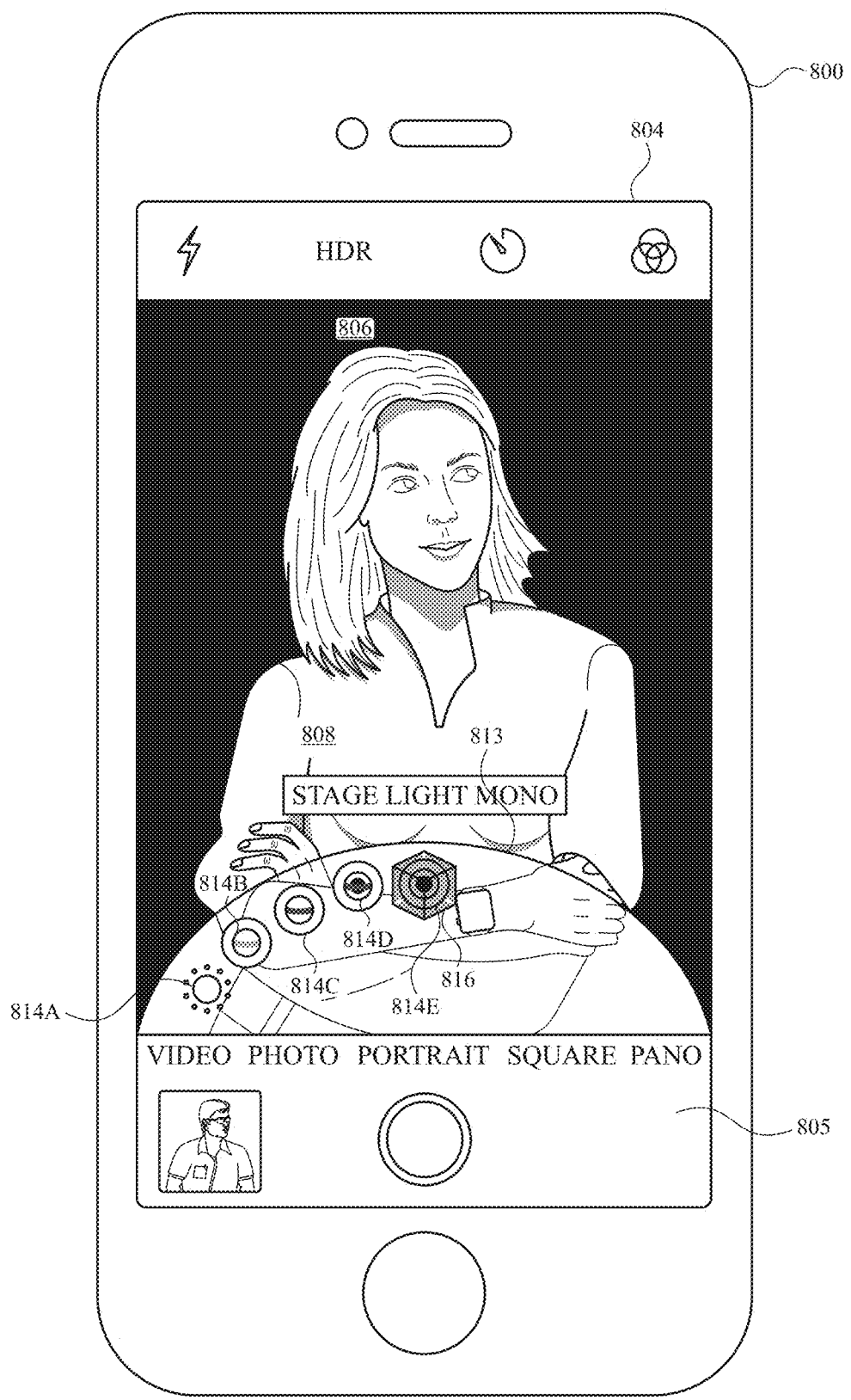

As illustrated in FIGS. 8E-8F, the electronic device 800 receives an input (e.g., tap 820) and will cause the representations of filters (814A-E) to scroll through the filter container (e.g., 816). In some embodiments, in response to the tap gesture (e.g., 820) corresponding to filter representation (e.g., 814E), the representations of the filters will scroll to the left across the top periphery of the expanded filter picker user interface (e.g., 813). FIG. 8F illustrates the result of the tap gesture (e.g., 820) of FIG. 8E where the electronic device 800 applied the "Stage Light Mono" filter to the digital viewfinder. The "Stage Light Mono" lighting effect simulates a single point-of-light source and, as a result, resembles a spotlight effect. Using the depth map information, the electronic device 800 applies the "Stage Light Mono" effect from above the subject in the foreground region (e.g., 808). In some examples, the point-of-light source may be simulated to originate from any direction. In some examples, the "Stage Light Mono" effect is simulated to originate from the front, and, as a result, a specific focal point (e.g., a face) is highlighted, but the remaining portion of the representation of the image data is darkened. As illustrated in FIG. 8F, because the simulate point-of-light source is originating from above the subject, the electronic device is able to use the image data's depth map information to cast deeper shadows on the subject (e.g., face and neck). In some embodiments, a background of the image is removed and replaced with a solid color such as black or white or a color of the user's choice to further draw attention to the subject in the foreground and simulate a studio setting in which a user could be photographed against a solid backdrop.

Figure 8G:
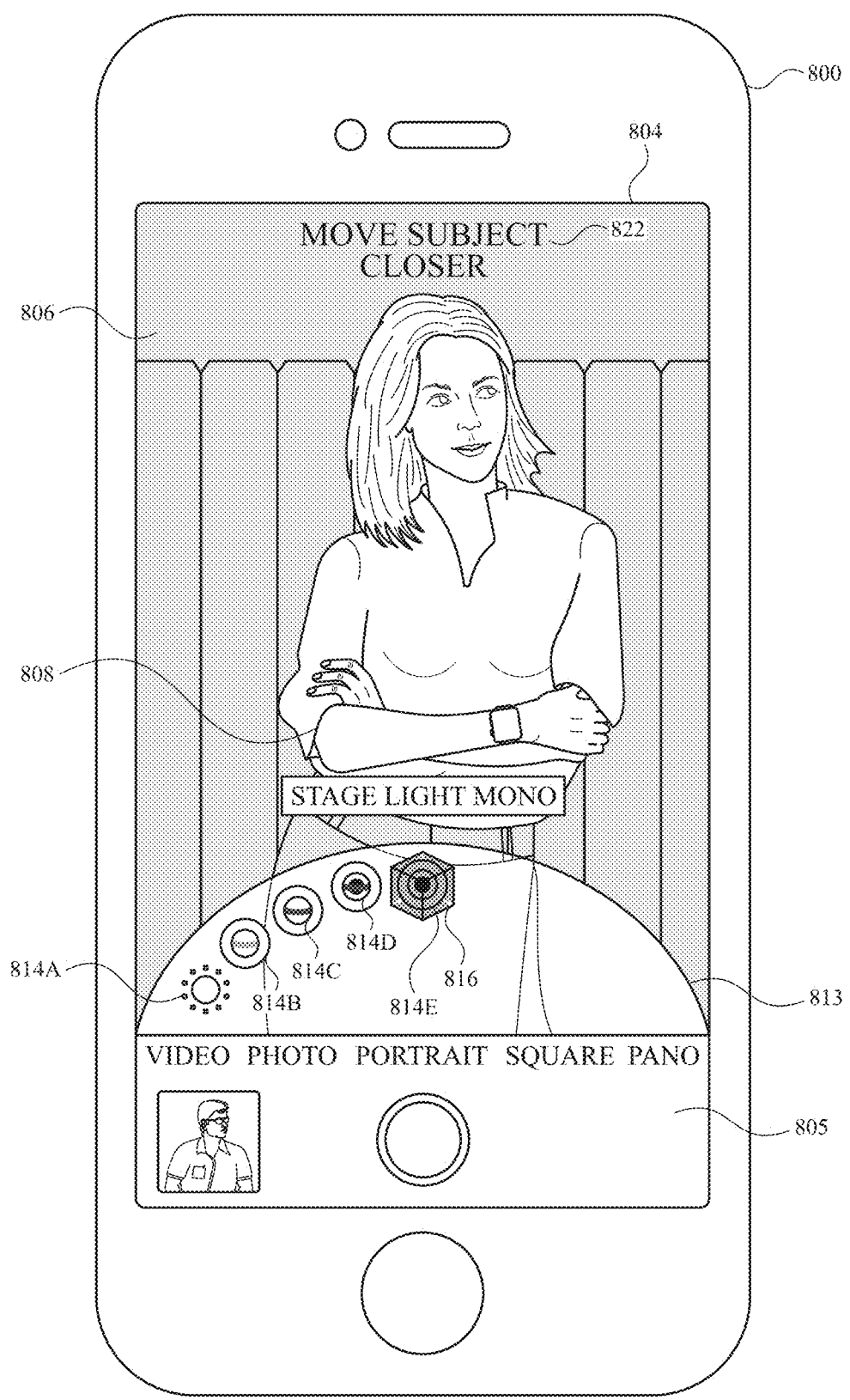

As illustrated in 8G, the electronic device may not be in appropriate state to capture depth information. FIG. 8G illustrates a user operating the electronic device 800 after taking a few steps back from the position the user was in when operating the electronic device in FIG. 8F. As a result of the user stepping back, the electronic device can no longer capture depth information (e.g., conditions are no longer detected for the camera to capture depth information). In some embodiments, when the conditions for capturing depth effect are no longer met, the previously applied lighting effect is gradually faded out. In some examples, when the conditions for capturing depth effect are no longer met, the previously applied lighting effect is snapped out (e.g., the device reverts to no lighting filter applied without a transition). In some embodiments, a temporary filter (e.g., a gradient) which is, optionally, part of the lighting effect filter is applied to the image representation when the filter snaps out. The temporary filter helps smooth (e.g., less jarring) the transition when the lighting effect is reapplied.

In some embodiments, when the electronic device does not detect the necessary conditions to capture depth map data, the electronic device 800 displays a graphical indication (e.g., 822) to instruct the user as to what actions to take in order for the electronic device (e.g., 800) to capture the depth map information. In some examples, the electronic device detects a subject, but the subject is too far way (e.g., focus is between 2.5m and 10m), and the electronic device instructs the user (e.g., using the graphical indication) to move closer to camera (e.g., to within 8 feet). In some examples, the electronic device determines an amount of light is too low (e.g., 400 lux or less), and instructs the user (e.g., using the graphical indication) to provide more light. In some examples, an affordance is displayed in the viewfinder to allow a user to disable or enable such instructions. In some examples, when the conditions for capturing depth effect map are met, the electronic device 800 forgoes displaying the graphical indication instructing the user. Thus, in some examples, the electronic device 800 does not instruct the user when user action is not helpful for applying the lighting effect.

Figure 8H:
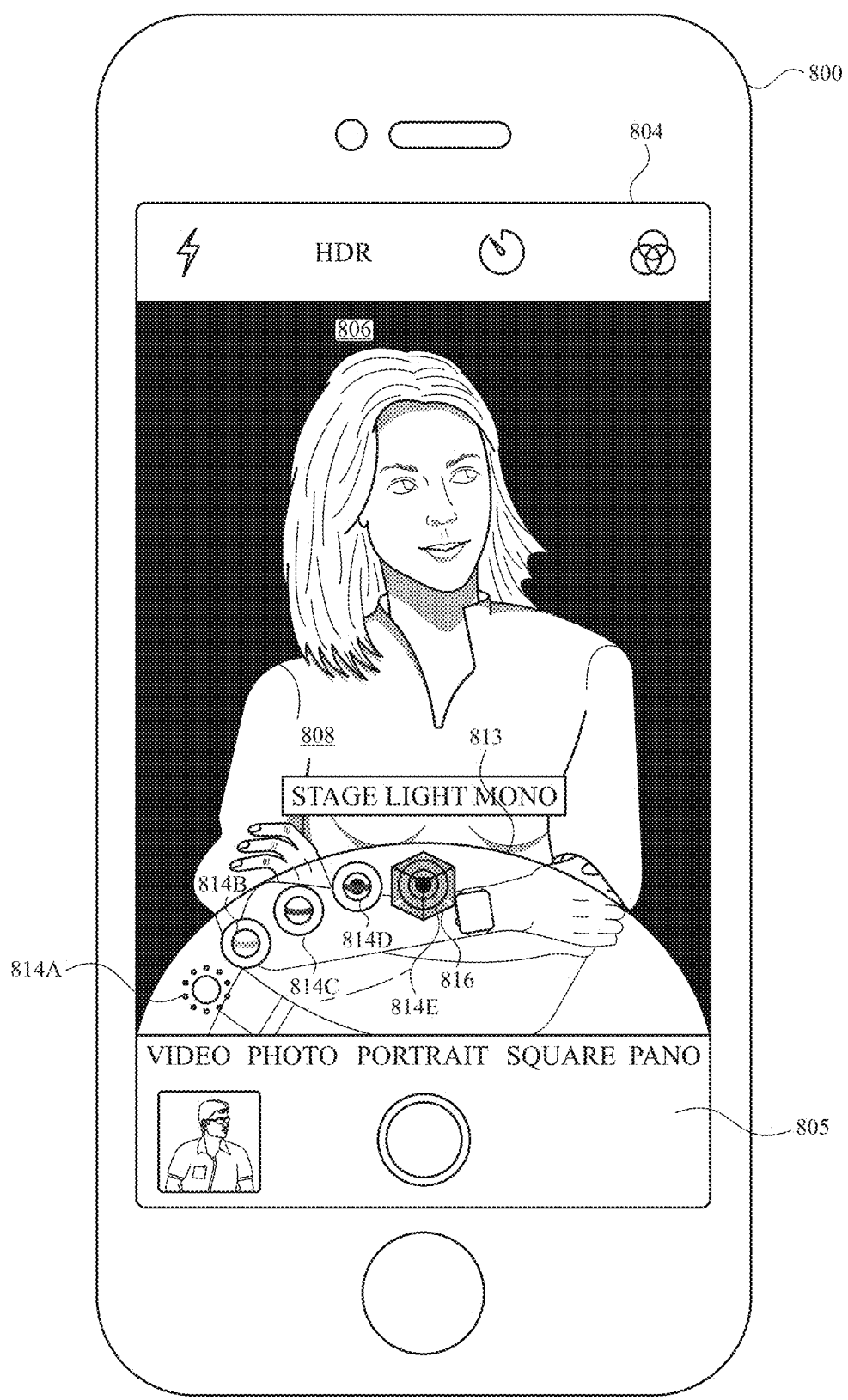

As illustrated in FIG. 8H, when the user takes a few steps forward and the electronic once again detects the necessary conditions for capturing depth map information, the lighting effect is snapped in (e.g., without a transition). In some examples, electronic device 800 gradually applies the lighting effect to the representation of the image data when the conditions for capturing depth map information are again met.

Figure 8I:
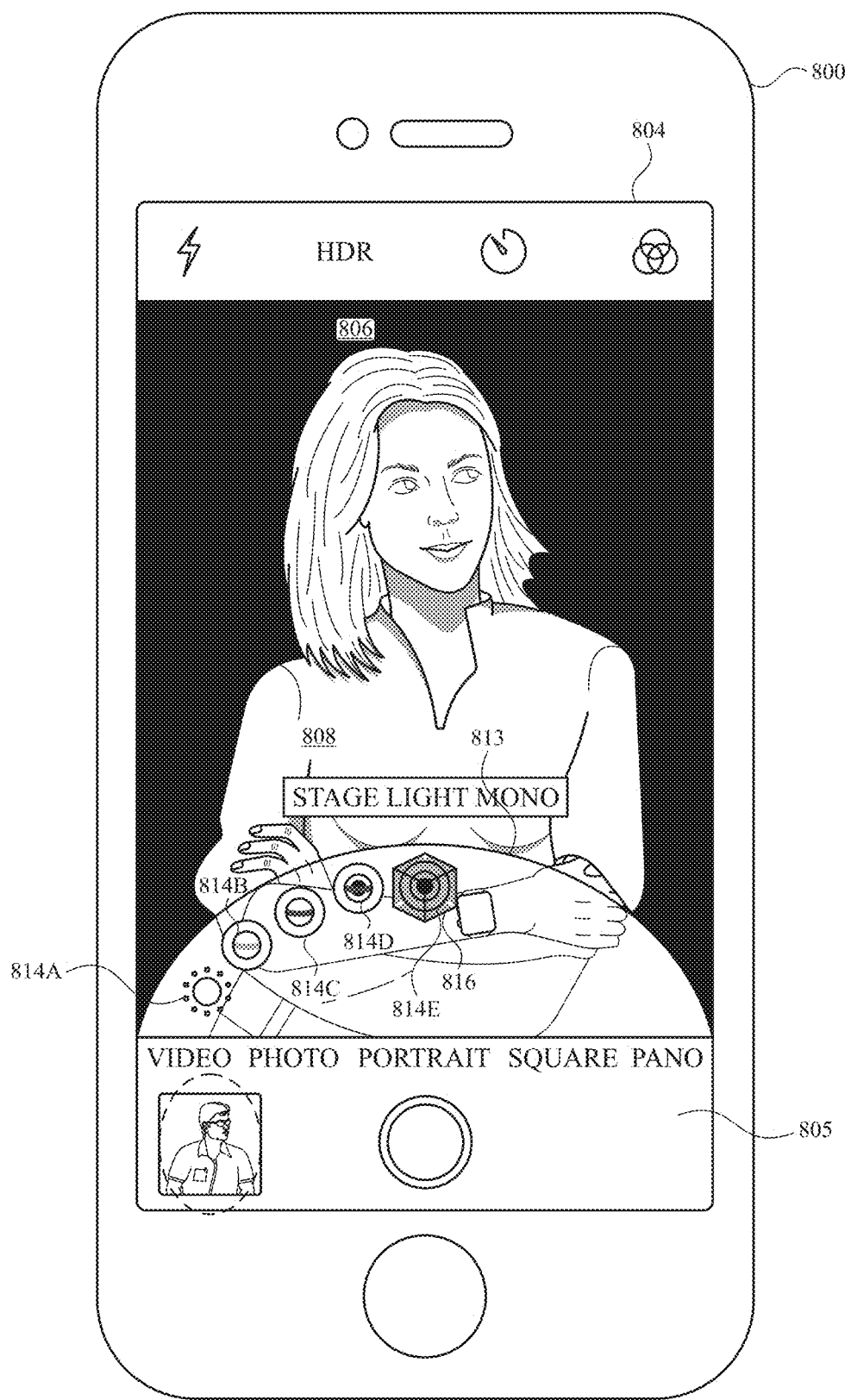

As illustrated in FIG. 8I, the electronic device detects an input (e.g., tap 824) at a location corresponding to a photo viewer application (e.g., 826). In response to receiving the input (e.g., 826), the electronic device 800 switches to an image viewing mode (e.g., a mode for viewing previously captured images, rather than a live preview of camera data) as illustrated in FIG. 8J.

Figure 8J:
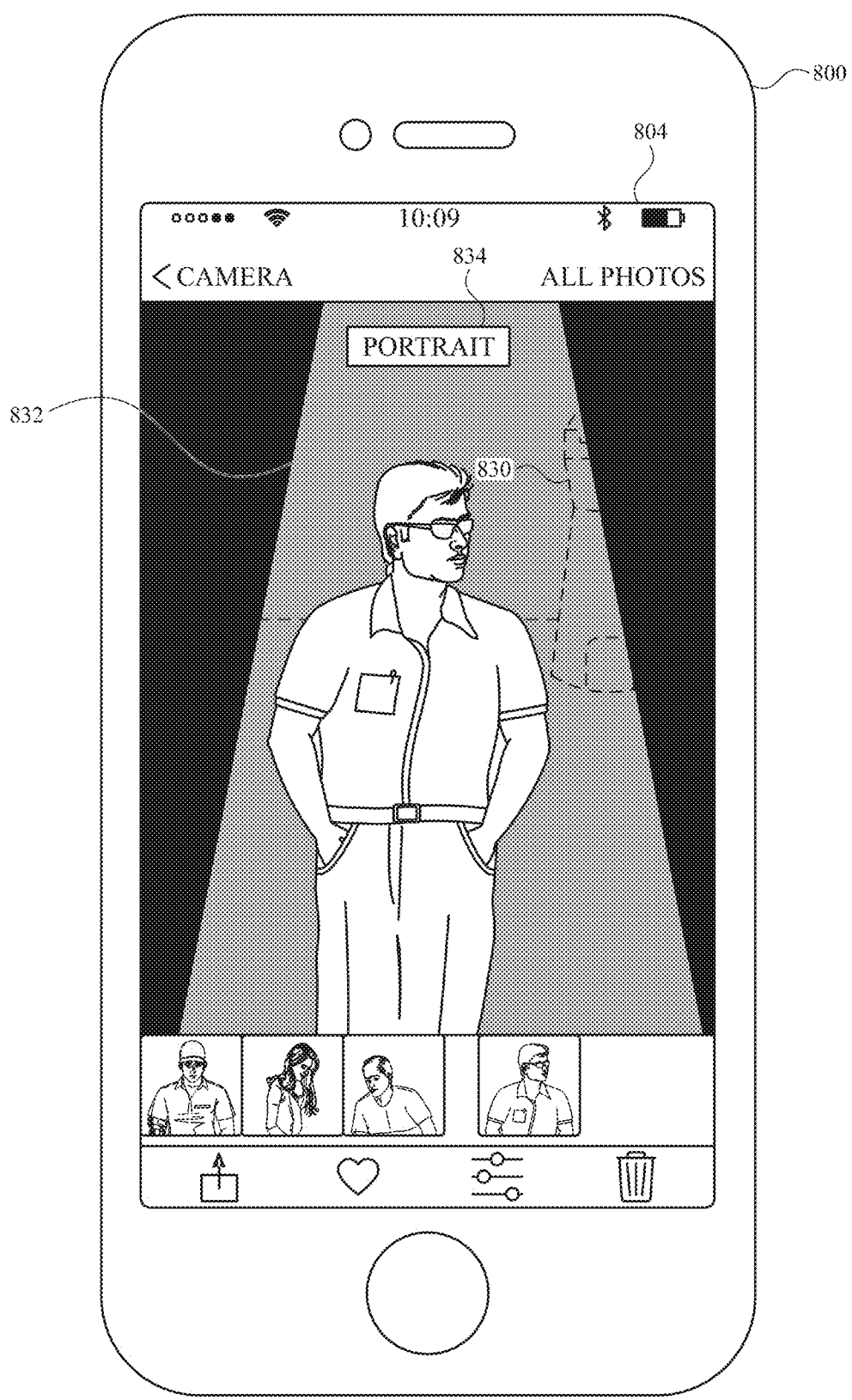

FIG. 8J illustrates a user interface for a photo viewer application. The photo viewer application includes a thumb strip of previously captured images (e.g., 828A-828D) with 828D being the last capture image. In some examples, the previously captured images were captured using a camera corresponding to the electronic device (e.g., 800). In some examples, the electronic device (e.g., 800) received the previously captured images (e.g., 828A-828D) from a remote source (e.g., a server) and, optionally, the previously captured images were captured with a different electronic device (e.g., not 800).

FIG. 8J further illustrates that the last captured image (e.g., 828D) was captured with a combination of visual effects (e.g., simulated depth effect (bokeh) 830 in which the background is blured and a portion of the foreground is not blurred to simulate taking a photo with a shallow depth of field where the foreground is in the plane of focus, and a lighting effect 832). In some embodiments, the electronic device displays a "PORTRAIT" visual indicator (e.g., 834) at the top of the display as an indication to the user that that the previously captured image data includes depth map information. In some examples, the electronic device (e.g., 800) receives an input at a location corresponding to the visual indicator to toggle the simulated depth effect (e.g., bokeh) effect on and off. In some embodiments, if the simulated depth effect is toggled off, the lighting effect would remain. In some examples, the visual indicator, when activated would toggle the simulated depth effect and the lighting effect, together. In some examples, the electronic device, optionally, receives an input to change the lighting effect within the photo viewer application to a different lighting effect using a filter picker user interface (as describe above). In some examples, if the previously captured image data does not have depth map information; the electronic device (e.g., 800) would not provide an option to apply a simulated depth effect or a lighting effect. In some examples, if the previously captured image data does not have depth map information associated with the image data, the electronic device would not display the visual indicator (e.g., 834).

In some examples, the electronic device (e.g., 800) stores the depth map information with the image data in one file. In some examples, the electronic device (e.g., 800) stores the depth map information separately from the image data. In some embodiments, once the electronic device stores an image with depth map information as a flat image (e.g., without depth map information) the electronic device (e.g., 800) would no longer be able to apply a lighting effect to the representation of image data.

FIGS. 9A-9D are a flow diagram illustrating a method for applying a simulated lighting effect to a representation of image data using an electronic device in accordance with some embodiments. Method 900 is performed at a device (e.g., 100, 300, 500, 800) with one or more input devices (e.g., a touch-sensitive surface, keyboard, mouse) and a display. In some embodiments, the display is a touch-sensitive display. In some embodiments, the display is not a touch sensitive display. In some embodiments, the electronic device includes a plurality of cameras. In some embodiments, the electronic device only has one camera. Some operations in method 900 are, optionally, combined, the orders of some operations are, optionally, changed, and some operations are, optionally, omitted.

As described below, method 900 provides an intuitive way for applying a simulated lighting effect to a representation of image data. The method reduces the cognitive burden on a user for providing inputs corresponding to functions, thereby creating a more efficient human-machine interface. For battery-operated computing devices, enabling a user to initiate various functions faster and more efficiently conserves power and increases the time between battery charges.

In some embodiments, at block 902, prior to displaying the representation of image data (e.g., 806), the electronic device (e.g., 800) receives (e.g., from camera, from memory, from server), at the device, image data and depth map information associated with the image data. In some embodiments, the image data includes RGB and depth map values. In some embodiments, image data and depth map is received from a source external to the electronic device (e.g., 800) (e.g., the data is received from a server). In some embodiments, the image is saved in a file format which allows for the separation of depth information (e.g. depth map) and RGB data in a single file. In some embodiments, the image data includes the depth map information. In some embodiments the depth map information and the depth map information are separate. Receiving image data and depth map information corresponding to the image data before displaying the representation of the image data (e.g., 806) enables the device to provide the user with visual feedback via the representation of the image data (e.g., 806) about the content of the depth map information, such as whether items are in the background (e.g., 809) or foreground (e.g., 808) of a scene. Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

At block 904, the electronic device (e.g., 800) displays, on the display (e.g., 804), a representation of image data associated with depth map information. In some embodiments, an image or photograph is displayed on the device's display (e.g., 804). In some embodiments, a live preview of the image data is displayed in a digital viewfinder (e.g., 810). Displaying a live preview of the image data in the digital viewfinder (e.g., 810) enables the user to frame a photo quickly and efficiently without the need to repeatedly capturing photos, thereby reducing the number of inputs required to capture the intended photo, reducing the memory requirements for storage of photos, and making the user interface more efficient. Reducing the number of inputs needed to capture a desired image and reducing the memory requirements enhances the operability of the device and makes the user-device interface more efficient (e.g., by helping the user to achieve an intended result and reducing user mistakes when operating/interacting with the device) which, additionally, reduces power usage and improves battery life of the device by enabling the user to use the device more quickly and efficiently.

In some embodiments, at block 906, the electronic device (e.g., 800) further includes one or more cameras (e.g., 602 and/or 603) and wherein the representation of the image data (e.g., 806) is a live preview of image data captured within the field of view of the one or more cameras (e.g., 602 and/or 603) displayed in the digital viewfinder (e.g., 810). In some embodiments, the device includes a plurality of cameras (e.g., 602 and/or 603) with varying focal lengths.

In some embodiments, at block 908, the depth map information associated with the image data includes information corresponding to at least three different depth levels. For example, the image data includes information corresponding to at least a background depth level, foreground depth level, and an intermediate depth level. The depth map information including three or more different levels of depth provides the user with a framework to apply depth-specific filters and provide the user with more precise feedback about the depth positioning of objects in the field of view of the camera(s) (e.g., 602 and/or 603). Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, at block 910, the depth map information associated with the image data includes information identifying depth contours of an object in the representation of the image data (e.g., 806).

At block 912, while displaying, on the display (e.g., 804), the representation of the image data (e.g., 806), the electronic device (e.g., 800) optionally performs the techniques of blocks 914-936. At block 914, the electronic device (e.g., 800) detects, via the one or more input devices, a first input (e.g., 818) (e.g., swipe, tap and hold, tap, button press; the gesture can be on top of an icon representing a lighting filter or another user interface system used to select a filter).

In some embodiments, at block 916, the first input (e.g., 818) is an input received while first criteria (e.g., a set of lighting-effect-application criteria) is met, wherein the first criteria include a requirement that a subject is detected in the field of view within a predetermined distance from the electronic device (e.g., 800) (e.g., other conditions in the set include: focus distance of a first camera (e.g., 602 or 603) exceeds minimum distance threshold, focus distance of the first camera (e.g., 602 or 603) does not exceed a maximum distance threshold, subject is detected beyond a predetermined minimum distance from the device, the amount of detected light exceeds a minimum light threshold, the amount of detected light does not exceed a maximum light threshold). In some embodiments, if the first criteria are not met, forgo applying the first lighting effect or the second lighting effect. Applying a lighting effect when the subject is determined to be within a predetermined distance when the first input (e.g., 818) is received provides the user with visual feedback that the subject is properly positioned such that an optimal (or near-optimal) effect can be achieved with the filter. Similarly, not applying the lighting effect when the subject is not within the predetermined distance provides the user with feedback that the subject is not properly positioned and indicates to the user that corrective action is required. Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, at block 918, the first input (e.g., 818) is an input received while first criteria (e.g., a set of lighting-effect-application criteria) is not met, wherein the first criteria include a requirement that is met when a subject is detected in the field of view within a predetermined distance from the electronic device (e.g., 800) (e.g., other conditions/criteria in the set include: focus distance of a first camera (e.g., 602 or 603) exceeds minimum distance threshold, focus distance of the first camera (e.g., 602 or 603) does not exceed a maximum distance threshold, subject is detected beyond a predetermined minimum distance from the device, the amount of detected light exceeds a minimum light threshold, the amount of detected light does not exceed a maximum light threshold). In some embodiments, if the first criteria are not met, the electronic device (e.g., 800) forgoes applying the first lighting effect or the second lighting effect.

In some embodiments, at block 920, in response to the first input (e.g., 818), the electronic device (e.g., 800) applies, to the live preview, a placeholder filter (e.g., dimming or desaturating a background (e.g., 809)) without applying the first lighting effect to the live preview. In some embodiments, in response to detecting that the first criteria have been met, the electronic device (e.g., 800) applies the first lighting effect to the live preview while continuing to apply the placeholder filter to the live preview (e.g., the placeholder filter is part of the first lighting effect that does not take into account the depth map information and thus is displayed without regard to whether the first criteria have been met). Applying a placeholder filter without regard to whether the first criteria are met provides the user with visual feedback about the depth-map corresponding to the viewfinder (e.g., 810) content, such as which portions of the image correspond to portions of the depth map in the background (e.g., 809), as compared to the foreground (e.g., 808). Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, at block 922, after displaying the live preview without applying the first lighting effect to the live preview, the electronic device (e.g., 800) detects that the first criteria have been met. In response to detecting that the first criteria have been met, the electronic device (e.g., 800) applies the first lighting effect to the live preview. Applying a lighting effect when the first criteria are met provides the user with visual feedback that the first criteria has been met (e.g., the subject is properly positioned) and that an optimal (or near-optimal) effect can be achieved with the filter. Similarly, not applying the lighting effect when first criteria are not met provides the user with feedback that the first criteria are not met and indicates to the user that corrective action is required. Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

At block 924, in accordance with detecting the first input (e.g., 818), the electronic device (e.g., 800) applies a first lighting effect (e.g., natural light, studio light, contour light, stage light, stage light mono) to the representation of image data (e.g., 806), wherein the first lighting effect is based on the depth map information (e.g., based on measurements of a depth sensor or based on disparity mapping between two images taken at the same time from different locations). Displaying a lighting effect based on the depth map information provides the user with visual feedback about the depth map information. For example, placing (or intensifying) and removing (or lightening) shadows provides the user with feedback about the special orientation of objects corresponding to the depth map information. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, at block 926, applying the first lighting effect includes applying, to the representation of the image data (e.g., 806) displayed in the digital viewfinder (e.g., 810), a placeholder filter (e.g., dimming or desaturating a background (e.g., 809)), wherein the placeholder filter is based (e.g., selected) on the first lighting effect and is applied without regard to whether or not the first criteria are met. Applying the placeholder filter makes for a smoother/pleasant transition to the lighting filter. Applying a placeholder filter without regard to whether the first criteria are met provides the user with visual feedback about the depth-map corresponding to the viewfinder (e.g., 810) content, such as which portions of the image correspond to portions of the depth map in the background (e.g., 809), as compared to the foreground (e.g., 808). Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, at block 928, applying the first lighting effect includes applying, to the representation of the image data (e.g., 806) displayed in the viewfinder (e.g., 810), a simulation of one or more point-of-light sources in space based on the depth map information associated with the image data. Lighting options comprise of natural light, studio light, contour light, stage light, and stage light mono. Each of the lighting effect models (e.g., simulates) the result of one or more points of light sources in space based on an image data's depth map. The natural lighting option applies no synthetic lighting to an image (e.g. the original image is displayed or a portion of the original image is displayed and a blur is applied to a different portion of the original effect to simulate a bokeh effect). The studio lighting effect includes modelling of multiple discrete points of light sources positioned around the subject (e.g. creates a bright fill of light effect). The contour lighting effect includes modelling of multiple discrete points of light sources positioned at fewer points around the subject to create shadows on the subject's face (e.g., creates a slimming effect, creates shadows on side of a subject's face and/or over the subject's chin). The stage light lighting effect includes modelling of a single discrete point light source positioned above the subject (e.g., creates a spotlight effect). The stage light mono lighting effect includes modelling in black and white of a single discrete point light source positioned around above the subject (e.g., creates a spotlight effect in a black and white). In some embodiments, the lighting filter simulates a light point source. In some embodiments, the lighting effect is snapped in when first (e.g., lighting-effect-application criteria are met), as described in greater detail above). In some embodiments, if the system detects a face, the facial features are taken into consideration when applying the lighting effect. As a result, the lighting effects change the appearance of the representation of the image data (e.g., 806) based on a subject's specific facial features and facial shape. Applying a simulation of a point-of-light source provides the user with a visual representation of the content of the depth map information and enables the device to provide the user with visual feedback about the shape and depth positioning of objects in the field of view of the camera(s) (e.g., 602 and/or 603). Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently. Further, applying a simulation of a point-of-light source without requiring actual physical studio lights makes the electronic device cheaper and smaller than if the actual studio lights and a backdrop were needed, thereby increasing the portability of the device and reducing the manufacturing costs.

At block 930, the electronic device (e.g., 800) detects, via the one or more input devices, a second input (e.g., swipe, tap and hold, tap; button press, the gesture can be on top of an icon representing a lighting filter (e.g., 814A) or another user interface system used to select a filter).

At block 932, in accordance with detecting the second input, the electronic device (e.g., 800) applies a second lighting effect (e.g., natural light, studio light, contour light, stage light, stage light mono) different than the first lighting effect to the representation of image data (e.g., 806), wherein the second lighting effect is based on the depth map information (e.g., based on measurements of a depth sensor or based on disparity mapping between two images taken at the same time from different locations). Displaying a second lighting effect based on the depth map information provides the user with additional visual feedback about the depth map information. For example, the second lighting effect may include one or more light sources at different locations, intensities, or types (directional, ambient, point) that provide the user with feedback about the special orientation of objects corresponding to the depth map information. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, at block 934, applying the second lighting effect includes applying, to the representation of the image data (e.g., 806) displayed in the digital viewfinder (e.g., 810), a simulation of one or more point-of-light sources in space based on the depth map information associated with the image data. Lighting options comprise of natural light, studio light, contour light, stage light, and stage light mono. Each of the lighting effect models (e.g., simulates) the result of one or more points of light sources in space based on an image data's depth map. The natural lighting option applies no synthetic lighting to an image (e.g. the original image is displayed or a portion of the original image is displayed and a blur is applied to a different portion of the original effect to simulate a bokeh effect). The studio lighting effect includes modelling of multiple discrete points of light sources positioned around the subject (e.g. creates a bright fill of light effect). The contour lighting effect includes modelling of multiple discrete points of light sources positioned at fewer points around the subject to create shadows on the subject's face (e.g., creates a slimming effect, creates shadows on side of a subject's face and/or over the subject's chin). The stage light lighting effect includes modelling of a single discrete point light source positioned above the subject (e.g., creates a spotlight effect). The stage light mono lighting effect includes modelling in black and white of a single discrete point light source positioned around above the subject (e.g., creates a spotlight effect in a black and white). In some embodiments, the lighting filter simulates a light point source. In some embodiments, the lighting effect is snapped in when first criteria are met, as described in greater detail above). In some embodiments, if the system detects a face, the facial features are taken into consideration when applying the lighting effect. As a result, the lighting effects change the appearance of the representation of the image data (e.g., 806) based on a subject's specific facial features and facial shape. Applying a simulation of a point-of-light source provides the user with a visual representation of the content of the depth map information and enables the device to provide the user with visual feedback about the shape and depth positioning of objects in the field of view of the camera(s) (e.g., 602 and/or 603). Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, at block 936, the lighting effects change the appearance of the representation of the image data (e.g., 806) based on the location and curvature of the contours of the object. Including depth contours of objects in the depth map information enables the device to provide the user with more precise visual feedback about the shape and depth positioning of objects in the field of view of the camera(s) (e.g., 602 or 603). Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently. Further, including depth contours of objects in the depth map information enables previewing and applying simulations of light sources without requiring actual physical studio lights makes the electronic device cheaper and smaller than if the actual studio lights and a backdrop were needed, thereby increasing the portability of the device and reducing the manufacturing costs.

In some embodiments, while the first lighting effect (or the second filter) is being applied, the electronic device (e.g., 800): determines that the first criteria are not met, and in response to the determination that the first criteria are not met (e.g., no subject is detected in the field of view within a predetermined distance from the electronic device (e.g., 800)): ceases to apply the first (or second) lighting effect to the representation of image data (e.g., 806) (in some embodiments, the visual effect of the filter is lessened, but the filter remains applied), displays, on the display (e.g., 804), the representation of image data without a first lighting effect applied (e.g., unaltered image with no filter or partial filter applied), and displays, on the display (e.g., 804), a graphical indication (e.g., 822) (e.g., text, icon, image) of the first criteria (e.g., lighting condition application criterion) that is not met. In some embodiments, when the conditions are met again, the filter is reapplied again.

In some embodiments, the representation of image data is previously captured image data. (e.g., an image retrieved from memory/storage, not a live preview of image data captured by the one or more cameras (e.g., 602 and/or 603)). In some embodiments, the depth map information is saved for stored images so that the lighting effects applied to an image can be changed and/or removed after the image has been captured. Saving the depth map information for stored images provides the ability to revise lighting after an image has been captured, thereby reducing the number of photos a user must take to achieve a desired effect, thereby reducing the number of inputs required to capture the intended photo, reducing the memory requirements for storage of photos, and making the user interface more efficient. Reducing the number of inputs needed to capture a desired image and reducing the memory requirements enhances the operability of the device and makes the user-device interface more efficient (e.g., by helping the user to achieve an intended result and reducing user mistakes when operating/interacting with the device) which, additionally, reduces power usage and improves battery life of the device by enabling the user to use the device more quickly and efficiently.

In some embodiments, while displaying the representation of image data (e.g., 806), the electronic device (e.g., 800) displays, on the display (e.g., 804), a visual indication (e.g., 834) that the image data includes depth map information (e.g., a "portrait mode" badge is optionally displayed to indicate the availability of depth map information).

In some embodiments, while the first lighting effect is applied, the electronic device (e.g., 800) maintains at least one value of a previously applied visual effect (e.g., bokeh, lighting). Thus, it is possible to achieve a light effect and a bokeh effect in one representation of the image data.

In some embodiments, the previously applied visual effect is a color filter.

In some embodiments, the second input is an input received while the first lighting effect is being applied to the representation of image data (e.g., 806) and applying the second lighting effect includes gradually transitioning between the first lighting effect and application of the second lighting effect (In some embodiments, gradually transitioning includes at a 1st time 100% 1st, 0% 2nd, at 2nd time, 90% first, 10% second, etc.). Gradually transitioning between lighting effects reduces user distraction created by flickering the filters on/off, thereby letting the user focus on taking the desired picture, thereby reducing the number of inputs required to capture the desired photo, reducing the memory requirements for storage of photos. Reducing the number of inputs needed to capture a desired image and reducing the memory requirements enhances the operability of the device and makes the user-device interface more efficient (e.g., by helping the user to achieve an intended result and reducing user mistakes when operating/interacting with the device) which, additionally, reduces power usage and improves battery life of the device by enabling the user to use the device more quickly and efficiently.

Note that details of the processes described above with respect to method 900 (e.g., FIGS. 9A-9D) are also applicable in an analogous manner to the methods described below and above. For example, method 700, 1100, 1300, 1500, 1700 optionally includes one or more of the characteristics of the various methods described above and with reference to method 900. For example, elements of the filter user interface, affordances, and controls from among the various methods can be combined. For another example, the viewfinder in method 900 is analogous to the viewfinder in methods 900, 1100, 1300, 1500, 1700. For brevity, these details are not repeated below.

In some embodiments, the electronic device 1000 includes some or all of the components of device 600, as illustrated in FIG. 6A. In some embodiments, the device 1000 includes multiple cameras 602 and 603 (e.g., on the rear of the electronic device 1000). In some embodiments, device 1000 includes one or more features of devices 100, 300, and/or 500. In some examples, the electronic device (e.g., 1000) has multiple cameras 602 and 603 with fixed, but different, focal lengths. In some examples, the multiple cameras are on the front, the back, or both sides of the electronic device (e.g., 1000). In some embodiments, in addition to having different fixed focal lengths, multiple cameras have different fixed fields of view and different fixed optical magnification properties. In some embodiments, the camera (e.g., 602) captures image data using a plurality of focal lengths. In some embodiments, one camera (e.g., 602) captures a plurality of focal lengths, thus, producing the same result as a plurality (e.g., more than one) of cameras with fixed, but different, focal lengths. In some examples, the electronic device (e.g., 1000) includes a depth camera, such as an infrared camera, a thermographic camera, or a combination thereof. In some examples, the device further includes a light-emitting device (e.g., light projector), such an IR flood light, a structured light projector, or a combination thereof. The light-emitting device is, optionally, used to illuminate the subject during capture of the image by a visible light camera and a depth camera (e.g., an IR camera) and the information from the depth camera and the visible light camera are used to determine a depth map of different portions of subject captured by the visible light camera. In some embodiments, the lighting effects described herein are displayed using disparity information from two cameras (e.g., two visual light cameras) for rear facing images and using depth information from a depth camera combined with image data from a visual light camera for front facing images (e.g., selfie images). In some embodiments, the same user interface is used when the two visual light cameras are used to determine the depth information and when the depth camera is used to determine the depth information, providing the user with a consistent experience, even when using dramatically different technologies to determine the information that is used when generating the lighting effects. In some embodiments, while displaying the camera user interface with one of the filters applied, the device detects selection of a camera switching affordance and switches from the front facing cameras (e.g., a depth camera and a visible light camera) to the rear facing cameras (e.g., two visible light cameras that are spaced apart from each other) (or vice versa) while maintaining display of the user interface controls for applying the filters and replacing display of the field of view of the front facing cameras to the field of view of the rear facing cameras (or vice versa).

As illustrated in FIG. 10A, the electronic device 1000 includes display 1004 which is touch sensitive (e.g., touch screen) and the display displays information received from the camera (e.g., 602). In some embodiments, the display is distinct from a touch sensitive surface. In some examples, the camera (e.g., 602) is positioned on the front, back, or both sides of the electronic device (e.g., 1000).

As shown in FIG. 10A, the electronic device 1000 displays, on the display 1004, a camera application user interface for capturing images with the camera (e.g., 602). The camera application user interface further includes a representation of image data (e.g., 1006) which includes a live preview of a field of view of a camera (e.g., 602). In some embodiments, including embodiment of FIG. 10A, the field of view of camera captures, in real time, depth information associated with the image data. FIG. 10A further illustrates the camera capturing depth levels in the field of view; including a subject (e.g., woman) in the foreground region (e.g., 1008) and a subject (e.g., woman) with trees surrounding the subject in the background region (e.g., 1010). In some embodiments, the representation of image data 1006 consists of the background region (e.g., 1008 and 1006) and the foreground region. As seen in FIG. 10A, because the image data includes depth map information, the electronic device 1000 applies a simulated depth effect (e.g., bokeh) (as exemplified by representation of the subject and the trees) to the representation of image data (e.g., 1006) before any other filter is applied.

Furthermore, in FIG. 10A, the electronic device 1000 displays a filter selection interface 1012 below the representation of image data 1006. In some embodiments, the filter selection interface overlaps the representation of image data. In some embodiments, the filter selection interface 1012 is positioned along an edge of the representation of image data 1006. In some examples, the filter selection interface is, displayed, by the electronic device 1000, above, below (as seen in FIG. 10A), to the left, or to the right of the representation of image data (e.g., 1006). As seen in FIG. 10A, the filter selection interface (e.g., 1012) includes one or more representation of filters (e.g., 1014A-1014C)(e.g., visual effects) arranged in a one or more of rows and columns or positioned in a circular orientation.

In some examples, the filter selection interface is delineated with an outline (e.g., a boundary) to distinguish the filter selection interface from the representation of image data. In some embodiments, the filter selection interface (e.g., 1012), is displayed as being translucent, semi-translucent, transparent, or semi-transparent and, as having no visible boundary. As a result, in some examples, the filter selection interface (e.g., 1012) appears to blend in (e.g., indistinguishable) on the display 1004 with the representation of image data (e.g., 1006).

As shown in FIG. 10A, the filter selection interface 1012 includes one or more filter representations (e.g., 1014A, 1014B, 1014C, 1014D) displayed on the display 1004 corresponding to visual effects. In some examples, the filter selection interface (e.g., 1012), optionally, includes filter representations which are not displayed (e.g., they are off screen). The filters representations which are not displayed filter representations, optionally, displayed upon an input (e.g., a swipe gesture) which would result in the filter representations to scroll through a filter selection location of the filter selection interface (e.g., 1012).

As illustrated in FIG. 10B, the electronic device 1000 receives an input (e.g., tap 1016) corresponding to a location of one of the filter representations within the filter selection interface 1012. In FIG. 10B, the filter corresponding to the location of the tap input is "Vivid Warm." In response to receiving the input, as illustrated in FIG. 10 the electronic device 1000 applies the corresponding filter (e.g., "Vivid Warm") to the representation of image data (e.g., 1006).

As illustrated in FIG. 10C, using the depth map information, the electronic device 1000 applies the selected filter (e.g., 1014C) differently to the background region (e.g., 1010) than the foreground region (e.g., 1008). The foreground region 1008 (including the woman in the front) is modified using a different filter value than the background region 1010 (e.g., woman and trees). As seen in FIG. 10C, the electronic device 1000 displays the background region using a warmer (depicted as darker) shade than the foreground region.

As further illustrated in FIG. 10C, the selected filter (e.g., Vivid arm") includes a color tone protection algorithm. The electronic device 1000 uses the depth map information associated with an image to minimize the color deviation from a predetermined color (or predetermined range of color tones) when a filter is applied. For example, the subject's skin color tone in the foreground region (1008) without the color tone protection algorithm would potentially drastically deviate from the original color tone, after application of the Vivid Warm filter. To address undesirable color tone deviation, the electronic device 1000 would apply the filter to the image representation, but would limit the change to a predetermined color tone (or predetermined range of color tones). Thus, in some examples, a color tone corresponding to a skin color tone may remain within a certain predetermined range. In contrast, color tones not associated with skin (e.g., blue or green) may be modified to a greater degree by the selected filter.

FIG. 10C further illustrates that the color tone protection algorithm applies the algorithm differently for a color tone that is in both the background region and the foreground region. For example, the subject in the background region (e.g., 1010) appears to have similar skin color tone as the subject in the foreground, and applying the "Vivid Warm" filter without any color correction to would potentially drastically deviate from the original skin color tone (e.g., would make the image look unrealistic). To correct for the color tone deviation, the electronic device 1000 would apply the filter to the image representation, but would limit the change to a predetermined color tone. Thus, in some examples, a color tone corresponding to a skin color tone may remain within a certain predetermined range. However, an acceptable range for color tone protection in the background is different than the acceptable range for color protection in the foreground (e.g., there is less, or even no, color tone protection for a tone in the background because it is not the focal point). Thus, as illustrated in FIG. 10C, the skin tone for the subject in the background region 1010 would change to a warmer tone than the skin tone for the subject in the foreground region 1008.

As illustrated in FIG. 10D, the electronic device detects tap 1018 at location 1020, which corresponds to a photo viewer application. In response to receiving tap 1018, the electronic device switches to an image viewing mode as illustrated in FIG. 10E.

FIG. 10E illustrates a user interface displayed for a photo viewer application. The photo viewer application includes a thumb strip of representations of previously captured images (e.g., 1020A-1020D) with 1020D being the last captured. The representation of image data (e.g., 1006) corresponding to last captured image (1020D) is displayed on the display 1004. In some examples, the previously captured images were captured using a camera corresponding to the electronic device (e.g., 1000). In some examples, the electronic device receives the previously captured images (e.g., 1020A-1020D) from a remote source (e.g., a server). In some examples, the previously captured images were captured with a different electronic device (e.g., not 1000).

FIG. 10E further illustrates that the last captured image does not have any depth map information associated with it (e.g., no visual indicator to signify depth map is present, no visible bokeh effect).

As illustrated in FIG. 10F, the electronic device detects tap 1022 at location 1024, which corresponds to a photo viewer editing mode (e.g., 1024). In response to receiving tap 1022, the electronic device switches to an image viewing mode as illustrated in FIG. 10G.

FIG. 10G, illustrates that, as described above with respect to FIG. 10A, a filter selection interface 1012 is displayed below the representation of image data 1006. In some examples, the filter selection interface (e.g., 1012) includes a one or more of representation of filters (e.g., 1014A-1014C) (e.g., visual effects) arranged in a one or more rows and columns or positioned in a circular orientation.

As illustrated in FIG. 10H, device 1000 detects tap 1026 the location of the "Vivid Warm" filter representation 1014C. In response to receiving tap 1026, the electronic device applies the Vivid Warm filter, which corresponds to the filter representation 1014C to the image representation and displays the result in FIG. 10I.

As illustrated in FIG. 10I, because the image data does not have depth information associated with it, the electronic device applies the "Vivid Warm" filter, evenly to the background region 1010 and to the foreground region 1008. Additionally, even though the image data does not have depth information association with the image, the color tone protection algorithm still applies the algorithm for a color tone that is in the image (e.g., it applies the color protection algorithm for the entire image uniformly). For example, the electronic device 1000 applies the color protection algorithm to both the subject's skin color tone (e.g., foreground and background) using the same value. Thus, as illustrated in FIG. 10C, after the electronic device applies a filter to the reorientation of image data, in some embodiments, the subjects' (e.g., foreground and background) skin color tone is displayed using the same filter value, which is a filter value that is different than that which was applied to the rest of the image.

As illustrated in FIG. 10J, the electronic device 1000 displays a color wheel indicator affordance 1028) overlaid on the representation of image data 1006.

As illustrated in FIG. 10K, device 1000 detects tap 1030 at the location of the color wheel indicator affordance 1028. In response to detecting tap 1030, as illustrated in FIG. 10L, the electronic device displays an expanded color wheel over the representation of image data. The color wheel allows a user to swipe through to rotate the wheel and to tap on any of the colors represented in the wheel so as to apply the selected color filter to the representation of image data.

As illustrated in FIG. 10M, device 1000 detects tap 1034 a location corresponding to a representation of color within the color wheel. In response to receiving tap 1032, the electronic device 1000 applies the selected color filter to the representation of image data 1006 as illustrated in FIG. 10N. As shown in FIG. 10N, visual indicator 1034 is displayed above the selected color filter to indicate the currently selected filter.

Figure 11B:
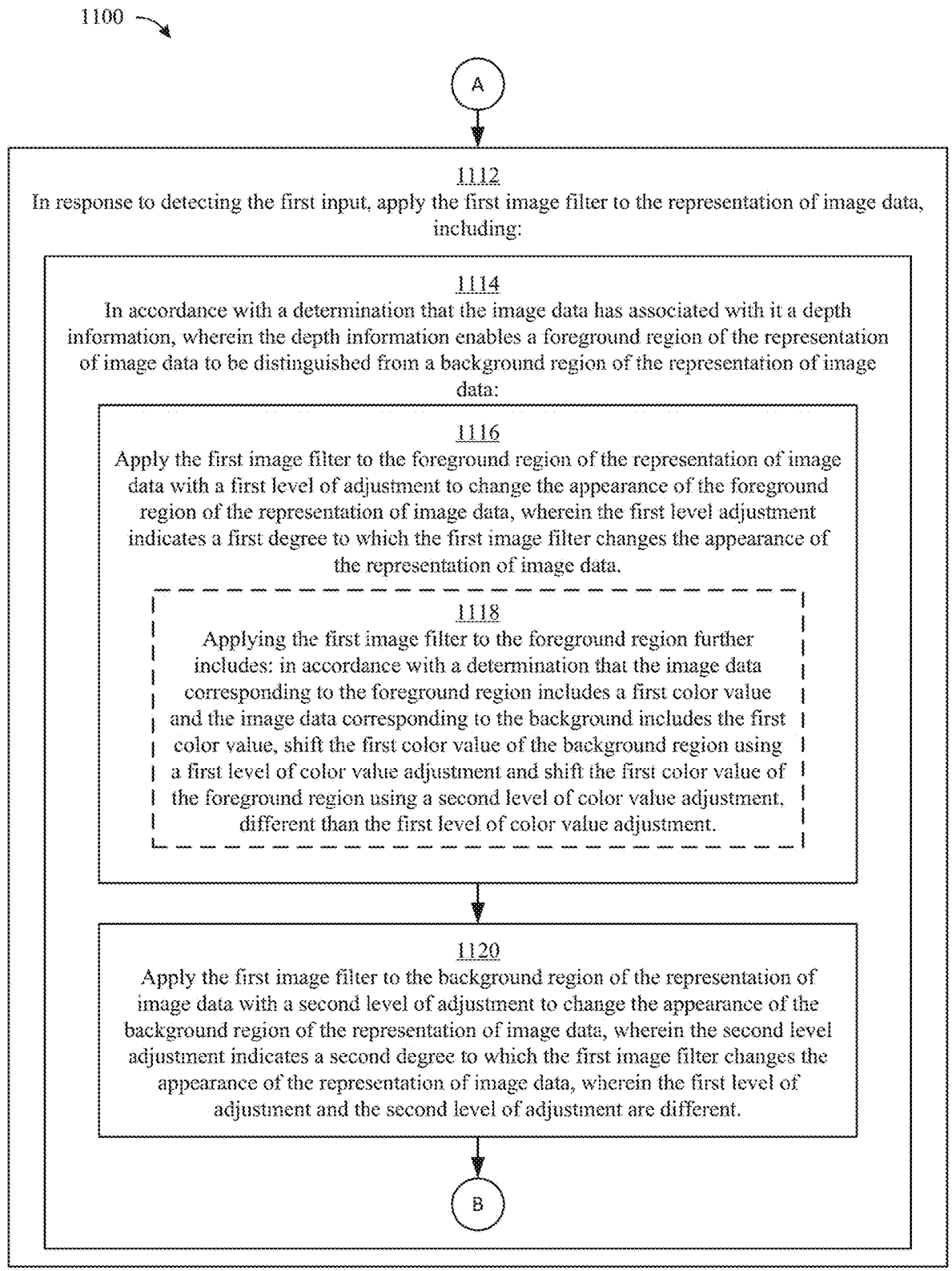

FIGS. 11A-11C are a flow diagram illustrating a method for applying a simulated visual effect to a representation of image data using an electronic device in accordance with some embodiments. Method 1100 is performed at a device (e.g., 100, 300, 500, 1000) with one or more input devices (e.g., a touch-sensitive surface, mouse, keyboard), and a display (e.g., 1004) (In some embodiments, the device has one camera. In some embodiments, the device has a plurality of camera, with each camera having a different focal length). Some operations in method 1100 are, optionally, combined, the orders of some operations are, optionally, changed, and some operations are, optionally, omitted.

As described below, method 1100 provides an intuitive way for applying a simulated visual effect to a representation of image data. The method reduces the cognitive burden on a user for providing inputs corresponding to functions, thereby creating a more efficient human-machine interface. For battery-operated computing devices, enabling a user to initiate various functions faster and more efficiently conserves power and increases the time between battery charges.

In some embodiments, at block 1102, the electronic device (e.g., 1000) concurrently displays, on the display (e.g., 1104): a representation of image data (e.g., 1006) (e.g., an image or photograph is displayed on the device's display (e.g., 1104)) and a filter selection interface (e.g., 1012).

At block 1104, the electronic device (e.g., 1000) detects, via the one or more input devices, a first input (e.g., 1016) that corresponds to selection of a first image filter (e.g., 1014C) (e.g., swipe, tap and hold, tap, button press at a location corresponding (e.g., on or near) to the first image filter (e.g., 1014C) (e.g., lighting filter, vivid, vivid warm vivid cool, dramatic, dramatic warm, dramatic cool, mono, silvertone, noir) of a representation of image data (e.g., 1006) that has a first appearance.

In some embodiments, at block 1106, the electronic device (e.g., 1000) further includes one or more cameras (e.g., 602 and/or 603) and the representation of the image data (e.g., 1006) is a live preview of image data captured within the field of view of the one or more cameras. In some embodiments, the device includes a plurality of cameras with varying focal lengths. In some embodiments, the image data and depth information is captured with the one or more cameras at the electronic device (e.g., 1000). In some embodiments, the device includes a plurality of cameras with varying focal lengths.

In some embodiments, at block 1108, the first input is detected while displaying a filter selection user interface (e.g., 1012).

In some embodiments, at block 1110, the filter selection user interface (e.g., 1012) includes a plurality of filter representations (e.g., 1014A-1014D) including a representation of the first image filter (e.g., 1014C), wherein the first input correspond to a selection of the representation of the first image filter (e.g., 1014C). The first filter is displayed as part of a set of one or more filter representations positioned in a row along an edge of the display (e.g., 1004). In some embodiments, the set of one or more filter representations (e.g., 1014A-1014D) directly border an edge of the display (e.g., 1004). In some embodiments, the filter representations (e.g., 1014A-1014D) are adjacent to, but do not abut the edge of the display (e.g., 1004). In some embodiments, the row is positioned along the short edge of the display (e.g., 1004). In some embodiments, the row is positioned along the long edge of the display (e.g., 1004). Displaying a plurality of filter representations provides the user with visual feedback that different selectable filters are available to be applied to the representation of the image data (e.g., 1006), and, optionally, that the different filters provide differing techniques for visualizing depth map information corresponding to the representation of the image data (e.g., 1006), thereby providing the user with additional information about the shape and positioning of objects in the representation of the image data (e.g., 1006). Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

At block 1112, in response to detecting the first input, the electronic device (e.g., 1000) applies the first image filter (e.g., 1014C) to the representation of image data (e.g., 1006), optionally including the techniques of blocks 1114-1126.

At block 1114, in accordance with a determination that the image data has associated with it a depth information, wherein the depth information enables a foreground region (e.g., 1008) of the representation of image data (e.g., 1006) to be distinguished from a background region (e.g., 1010) of the representation of image data (e.g., 1006) (e.g., depth map), the technique of blocks 1116-1120 are optionally performed. In some embodiments, the depth information is stored as a separate track of an image file. In some embodiments, the depth information is calculated using image data received from at least two cameras with different focal lengths.

At block 1116, the electronic device (e.g., 1000) applies the first image filter (e.g., 1014C) to the foreground region of the representation of image data (e.g., 1006) with a first level of adjustment to change the appearance of the foreground region (e.g., 1008) of the representation of image data (e.g., 1006), wherein the first level adjustment indicates a first degree to which the first image filter (e.g., 1014C) changes the appearance of the representation of image data (e.g., 1006). In some embodiments, the filter changes one or more of: color warmth, desaturation, color gradient, light intensity, contrast, hue shifting, brightness.

In some embodiments, at block 1118, applying the first image filter (e.g., 1014C) to the foreground region (e.g., 1008) further includes: in accordance with a determination that the image data corresponding to the foreground region (e.g., 1008) includes a first color value (e.g., hue value, tone value, one or more colors associated with skin tones) and the image data corresponding to the background includes the first color value, shifting (e.g., changing, modifying, replacing) the first color value of the background region (e.g., 1010) using a first level of color value adjustment and shifting (e.g., changing, modifying, replacing) the first color value of the foreground region (e.g., 1008) using a second level of color value adjustment, different than the first level of color value adjustment. In some embodiments, skin color in the background is colored differently than skin color in the foreground. In some examples, the skin tone color is modified so as to not drastically change the skin color's appearance. In some examples, the skin tone is not modified at all. In some embodiments, a filter is applied uniformly to the background even if a region in the background has a color tone corresponding to a skin tone. A different application of the filter includes eliminating a constraint on the filter from the foreground or the background (e.g., removing skin protection requirement on background) Applying different levels of color adjustment to similarly (or the same) colored objects based on whether they are in the foreground or background provides the user with visual feedback about the depth information corresponding to the image data, such as indicating that particular objects are in the foreground and different objects are in the background, and provides the user with visual feedback to differentiate objects in the foreground from similar objects in the background. Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

At block 1120, the electronic device (e.g., 1000) applies the first image filter (e.g., 1014C) to the background region (e.g., 1010) of the representation of image data (e.g., 1006) with a second level of adjustment to change the appearance of the background region (e.g., 1010) of the representation of image data (e.g., 1006). The second level adjustment indicates a second degree to which the first image filter (e.g., 1014C) changes the appearance of the representation of image data (e.g., 1006), wherein the first level of adjustment and the second level of adjustment are different.

At block 1122, after applying the first image filter (e.g., 1014C) to the representation of image data (e.g., 1006), the electronic device (e.g., 1000) displays, on the display (e.g., 1004), the representation of the respective image with the first filter applied to the representation of image data (e.g., 1006). In some embodiments, the result is displayed on the display (e.g., 1004). In some embodiments, the electronic device (e.g., 1000) displays the result in response to receiving the request to apply the first image filter (e.g., 1014C) to the respective image. Applying an image filter to the foreground and background with differing levels of adjustment and displaying the updated representation of the image data (e.g., 1006) provides the user with visual feedback regarding the depth information, and in particular which objects are identified as being in the foreground and which objects are identified as being in the background. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently. Further, applying an image filter to the foreground and background with differing levels of adjustment and displaying the updated representation of the image data (e.g., 1006) enables the electronic device to automatically apply filters to create a more dramatic effect without distorting the skin tone of subjects in the viewfinder that the user would otherwise have to manually correct after applying the filter. Applying a filter to relevant portions of the image and automatically avoiding distorting the skin tone of subjects without further user input enhances the operability of the device and makes the user-device interface more efficient (e.g., by helping the user to achieve an intended result and reducing the number of user inputs) which, additionally, reduces power usage and improves battery life of the device by enabling the user to use the device more quickly and efficiently.

In some embodiments, at block 1124, applying the first image filter (e.g., 1014C) to the representation of image data (e.g., 1006) further includes in accordance with a determination that the image data includes a third color value (e.g., hue value, tone value, one or more colors associated with skin tones), shifting (e.g., changing, modifying, replacing) the third color value using a third level of color value adjustment (e.g. certain color grading for skin tone protection). In some examples, the skin color is colored differently than the remaining portion of the image. In some examples, the skin tone color is modified so as to not drastically change the skin color's appearance. In some examples, the skin tone is not modified at all. In some examples, a different application of the filter includes eliminating a constraint on the filter from the image (e.g., removing skin protection requirement on background). For example, when depth information is not available, the device optionally applies skin protection algorithms when adjusting colors of the image to the entire image rather than just a foreground of the image. As such, some features in a background of the image that are close to skin tones that are protected by the skin protection algorithms, will not be shifted in color. Shifting colors of portions of the image data using a different (e.g., third level of color adjustment) technique provides the user with visual feedback about which portions of the image do not correspond to (or, alternative, do correspond to) a particular color, such as by shifting the color of skin tones differently from the background so that people with the particular skin tone are more easily distinguishable as compared to other objects. Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently. Further, shifting colors of portions of the image data using a different (e.g., third level of color adjustment) technique enables a more dramatic effect for the filter when depth information is available, while still avoiding distorting skin tones of subjects whether or not depth information is available, thereby avoiding the need for the user to manually correct skin tones later. Applying a filter to relevant portions of the image and automatically avoiding distorting the skin tone of subjects without further user input enhances the operability of the device and makes the user-device interface more efficient (e.g., by helping the user to achieve an intended result and reducing the number of user inputs) which, additionally, reduces power usage and improves battery life of the device by enabling the user to use the device more quickly and efficiently.

In some embodiments, at block 1126, in response to detecting the first input, applying the first image filter (e.g., 1014C) to the representation of image data (e.g., 1006): in accordance with a determination that the image data does not have associated with it depth information, the electronic device (e.g., 1000) uniformly applies the first image filter (e.g., 1014C) to the representation of image data (e.g., 1006) with the first level of adjustment (e.g., to uniformly change the appearance of the foreground region (e.g., 1008) of the representation of image data (e.g., 1006) and the background region (e.g., 1010) of the representation of image data (e.g., 1006)). Uniformly applying the image filter to the representation of the image data (e.g., 1006) provides the user with visual feedback about the state of the device, and in particular, that depth information is unavailable for the image data. Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently. Further, uniformly applying the image filter to the representation of the image data (e.g., 1006) enables a more dramatic effect for the filter when depth information is available, while still avoiding distorting skin tones of subjects whether or not depth information is available, thereby avoiding the need for the user to manually correct skin tones later. Applying a filter to relevant portions of the image and automatically avoiding distorting the skin tone of subjects without further user input enhances the operability of the device and makes the user-device interface more efficient (e.g., by helping the user to achieve an intended result and reducing the number of user inputs) which, additionally, reduces power usage and improves battery life of the device by enabling the user to use the device more quickly and efficiently.

In some embodiments, prior to detecting the first input, the electronic device (e.g., 1000) receives (e.g., from camera, from memory, from server), at the electronic device (e.g., 1000), image data represented by the representation of image data (e.g., 1006). In some embodiments, the image data includes RGB and depth map values. In some embodiments, image data and depth information is received from a source external to the electronic device (e.g., 1000) (e.g., the data is received from a server).

In some embodiments, while the first image filter (e.g., 1014C) is applied, the electronic device (e.g., 1000) maintains at least one value of a previously applied visual effect (e.g., bokeh, lighting). Thus, it is possible to achieve a light effect and a bokeh effect in one representation of the image data (e.g., 1006). Maintaining at least one value of a previously applied visual effect (e.g., bokeh, lighting) while the first image filter (e.g., 1014C) is applied alleviates the need for bulky lenses and equipment to create the bokeh effect.

In some embodiments, the electronic device (e.g., 1000) displays, on the display (e.g., 1004), a camera application user interface, wherein the camera application user interface includes: a digital viewfinder (that includes live or near-live preview images) including a live preview of a field of view of one or more cameras and a representation of a color wheel user interface (e.g., 1028) (e.g. an icon, affordance, button) at a first location overlaid on the digital viewfinder (e.g., an image, icon, textual representation indicating filter). In some embodiments, the representation of the color wheel user interface is displayed in response to user input (e.g., a tap on a color wheel affordance or a touch and hold gesture detected on the color wheel affordance).

In some embodiments, in response to detecting a second user input (e.g., 1030) corresponding to the representation of the color wheel user interface, the electronic device (e.g., 1000) ceases to display (e.g., 1004) the representation of the color wheel user interface (e.g., 1030), and displays, on the display (e.g., 1004), a color wheel user interface (e.g., 1031), wherein the color wheel user interface (e.g., 1031) displays a plurality of representations of color filters. In some embodiments, the color wheel is displayed as an arc, wheel, partial/full oval or circle.

In some embodiments, in response to detecting a third user input corresponding to an area corresponding to at least one of a representations of a color filter displayed within the color wheel user interface, the electronic device (e.g., 1000) applies the corresponding color filter to the image data to modify the color appearance of the representation of image data (e.g., 1006) (background, foreground, or both background and foreground).

For example, method 700, 900, 1300, 1500, 1700 optionally includes one or more of the characteristics of the various methods described above with reference to method 1100. For example, elements of the filter user interface, affordances, and controls from among the various methods can be combined. For another example, the viewfinder in method 1100 is analogous to the viewfinder in methods 700, 900, 1300, 1500, 1700. For brevity, these details are not repeated below.

As illustrated in FIG. 12A, in some embodiments, the electronic device 1200 includes display 1204 which is touch sensitive (e.g., touch screen) and the display displays information received from a camera (e.g., 1202). In some embodiments, device 1200 includes one or more features of devices 100, 300, and/or 500. In some embodiments, the display is distinct from a touch sensitive surface. In some examples, the camera (e.g., 1202) is positioned on the front, back, or both sides of the electronic device (e.g., 1200). In some embodiments, the electronic device 1200 includes some or all of the components of device 600, as illustrated in FIG. 6A. In some embodiments, the device 1200 includes multiple cameras 602 and 603 (e.g., on the rear of the electronic device 1200).

In some examples, the electronic device (e.g., 1200) has multiple cameras with fixed, but different, focal lengths. In some examples, the multiple cameras are on the front, back, or both sides of the electronic device (e.g., 1200). In some embodiments, in addition to having different fixed focal lengths, multiple cameras have different fixed fields of view and different fixed optical magnification properties. In some embodiments, the camera (e.g., 1202) captures image data using a plurality of focal lengths. In some embodiments, the camera (e.g., 1202) captures the plurality of focal lengths at a single time, thus, producing the same result as two or more cameras with fixed, but different, focal lengths.

FIG. 12A further illustrates, the electronic device 1200 displaying a camera application user interface for capturing images with a camera (e.g., 1202). The camera application user interface further includes representation of image data 1210 which includes a live preview of a field of view of a camera. In some embodiments, the field of view of camera captures, in real time, depth information associated with the image data. FIG. 12A further illustrates that the electronic device has applied the "Dramatic" filter to the representation of image data.

FIG. 12A further illustrates that the electronic device 1200 displays a filter selection interface 1206 below the representation of the image (e.g., 1210). In some embodiments, the filter selection interface (e.g., 1206) overlaps the representation of image data (e.g., 1210). In some embodiments, the filter selection interface (e.g., 1206) is displayed along an edge of the representation of image data (e.g., 1210). In some examples, the filter selection interface is displayed above, below (as shown in FIG. 12A), to the left, or to the right of the representation of image data (e.g., 1210). In some examples, the filter selection interface (e.g., 1206) includes one or more representation of filters (e.g., 1208A-1208G) (e.g., visual effects) arranged in a one or more of rows and columns or positioned in a circular orientation.

As shown in FIG. 12A, the filter selection interface (e.g., 1206) is displayed and is delineated with an outline (e.g., a boundary) to distinguish the filter selection interface (e.g., 1206) from the representation of image data (e.g., 1210). In some embodiments, the filter selection interface (e.g., 1206), is displayed as being translucent, semi-translucent, transparent, or semi-transparent and, in some embodiments, has no visible boundary. As a result, in some examples, the filter selection interface (e.g., 1206) appears to blend in (e.g., indistinguishable) with the digital viewfinder.

As shown in FIG. 12A, electronic device 1202 displays the filter selection interface 1206, which includes filter representations 1208A-1208G, corresponding to visual effects. In some examples, the filter selection interface (e.g., 1206), optionally, includes filter representations which are not displayed on the display (e.g., they are off screen). In some embodiments, the filter representations which are not displayed on the display are displayed when the electronic device detects an input (e.g., a swipe gesture) which would result in the filter representations to scroll through a filter selection location (e.g., 1212) of the filter selection interface (e.g., 1006).

As further illustrated in FIG. 12A, the electronic device displays the filter representations 1208A-1208G as icons (e.g., thumbnails) which depict the representation of the image data 1210 in an icon (e.g., smaller) form. For example, the representation of image data (e.g., 1210) that is displayed in the main part of the display is depicted within each of the filter representations. Additionally, in some embodiments, the filter representations include a filter associated with each respective filter representation applied, by the electronic device 1200, to each respective thumbnail image. Thus, a user is able to preview the respective filter's effect on the respective thumbnail image before activating the respective filter. In some embodiments, the name of the filter (e.g., "Dramatic" in FIG. 10A) associated with the filter representation within the filter selection location (e.g., 1212) is displayed above the filter selection interface (e.g., 1212). In some embodiments, the names of the filters associated with the filter representations are displayed within the filter representations (e.g., 1208A-1208G) overlaying the representation of the image. In some embodiments, the icons associated with the filter representations (e.g., 1208A-1208G) include the respective name of the filter associated with the respective filter representation within the filter representation without the representation of the image.

As further illustrated in FIG. 12A, a filter marker 1214 (e.g., a visual indicator is displayed, by the electronic device 1200 above at least one of a plurality of filter representations (e.g., 1208B) to designate a most recently filter. In some embodiments, the most recently filter is at least one filter which was preselected by the electronic device 1200 based on the last used filter in the currently selected mode (e.g., capture mode or post capture editing mode). In some examples, the most recently used filter is a filter which was predetermined by the electronic device 1200 based on the last used filter without regard to a specific mode (e.g., capture or edit). In some embodiments, a visual indicator may be displayed in association with a filter which is most frequently (e.g., number of times used in a predetermined time period) used by the user. In some embodiments, the visual indicator is displayed in association with a user-designated filter (e.g., a favorite filter). In some examples, a plurality of filters are designated as favorite filters and a plurality of visual indicators are displayed above the respective filter representations. In some examples, the visual indicator is displayed, by the electronic device, above, below, surrounding, or within the filter representations. In some embodiments, for a live preview, the filter representations include reduced scale live previews of the field of view of the camera with the corresponding filter applied to the live preview. In some embodiments, for a previously captured image, the filter representations include reduced scale copies of the image with the corresponding filter applied to the image. In some embodiments, the visual indicator is an image, text, or an affordance. In some examples, the plurality of visual indicators vary in color and/or shape based on predetermined criteria.

FIG. 12A further illustrates representation 1216 of contact (e.g., touch input) characteristic intensity, as detected by device 1200. Representation 1216 includes indicators corresponding to an initial intensity threshold, $IT_0$, an intermediate intensity threshold, $IT_1$, and a high intensity threshold, $IT_2$. As will be describes below, in some embodiments, the amount of representations of filters in the filter selection interface will change based on the intensity of the input.

FIG. 12B illustrates the electronic device detecting a press input 1218 at a location corresponding to filter representation 1208C. As illustrated in FIG. 12B press input 1218 has a characteristic intensity greater than initial intensity threshold, $IT_0$.

FIGS. 12C-12F illustrate a collapsing effect (e.g., a compressing effect) of some of the filter representations when the electronic device detects an input with a sufficient characteristic intensity on one of the filter representations (e.g., 1208A-1208G). As a result of the collapsing effect, the filter selection interface 1206 is displayed with fewer filter representations then before the collapsing effect. Fewer filter presentations in the filter selection interface can allow a user to more quickly traverse the filter representations. In some examples, the collapsed effect occurs in response to the electronic device 1200 receiving a tap and hold input (e.g., an input that exceeds a predetermined amount of time).

As illustrated in FIG. 12C, device 1200 continues to detect input 1218 at the location corresponding to the filter representation 1208C. Furthermore, FIG. 12C illustrates that the characteristic intensity of the input has gone up past the intermediate intensity threshold of $IT_1$. Because the input has been interpreted to have a sufficient characteristic intensity greater than $IT_1$, some of the representations of filters (e.g., 1208C, 1208E, 1208F, 1208G) appear to collapse toward the filter selection location (e.g., 1212) and appear as though they are being removed from the display. In some embodiments, some of the filter representations (e.g., 1208C) collapse to the right. In some embodiments, some of the representations of filters (e.g., 1208E) collapse to the left. In some examples, the filter representations appear to fade out as they are removed from the display. In some examples, instead of collapsing towards the filter selection location (e.g., 1212), the filter representations begin to slide off the display. In some examples, instead of collapsing toward the filter selection location 1212, the filter representations collapse toward the filter representation corresponding to the location of the input (e.g., the location of filter representation 1208C).

FIG. 12C further illustrates that even though the electronic device has begun the collapsing effect, the filter applied to the representation of image data 1210 does not change from the filter that was applied in FIG. 12B. In some examples, a filter representation in the filter selection location 1212 changes when filter representations begin to collapse. In some examples, the filter representation corresponding to the input location would begin to move into the selection location (e.g., 1212). As the filter in the selection location changes, the filter which is applied to the representation of image data 1210 changes to the filter associated with the new filter representation in the filter selection location 1212.

FIG. 12C further illustrates that the electronic device 1200 generates, via tactile output generator, haptic feedback (e.g., a sequence of one or more tactile outputs) 1220 during the activation of the collapsing effect. In some embodiments, the electronic device does not generate any haptic feedback during the activation of collapsing effect. In some embodiments, haptic feedback is generated to indicate completion of the collapsing effect.

FIG. 12D illustrates the electronic device detecting an increase in the characteristic intensity of input 1218. In some embodiments, as the characteristic intensity of the press input increases, the collapsing effect increases and some of the filter representations continue to gravitate towards the selection location (e.g., 1212). FIG. 12D further illustrates the electronic device continuing to generate haptic feedback (e.g., a sequence of tactile outputs) during the collapsing effect.

FIG. 12E illustrates the electronic device continuing to detect an increase in the characteristic intensity of the input 1218. In FIG. 12E, some of the filter representations appear to be almost completely collapsed (e.g., barely visible). In FIG. 12E, the electronic device no longer generates haptic feedback (e.g., a sequence of one or more tactile outputs) because the intensity of the input has almost reached the high intensity threshold, $IT_2$. In some embodiments, the electronic device continues to generate haptic feedback (e.g., a sequence of one or more tactile outputs).

In some examples, if the electronic device (e.g., 1200) ceases to detect the input (e.g., 1218) during the transitional collapsing effect (e.g., the collapsing effect as represented in FIGS. 12C-E) and the characteristic intensity of the input is below a particular threshold (e.g., high intensity threshold $IT_2$), the electronic device will perform an expanding effect (e.g., the collapsing effect in reverse), restoring the filter selection interface to its expanded state (e.g., as seen in FIG. 12A). Thus, in some embodiments, if the electronic device detects a lift-off, the electronic device will cease the collapsing effect and the user interface will revert to the state (e.g., expand) as shown in FIG. 12A.

As illustrated in FIG. 12F, the electronic device 1200 detects that characteristic intensity of the input has exceed the high intensity threshold, $IT_2$. Consequently, the electronic device has completed the collapsing effect and only three filter representations are displayed in the filter selection interface 1206. In some embodiments, because the filter representation within the filter selection location 1212 at the time when the initial input (e.g., 1218 in FIG. 12B) was received is not associated with a "No Filter" option or a last used filter option, the three filter representations displayed in the filter selection interface are the currently selected filter representation (e.g., the filter representation in the filter selection location 1212), the last used filter (e.g., 1208B) or a favorite filter, and "No Filter" representation (e.g., 1208H). In some embodiments, if the filter interface includes a plurality of recently used or favorite filter representations, then the condensed filter interface would include the corresponding last used filter representations and the total amount of filter representations in the condensed filter interface would exceed three.

In some examples, when the filter representation within the filter selection location 1212 at the time when the initial input (e.g., 1218 in FIG. 12B) is received, at the electronic device 1200, is associated with a "No Filter" representation, two filter representations are consequently displayed in the reduced filter selection interface (e.g., the collapsed interface). The two filter representations include the last used filter (e.g., 1208B) representation, and "No Filter" representation (e.g., 1208H).

In some examples, when the filter representation within the filter selection location 1212 at the time when the initial input (e.g., 1218 in FIG. 12B) is received, at the electronic device 1200, is associated with a last used filter representation, two filter representations are consequently displayed in the reduced filter selection interface (e.g., the collapsed interface). The two filter representations include the last used filter (e.g., 1208B) representation, and "No Filter" representation (e.g., 1208H). Thus, in some embodiments, the device only maintains, in the fully collapsed state, filter representations that meet one or more of the following parameters: a currently selected filter representation, a "No Filter" representation, or a last used or favorite filter representation.

As illustrated in FIG. 12G, while the filter selection interface is in the collapsed state, the electronic device 1200 detects a swipe 1222 at a location corresponding to the most recently used filter 1208B to change the filter representation displayed in the filter selection location 1212. As shown in FIG. 12G, the swipe input 1222 is a continuation of input 1218 (e.g., occurs without an intervening lift-off). In some embodiments, even though the swipe input 1222 is maintained on the display, the characteristic intensity of the input 1222 drops below the high threshold, $IT_2$, but is still above the initial intensity threshold, $IT_0$. In some embodiments, even though the characteristic intensity of the input 1222 is below the high intensity threshold $IT_2$, the filter selection interface remains in the condensed (e.g., collapsed) mode until the electronic device detects a lift-off event (e.g., intensity drops below the initial intensity threshold, $IT_0$). In some embodiments, swipe input 1222 is a separate input, and the filters remain in the collapsed mode until the user taps or presses again.

FIGS. 12H-12I illustrate the result of the electronic device receiving the swipe input 1222 in FIG. 12G. FIG. 12H illustrates a transition user interface while the electronic device 1200 detects the swipe input 1222. In some embodiments, as the swipe input 1222 moves along the display, the filter representation displayed within the filter selection location 1212 gradually changes. In some examples, as the filter representation in the selection location changes, the filter corresponding to the filter selection location is gradually applied to the representation of image data (e.g., 1210). In some examples, the electronic device outputs a tactile feedback when the filter representations switch in the selection location (e.g., 1212).

FIG. 12I illustrates the user interface after changing the filter representations in the selection location (e.g., 1212). As a result, the last used filter (e.g., 1208B) is now displayed within the selection location. Additionally, the filter corresponding to the last used filter (e.g., "Vivid Warm" 1208B) is applied, by the electronic device, to the representation of image data 1210. FIG. 12I further illustrates that electronic device continues to detect the input (e.g., 1222).

FIG. 12J illustrates the user interface when the electronic device 1200 ceases to detect input (e.g., 1222) in FIG. 12I. In some embodiments, when a user lifts off his/her finger from the touch sensitive display, the electronic device 1200 detects that the characteristic intensity of input drops below the initial intensity threshold $IT_0$. Consequently, as illustrated in FIG. 12J, in some embodiments, the filter representations begin to visually expand within the filter selection interface 1206 upon the electronic device detecting a lift off command.

FIG. 12K illustrates the user interface after the electronic device completes the expanding process in FIG. 12J. Once the filter representations are expanded, all of the representations of filters are displayed within the filter selection interface. In some embodiments the filter representation that was displayed in the filter selection location 1212 when the filter selections interface was condensed (e.g., as represented in FIG. 12I) remains displayed within the filter selection location 1212 when all the filters are fully displayed in FIG. 12K. In some embodiments, when all of the filter representations expand, some of the filters remain off the visible portion of the display 1204. In some embodiments, a used can swipe at a location corresponding to the filter selection interface to scroll the list of filter representations from off the display to on the display.

As illustrated in FIG. 12L, the electronic device 1200 detects a swipe input 1226 at a location corresponding to a location of the filter selection interface 1206. As a result of the swipe input 1226, as illustrated in FIG. 12M, the filter representations are scrolled through the filter selection location 1212. As FIG. 12L shows, the previously displayed filter representation, "Vivid Warm" is gradually removed from the selection location and a new filter representation "None" is displayed in the selection location. In some embodiments, the filter representation "None" does not correspond to any specific filter, rather it corresponds to no filter being applied to the representation of image data 1210. In some examples, as the filter representation is changed from "Vivid Warm" to "None," the "Vivid Warm" filter is gradually removed, by the electronic device 1200, from being applied to the representation of image data 1210.

As illustrated in FIG. 12N, the electronic device 1200 detects an input with a characteristic intensity beyond the high threshold, $IT_2$. As a result of detecting the input with a characteristic intensity, some of the filter representations have collapsed (e.g., condensed) on the user interface so as they are no longer visible. In some embodiments, two filter representations remain displayed within the filter selection location 1212. As shown in FIG. 12N, because the electronic device detects an input when the "None" filter representation is displayed within the filter selection location 1212, the "None" filter representation location remains in the selection interface when the filter are collapsed in addition to the representation of the most recently used filter (e.g., the filter with a visual indicator above it).

As illustrated in FIG. 12O, the electronic device 1200 detects a swipe input 1228 at a location corresponding to a location of the filter selection interface 1206. In some embodiments, as a result of the swipe input 1228, as illustrated in FIG. 12O, the filter representations are scrolled through the filter selection location 1212. As shown in FIG. 12O, the previously displayed filter representation, "None" is gradually removed from the filter selection location. As shown in FIG. 12O, a new filter representation, "Vivid Warm" is displayed in the filter selection location 1212. In some examples, the filter corresponding to the new filter representation, "Vivid Warm" is gradually applied to the representation of image data (e.g., 1210) when the filter scrolls into the filter selection location 1212.

In some examples, the collapsing effect as described above with reference to FIGS. 12A-12P is optionally implemented, by the electronic device 1200, within an image viewer application and/or an image editing application and would function similarly described above.

FIGS. 13A-13F are a flow diagram illustrating a method for simplifying a user interface using an electronic device in accordance with some embodiments. Method 1300 is performed at a device (e.g., 100, 300, 500, 1200) with one or more input devices (e.g., a touch-sensitive surface, keyboard, mouse) and a display (e.g., touch-sensitive display). In some embodiments, the device includes a touch-sensitive display. Some operations in method 1300 are, optionally, combined, the orders of some operations are, optionally, changed, and some operations are, optionally, omitted.

As described below, method 1300 provides an intuitive way for simplifying a user interface. The method reduces the cognitive burden on a user for providing inputs corresponding to functions, thereby creating a more efficient human-machine interface. For battery-operated computing devices, enabling a user to initiate various functions faster and more efficiently conserves power and increases the time between battery charges.

At block 1302, the electronic device (e.g., 1200) displays, on the display (e.g., 1204), a filter selection interface (e.g., 1206) which includes representations of a plurality of filters (e.g., 1208A-1208G) in a set of filters (e.g., the filter selection mode displays all of the filters).

In some embodiments, at block 1304, a representation of a first filter (e.g., 1208A) corresponds to a no filter option and wherein the first subset of representations of filters includes two or more (e.g., all) filters of the plurality of filters except the representation of the first filter (e.g., 1208C) and a representation of a fourth filter corresponding to a most recently applied filter (e.g., 1208B). Reducing the number of representations of filters displayed in response to the user input corresponding to selection of the first filter provides the user with feedback that limits the filters to a subset that is curated based on the type of the first filter, thereby decluttering the display by removing display of filters that the user is less likely to use and making filters the user is likely to use more readily accessible with less user inputs. Providing improved visual feedback to the user and reducing the number of inputs required to perform an operation enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 1306, the representation of the first filter (e.g., 1208B) corresponds to a most recently used filter option and wherein the first subset of representations of filters includes two or more (e.g., all) filters of the plurality of filters except the representation of the first filter (e.g., 1208B) and a representation of a fifth filter (e.g., 1208A) corresponding to a no filter option. Reducing the number of representations of filters displayed in response to the user input corresponding to selection of the first filter provides the user with feedback that limits the filters to a subset that is curated based on the type of the first filter, thereby decluttering the display by removing display of filters that the user is less likely to use and making filters the user is likely to use more readily accessible with less user inputs. Providing improved visual feedback to the user and reducing the number of inputs required to perform an operation enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 1308, the representation of the first filter (1208C) does not correspond to the most recently applied filter and does not correspond to a no filter option and wherein the first subset of representations of filters includes two or more (e.g., all) filters of the plurality of filters except the representation of the first filter (e.g., 1208C), the representation of a sixth filter corresponding to a most recently applied filter (e.g., 1208B), and the representation of a seventh filter corresponding to a no filter option (e.g., 1208A). In some embodiments, the second subset of representations of filters contains filters from a favorite list of filters which are displayed when the second subset is activated. In some embodiments, the favorite list of filters is determined based on the most frequently used filters. In some embodiments, the favorite list of filters is a customizable list of filters. Reducing the number of representations of filters displayed in response to the user input corresponding to selection of the first filter provides the user with feedback that limits the filters to a subset that is curated based on the type of the first filter, thereby decluttering the display by removing display of filters that the user is less likely to use and making filters the user is likely to use more readily accessible with less user inputs. Providing improved visual feedback to the user and reducing the number of inputs required to perform an operation enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 1310, the representation of the first filter in the filter selection interface (e.g., 1206) includes a live preview (e.g., 1210) of the field of view of the one or more cameras (e.g., 1202) of the device with the first filter applied (e.g., color shift, lighting effect, sharpening, blurring). Including live previews as part of the representations of the filters provides the user with visual feedback about the effects that will result if the filters is applied, thus reducing the need for the user to provide numerous inputs to select the various filters to receive the feedback. Providing improved visual feedback to the user and reducing the number of inputs required to perform an operation enhance the operability of the device and make the user-device interface more efficient (e.g., by helping the user to provide proper inputs and reducing user mistakes when operating/ interacting with the device) which, additionally, reduces power usage and improves battery life of the device by enabling the user to use the device more quickly and efficiently.

In some embodiments, at block 1312, the representation of the second filter in the filter selection interface (e.g., 1206) includes a live preview (e.g., 1210) of the field of view of the one or more cameras (e.g., 1202) of the device with the second filter applied. In some embodiments, if the first filter correspond to a no filter option, then applying visual effect to an image will not alter the image's appearance. Including live previews as part of the representations of the filters provides the user with visual feedback about the effects that will result if the filters is applied, thus reducing the need for the user to provide numerous inputs to select the various filters to receive the feedback. Providing improved visual feedback to the user and reducing the number of inputs required to perform an operation enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 1314, the filter selection interface (e.g., 1206) further includes visual indicator (e.g., 1214)(e.g., dot) identifying a representation of a third filter (e.g., above a filter), wherein the third filter is a most recently used filter. In some embodiments, the visual indicator (e.g., 1214) represented the most frequently used filter (e.g., based on filters that have been applied to images in a photo library or camera roll of the device). In some embodiments, a plurality of indicators are displayed which represent a predetermined number most recently used, or favorite (e.g., filters explicitly marked by the user as favorite filters or filters that the user most frequently uses), filters. In some embodiments, the most recently used filter is determined based on the currently selected camera mode (e.g., the most recently used filter is a filter that was most recently used on a photo that was captured in the currently selected camera mode or that was most recently used when capturing a photo in the currently selected camera mode). In some embodiments, the most recently used filter is based on the most recently used filter in any camera mode and thus the most recently used filter is the same even if the device switches from one camera mode to another camera mode. Including a visual indicator identifying the most recently used filter provides the user with visual feedback about recently applied filtering techniques such that the user is less likely to need to switch among multiple filters to identify the most recently used filter, thereby reducing the number of inputs required to identify and activate the most recently used filter. Providing improved visual feedback to the user and reducing the number of inputs required to perform an operation enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 1316, while concurrently displaying, on the display (e.g., 1204), a representation of image data (e.g., 1210) (e.g., a previously captured photograph, a preview based on data received from the first camera, image received from a server) and the filter selection interface (e.g., 1206), the electronic device (e.g., 1200) detects, at block 1318, via the one or more input devices, a first input (e.g., 1228) (e.g., swipe, tap and hold, tap, hard press (3-D touch), button press) at a location corresponding (e.g., on or near the filter indicator affordance) to the filter selection interface (e.g., 1206) while a first filter of the set of filters satisfies selection criteria.

In some embodiments, at block 1320, the first filter satisfies the selection criteria when the first input (e.g., 1218)

is detected at a location that corresponds to the first filter. The first filter satisfying the selection criteria when the input is at a location corresponding to the first filter (and, for example, not satisfying the selection criteria when the input is not at a location corresponding to the first filter) enables the user to provide a targeted input to cause the device to reduce the number of displayed filter representations, thereby reducing the number of required inputs to select a filter. Reducing the number of inputs needed to perform an operation enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, at block 1322, the first filter satisfies the selection criteria when the representation of the first filter is at a selection location (e.g., 1212) (e.g., a location that corresponds to a filter that is currently being applied to the representation of image data, a focus position (e.g., 1210)) when the first input (e.g., 1218) is detected (e.g., when the increase in intensity of the contact is detected). The first filter satisfying the selection criteria when the representation of the first filter is selected at the time that the input is detected (and, for example, not satisfying the selection criteria when the representation of the first filter is not selected at the time that the input is received) enables the user to provide targeting information to cause the device to reduce the number of displayed filter representations, thereby reducing the number of required inputs to select a filter. Reducing the number of inputs needed to perform an operation enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, at block 1324, the first input (e.g., 1218) corresponds to a contact on the touch-sensitive display, and at block 1326, the contact has a characteristic intensity greater than a first intensity threshold (e.g., a hard press). The device determining that a characteristic intensity of the first input (e.g., 1218) exceeds the first intensity threshold and, in response, ceasing to display the first subset of filters while continuing to display the second subset of filters provides the device with the ability to disambiguate various inputs received at the same location on the touch-sensitive display and to perform an appropriate operation, thereby reducing the number of inputs needed. Reducing the number of inputs needed to perform an operation enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

At block 1328, in response to detecting the first input (e.g., 1218), the electronic device (e.g., 1200) optionally performs the techniques of blocks 1330-1338.

At block 1330, the electronic device (e.g., 1200) ceases to display (e.g., fully/partially remove from the full set, shrink) a first subset of representations of filters (e.g., at least one) of the set of filters. At block 1332, the first subset of representations of filters of the set of filters includes, at block 1334, one or more filters in a first direction from the representation of the first filter in the filter selection user interface (e.g., one or more representations of filters to the right of the representation of the first filter) and, at block 1336, one or more filters in a second direction from the representation of the first filter (e.g., one or more representations of filters to the left of the representation of the first filter). Reducing the number of displayed filter representations by ceasing to display the first subset of filters and maintaining display of the second subset of filter representations, in response to detecting the first input, provides the user with visual feedback of relevant filter options, reduces clutter on the user interface, and requires less user inputs to navigate among filters to find a desired filter. Providing visual feedback and reducing the number of inputs needed to perform an operation enhance the operability of the device and make the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

At block 1338, the electronic device (e.g., 1200) maintains display of a second subset of representations of filters of the set of filters, the second subset of representations of filters including at least the representation of the first filter. In some embodiments, a subset of the initial set of filters are maintained on screen. In some embodiments, maintaining filters on screen involves shifting the position of the filters while maintaining the filters on screen).

In some embodiments, at block 1340, the first subset of representations of filters includes two or more (e.g., all) filters of the plurality of filters except those at blocks 1342-1346. At block 1342, the first subset of representations of filters includes two or more (e.g., all) filters of the plurality of filters except the representation of the first filter and a representation of a fourth filter corresponding to a most recently applied filter.

In some embodiments, at block 1344, the first subset of representations of filters includes two or more (e.g., all) filters of the plurality of filters except the representation of the first filter and a representation of a fifth filter corresponding to a no filter option.

In some embodiments, at block 1346, the first subset of representations of filters includes two or more (e.g., all) filters of the plurality of filters except the representation of the first filter, the representation of a sixth filter corresponding to a most recently applied filter, and the representation of a seventh filter corresponding to a no filter option.

In some embodiments, the electronic device (e.g., 1200) includes a touch-sensitive display, the first input (e.g., 1218) corresponds to a first contact on the touch-sensitive display, and at block 1348, while continuing to detect the first contact on the display (e.g., 1204) after detecting the first input (e.g., 1218), the technique of blocks 1350 and 1352 are performed. At block 1350, the electronic device (e.g., 1200) detects movement of the first contact. At block 1352, the electronic device (e.g., 1200) displays, on the display (e.g., 1204), a representation of the image data with an applied visual effect corresponding to the second filter (e.g., color shift, lighting effect, sharpening, blurring) (e.g., and ceasing to display, on the display (e.g., 1204), a representation of the image data with an applied visual effect corresponding to the first filter to the image data). Updating the representation of the image data to reflect the second filter in response to detecting movement of the contact provides the user with feedback about the state of the device, and in particular, provides visual feedback corresponding to the activated filter. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, in response to detecting movement of the first contact the electronic device (e.g., 1200) ceases to display a representation of the first filter at a second selection location (e.g., 1212) and displays a representation of the second filter at the second selection location (e.g., 1212). (e.g., moving the representation of the second filter into the "currently selected" filter position on the display (e.g., 1204) and removing the representation of the first filter from the "currently selected" filter position on the display (e.g., 1204))

In some embodiments, the electronic device (e.g., 1200) includes a touch-sensitive display, at block 1354, the first input (e.g., 1218) corresponds to an increase in characteristic intensity (e.g., 1216) of a contact on the touch-sensitive display, and in response to detecting the increase in the characteristic intensity of the contact, the electronic device (e.g., 1200) dynamically shifts the position, on the display (e.g., 1204), of the first filter representation toward the focal point. In some embodiments, as the position of the first filter representations move toward the focal point, representations of other filters that are not in the second subset of representations of filters fade out and/or decrease in size as the intensity of the contact increases. In some embodiments, the representations of other filters that are not in the second subset of representations of filters shrink down in one or more dimensions (e.g., by being stretched or compressed in a horizontal direction as representations of filters in the second subset of representations of filters move toward the focal point). Dynamically shifting the position of the first filter representation toward the focal point as the user increases the characteristic intensity of the contact provides the user with feedback about the level of intensity that is being detected by the device based on the user's input and provides visual feedback to the user indicating that pressing harder will cause the device to perform an operation associated with the user interface element. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first input (e.g., 1218) corresponds to a contact on the touch-sensitive display having a first contact portion and a second contact portion; the first contact portion has a first characteristic intensity; the second contact portion has a second characteristic intensity; and the method further includes: in accordance with a determination that the first characteristic intensity is greater that a second intensity threshold (e.g., collapsing threshold at which compression of the filter selection interface (e.g., 1206) begins) and less than a third intensity threshold, gradually shifting the position, on the display (e.g., 1204), of the first filter representation (e.g., filter representations move towards the focal point); and in accordance with a determination that the second characteristic intensity is greater than the third intensity threshold (e.g., collapsing threshold at which compression of the filter selection interface (e.g., 1206) ends (e.g., the point at which the first subset ceases to be displayed)), cease shifting the position of the first filter representation.

In some embodiments, at block 1356, the electronic device (e.g., 1200) detects a decrease in the characteristic intensity of the contact while continuing to detect the contact on the touch-sensitive display. In some embodiments, at block 1358, in response to detecting the decrease in the characteristic intensity of the contact, blocks 1360-1362 are optionally performed.

In some embodiments, at block 1360, in accordance with a determination that the characteristic intensity of the contact reached a respective intensity threshold (e.g., 1216) prior to detecting the decrease in the characteristic intensity of the contact (e.g., a threshold intensity for ceasing to display the first subset of filters), the electronic device (e.g., 1200) maintains display of the second subset of representations of filters without displaying the first subset of representations of filters.

In some embodiments, at block 1362, in accordance with a determination that the characteristic intensity of the contact did not reach the respective intensity threshold (e.g., 1216) prior to detecting the decrease in the characteristic intensity of the contact (e.g., a threshold intensity for ceasing to display the first subset of filters), the electronic device (e.g., 1200) dynamically shifts the position, on the display (e.g., 1204), of the first filter representation away from the focal point. In some embodiments, as the position of the first filter representations move away from the focal point they increase in size.

Maintaining display of the second subset of filters or dynamically shifting the position of the first filter as the user decreases the characteristic intensity of the contact provides the user with feedback about the level of intensity that was detected by the device based on the user's input reached the respective intensity threshold (e.g., 1216), and provides visual feedback to the user indicating whether the user needs to press harder to cause the device to perform an operation associated with the user interface element. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to displaying the representation of the image data, receiving (e.g., from camera, from memory, from server), at the electronic device (e.g., 1200), image data wherein the image data correspond to the representation of image data (e.g., 1210). In some embodiments, the image data includes RGB and depth map values. In some embodiments, image data and depth information is received from a source external to the electronic device (e.g., 1200) (e.g., the data is received from a server).

In some embodiments, further in response to detecting movement of the contact, the electronic device (e.g., 1200) provides a tactile output that indicates that the filter applied to the image data has been changed. In some examples, the electronic device (e.g., 1200) provides a tactile output when switching between different filters. Performing a tactile output when switching between different filters provides the user with additional feedback about changes to the state of the selected filter and helps the user perform operations more efficiently. Providing improved feedback enhances the operability of the device and makes the user-device interface more efficient (e.g., by helping the user to achieve an intended result and reducing user mistakes when operating/interacting with the device) and, additionally, reduces power usage and improves battery life of the device.

In some embodiments, prior to detecting the first input (e.g., 1218), while a third filter is at the second selection location (e.g., 1212), and while displaying the first subset of representations, the electronic device (e.g., 1200) detects movement of a second contact on the touch-sensitive display. In response to detecting movement of the second contact, the electronic device (e.g., 1200): ceases to display a representation of a third filter at the second selection location (e.g., 1212), displays a representation of a fourth filter at the second selection location (e.g., 1212), applies a visual effect corresponding to the fourth filter to the image data (e.g., color shift, lighting effect, sharpening, blurring), and displays, on the display (e.g., 1204), a representation of the image data with the applied visual effect, wherein the first contact is the second contact. Transitioning among filters in response to detecting movement of the second contact enables the user to easily switch among filters (rather than just favorite or recent filters) without requiring a hard press, thereby improving the ability to accurately target a desired filter. Providing improved targeting capabilities enhances the operability of the device and makes the user-device interface more efficient (e.g., by helping the user to achieve an intended result and reducing user mistakes when operating/interacting with the device) and, additionally, reduces power usage and improves battery life of the device.

In some embodiments, the electronic device (e.g., 1200) includes a touch-sensitive display and wherein the first input (e.g., 1218) corresponds to a contact on the touch-sensitive display. While maintaining display of the second subset of representations of filters without displaying the first subset of representations of filters, the electronic device (e.g., 1200) detects liftoff of the contact. In response to detecting liftoff of the contact, the electronic device (e.g., 1200) restores display the first subset of the representations of filters. Restoring display of the first subset of the representations of filters in response to detecting liftoff of the contact reduces the number of user inputs required to access the first subset of the representations of filters. Reducing the number of inputs required to perform an operation enhances the operability of the device and makes the user-device interface more efficient (e.g., by helping the user to achieve an intended result and reducing user mistakes when operating/interacting with the device) and, additionally, reduces power usage and improves battery life of the device.

In some embodiments, the electronic device (e.g., 1200) includes a touch-sensitive display. While not displaying the first subset of representations of filters and while maintaining display of the second subset of representations of filters, the electronic device (e.g., 1200) detects an input that includes an increase in intensity of a contact. In response to detecting the input, in accordance with a determination that the input included an increase in a characteristic intensity of the contact from a characteristic intensity below a fourth intensity threshold to a characteristic intensity above than the fourth intensity threshold contact having the characteristic intensity greater than the fourth intensity threshold, the electronic device (e.g., 1200) restores display the first subset of representations of filters. In response to detecting the input, in accordance with a determination that the input did not include an increase in a characteristic intensity of the contact from a characteristic intensity below the fourth intensity threshold to a characteristic intensity above than the fourth intensity threshold contact having the characteristic intensity greater than the fourth intensity threshold, the electronic device (e.g., 1200) maintains display of the second subset of representations of filters without displaying the first subset of representations of filters. Restoring display of the first subset of representations of filters when the characteristic intensity of the input increases above the threshold and maintaining display of the second subset of representations of filters when the characteristic intensity of the input does not increase above the threshold provides the user with a preview of operations (when the user presses a little) and lets users lock in the operation, by pressing harder, so that users don't need to maintain the higher input characteristic intensity while switching among filters, which enhances the operability of the device and makes the user-device interface more efficient.

In some embodiments, ceasing to display (e.g., fully/partially remove from the full set, shrink) a first subset of representations of filters further comprises: gradually shrinking a size of the representation of the first filter while the representation of the first filter continues to display at least a portion of a live preview (e.g., 1210) of the field of view of the one or more cameras of the device with the first filter applied, and gradually shrinking a size of the representation of the second filter while the representation of the second filter continues to display at least a portion of a live preview (e.g., 1210) of the field of view of the one or more cameras of the device with the second filter applied.

In some embodiments, further in response to detecting movement of the second contact: in accordance with a determination that the fourth filter is a filter of a first type (e.g., a predetermined favorite, most frequently used, most used), the electronic device (e.g., 1200) generates a respective tactile output, and in accordance with a determination that the fourth filter is a filter of a second type (e.g., a filter other than a predetermined favorite, most frequently used, most used), the electronic device (e.g., 1200) forgoes generating the respective tactile output (e.g., forgoing generating any tactile output or generating a tactile output with a different tactile output pattern). In some embodiments, the tactile output is provided whenever a new filter is displayed within the filter selection interface (e.g., 1206). Performing a tactile output when switching between different filters (and performing differing tactile outputs based on the filters) provides the user with additional feedback about changes to the state of the selected filter and helps the user perform operations more efficiently. Providing improved feedback enhances the operability of the device and makes the user-device interface more efficient (e.g., by helping the user to achieve an intended result and reducing user mistakes when operating/interacting with the device) and, additionally, reduces power usage and improves battery life of the device.

In some embodiments, the electronic device (e.g., 1200) includes a touch-sensitive display and wherein the first input (e.g., 1218) corresponds to a contact on the touch-sensitive display that is maintained for a predetermined period of time. In some embodiments, the hold time is greater than a predetermined time period. Performing an operation when the input is maintained for a duration greater than a predetermined time period enables users to access additional (e.g., all) filters from among which they can select without requiring display of additional user interface elements that obscure the viewfinder or clutter the display. Providing additional control options without cluttering the user interface with additional displayed controls enhances the operability of the device and makes the user-device interface more efficient (e.g., by helping the user to achieve an intended result and reducing user mistakes when operating/interacting with the device) and, additionally, reduces power usage and improves battery life of the device.

In some embodiments, in response to detecting the first input (e.g., 1218), the electronic device (e.g., 1200) provides a tactile output (e.g., 1220) at the electronic device (e.g., 1200). In some embodiments, the tactile output (e.g., 1220) is generated in response to the characteristic intensity of the contact reaching the respective intensity threshold (e.g., 1216) (e.g., as described above with respect to the process at which the representations of filters other than the second subset of representations of filters have ceased to be displayed). In some embodiments, a tactile output is provided when the subset of filters is redisplayed (e.g., in response to liftoff of the contact or in response to a subsequent hard press (e.g., as described above). Performing a tactile output when the subset of filters is redisplayed provides the user with feedback regarding the state of the selected filter and helps the user perform operations more efficiently. Providing improved feedback enhances the operability of the device and makes the user-device interface more efficient (e.g., by helping the user to achieve an intended result and reducing user mistakes when operating/interacting with the device) and, additionally, reduces power usage and improves battery life of the device.

In some embodiments, the representations of the plurality of filters in the set of filters include a third subset of representations of filters that is not displayed, on the display (e.g., 1204), while detecting the first input (e.g., 1218). In some embodiments, an input that includes movement of a contact along the filter selection interface (e.g., 1206) causes the filter selection interface (e.g., 1206) to scroll and reveal one or more representations of filters in the third subset of filters.

Note that details of the processes described above with respect to method 1300 (e.g., FIGS. 13A-13F) are also applicable in an analogous manner to the methods described below/above. For example, method 700, 900, 1100, 1500, 1700 optionally includes one or more of the characteristics of the various methods described above with reference to method 1300. For example, elements of the filter user interface, affordances, and controls from among the various methods can be combined. For another example, the viewfinder in method 1300 is analogous to the viewfinder in methods 700, 900, 1100, 1500, 1700. For brevity, these details are not repeated below.

Figure 14A:
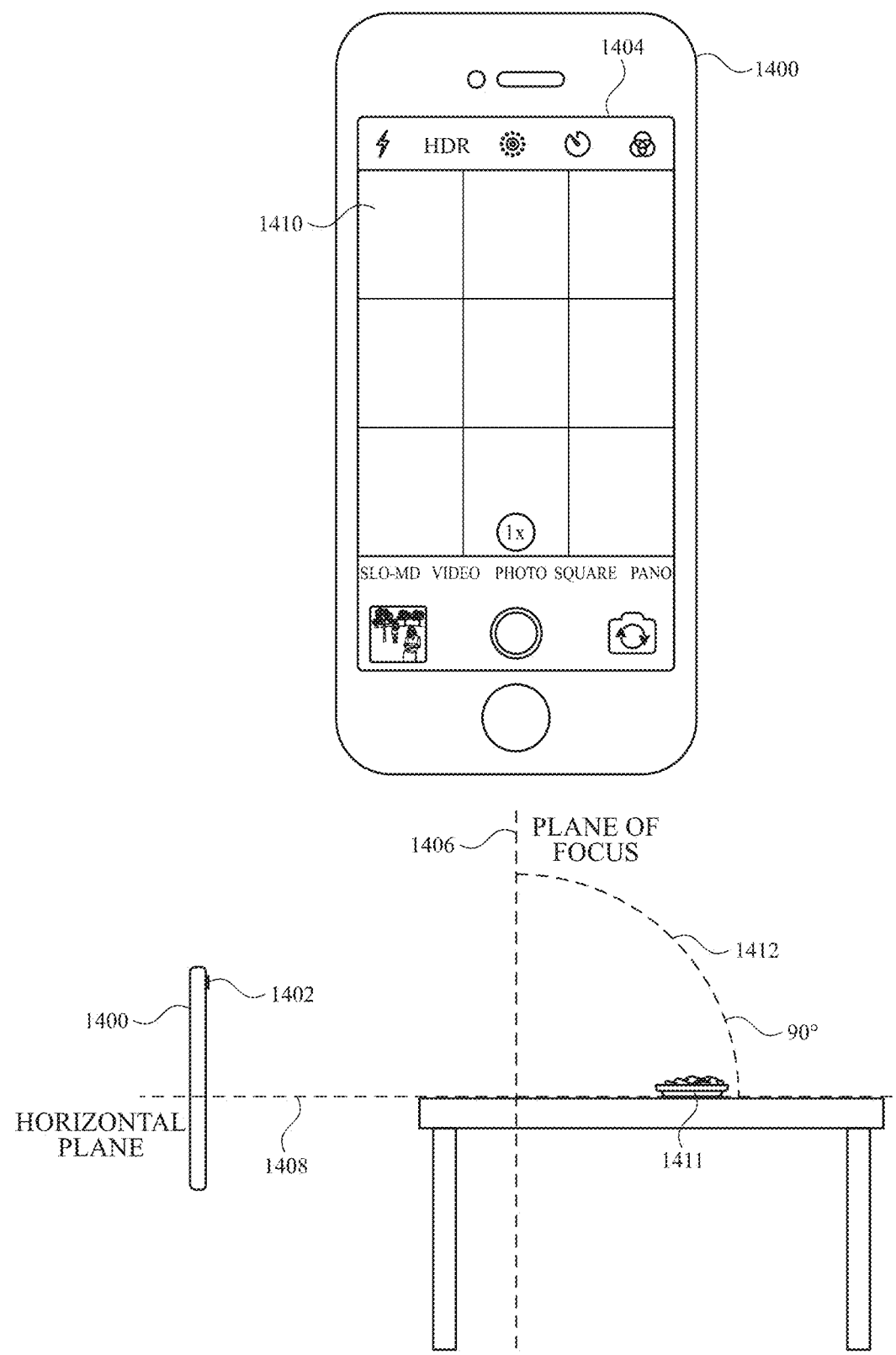
FIGS. 14A-14K illustrate exemplary devices and user interfaces for capturing an image, in accordance with some embodiments.
Figure 15A:
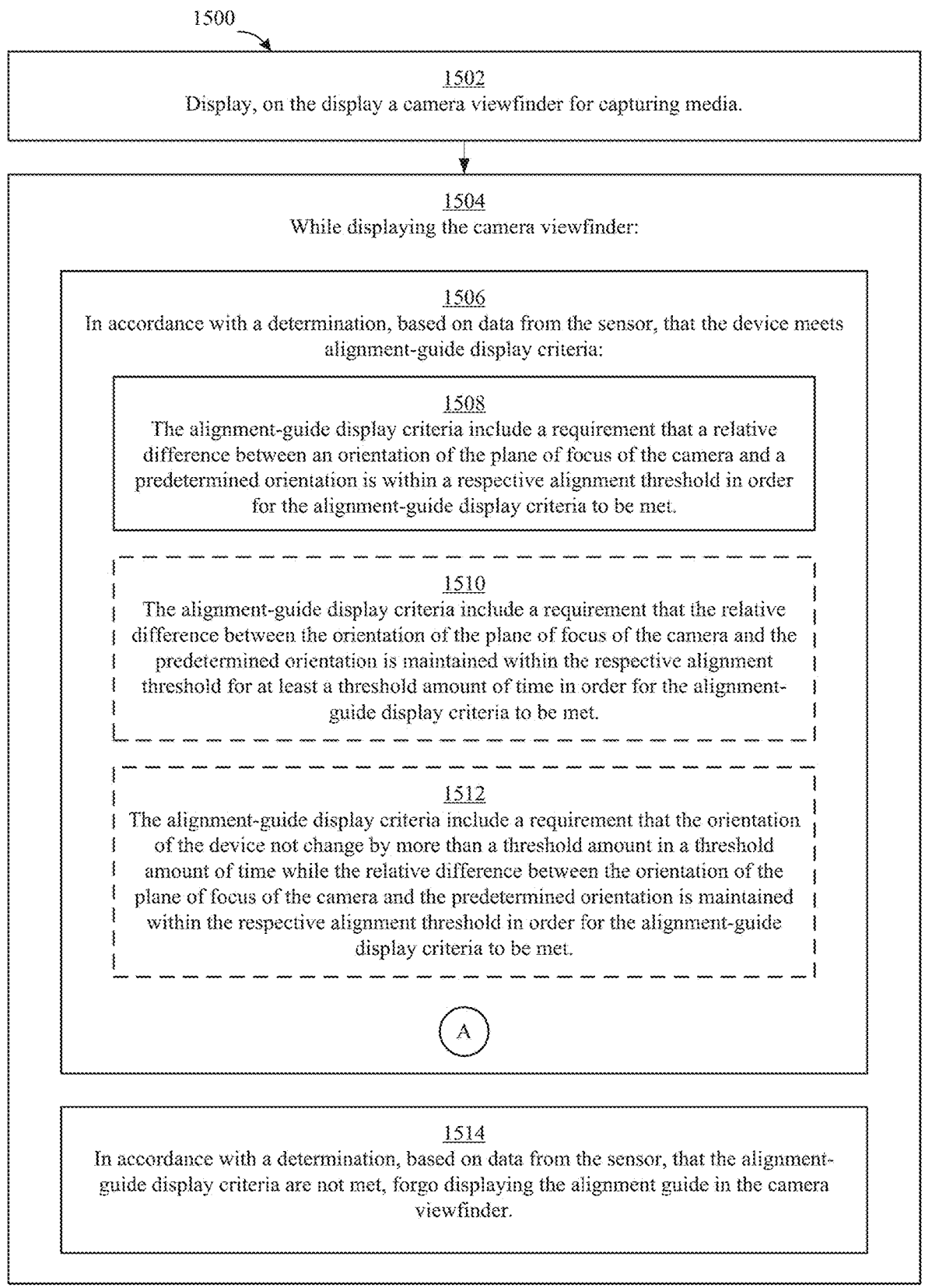
Figure 15D:
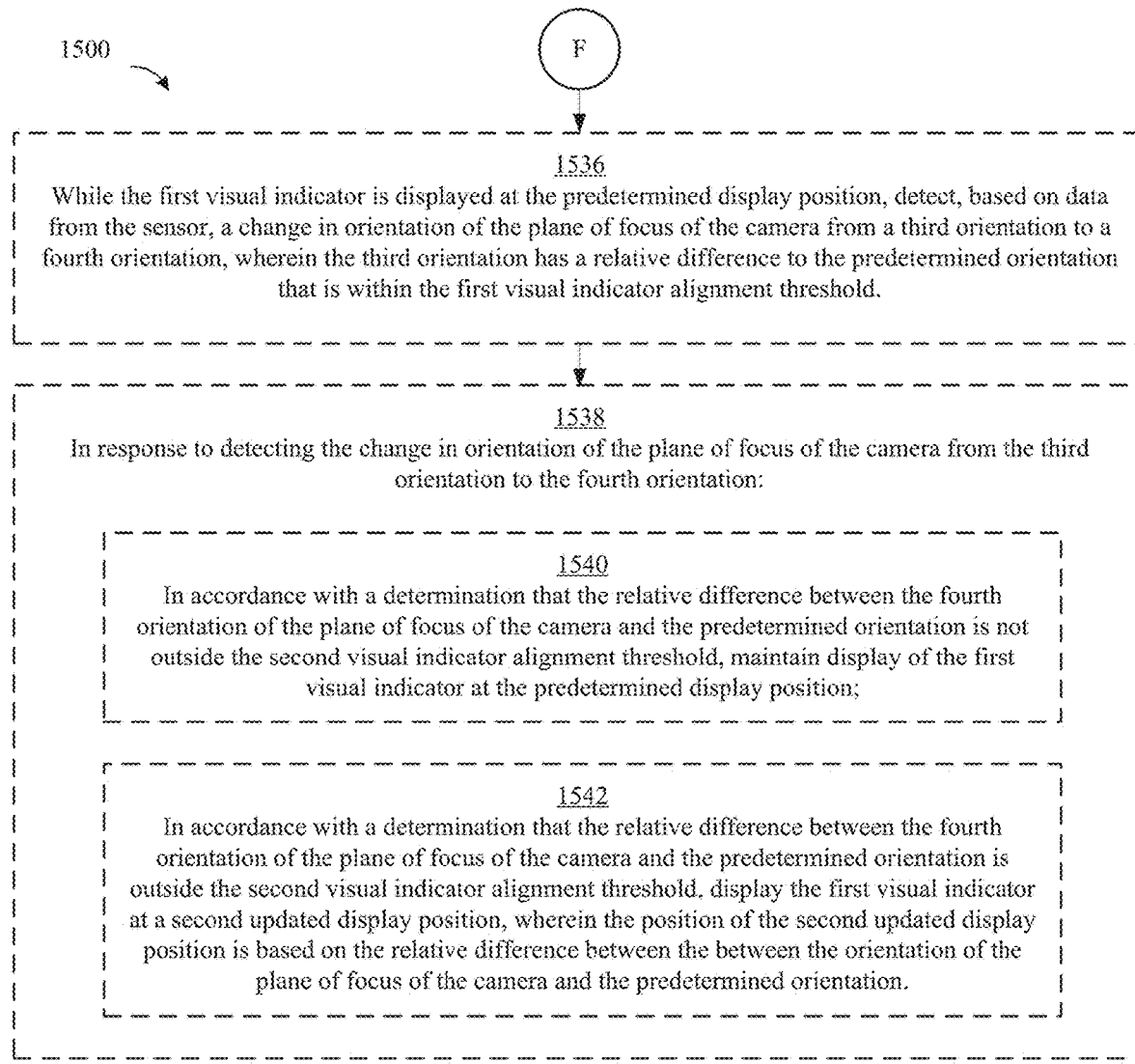

As illustrated in FIG. 14A, the electronic device 1400 includes display 1404 which is touch sensitive (e.g., touch screen) and the display displays information received from a camera (e.g., 1402). In some embodiments, electronic device 1400 includes one or more features of devices 100, 300, and/or 500. In some embodiments, the display is distinct from a touch sensitive surface. In some examples, the camera (e.g., 1402) is positioned on the front, back, or both sides of the electronic device (e.g., 1400).

FIG. 14A further illustrates a camera application user interface is displayed on the display 1404 for capturing images with the camera (e.g., 1402). The camera application user interface further includes a representation of image data 1410 which includes a live preview of a field of view of a camera. FIG. 14A further illustrates that the grid mode is enabled within the camera application and the corresponding grids are displayed on the display to aid a user to frame an image.

FIG. 14A further illustrates a plane of focus 1406 for the camera, a horizontal plane 1408, and the relative angle between the plane of focus 1406 and the horizontal plane 1412. In FIG. 14A, the plane of focus 1406 is an imaginary two dimensional plane in front of the camera that intersects the point of focus. FIG. 14A also includes a representation of a table and a representation of 1411 of a pie displayed as resting on the representation of the table. In some embodiments, different planes of orientation (e.g., vertical) are used, instead of the horizontal plane, to determine the relative angle (e.g., 1412). In some examples, the predetermined orientation is horizontal to a table and the horizontal orientation provides an optimal orientation for capturing images from a top-down perspective.

Figure 14B:
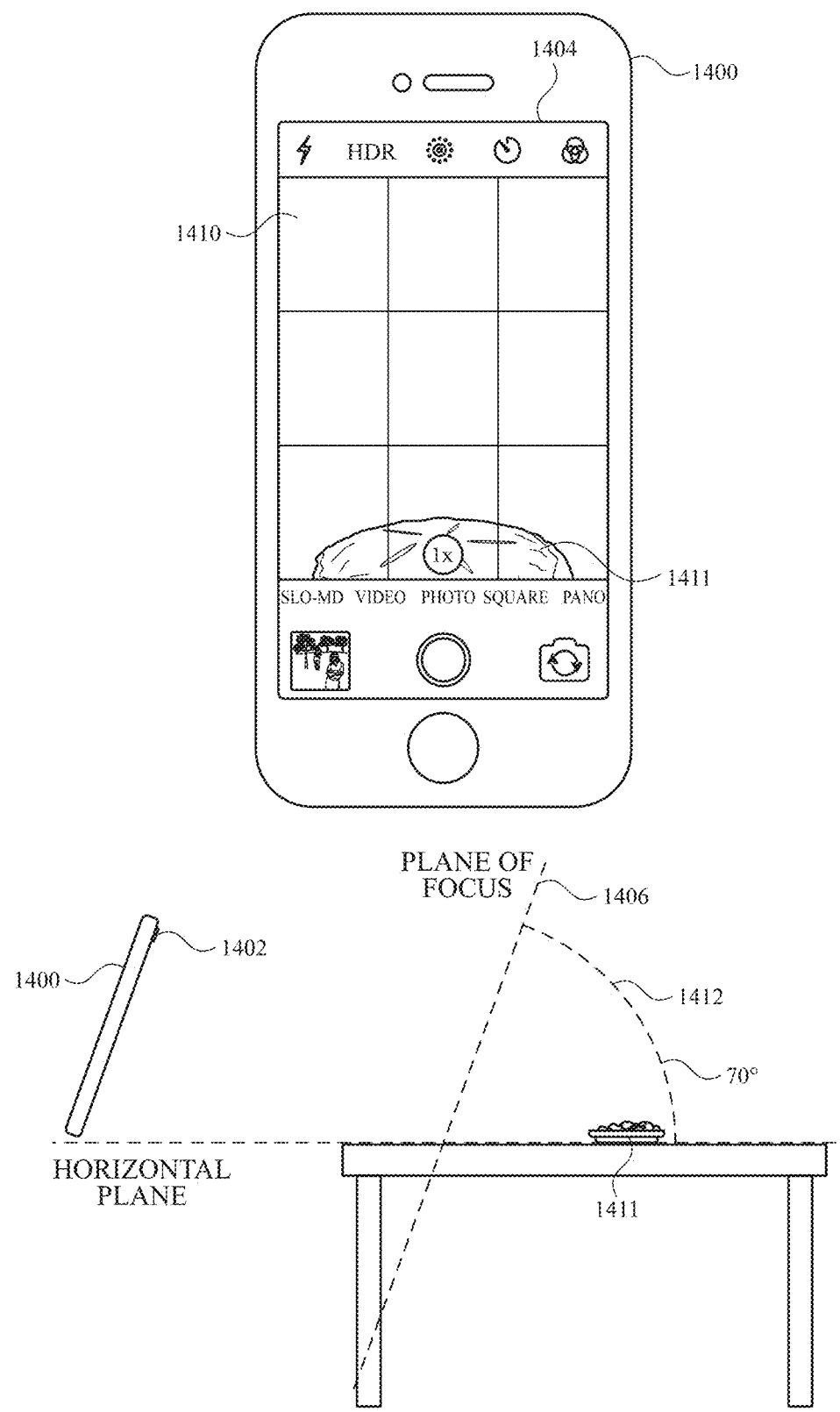

FIG. 14B illustrates the electronic device tilting forward (e.g., toward) the representation of the table. As the electronic device tils toward the table, the relative angle between the plane of focus and the horizontal plane (which is parallel to the table) decreases from 90 degrees in FIG. 14A to 70 degrees in FIG. 14B.

Figure 14C:
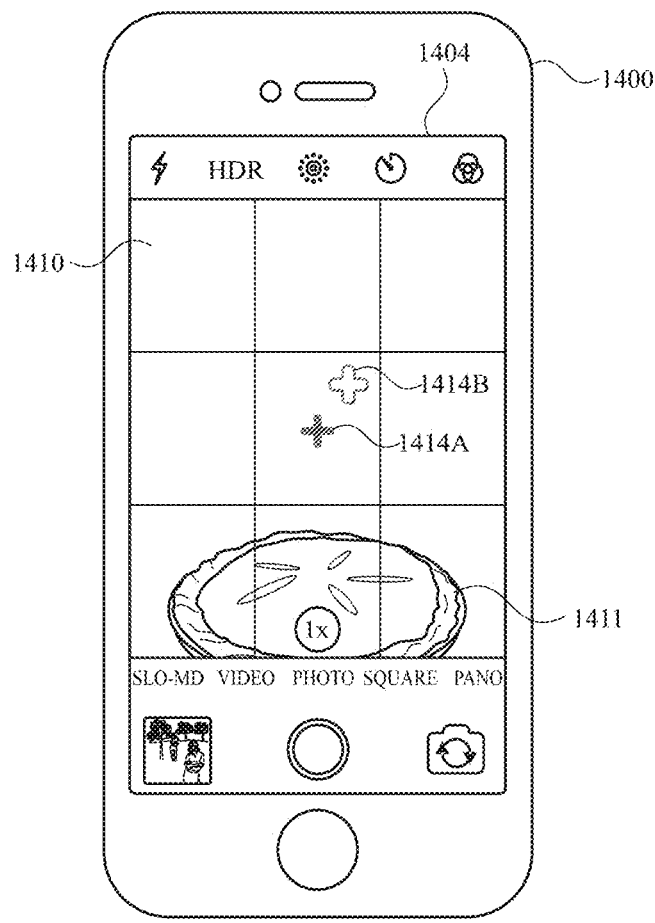
Figure 14C:
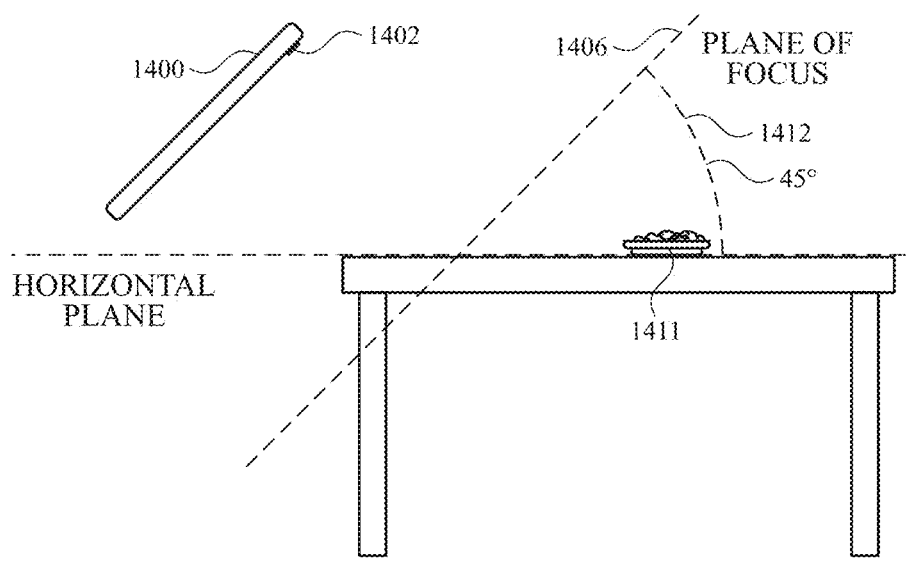

As the user continues to tilt the forward toward the table, as illustrated in FIG. 14C, the relative angle between the horizontal plane and the plane of focus decreases to 45 degrees. As further illustrated in FIG. 14C, at certain angles (e.g., 45 degrees or less), the relative angle (e.g., relative difference) between the horizontal plane and the plane of focus is within (e.g., equal to or less than) a predetermined alignment threshold (e.g., a predetermined respective alignment threshold) (e.g., 45 degrees). As a result, a visual indicator (e.g., 1414A and 1414B) is displayed. In some examples, the predetermined alignment threshold is 35, 30, 25, 20, 15, 10, or 5 degrees.

In some examples, the visual indicator is represented as two separate graphical objects 1414A and 1414B. In some embodiments, one of the two graphical objects (e.g., 1414A) remains stationary in the middle of the display. In some embodiments, the second graphical object (e.g., 1414B) changes position based on the electronic device's orientation. The visual indicator acts an aid to a user to guide the user in positioning the device relative to a predetermined orientation. As described below, as the relative angle between the plane of focus 1406 and the horizontal plane 1408 continues to decrease (e.g., they are coming closer to becoming parallel), the graphical object 1414B gradually gravitates toward graphical object 1414B. In some embodiments, when the relative angle between the plane of focus 1406 and the horizontal plane 1408 is zero (e.g., they are parallel), the graphical objects (e.g., 1414A and 1414B) appear to fully overlap (e.g., appear as one graphical object).

In some embodiments, the visual indicator appears to gradually fade-in when the electronic device determines that the relative angle between the plane of focus and the horizontal plane is within the predetermined alignment threshold (e.g., 45 degrees). In some embodiments, the visual indicator is displayed with full opacity when the electronic device determines that the relative angle between the plane of focus and the horizontal is within the predetermined alignment threshold (e.g., 45 degrees).

In some examples, the visual indicator is displayed only after the electronic device determines that the relative angle between the horizontal plane and the plane of focus remains within the alignment threshold (e.g., 45 degrees) for a predetermined time period (e.g., 2, 5, 10 seconds). Thus, in some examples, the electronic device must remain oriented so that the relative angle remains within the predetermined alignment threshold for a predetermined time period before the visual indicator is displayed. In some example, the visual indicator is not displayed when the electronic device determines that the electronic device does not remain within the alignment threshold (e.g., 45 degrees) for a predetermined time period (e.g., 2, 5, 10 seconds). In some examples, time is not a factor in determining whether the visual indicator is displayed.

Figure 14D:
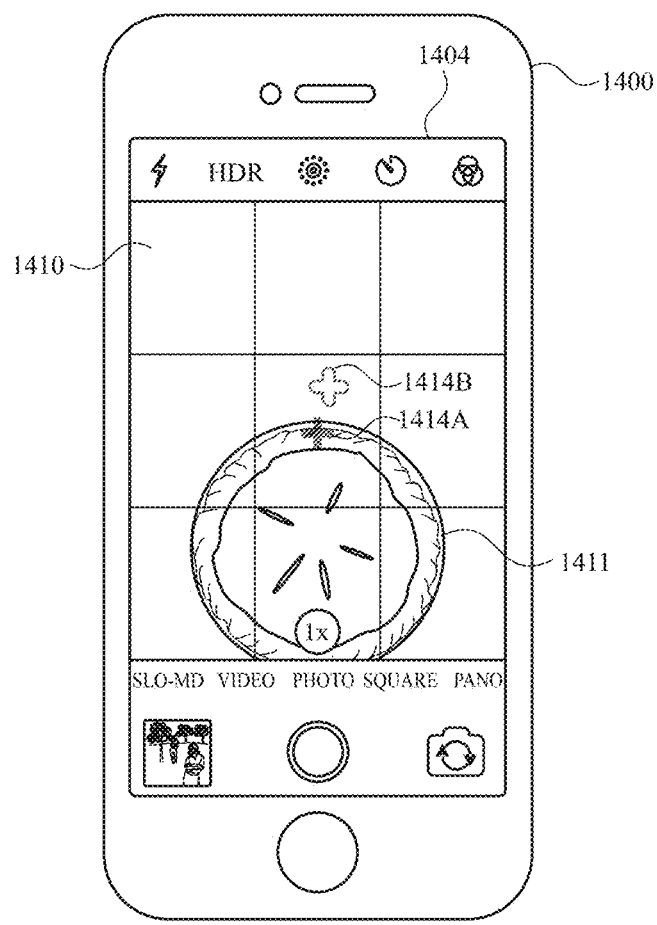
Figure 14D:
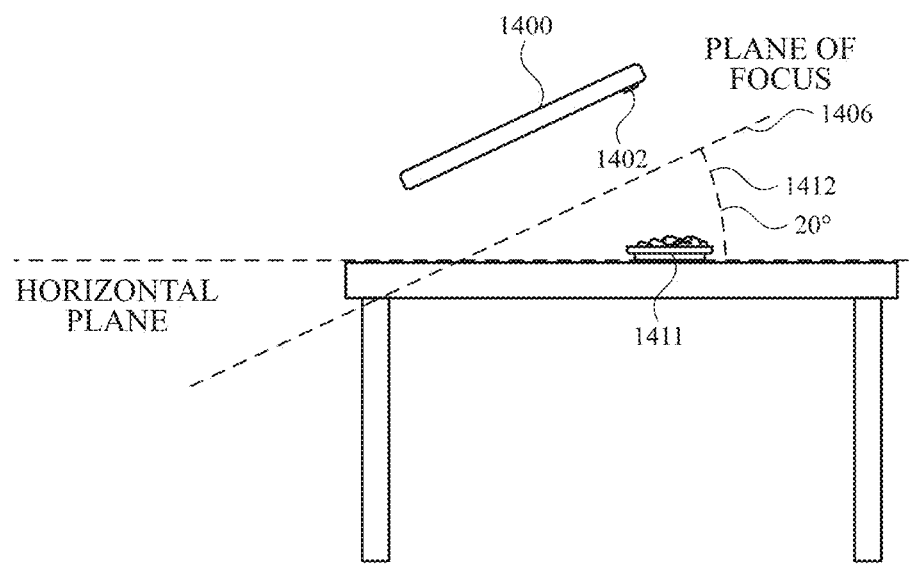
Figure 14E:
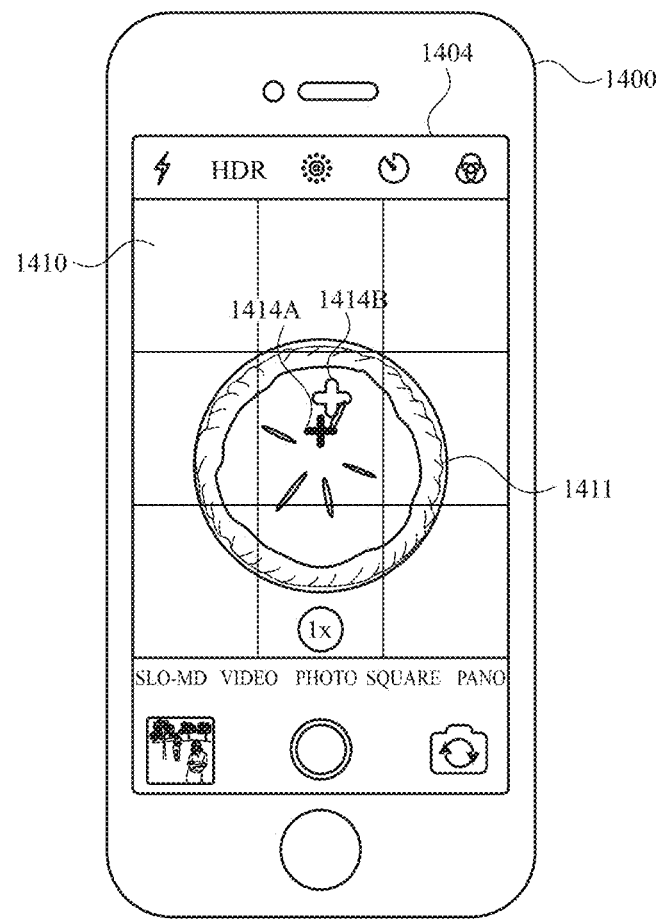
Figure 14E:
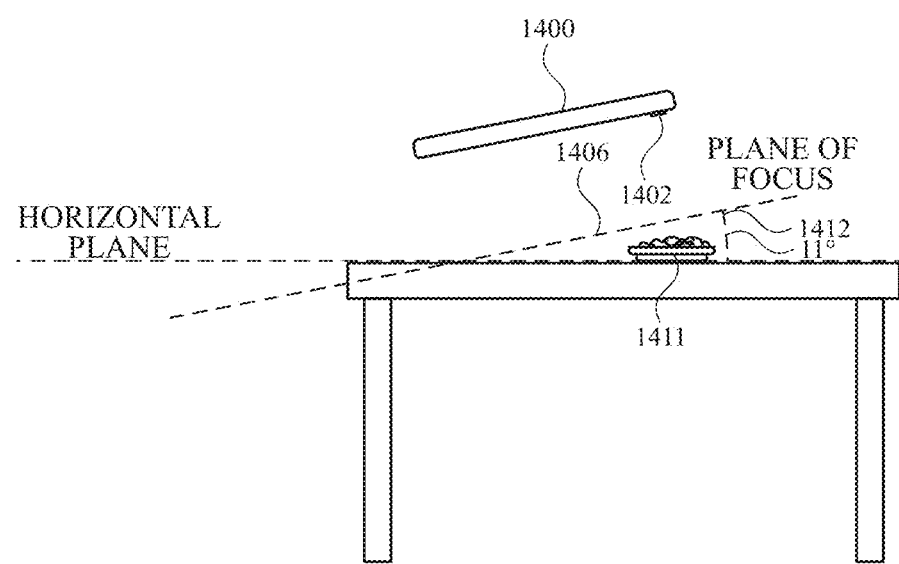

FIGS. 14D-14E illustrate the user interface as the electronic device continues to tilt forward. As illustrated in FIG. 14D, as the electronic device 1400 determines that the relative angle between the horizontal plane and the plane of focus continues to decrease, graphical object 1414B continues to gradually gravitate toward graphical object 1414A. Additionally, as the electronic device 1400 determines that the relative angle (e.g., 20 degrees in FIG. 14D) between the horizontal plane and the plane of focus continues to decrease, graphical objects 1414A and 1414B continue to fade-in. Additionally, in some embodiments once electronic device determines that the relative angle (e.g. 11 degrees in FIG. 14E) between the horizontal plane and the plane of focus reaches a predetermined fade threshold (e.g., 15 degrees), the graphical objects 1414A and 1414B are displayed at full opacity. In some examples, the fade threshold is 30, 25, 20, 15, 10, 5, or 2 degrees.

Figure 14F:
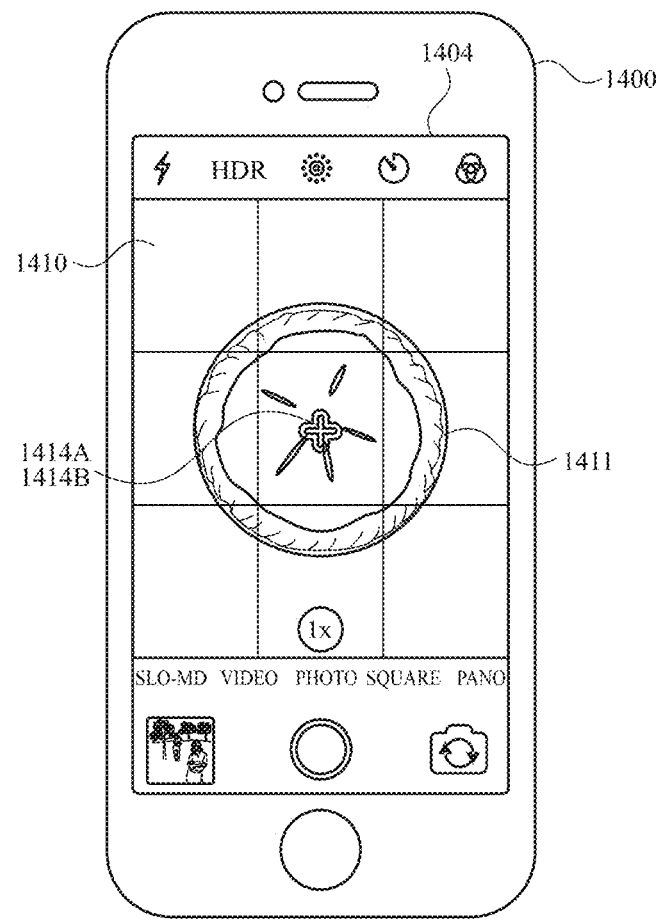
Figure 14F:
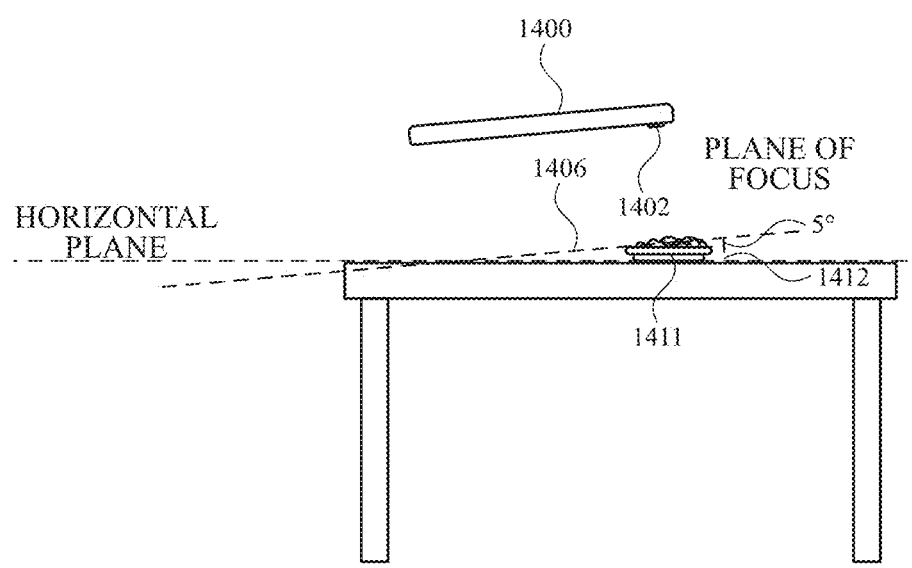

As illustrated in FIG. 14F, the electronic device 1400 is now positioned within five degrees of the horizontal plane. As a result, the graphical objects 1414A and 1414B are snapped-to the center display position because the relative angle between the horizontal plane and the plane of focus is within a snap threshold (e.g., 10 degrees). In some embodiments, the snap threshold is 25, 20, 15, 10, 5, 4, 3, 2, or 1 degrees. Thus, in some embodiments, even though the plane of focus is not perfectly parallel to the horizontal plane, if the relative angle (e.g., 5 degrees) between the horizontal plane and the plane of focus is determined to be within a snap threshold (e.g., 10 degrees), the graphical objects 1414A and 1414B are displayed in (e.g., snapped-to) the middle of the display, with a predetermined alignment. In some embodiments, the graphical objects exhibit an animation when being snapped-to the center position of the display. In some embodiments, the animation includes one or more of a color differentiation, shape differentiation, or position differentiation (e.g., slight bouncing effect).

Figure 14G:
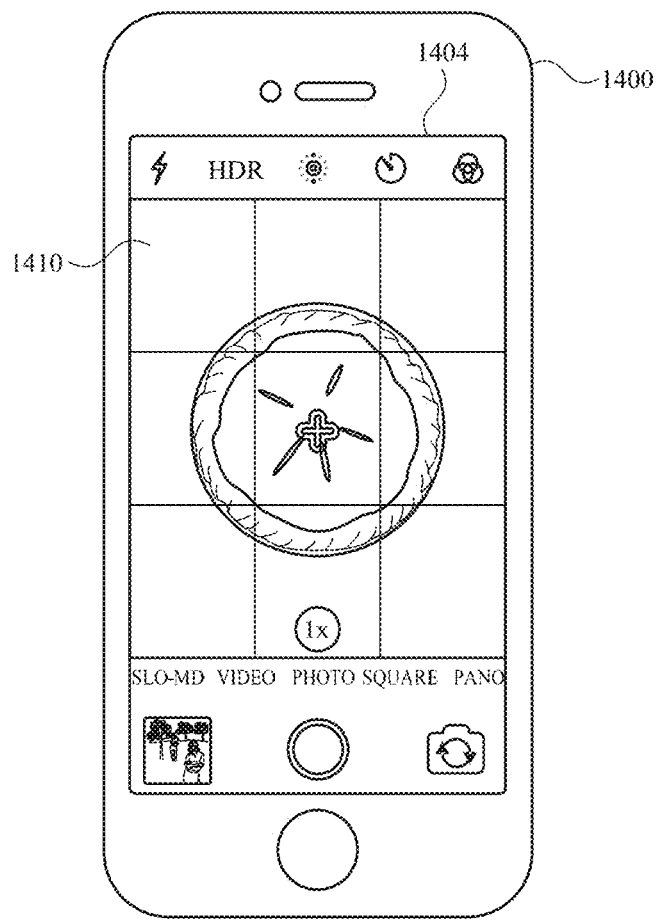
Figure 14G:
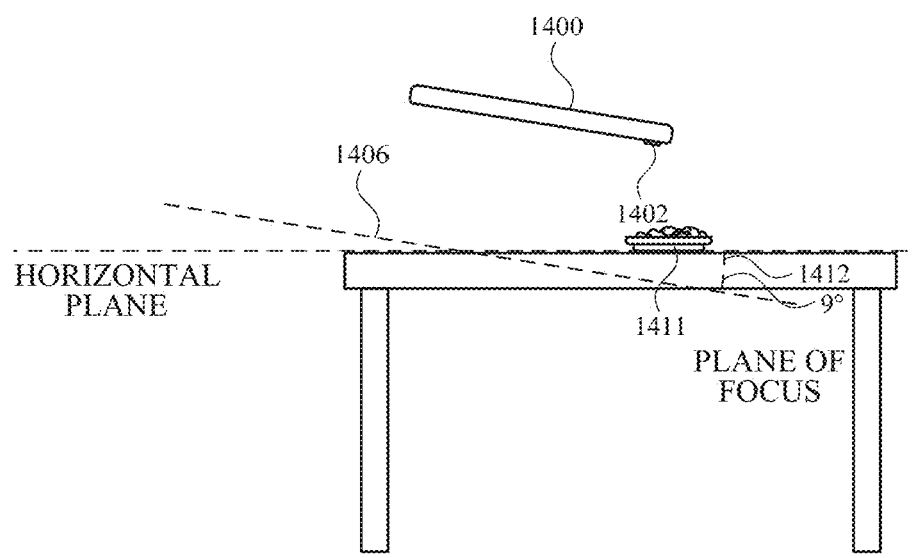

As illustrated in FIG. 14G, even though the electronic device 1400 continues to tilt forward, the relative angle (e.g., 9 degrees), as determined by the electronic device, between the horizontal plane and the plane of focus is maintained within the snap threshold (e.g., 10 degrees). As a result, in some embodiments, the graphical objects (e.g., 1414A and 1414B) remain displayed in the center of the display.

Figure 14H:
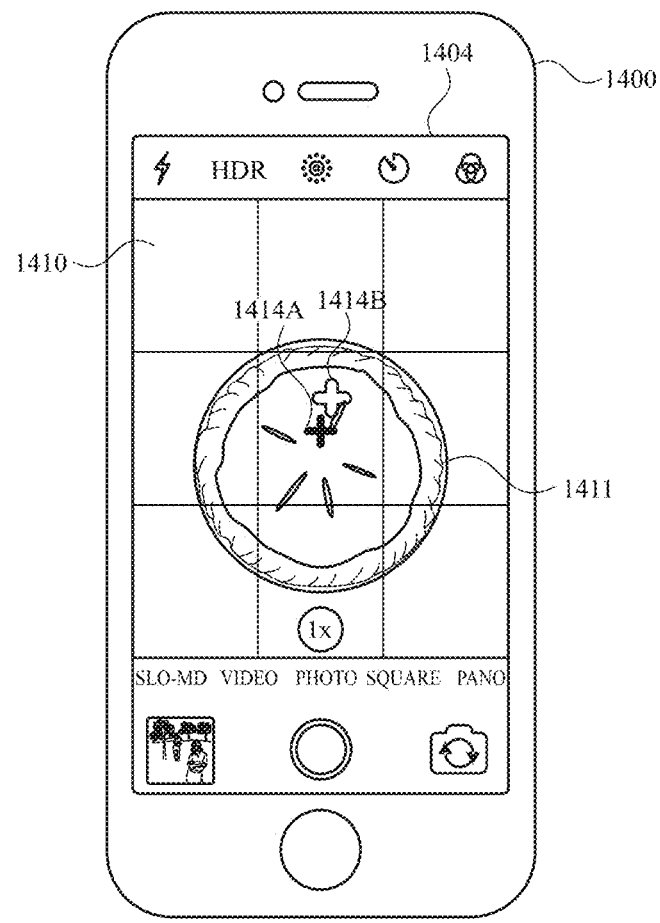
Figure 14H:
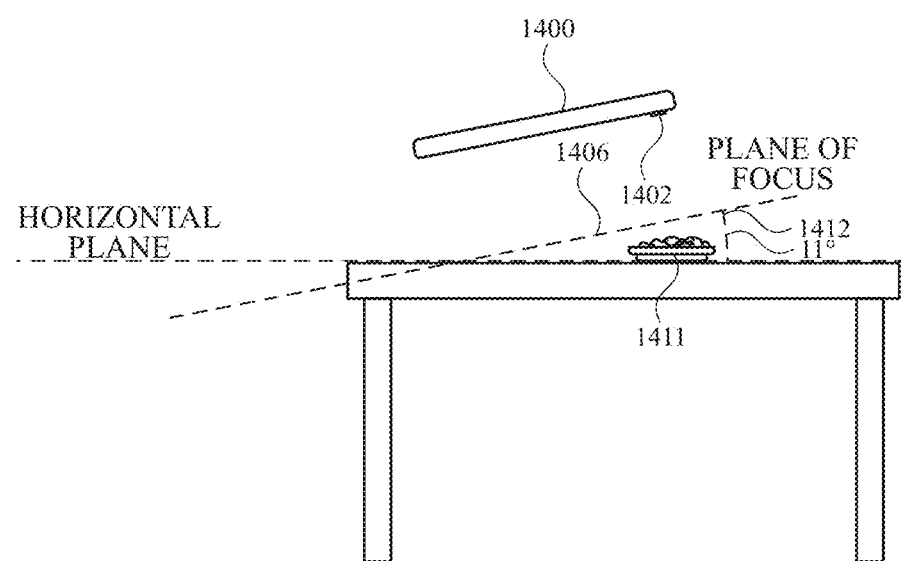

As illustrated in FIG. 14H, once the electronic device 1400 determines that the relative angle (e.g., 11 degrees) between the horizontal plane and the plane of focus is above the snap threshold (e.g., 10 degrees), the graphical objects (e.g., 1414A and 1414B) are shown as separating from one another. In some embodiments, the initial snap threshold (e.g., 10 degrees) is increased (e.g., 15 degrees), once an initial snap occurs, to account for slight inadvertent hand movements. Thus, in some embodiments, the graphical objects (e.g., 1414A and 1414B) will remain snapped-to the center position on the display as long as electronic device determines that the relative angle between the horizontal plane and the plane of focus is within the increased snap threshold (e.g., 15 degrees).

Figure 14I:
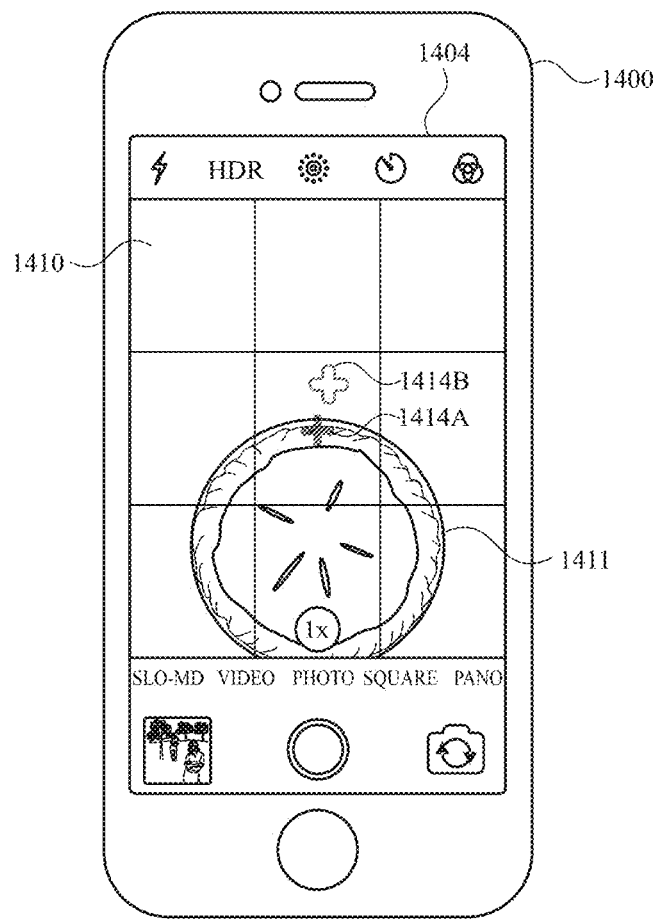
Figure 14I:
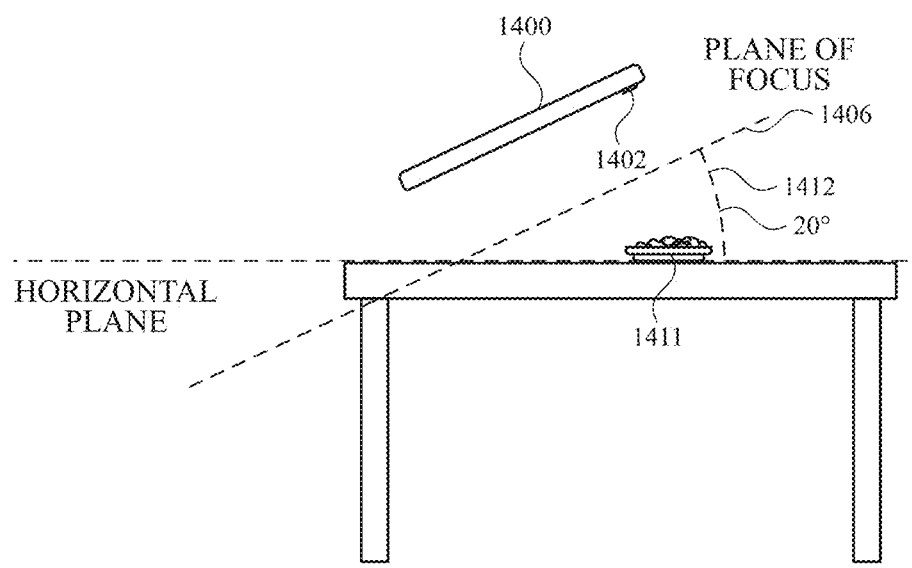
Figure 14J:
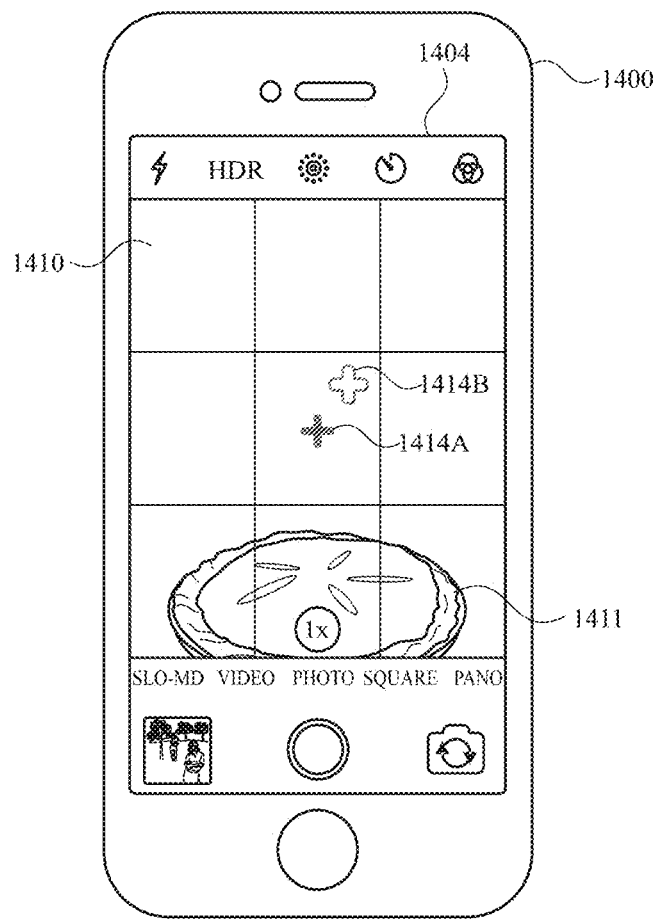
Figure 14J:
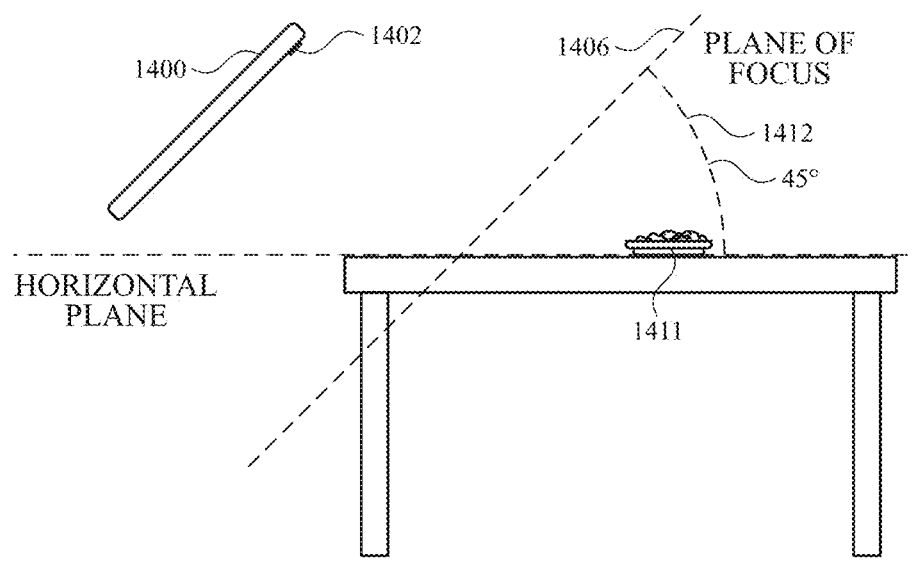
Figure 14K:
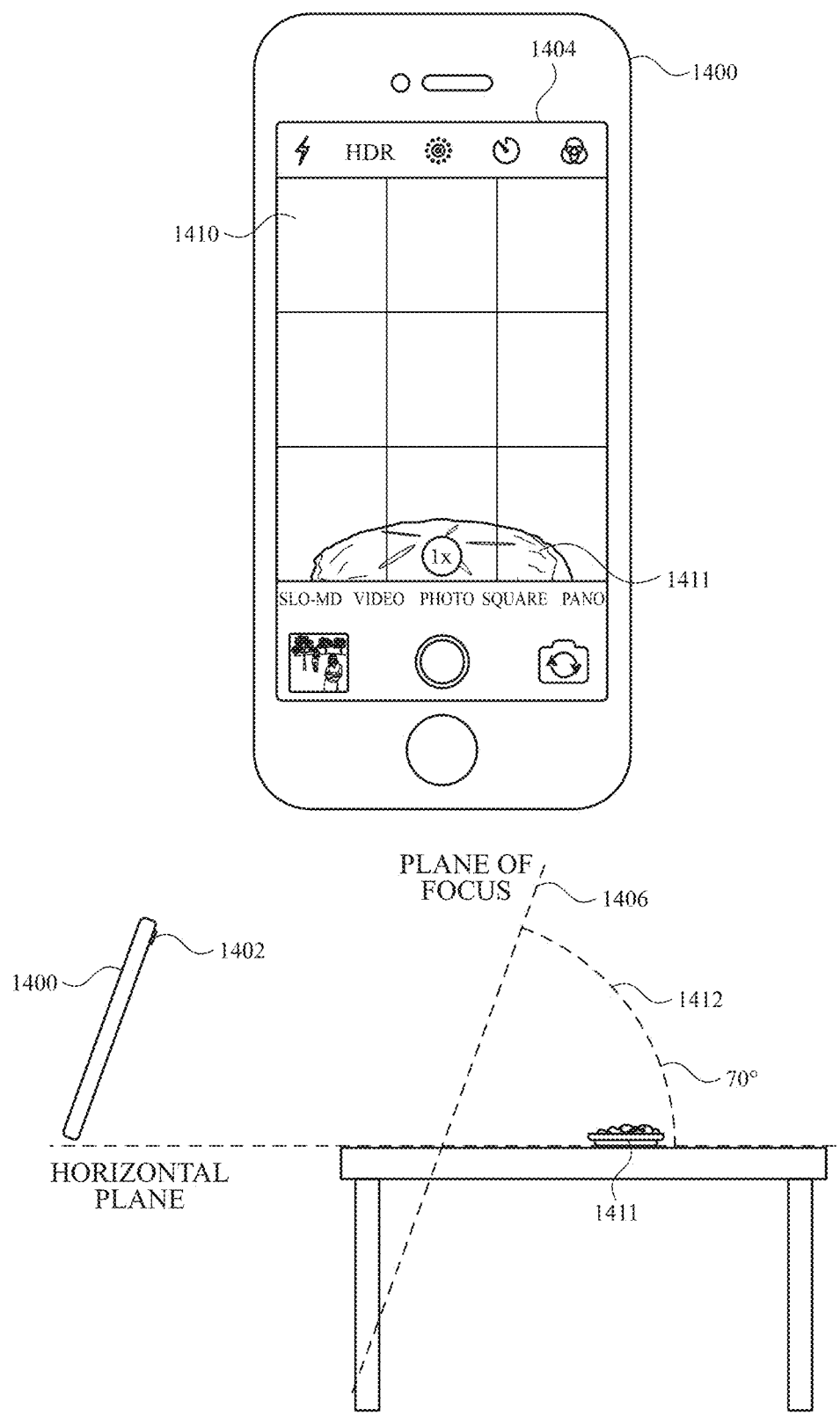

As illustrated in FIGS. 14I-K, as electronic device continues to detect that the relative angle between the horizontal plane and the plane of focus is increasing, the graphical object 1414B continues to be displayed as moving further away from the graphical object 1414A. Furthermore, as illustrated in FIGS. 14I-J, as electronic device continues to detect that the relative angle between the horizontal plane and the plane of focus is increasing, the visual indicator gradually fades out. As illustrated in FIG. 14K when the electronic device determines that the relative angle between the horizontal plane and the plane of focus is no longer with in the predetermined alignment threshold, the visual indicator ceases to be displayed.

FIGS. 15A-15E are a flow diagram illustrating a method for composing an image using an electronic device (e.g., 1400) in accordance with some embodiments. Method 700 is performed at a device (e.g., 100, 300, 500, 1400) with a camera, a sensor (e.g., gyroscope, accelerometer, compass), one or more input devices (e.g., a touch-sensitive surface, keyboard, mouse), and a display. In some embodiments, the device has a plurality of cameras, with each camera optionally having a different focal length. Some operations in method 1500 are, optionally, combined, the orders of some operations are, optionally, changed, and some operations are, optionally, omitted.

As described below, method 1500 provides an intuitive way for composing an image. The method reduces the cognitive burden on a user for providing inputs corresponding to functions, thereby creating a more efficient human-machine interface. For battery-operated computing devices, enabling a user to initiate various functions faster and more efficiently conserves power and increases the time between battery charges.

At block 1502, the electronic device (e.g., 1400) displays, on the display (e.g., 1404) a camera viewfinder (e.g., 1410) (e.g., that includes live or near-live preview images of content in a field of view of the camera) for capturing media.

At block 1504, while displaying the camera viewfinder (e.g., 1410), the techniques of blocks 1506-1550 are optionally performed.

At block 1506, in accordance with a determination, based on data from the sensor, that the device meets alignment-guide display criteria the techniques of blocks 1516-1524 are performed, wherein, at block 1508, the alignment-guide display criteria include a requirement that a relative difference (e.g., 1412) between an orientation of the plane of focus (e.g., 1406) of the camera (e.g., 1402) and a predetermined orientation (e.g., 1408)(e.g., an orientation with respect to a predetermined plane) is within a respective alignment threshold in order for the alignment-guide display criteria to be met. In some embodiments, the respective alignment threshold is based on whether the plane of focus (e.g., 1406) of the camera (e.g., 1402) is within a predefined range of degrees (e.g., less than 5, less than 10, or less than 15 degrees) of being parallel to or vertical to the predetermined plane. Displaying the alignment guide in the camera viewfinder (e.g., 1410) when the alignment threshold is met provides the user feedback in the form of the alignment-guide when the user is attempting to position the device in the particular orientation, which enables the user to more accurately position the device in the particular orientation. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 1510, the alignment-guide display criteria include a requirement that the relative difference (e.g., 1412) between the orientation of the plane of focus (e.g., 1406) of the camera (e.g., 1402) and the predetermined orientation (e.g., 1408) is maintained within the respective alignment threshold for at least a threshold amount of time in order for the alignment-guide display criteria to be met (e.g., alignment-guide display criteria require that the device is maintained within the range of orientations that correspond to displaying the alignment guide (e.g., 1414A and 1414B) for at least a predetermined amount of time in order for the alignment guide (e.g., 1414A and 1414B) to be displayed, so that the alignment guide (e.g., 1414A and 1414B) is not displayed if the device is briefly moved through the range of orientations that correspond to displaying the alignment guide (e.g., 1414A and 1414B)). Displaying the alignment guide in the camera viewfinder (e.g., 1410) when the alignment threshold is met for the threshold amount of time provides the user feedback in the form of the alignment-guide when the user is positioning the device in the particular orientation rather than when the device is merely being reoriented by the user (without maintaining the device in the particular orientation). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 1512, the alignment-guide display criteria include a requirement that the orientation of the device not change by more than a threshold amount in a threshold amount of time while the relative difference (e.g., 1412) between the orientation of the plane of focus (e.g., 1406) of the camera (e.g., 1402) and the predetermined orientation (e.g., 1408) is maintained within the respective alignment threshold in order for the alignment-guide display criteria to be met (e.g., alignment-guide display criteria require that the device is maintained at a substantially stationary orientation relative to the predetermined orientation (e.g., 1408) while within the range of orientations that correspond to displaying the alignment guide (e.g., 1414A and 1414B) in order for the alignment guide (e.g., 1414A and 1414B) to be displayed, so that the alignment guide (e.g., 1414A and 1414B) is not displayed if the device is moving too much while the range of orientations that correspond to displaying the alignment guide (e.g., 1414A and 1414B)).

At block 1514, in accordance with a determination, based on data from the sensor, that the alignment-guide display criteria are not met (e.g., the angle between the predetermined plane and the plane of focus (e.g., 1406) of the camera (e.g., 1402) is greater than a threshold) (e.g., the camera lens is not sufficiently parallel to a horizontal/vertical plane), the electronic device (e.g., 1400) forgoes displaying the alignment guide (e.g., 1414A and 1414B) in the camera viewfinder (e.g., 1410). Forgoing displaying the alignment guide (e.g., 1414A and 1414B) in the camera viewfinder reduces visual distractions to the user, helps to avoid drawing the user's attention away from the camera's viewfinder, and avoids obstructing subjects in the camera viewfinder. Reducing visual distractions and avoiding obstructing the viewfinder enhances the operability of the device and makes the user-device interface more efficient (e.g., by helping the user to achieve an intended result and reducing user mistakes when operating/interacting with the device) and, additionally, reduces power usage and improves battery life of the device.

At block 1516, the electronic device (e.g., 1400) displays, on the display (e.g., 1404), an alignment guide (e.g., 1414A and 1414B) (e.g., a crosshair, rectangles, ovals, triangles) in the camera viewfinder (e.g., 1410) (e.g., overlaid on at least a portion of the live preview of the field of view of the camera (e.g., 1402)). At block 1518, the appearance of the alignment guide (e.g., 1414A and 1414B) changes as the orientation of the plane of focus (e.g., 1406) of the camera (e.g., 1402) changes relative to the predetermined orientation (e.g., 1408) (e.g., alignment guide (e.g., 1414A and 1414B) shows discrepancy from alignment). Displaying (and forgoing displaying) the alignment guide in the camera viewfinder based on whether the alignment-guide display criteria are met provides the user with feedback about the orientation state of the device. For example, a user attempting to take a photograph with the camera (e.g., 1402) of the device pointed straight down is provided visual feedback in the form of the alignment guide when the device is pointed substantially downward, thereby enabling the user to better align the device (using the alignment guide) so that the device is more accurately pointed downward. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the sensor is part of the camera (e.g., 1402). In some embodiments, the sensor is independent of the camera (e.g., 1402). In some embodiments, the plane of focus (e.g., 1406) of the camera (e.g., 1402) must be sufficiently parallel to a horizontal plane, such as the earth's surface or a plane perpendicular to the earth's gravitational field. The parallel alignment allows for perfect or near perfect alignment to capture photographs from above. In some embodiments, the plane of focus (e.g., 1406) of the camera (e.g., 1402) must be sufficiently vertical to a horizontal plane, such as the earth's surface or a plane parallel to the earth's gravitational field. The vertical alignment allows for perfect or near perfect alignment to capture photographs straight on.

In some embodiments, the plane of focus (e.g., 1406) is an imaginary two dimensional plane in front of the camera (e.g., 1402) that passes through the point of focus.

In some embodiments, the alignment guide (e.g., 1414A and 1414B) is displayed when a guide-display mode is active (and other criteria are met), not displayed when guide-display mode is not active (even if other criteria are met). In some embodiments, the guide-display mode is a mode in which permanent guides are displayed (e.g., a grid). Permanently displaying guides while the guide-display mode is enabled avoids user distraction that may result from the guides repeatedly being displayed and removed from the display. Reducing visual distractions enhances the operability of the device and makes the user-device interface more efficient (e.g., by helping the user to achieve an intended result and reducing user mistakes when operating/interacting with the device) and, additionally, reduces power usage and improves battery life of the device.

In some embodiments, at block 1520, the alignment guide (e.g., 1411A and 1411B) includes at least two (e.g., one indicator changes position on the display (e.g., 1404) independent of the other indicator) visual indicators.

In some embodiments, at block 1522, at least one of the at least two (e.g., one indicator changes position on the display (e.g., 1404) independent of the other indicator) visual indicators remains stationary as the orientation of the plane of focus (e.g., 1406) of the camera (e.g., 1402) changes relative to the predetermined orientation (e.g., 1408). Displaying a visual indicator that remains stationary on the display (e.g., 1404) of the device provides the user with visual feedback regarding how close to the predetermined orientation (e.g., 1408) the device is when the location of the stationary visual indicator is compared to the location of the non-stationary visual indicator. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 1524, a distance between the two visual indicators is dynamically based on the relative difference (e.g., 1412) between the orientation of the plane of focus (e.g., 1406) of the camera (e.g., 1402) and the predetermined orientation (e.g., 1408). In some embodiments, the further the indicators are apart, the further the device is from being positioned to take a top-down picture of the field of view of the one or more cameras. Dynamically updating the distance between the two visual indicators provides the user with visual feedback on the degree of change in the device's orientation required to achieve the predetermined orientation (e.g., 1408) and provides visual feedback to the user indicating that changing the orientation of the device will cause the distance between the two visual indicators to change. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 1526, while displaying the alignment guide (e.g., 1414A and 1414B) and while the orientation of the plane of focus (e.g., 1406) of the camera (e.g., 1402) is a first orientation, the electronic device (e.g., 1400) detects, based on data from the sensor, a change in orientation of the plane of focus (e.g., 1406) of the camera (e.g., 1402) from the first orientation to a second orientation.

In some embodiments, at block 1528, in response to detecting the change in orientation of the plane of focus (e.g., 1406) of the camera (e.g., 1402) from the first orientation to the second orientation, at block 1530, the electronic device (e.g., 1400) changes a displayed position (e.g., a calculated position based on the degree of change in orientation, a position not based on the position of the stationary indicator) of a first visual indicator (e.g., a moving or non-stationary indicator) of the at least two visual indicators, wherein the displayed position of the first visual indicator is changed based on the relative difference (e.g., 1412) between the first orientation and the second orientation. (e.g., one indicator changes position on the display (e.g., 1404) independent of the other indicator). In some embodiments, at least one of the two separate visual indicators unfreezes when the devices changes position beyond a predetermined threshold.

In some embodiments, further in response to detecting the change in orientation of the plane of focus (e.g., 1406) of the camera (e.g., 1402) from the first orientation to the second orientation, at block 1532, in accordance with a determination that the relative difference (e.g., 1412) between the second orientation of the plane of focus (e.g., 1406) of the camera (e.g., 1402) and the predetermined orientation (e.g., 1408) is not within a first visual indicator alignment threshold (e.g., indicator snapping threshold, a range of relative difference (e.g., 1412) values (e.g., 0 degrees to 5 degrees) at which the indicators will be displayed in a predetermined aligned arrangement), the electronic device (e.g., 1400) displays the first visual indicator at the updated display position. In some embodiments, further in response to detecting the change in orientation of the plane of focus (e.g., 1406) of the camera (e.g., 1402) from the first orientation to the second orientation, at block 1534, in accordance with a determination that the relative difference (e.g., 1412) between the second orientation of the plane of focus (e.g., 1406) of the camera (e.g., 1402) and the predetermined orientation (e.g., 1408) is within the first visual indicator alignment threshold, the electronic device (e.g., 1400) displays the first visual indicator at a predetermined display position (e.g., a snapped position, such as complete alignment with the stationary indicator). Snapping the indicators into alignment when the current orientation of the device is within a threshold amount of the predetermined orientation (e.g., 1408) provides the user with visual feedback of the orientation state of the device and, in particular, that the device is substantially aligned with the predetermined orientation (e.g., 1408). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 1536, while the first visual indicator is displayed at the predetermined display position (e.g., a snapped position, such as complete alignment with the stationary indicator), the electronic device (e.g., 1400) detects, based on data from the sensor, a change in orientation of the plane of focus (e.g., 1406) of the camera (e.g., 1402) from a third orientation to a fourth orientation, wherein the third orientation has a relative difference (e.g., 1412) to the predetermined orientation (e.g., 1408) that is within the first visual indicator alignment threshold. In some embodiments, a change in orientation of the plane of focus (e.g., 1406) of the camera (e.g., 1402) starts while the orientation of the plane of focus (e.g., 1406) of the camera (e.g., 1402) is a third orientation. In some embodiments, the fourth orientation has a relative difference (e.g., 1412) to the predetermined orientation (e.g., 1408) that is outside of the first visual indicator alignment threshold.

In some embodiments, at block 1538, in response to detecting the change in orientation of the plane of focus (e.g., 1406) of the camera (e.g., 1402) from the third orientation to the fourth orientation, the technique of blocks 1540-1542 are performed.

In some embodiments, at block 1540, in accordance with a determination that the relative difference (e.g., 1412) between the fourth orientation of the plane of focus (e.g., 1406) of the camera (e.g., 1402) and the predetermined orientation (e.g., 1408) is not outside the second visual indicator alignment threshold (e.g., indicator snapping threshold, a range of relative difference (e.g., 1412) values (e.g., 0 degrees to 5 degrees) at which the indicators will be displayed in a predetermined alignment arrangement), the electronic device (e.g., 1400) maintains display of the first visual indicator at the predetermined display position. In some embodiments, the second visual indicator alignment threshold is the same as the first visual indicator alignment threshold. In some embodiments, the second visual indicator alignment threshold is different from the first visual indicator alignment threshold (e.g., to avoid the visual indicator from accidentally snapping out of alignment if the user maintains the device near the first visual indicator alignment threshold).

In some embodiments, at block 1542, in accordance with a determination that the relative difference (e.g., 1412) between the fourth orientation of the plane of focus (e.g., 1406) of the camera (e.g., 1402) and the predetermined orientation (e.g., 1408) is outside the second visual indicator alignment threshold, displaying the first visual indicator at a second updated display position, wherein the position of the second updated display position is based on the relative difference (e.g., 1412) between the orientation of the plane of focus (e.g., 1406) of the camera (e.g., 1402) and the predetermined orientation (e.g., 1408). In some embodiments, a change in orientation, while a moving visual indicator is snapped to stationary visual indicator, that results in a relative difference (e.g., 1412) in orientation of the plane of focus (e.g., 1406) of the camera (e.g., 1402) and the predetermined orientation (e.g., 1408) that outside (e.g., greater than) a visual indicator alignment threshold, will cause the moving visual indicator to be displayed at new position that is based on the degree of change in orientation and that is not based on the position of the stationary indicator. In contrast, a change in orientation that results in a relative difference (e.g., 1412) that is less than the visual indicator alignment threshold, does not cause the position of the moving visual indicator to be updated (e.g., it remains snapped to the stationary visual indicator). Snapping the indicators out of alignment when the current orientation of the device exceeds a threshold amount as compared to the predetermined orientation (e.g., 1408) provides the user with visual feedback of the orientation state of the device and, in particular, that the device is not substantially aligned with the predetermined orientation (e.g., 1408). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 1544, while the orientation of the plane of focus (e.g., 1406) of the camera (e.g., 1402) is at a seventh orientation having a relative difference (e.g., 1412) to the predetermined orientation (e.g., 1408) that is within the respective alignment threshold and while a third visual indicator of the at least two visual indicator is displayed, the electronic device (e.g., 1400) detects, based on data from the sensor, a change in orientation of the plane of focus (e.g., 1406) of the camera (e.g., 1402) from the seventh orientation to an eighth orientation.

In some embodiments, at block 1546, in response to detecting the change in orientation of the plane of focus (e.g., 1406) of the camera (e.g., 1402) from the seventh orientation to the eighth orientation, the technique of blocks 1548-1550 are performed.

In some embodiments, at block 1548, in accordance with a determination that a relative difference (e.g., 1412) between the eighth orientation of the plane of focus (e.g., 1406) of the camera (e.g., 1402) and the predetermined orientation (e.g., 1408) is within the visual indicator alignment threshold, the electronic device (e.g., 1400) maintains display of the third visual indicator (e.g., maintaining display at the same position or a different position, maintaining display with a similar visual characteristic (e.g., display intensity) or a different visual characteristic)).

In some embodiments, at block 1550, in accordance with a determination that the relative difference (e.g., 1412) between the eighth orientation of the plane of focus (e.g., 1406) of the camera (e.g., 1402) and the predetermined orientation (e.g., 1408) is not within the visual indicator alignment threshold, the electronic device (e.g., 1400) ceases to display of the third visual indicator. Ceasing to display the alignment guide (e.g., 1414A and 1414B) in the camera viewfinder when the difference between the current orientation of the device and the predetermined orientation exceeds a threshold amount enables the user to transition between display of the alignment guide (e.g., 1414A and 1414B) and not displaying the alignment guide (e.g., 1414A and 1414B), thereby displaying additional controls when they are helpful and not displaying the additional controls when they are not helpful. Providing additional control options when they are helpful and not cluttering the UI with additional displayed control options when they are not helpful enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the predetermined orientation (e.g., 1408) corresponds to a horizontal orientation (e.g., the earth's surface or a plane perpendicular to the earth's gravitational field).

In some embodiments, the predetermined orientation (e.g., 1408) is a vertical orientation (e.g., parallel to the earth's gravitational field).

In some embodiments, at least one of the at least two (e.g., one indicator changes position on the display (e.g., 1404) independent of the other indicator) visual indicators are displayed proximate to (e.g., at or near) a center of the camera viewfinder (e.g., 1410). Displaying one of the visual indicators proximate to the center of the camera viewfinder provides additional space in all directions of the centered visual indicator for displaying the other visual indicator, thereby maximizing the granularity with which the difference between the predetermined orientation and the current device orientation is provided to the user as visual feedback. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the first visual indicator at the predetermined display position, includes displaying a respective (e.g., predefined) animation at a location of one or more of the visual indicators (e.g., displaying a highlight, blink, flash at a location of the fixed visual indicator and/or translating the moving visual indicator from a first position to the predetermined display position). In some embodiments, the animation allows a user to understand that the image is in alignment. The animation draws a user's attention to that fact.

In some embodiments, while the orientation of the plane of focus (e.g., 1406) of the camera (e.g., 1402) is at a fifth orientation having a relative difference (e.g., 1412) to the predetermined orientation (e.g., 1408) that is within the respective alignment threshold and while a second visual indicator of the at least two visual indicator is displayed with a first value of a visual characteristic (e.g., a first visual intensity, a first color, a first size), the electronic device (e.g., 1400) detects, based on data from the sensor, a change in orientation of the plane of focus (e.g., 1406) of the camera (e.g., 1402) from the fifth orientation to a sixth orientation, wherein the relative difference (e.g., 1412) between the sixth orientation of the plane of focus (e.g., 1406) of the camera (e.g., 1402) and the predetermined orientation (e.g., 1408) is within the visual indicator alignment threshold. In response to detecting the change in orientation of the plane of focus (e.g., 1406) of the camera (e.g., 1402) from the fifth orientation to the sixth orientation, displaying the second visual indicator with a second value of the visual characteristic different than the first value (e.g., with a greater (or lesser) visual or display intensity, a different color, a different size). Displaying a visual indicator with a different visual characteristic provides the user with additional visual feedback about the alignment of the device. Providing improved visual feedback enhances the operability of the device and makes the user-device interface more efficient (e.g., by helping the user to achieve an intended result and reducing user mistakes when operating/interacting with the device) and, additionally, reduces power usage and improves battery life of the device.

In some embodiments, the fifth orientation of the plane of focus (e.g., 1406) of the camera (e.g., 1402) has a first relative difference (e.g., 1412) between an orientation of the plane of focus (e.g., 1406) of the camera (e.g., 1402) and a predetermined orientation (e.g., 1408). In some embodiments, the sixth orientation of the plane of focus (e.g., 1406) of the camera (e.g., 1402) has a second relative difference (e.g., 1412) between an orientation of the plane of focus (e.g., 1406) of the camera (e.g., 1402) and a predetermined orientation (e.g., 1408), the second relative distance is greater than the first relative difference (e.g., 1412) (e.g., the sixth orientation is further out of alignment with respect to the predetermined orientation (e.g., 1408) (e.g., horizontal). In some embodiments, the visual characteristic is a display intensity (e.g., degree of fade with respect to a maximum display intensity). In some embodiments, the first value is greater than the second value (e.g., the first visual indicator is more prominently displayed (e.g., less faded) when the camera orientation is closer to the predetermined orientation (e.g., 1408) and more faded as the camera orientation is further from the predetermined orientation (e.g., 1408), until the visual indicator fades out altogether). Enhancing the orientation guide as the camera orientation moves towards the predetermined orientation and fading the orientation guide as the camera orientation moves further from the predetermined orientation provides the user with visual feedback that the device is being moved in or out of a range in which the orientation guide will be displayed. Providing improved visual feedback enhances the operability of the device and makes the user-device interface more efficient (e.g., by helping the user to achieve an intended result and reducing user mistakes when operating/interacting with the device) and, additionally, reduces power usage and improves battery life of the device.

Note that details of the processes described above with respect to method 1500 (e.g., FIGS. 15A-15E) are also applicable in an analogous manner to the methods described above and below. For example, method 700, 900, 1100, 1300, 1700 optionally includes one or more of the characteristics of the various methods described above with reference to method 1500. For example, elements of an alignment interface, affordances, and controls from among the various methods can be combined. For another example, the viewfinder in method 1500 is analogous to the viewfinder in methods 700, 900, 1100, 1300, 1700. For brevity, these details are not repeated below.

Figure 16A:
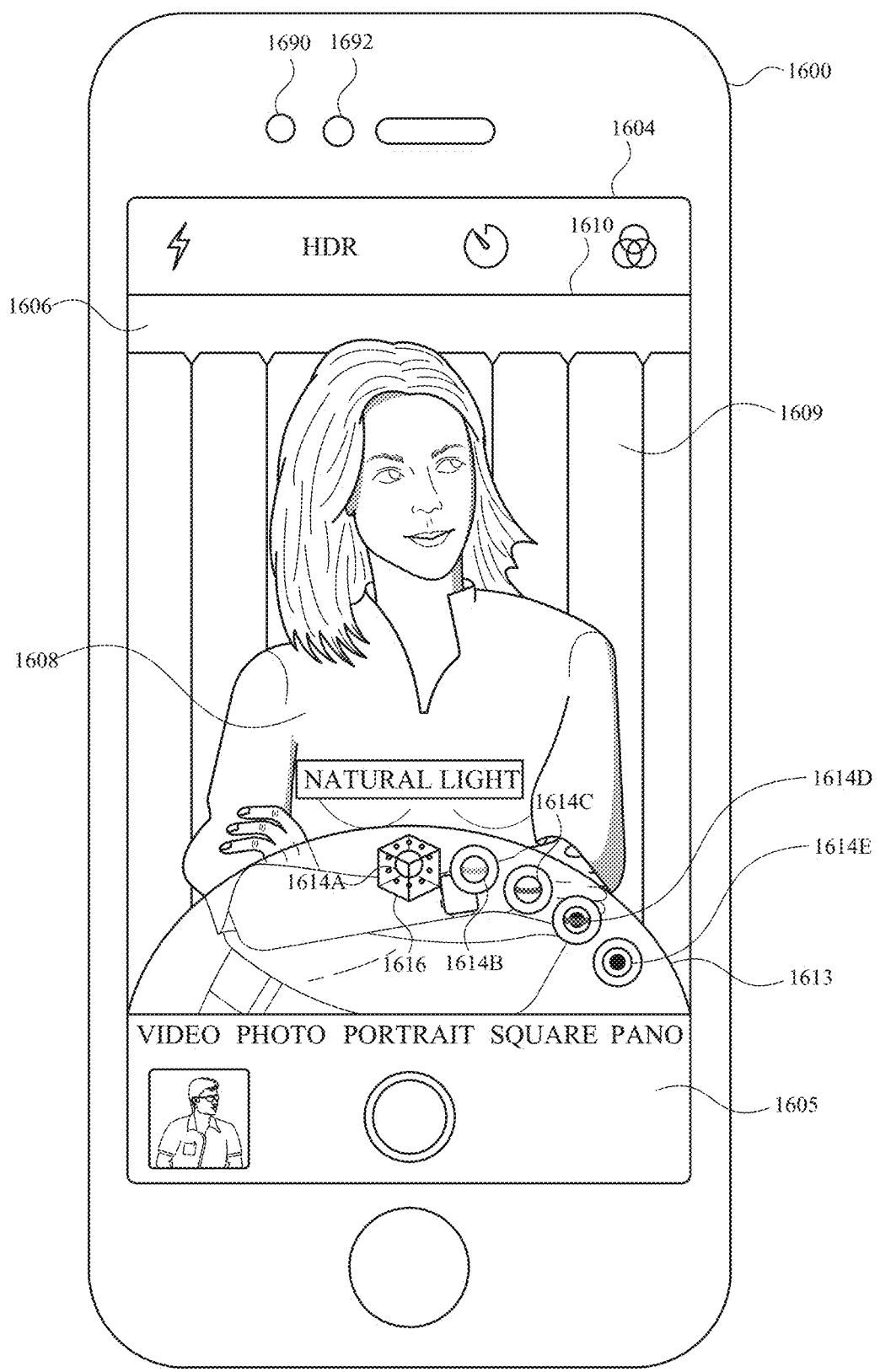
FIGS. 16A-16J illustrate exemplary devices and user interfaces for capturing an image, in accordance with some embodiments.

FIG. 16A illustrates device 1600 In some embodiments, the electronic device 1600 includes some or all of the components of device 600. In some embodiments, the device 1600 includes multiple cameras 602 and 603 (e.g., on the rear of the electronic device 1600). In some embodiments, device 1600 includes one or more features of devices 100, 300, and/or 500. In some examples, the electronic device (e.g., 1600) has multiple cameras with fixed, but different, focal lengths. In some examples, the multiple cameras are on the front, the back, or both sides of the electronic device (e.g., 1600). In some embodiments, in addition to having different fixed focal lengths, multiple cameras have different fixed fields of view and different fixed optical magnification properties. In some embodiments, the camera (e.g., 602) captures image data using a plurality of focal lengths. In some embodiments, one camera (e.g., 602) captures a plurality of focal lengths, thus, producing the same result as a plurality of cameras with fixed, but different, focal lengths. In some examples, the electronic device (e.g., 1600) includes a depth camera (e.g., 1690), such as an infrared camera, a thermographic camera, or a combination thereof. In some examples, the device further includes a light-emitting device (e.g., light projector), such an IR flood light, a structured light projector, or a combination thereof. The light-emitting device is, optionally, used to illuminate the subject during capture of the image by a visible light camera and a depth camera (e.g., an IR camera) and the information from the depth camera (e.g., 1690) and the visible light camera are used to determine a depth map of different portions of subject captured by the visible light camera. In some embodiments, the lighting effects described herein are displayed using disparity information from two cameras (e.g., two visual light cameras) for rear facing images and using depth information from a depth camera combined with image data from a visual light camera (e.g., 1692) for front facing images (e.g., selfie images). In some embodiments, the same user interface is used when the two visual light cameras are used to determine the depth information and when the depth camera is used to determine the depth information, providing the user with a consistent experience, even when using dramatically different technologies to determine the information that is used when generating the lighting effects. In some embodiments, while displaying the camera user interface with one of the lighting effects applied, the device detects selection of a camera switching affordance and switches from the front facing cameras (e.g., a depth camera 1690 and a visible light camera 1692) to the rear facing cameras (e.g., two visible light cameras that are spaced apart from each other) (or vice versa) while maintaining display of the user interface controls for applying the lighting effect and replacing display of the field of view of the front facing cameras to the field of view of the rear facing cameras (or vice versa).

As illustrated in FIG. 16A, the electronic device 1600 includes display 1604 which is touch sensitive (e.g., a touch screen) and the display displays image data received from the camera (e.g., 602). In some embodiments, the display is distinct from a touch sensitive surface. In some examples, the multiple cameras (e.g., 602 and 603) are positioned on the front, back, or both sides of the electronic device (e.g., 1600).

FIG. 16A further illustrates the electronic device 1600 displaying, on the display 1604, a camera application user interface 1605 for capturing images with the camera (e.g., 602). The camera application user interface 1605 further includes a digital viewfinder 1610 which includes a live preview of a field of view of a camera (e.g., 602 or 603). In some embodiments, the camera captures, in real time, depth information associated with the image data. FIG. 16A further illustrates the camera capturing distinct depth levels in the field of view; including a subject (e.g., woman) in the foreground region (e.g., 1608), and a fence in the background region (e.g., 1609). In some examples, the camera (e.g., 602) captures 3, 4, 5, 10, 20, or more depth levels in a field of view. The electronic device 1600 utilizes the various depth levels when applying a filter to the representation of image data (e.g., 1606) displayed within the digital viewfinder (e.g. 1610), as discussed in more detail below.

Furthermore, FIG. 16A illustrates the electronic device 1600 displaying a filter picker user interface 1613 in an expanded state. The filter picker user interface 1613 is positioned along the edge of the digital viewfinder 1610. In some examples, the filter picker user interface (e.g., 1613) is, optionally, displayed above, below, to the left, or to the right of the digital viewfinder (e.g., 1610). In some examples, the filter picker user interface (e.g., 1613) includes one or more representation of filters (e.g., representations of visual effects) arranged in one or more rows and columns or positioned in a circular orientation.

In some examples, the expanded filter picker user interface (e.g., 1613) is displayed at any location corresponding to the digital viewfinder. In some examples, the filter picker user interface (e.g., 1613) is delineated with an outline (e.g., a boundary) to distinguish the filter picker user interface from the digital viewfinder. In some embodiments, the filter picker user interface (e.g., 1613), when in the collapsed state, is translucent (or partially translucent) and has no visible boundary. As a result, in some examples, the filter picker user interface (e.g., 1613) appears to blend in (e.g., is indistinguishable) with the digital viewfinder.

As shown in FIG. 16A, the electronic device 1600 displays the filter picker user interface 1613, which includes one or more filter representations (e.g., 1614A, 1614B, 1614C, 1614D, 1614E) corresponding to visual effects. In some examples, the filter picker user interface (e.g., 1613), optionally, includes additional filter representations which are not displayed on the display (e.g., they are off screen). In some examples, the filter representations which are not displayed are displayed when the electronic device receives an input (e.g., a swipe gesture) which would result in the filter representations to scroll through the filter container (e.g., 1616).

As further illustrated in FIG. 16A, in some embodiments, the electronic device 1600, displays a filter representation 1614A within the expanded filter picker user interface (e.g., 1613) to indicate the currently selected visual effect. In some embodiments, the filter representation 1614A corresponds to a "Natural Light" lighting effect filter. Consequently, the foreground region 1608 and the background region 1609 are displayed with the "Natural Light" lighting effect filter (e.g., using the natural lighting from the scene). Because the image representation in in FIG. 16A is depicted without using any synthetic light (e.g., simulated), the natural light from the scene creates varying shadows on the subject (e.g., face, neck, and clothing). In some examples, the possible filter representations (e.g., 1614A-1614E) corresponding to lighting effects include the "Studio Light" lighting effect, the "Contour Light" lighting effect, the "Stage Light" lighting effect, and the "Stage Light Mono" lighting effect. The preceding lighting effects, when applied to the representation of image data (e.g., 1606), affects a visual characteristic of the representation of image data displayed on the display 1604.

In some embodiments, when the electronic device 1600 applies the natural lighting effect, no synthetic lighting is added to an image (e.g. the original image is displayed). In contrast, the studio lighting effect includes modelling of multiple discrete point-of-light sources (e.g., lights within a photography studio) positioned uniformly around the subject (e.g. creates a bright fill lighting effect). The contour lighting effect includes modelling of multiple discrete point-of-light sources positioned along a circumference of a subject (e.g., creates a slimming effect, creates shadows on side of a subject's face and/or over the subject's chin). The stage light lighting effect includes modelling of a single discrete point-light-source positioned above the subject (e.g., creates a spotlight effect). The stage light mono lighting effect includes modelling in black and white of a single discrete point light source positioned above the subject (e.g., creates a spotlight effect in a black and white).

In some examples, the electronic device (e.g., 1600) detects a subject's face in the representation of image data. Consequently, the electronic device uses the image data's depth map information and the corresponding facial features when applying a lighting effect. As a result, the lighting effect is applied with greater precision around the subject's face and certain facial features may be lighted differently based on a selected lighting effect (e.g., increasing or decreasing shadows around the subject's chin and/or cheek bones). In some examples, the image data includes depth map information which includes depth contours of objects. As a result, the electronic device uses the contour data to more accurately apply a lighting effect around the subject.

Figure 16B:
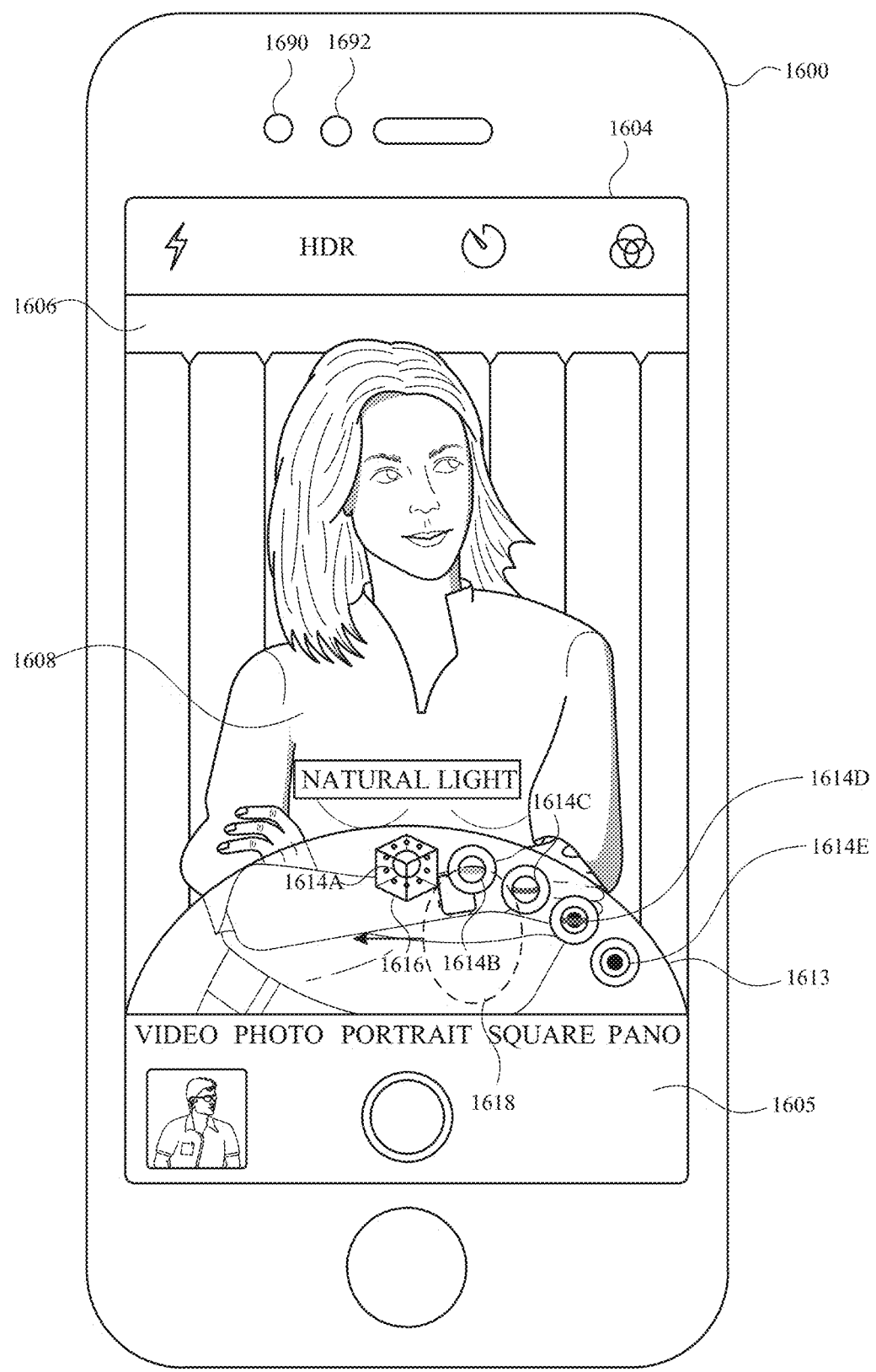
Figure 16C:
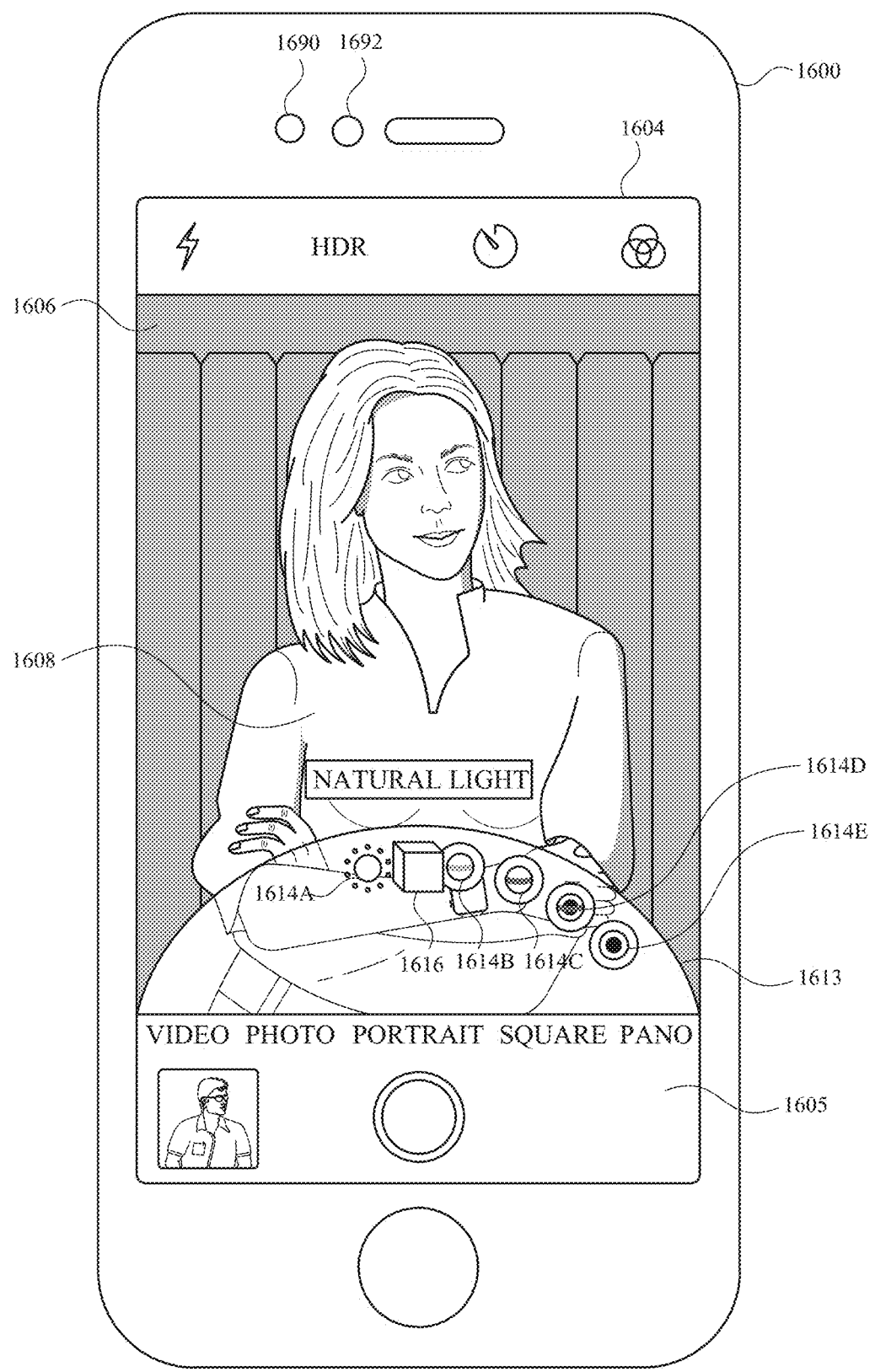

As illustrated in FIG. 16B, the electronic device 1600 receives an input (e.g., swipe 1618) at a location corresponding to the expanded filter picker user interface (e.g., 1613). As shown in FIG. 16C, the input (e.g., swipe 1618) causes the filter representations (1614A-E) to scroll through the filter container 1616. In some embodiments, in response to the input (e.g., swipe 1618) the filter representations will scroll to the left across the top boundary of the filter picker user interface (e.g., 1613). In some examples, a single swipe gesture will result in the incremental scroll of the filter representations. In some embodiments, the number of filter representations scrolled will be dependent the magnitude of the swipe gesture. Thus, in some examples, a longer swipe will cause a longer scroll than a shorter swipe.

In response to the input (e.g., 1618 swipe), in some embodiments, the electronic device 1600 applies a lighting effect corresponding to the filter representation (e.g., 1614B) corresponding to the location on the display 1604 of the tap input. In some examples, the input is a swipe, press and hold, or an input with a characteristic intensity that is above a respective intensity threshold. In some examples, an input with a characteristic intensity that is above a respective intensity threshold detected on a representation of one of the filters (1614A-1614F), optionally, results in a display of additional functionality for the corresponding filter representation associated with the location of the input with a characteristic intensity that is above a respective intensity threshold.

In some embodiments, an additional visual effect may be applied to the entire representation of image data (e.g., 1606) prior to applying the lighting effect corresponding to the filter representation (e.g., 1614B). For example, a slight gradient fill may be applied to the representation of image data (e.g., 1606) prior to applying the stage lighting filter so as to more fluidly transition from no filter to a lighting effect filter.

Figure 16D:
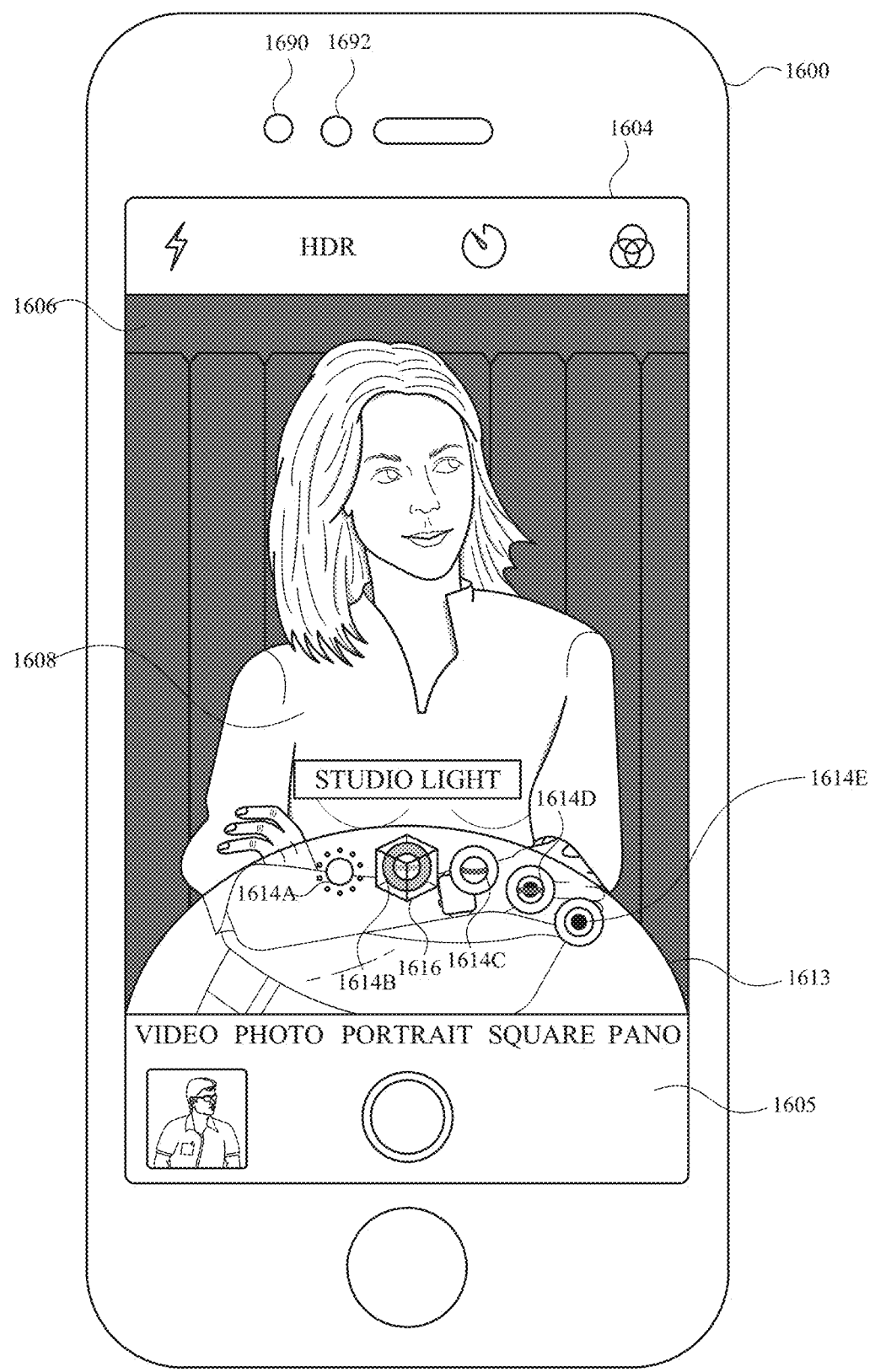

FIGS. 16C-16D illustrate the electronic device 1600 gradually applying the lighting effect as result of the electronic device receiving the input (e.g., swipe 1618) in FIG. 16B. In some embodiments, the lighting effect corresponding to the newly selected filter representation 1614B is gradually applied to the representation of image data (e.g., 1606) in the live preview. Because the selected lighting effect is a "Studio Light," the corresponding visual effect simulates multiple point-of light sources affecting the subject in the foreground region 1608. As a result, during the transition stage (FIG. 16C), the lighting effect corresponding to the filter representation 1614B is applied to the live preview at 50% intensity. The filter corresponding to the filter representation 1614B is fully applied (e.g. 100%) in FIG. 16D. In some examples, the filter is applied in increments (10%, 25%, 50%, 75%) while the electronic device 1600 applies the lighting effect until the transition is complete. In some examples, the background region (e.g., 1609) is completely darkened when the electronic device 1600 applies the "Studio Light" light effect to the representation of image data. In some embodiments, the background region (e.g., 1609) is partially darkened when the electronic device 1600 applies the "Studio Light" light effect to the representation of image data.

As illustrated in FIGS. 16C-16D, because the image data captured by the camera (e.g., 602) includes depth map information associated with the image data, the electronic device is able to use the available depth map information and is able to simulate the effect of various point-of light sources on representation of image data 1606. In some embodiments, the same lighting effect is applied differently in the background region as compared to the foreground region based on the depth map information associate with the image data. As a result, a subject in the foreground may appear more prominently and the subject in the background may be made less prominent via a darkening effect. Additionally, as illustrated in FIG. 16D, because the lighting effects simulate point-of-light sources, the depth map information is used to cast varying shadows on a subject's face in the foreground region (e.g., 1608). As illustrates in FIG. 16D, because the "Studio Light" lighting effect simulates a plurality of point-of-light sources, the electronic device 1600 uses the depth map information to lessen the shadows on a subject's face as compared to the "Natural Light" lighting effect.

In some embodiments, the lighting effects are applied to the digital viewfinder for preview when capturing an image. In some embodiments, the lighting effect is associated with an image post capture.

Figure 16E:
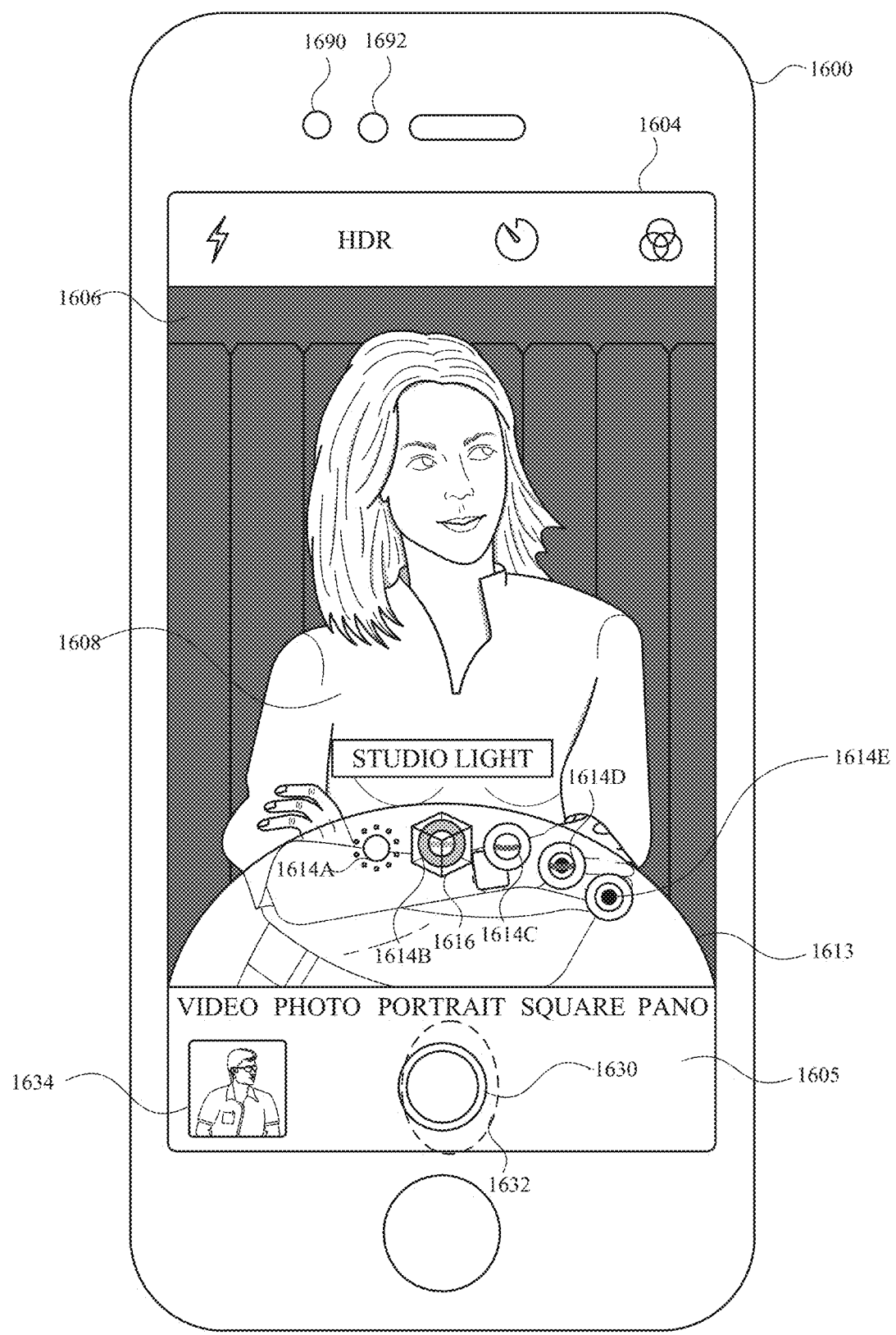

As illustrated in FIG. 16E, the electronic device receives a gesture (e.g., tap 1632) at a location corresponding to a shutter button affordance 1630. In some embodiments, in response to receiving the gesture (e.g., tap 1632), the electronic device 1600 would capture the image data corresponding to the field of view of the one or more cameras (e.g., 602 and 603) and the electronic device would associate the currently selected (e.g., activated) lighting effect to the representation of image data. The resulting image with the lighting effect applied would be stored in the electronic device's camera roll and would be available for review in the camera roll application (e.g., as represented by affordance 1634).

Figure 16F:
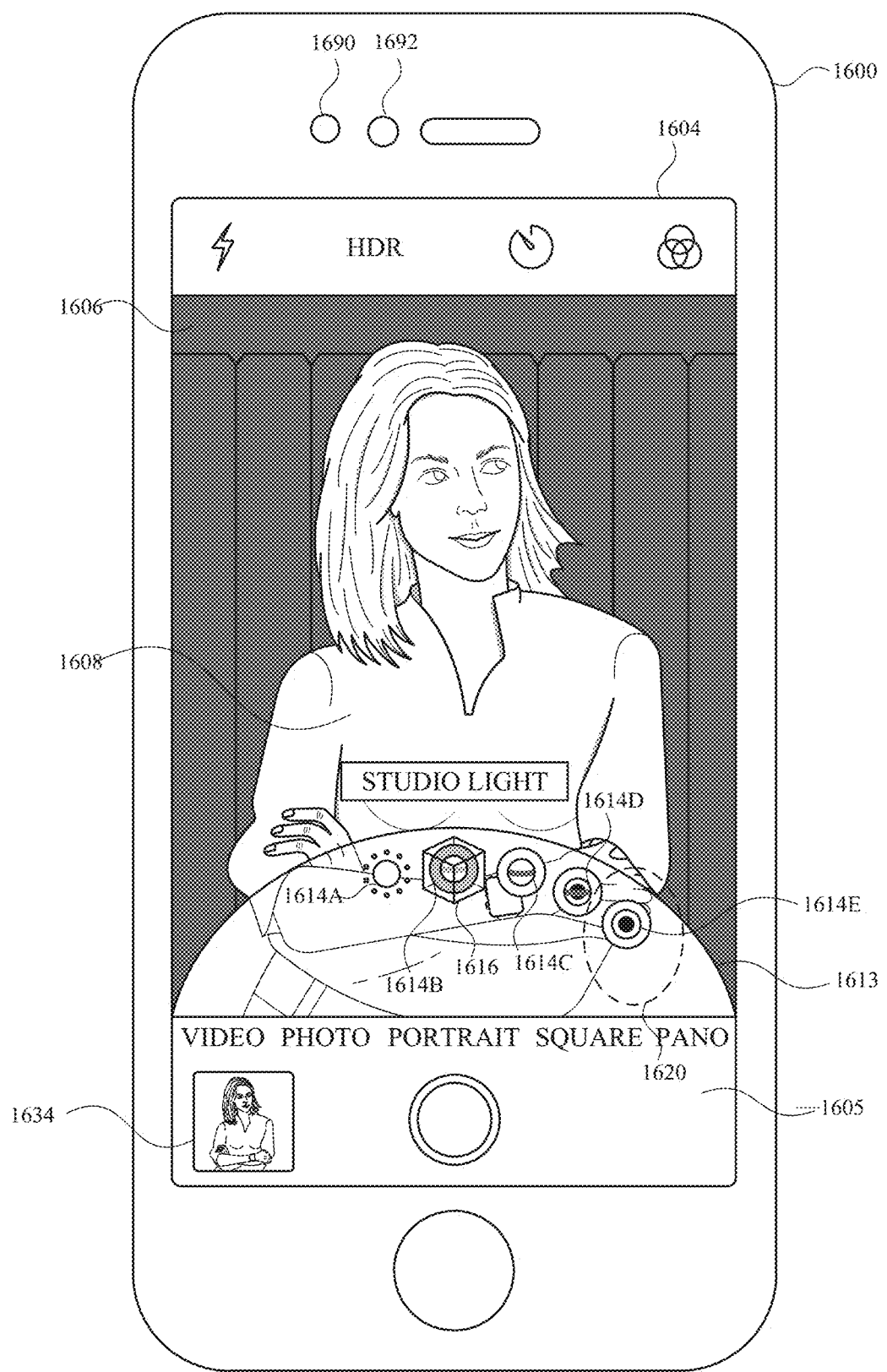

As illustrated in FIG. 16F, the electronic device 1600 receives an input (e.g., tap 1620) and will cause the representations of filters (1614A-E) to scroll through the filter container (e.g., 1616). In some embodiments, in response to the tap gesture (e.g., 1620) corresponding to filter representation (e.g., 1614E), the representations of the filters will scroll to the left across the top periphery of the expanded filter picker user interface (e.g., 1613). FIG. 16F further illustrates that the affordance for the camera roll application (e.g., 1634) changes appearance to correspond to the last captured image (e.g., the studio light image captured in FIG. 16E). In some embodiments, the affordance for the camera roll application (e.g., 1634) is displayed as a thumbnail representation of the captured image corresponding to the representation of the image. In some embodiments, the affordance for the camera roll application (e.g., 1634) is displayed as a thumbnail icon which does not resemble the captured image corresponding to the representation of the image.

Figure 16G:
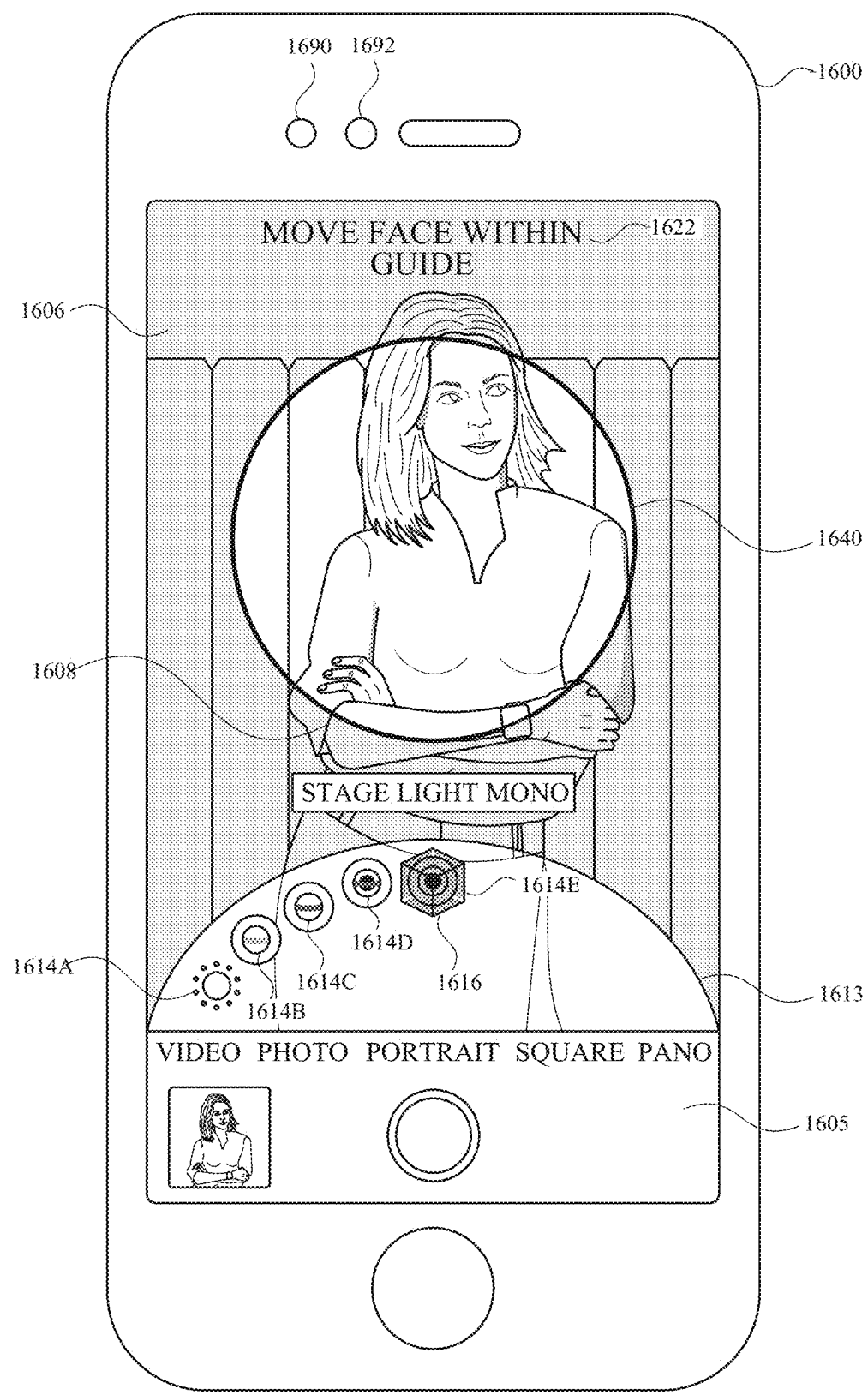

FIG. 16G illustrates the result of the tap gesture (e.g., 1620) of FIG. 16F. In response to the tap gesture, the electronic device 1600 transitions to the "Stage Light Mono" lighting effect mode. As illustrated in FIG. 16G, while the electronic device 1600 is in the "Stage Light Mono" mode, an alignment guide 1640 is displayed as a circle and is positioned slightly off-center in the vertical direction, on the display 1604. In some embodiments, the alignment guide (e.g., 1640) is represented as a hexagon, oval, or a triangular shape. In some embodiments, the alignment guide is positioned in the middle of the display (e.g., 1604) in both, the vertical and the horizontal directions. In some embodiments, the alignment guide (e.g., 1640) is positioned on the display (e.g., 1604) off-center in one or both of the vertical and the horizontal directions.

In some embodiments, the alignment guide is used to assist a user in aligning a subject's body part (e.g., their face) within a specific portion of the digital viewfinder. As illustrated in FIG. 16F, because the electronic device determined that certain criteria are not met (e.g., a subject's face is not properly aligned within the alignment guide 1640), the electronic device displays a message 1622 to prompt the user to take proper action. In some embodiments, the lighting effect will not be applied to the representation of image data (e.g., 1606) unless the electronic device determines that the proper criteria has been met (e.g., the subject's face is properly aligned with the alignment guide, the subject is at the proper distance from the device).

As further illustrated in FIG. 16G, the area outside of the alignment guide 1640 is slightly shaded while the area inside the alignment guide 1640 remains unchanged. In some embodiments, the area outside of the alignment guide (e.g., 1640) is not shaded and the area inside the alignment guide (e.g., 1640) is also unshaded.

Figure 16H:
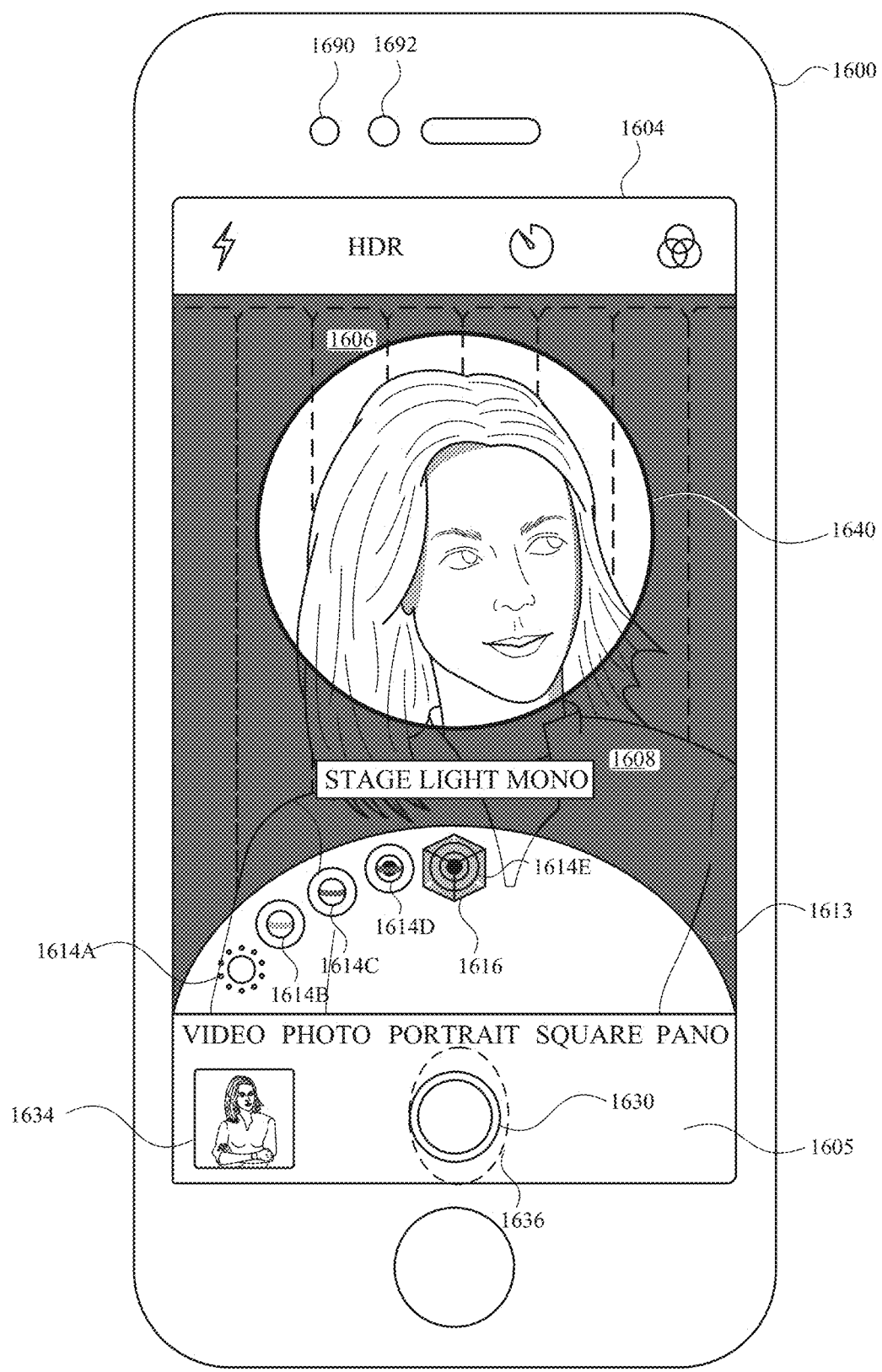

FIG. 16H illustrates a user taking a few steps toward the device so that a subject's face is properly aligned within the alignment guide 1640. As illustrated in FIG. 16H, when the subject's face is properly aligned with the alignment guide 1640, the area outside of the alignment guide (e.g., 1640) is shaded with a darker color and the area inside the alignment guide 1640 is not shaded (e.g., no artificial lighting is applied). In some embodiments, the dark shading serves as a "lock-on" indicator and provides the user an indication the criteria for the selected lighting effect (e.g., stage light mono) have been met. In some embodiments, the currently selected lighting effect (e.g., stage light mono) is applied to an area within the alignment guide (e.g., 1640). In some embodiments, additional criteria (e.g., the subject is at the required distance from the electronic device, lighting conditions) must be met for the dark shading outside of the alignment guide to occur.

Additionally, as further illustrated in FIG. 16H, a blurring (e.g., bokeh; depicted as dashed lines) optical effect is applied to the background (e.g., fence) of the representation of image data 1606 for the entire representation of image data 1606 (e.g., both the areas within and without of the alignment guide). In some embodiments, the blurring optical effect is disproportionally applied to different parts of the representation of image data (e.g., 1606) displayed on the display (e.g., 1604) when the alignment criteria are met.

In some embodiments, the alignment guide (e.g., 1640) is displayed in other (e.g., not stage light mono) lighting effects that require removal (e.g., blurring) of the background.

In some examples, when the conditions for the alignment guide are no longer met (e.g., a subject's face is not longer aligned with the alignment guide, the subject moved too far back from the device and is no longer at the proper distance from the device, the lighting conditions are not correct), the previously applied lighting effect is snapped out (e.g., the electronic device reverts to slight/no darkening outside of the alignment guide as illustrated in FIG. 16G). In some embodiments, a temporary filter (e.g., a gradient) which is, optionally, part of the lighting effect filter is applied to the image representation when the dark shading snaps out. The temporary filter helps smooth (e.g., less jarring) the transition when shading is reapplied.

As further illustrated in FIG. 16H, the electronic device 1600 receives a gesture (e.g., tap 1636) at a location corresponding to a shutter button affordance 1630. In some embodiments, in response to receiving the gesture (e.g., tap 1636), the electronic device 1600 captures the image data corresponding to the field of view of the one or more cameras (e.g., 602 and 603) and the electronic device associates the currently selected (e.g., activated) lighting effect to the representation of image data. In such embodiments, the resulting image with the lighting effect applied is then stored in the electronic device's camera roll and is available for review in the camera roll application (e.g., as represented by affordance 1634). In some embodiments, even though the lighting effect is not applied to the digital viewfinder during capture, it will be applied to the image data after capture (e.g., the captured image will appear different that what is seen by the user in the digital viewfinder).

Figure 16I:
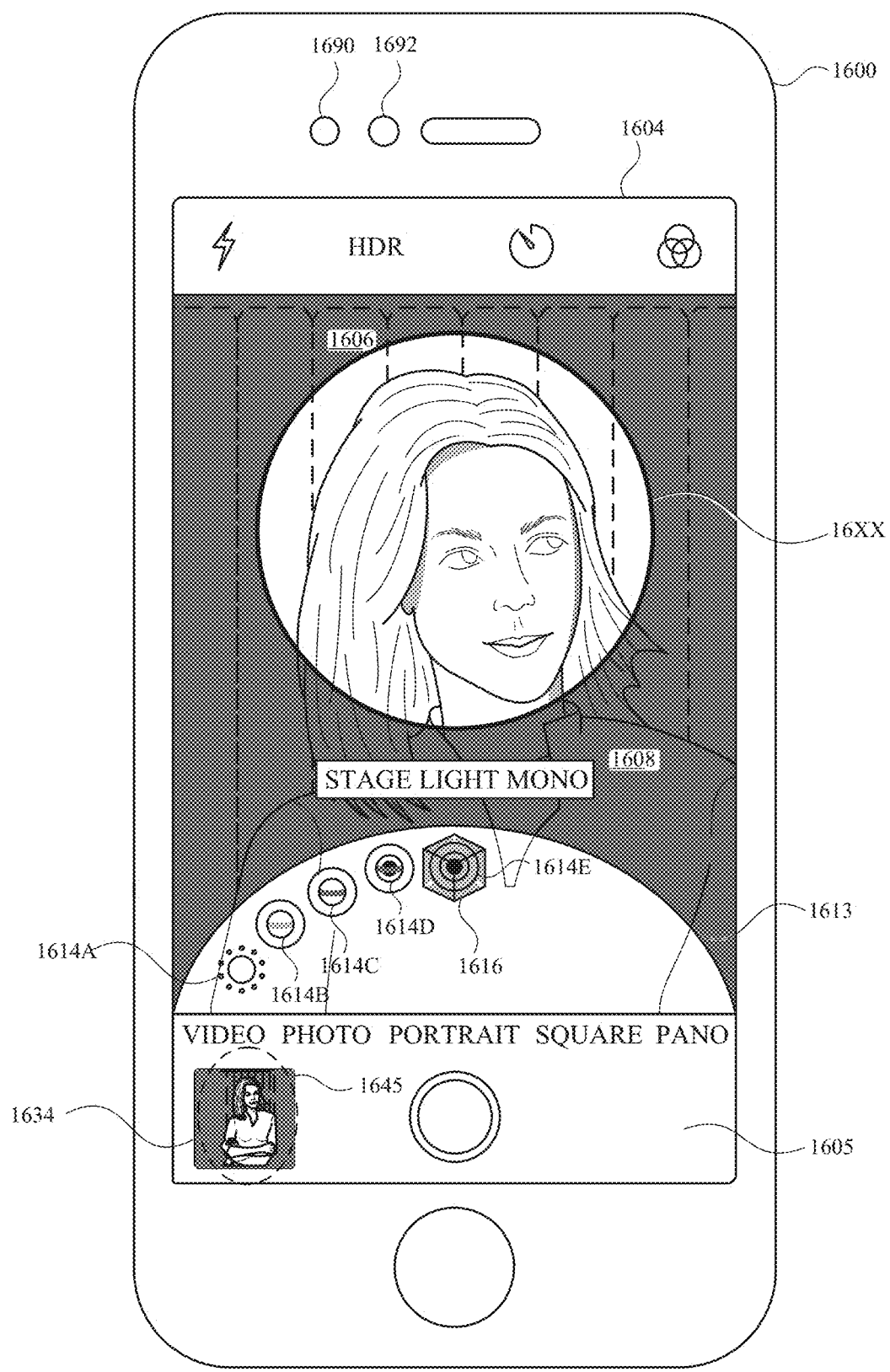

As illustrated in FIG. 16I, the electronic device detects an input (e.g., tap 1645) at a location corresponding to a photo viewer application (e.g., 1634). In response to receiving the input (e.g., 1645), the electronic device 1600 switches to an image viewing mode (e.g., a mode for viewing previously captured images, rather than a live preview of camera data) as illustrated in FIG. 16J.

Figure 16J:
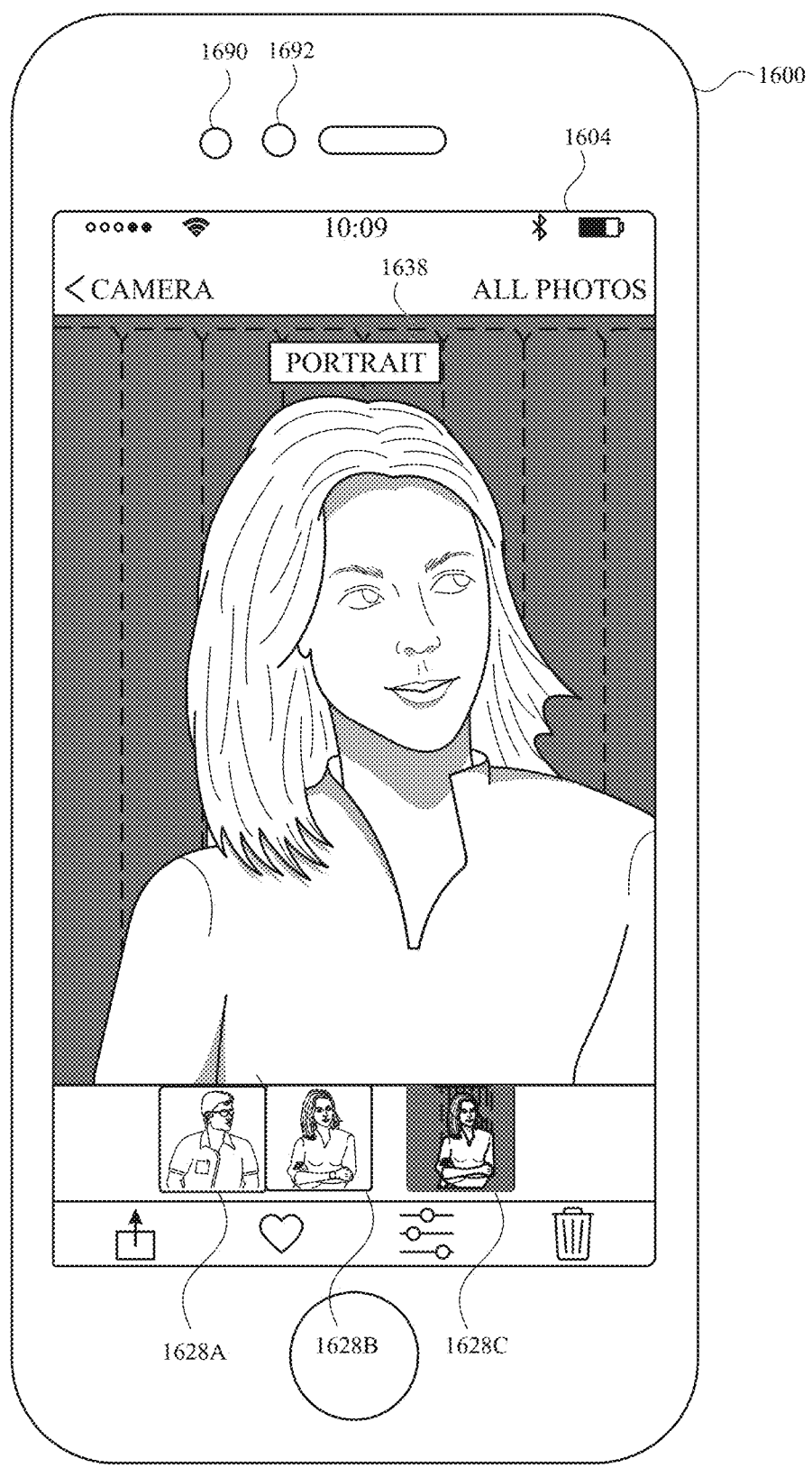

FIG. 16J illustrates a user interface for a photo viewer application. The photo viewer application includes a thumb strip of previously captured images (e.g., 1628A-1628C) with 1628C being the last capture image. In some examples, the previously captured images were captured using a camera corresponding to the electronic device (e.g., 1600). In some examples, the electronic device (e.g., 1600) received the previously captured images (e.g., 1628A-1628C) from a remote source (e.g., a server) and, optionally, the previously captured images were captured with a different electronic device (e.g., not 1600).

FIG. 16J further illustrates that the last captured image (e.g., 1628C) was captured using the stage light mono lighting. The "Stage Light Mono" lighting effect simulates a single point-of-light source and, as a result, resembles a spotlight effect. Using the depth map information, the electronic device 1600 applies the "Stage Light Mono" effect from above the subject in the foreground region (e.g., 1608). In some examples, the point-of-light source may be simulated to originate from any direction. In some examples, the "Stage Light Mono" effect is simulated to originate from the front, and, as a result, a specific focal point (e.g., a face) is highlighted, but the remaining portion of the representation of the image data is darkened. As illustrated in FIG. 16J, because the simulate point-of-light source is originating from above the subject, the electronic device is able to use the image data's depth map information to cast deeper shadows on the subject (e.g., face and neck). In some embodiments, a background of the image is removed and replaced with a solid color such as black or white or a color of the user's choice to further draw attention to the subject in the foreground and simulate a studio setting in which a user could be photographed against a solid backdrop.

In some embodiments, the electronic device displays a "PORTRAIT" visual indicator (e.g., 1638) at the top of the display as an indication to the user that that the previously captured image data includes depth map information. In some examples, the electronic device (e.g., 1600) receives an input at a location corresponding to the visual indicator to toggle the simulated depth effect (e.g., bokeh) effect on and off. In some embodiments, if the simulated depth effect is toggled off, the lighting effect would remain. In some examples, the visual indicator, when activated would toggle the simulated depth effect and the lighting effect, together. In some examples, the electronic device, optionally, receives an input to change the lighting effect within the photo viewer application to a different lighting effect using a filter picker user interface (as describe above). In some examples, if the previously captured image data does not have depth map information; the electronic device (e.g., 1600) would not provide an option to apply a simulated depth effect or a lighting effect. In some examples, if the previously captured image data does not have depth map information associated with the image data, the electronic device would not display the visual indicator (e.g., 1638).

In some examples, the electronic device (e.g., 1600) stores the depth map information with the image data in one file. In some examples, the electronic device (e.g., 1600) stores the depth map information separately from the image data. In some embodiments, once the electronic device stores an image with depth map information as a flat image (e.g., without depth map information) the electronic device (e.g., 1600) would no longer be able to apply a lighting effect to the representation of image data.

FIGS. 17A-17G are a flow diagram illustrating a method for applying a simulated lighting effect to a representation of image data (e.g., 1606) and displaying an alignment guide (e.g., 1640) using an electronic device (e.g., 1600) in accordance with some embodiments. Method 1700 is performed at a device (e.g., 100, 300, 500, 1700) with one or more input devices (e.g., a touch-sensitive surface, keyboard, mouse), one or more cameras (e.g., cameras with varying focal lengths and/or a depth sensing camera and a camera that captures color images), and a display (e.g., 1604). In some embodiments, the display (e.g., 1604) is a touch-sensitive display. In some embodiments, the display (e.g., 1604) is not a touch sensitive display. In some embodiments, the electronic device (e.g., 1600) includes a plurality of cameras. In some embodiments, the electronic device (e.g., 1600) only has one camera. Some operations in method 1700 are, optionally, combined, the orders of some operations are, optionally, changed, and some operations are, optionally, omitted.

As described below, method 1700 provides an intuitive way for displaying an alignment guide when certain criteria is met and applying a simulated lighting effect to a representation of image data. The method reduces the cognitive burden on a user for providing inputs corresponding to functions, thereby creating a more efficient human-machine interface. For battery-operated computing devices, enabling a user to initiate various functions faster and more efficiently conserves power and increases the time between battery charges.

At block 1702, the electronic device (e.g., 1600) displays, on the display (e.g., 1604), a representation of image data (e.g., 1606) associated with depth map information (e.g., an image or photograph is displayed on the device's display (e.g., 1604)). In some embodiments, a live preview of the image data is displayed in a digital viewfinder (e.g., 1610).

In some embodiments, at block 1704, the representation of the image data is a live preview of image data captured within the field of view of the one or more cameras displayed in a digital viewfinder (e.g., 1610).

In some embodiments, at block 1706, the depth map information associated with the image data includes information corresponding to at least three different depth levels (e.g., at least a background, depth level, foreground depth level, and an intermediate depth level). The depth map information including three or more different levels of depth provides the user with a framework to apply depth-specific filters and provide the user with more precise feedback about the depth positioning of objects in the field of view of the camera(s). Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, at block 1708, the depth map information associated with the image data includes information identifying depth contours of an object in the representation of the image data; and the lighting effects change the appearance of the representation of the image data based on a location and curvature of the contours of the object. Including depth contours of objects in the depth map information enables the device to provide the user with more precise visual feedback about the shape and depth positioning of objects in the field of view of the camera(s). Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently. Changing the appearance of the representation of the image data based on the location and curvature of contours of the object provides generates a lighting effect that simulates the use of external lighting equipment without requiring the external lighting equipment. Generating these lighting effects without requiring the external lighting equipment reduces a size and cost of the equipment needed to generate the image with the specified lighting effects.

At block 1710, while displaying, on the display (e.g., 1604), the representation of the image data, the electronic device (e.g., 1600), at block 1712, detects, via the one or more input devices, a first input (e.g., swipe, tap and hold, tap (e.g., 1620), button press; the gesture can be on top of an icon representing a lighting filter (e.g., filter representations 1614A, 1614B, 1614C, 1614D, 1614E) (or another user interface system used to select a filter) that selects a respective filter of a plurality of lighting effects (e.g., one or more of natural light, studio light, contour light, stage light, stage light mono that) are based on the depth map information (e.g., based on measurements of a depth sensor or based on disparity mapping between two images taken at the same time from different locations). Concurrently displaying the representation of image data (e.g., 1606) and providing a filter selection interface (e.g., filter picker user interface 1613) provides the user with visual feedback about objects in the camera's field of view and filters available to be applied to the preview. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, at block 1714, the first input is an input received while first criteria (e.g., a set of lighting-effect-application criteria) are met, wherein the first criteria include a requirement that a subject is detected in the field of view within a predetermined distance from the electronic device (e.g., 1600) in order for the first criteria to be met. Other criteria include one or more of: focus distance of a first camera exceeds minimum distance threshold, focus distance of the first camera does not exceed a maximum distance threshold, subject is detected beyond a predetermined minimum distance from the device, the amount of detected light exceeds a minimum light threshold, the amount of detected light does not exceed a maximum light threshold. In some embodiments, if the first criteria are not met, forgo applying the first lighting effect or the second lighting effect. Applying a lighting effect when the subject is determined to be within a predetermined distance when the first input is received provides the user with visual feedback that the subject is properly positioned such that an optimal (or near-optimal) effect can be achieved with the filter. Similarly, not applying the lighting effect when the subject is not within the predetermined distance provides the user with feedback that the subject is not properly positioned and indicates to the user that corrective action is required. Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, at block 1716, the first input is an input received while the first criteria are not met, wherein the first criteria include a requirement that a subject is detected in the field of view within a predetermined distance from the electronic device (e.g., 1600) in order for the first criteria to be met; the method includes: after displaying the live preview without applying the first change in appearance to the live preview, detecting that the first criteria have been met; and in response to detecting that first criteria have been met, applying the first change in appearance to the live preview. In some embodiments, other conditions in the set include one or more of: focus distance of a first camera exceeds minimum distance threshold, focus distance of the first camera does not exceed a maximum distance threshold, subject is detected beyond a predetermined minimum distance from the device, the amount of detected light exceeds a minimum light threshold, the amount of detected light does not exceed a maximum light threshold. In some embodiments, if the first criteria are not met, forgo applying the first lighting effect or the second lighting effect. Applying a lighting effect when the first criteria are met provides the user with visual feedback that the lighting-effect-application criteria has been met (e.g., the subject is properly positioned) and that an optimal (or near-optimal) effect can be achieved with the filter. Similarly, not applying the lighting effect when first criteria are not met provides the user with feedback that the first criteria are not met and indicates to the user that corrective action is required. Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

At block 1710, while displaying, on the display (e.g., 1604), the representation of the image data, the electronic device (e.g., 1600) optionally performs the techniques of blocks 1718-1742.

In some embodiments, at block 1718, in response to detecting the first input, the electronic device (e.g., 1600), prepares to capture image data using the respective filter.

In some embodiments, at block 1720, in accordance with a determination that the respective lighting effect is the first lighting effect (e.g., stage light or another lighting effect that includes background removal), the electronic device (e.g., 1600), displays a capture user interface (e.g., an alignment guide (e.g., 1640)) for the first lighting effect that causes a first change in appearance of a portion of the representation of the image data when a subject in the field of view of the one or more cameras meets the first criteria (e.g., lighting-effect-application criteria) (e.g., an alignment user interface that changes appearance when the first criteria is met).

In some embodiments, at block 1722, in accordance with a determination that the respective lighting effect is the second lighting effect (e.g., natural light, studio light, or contour light or another lighting effect that does not include background removal), the electronic device (e.g., 1600), displays a capture user interface for the second lighting effect that causes a second change in appearance of a portion of the representation of the image data when a subject in the field of view of the one or more cameras meets the first criteria (e.g., lighting-effect-application criteria). (e.g., a preview of a 3D lighting effect).

In some embodiments, at block 1724, displaying the capture user interface for the first lighting effect includes concurrently displaying: the representation of the image data; and an alignment guide (e.g., 1640) (e.g., circle, oval, hexagon) displayed at a first area within the representation of the image data, and wherein the first criteria include a requirement that a representation of a face of the subject displayed in the representation of the image data is within the alignment guide (e.g., 1640) in order for the first criteria to be met. In some embodiments, the alignment guide (e.g., 1640) is overlaid on the representation of image data. In some embodiment, a user would align a part of their body (e.g., face) within the alignment guide (e.g., 1640). In some embodiments, the face of the subject substantially aligns with a perimeter of the alignment guide (e.g., 1640). In some embodiments, the alignment guide (e.g., 1640) is not displayed during some modes (e.g., portrait mode, studio light). In some embodiments, the alignment guide (e.g., 1640) is positioned in the center of the live preview. In some embodiments, the alignment guide (e.g., 1640) is positioned off-center. In some embodiments, if multiple subjects are detected, multiple alignment guides are displayed in the live preview. Displaying an alignment guide (e.g., 1640) within the representation of the image data provides the user with visual feedback about where to position a subject's face so as to capture an image with the desired optical effect. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, at block 1726, the first criteria include a requirement that a representation of a face of the subject detected in a first area within the representation of the image data (e.g., when the face of the user is detected within an alignment guide (e.g., 1640) in the live preview) in order for the first criteria to be met.

In some embodiments, at block 1728, applying the first change in appearance to the image data includes changing an appearance of the representation of the image data displayed in a second area (e.g., outside of the alignment guide (e.g., 1640)) within the representation of the image data as compared to an appearance of the representation of the image data displayed in a first area within the representation of the image data, wherein the second area is distinct (e.g., non-overlapping, separate) from the first area. In some embodiments, changing the appearance of the representation of the image data displayed in the second area as compared to the representation of the image data displayed in the first area includes applying a filter (e.g., an alignment filter) to the second area. In some embodiments, the alignment filter is not applied to the first area. In some embodiments, the alignment filter is evenly applied to the area outside of the alignment guide (e.g., 1640). In some embodiments, the alignment filter gradually changes in intensity (e.g., becomes darker/lighter closer to the edge of the live preview as compared to how the alignment filter is applied near an edge of the alignment guide (e.g., 1640)). In some embodiments, the alignment filter is a singular optical effect (e.g., bokeh, saturation, color). In some embodiments, the alignment filter includes (e.g., is a combination of) multiple optical effects (e.g., bokeh, saturation, color). In some embodiments, each of the multiple optical effects is applied differently to different portions of the live preview.

In some embodiments, at blocks 1732-1742, the electronic device (e.g., 1600), determines that the first criteria are not met; and in response to the determination that the first criteria are not met (e.g., no subject is detected in the field of view within a predetermined distance from the electronic device (e.g., 1600); face is not aligned within the alignment guide (e.g., 1640)): ceases to apply the first change in appearance to the representation of image data; displays, on the display (e.g., 1604), the representation of image data (e.g., 1606) without a first change in appearance applied (e.g., unaltered image with no filter or partial filter applied); and displays, on the display (e.g., 1604), a graphical indication of the lighting condition application criteria that are not met. In some embodiments, the device displays instructions for placing the face within the alignment guide (e.g., 1640) (e.g., move closer, move further away). In some embodiments, when the conditions are met again, the filter is reapplied again.

At block 1710, while displaying, on the display (e.g., 1604), the representation of the image data, the electronic device (e.g., 1600) further performs the techniques of blocks 1744-1750.

At block 1744, after detecting the first input, the electronic device (e.g., 1600) detects a second input (e.g., 1636) (e.g., swipe, tap and hold, tap, button press; the gesture can be on top of an icon representing a shutter button) that corresponds to a request to capture image data corresponding to a field of view of the one or more cameras.

At block 1746, in accordance with a determination that the respective lighting effects selected based on the first input is a first lighting effect (e.g., one or more of natural light, studio light, contour light, stage light, stage light mono), at block 1748, the electronic device (e.g., 1600) captures image data corresponding to the field of view of the one or more cameras and associating the first lighting effect with the representation of image data (e.g., 1606) (e.g., applying the first lighting effect to the image data, preparing to apply the first lighting effect to the image data, or marking the captured image data as image data to which the first lighting effect is to be applied by default when viewing of the image data is requested), wherein the first lighting effect is based on the depth map information; and (e.g., based on measurements of a depth sensor or based on disparity mapping between two images taken at the same time from different locations). Associating a first lighting effect based on the depth map information to the representation of image data (e.g., 1606) provides the user with additional visual feedback about the depth map information.

For example, the first lighting effect may include one or more light sources at different locations, intensities, or types (directional, ambient, point) that provide the user with feedback about the special orientation of objects corresponding to the depth map information. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

At block 1750, in accordance with a determination that the respective lighting effects selected based on the first input is a second lighting effect that is different from the first lighting effect (e.g., one or more of natural light, studio light, contour light, stage light, stage light mono), the electronic device (e.g., 1600) captures image data corresponding to the field of view of the one or more cameras and associating the second lighting effect with the representation of image data (e.g., 1606) (e.g., applying the second lighting effect to the image data, preparing to apply the second lighting effect to the image data, or marking the captured image data as image data to which the second lighting effect is to be applied by default when viewing of the image data is requested), wherein the second lighting effect is based on the depth map information. (e.g., based on measurements of a depth sensor or based on disparity mapping between two images taken at the same time from different locations). Associating a second lighting effect based on the depth map information to the representation of image data (e.g., 1606) provides the user with additional visual feedback about the depth map information. For example, the second lighting effect may include one or more light sources at different locations, intensities, or types (directional, ambient, point) that provide the user with feedback about the special orientation of objects corresponding to the depth map information. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

At block 1752, after capturing image data corresponding to the field of view of the one or more cameras, the electronic device (e.g., 1600) receives a request to display image data captured in response to the second input (e.g., selection of a camera roll affordance (e.g., 1634) or activation of a photo viewer application).

At blocks 1754-1758, in response to receiving the request to display image data captured in response to the second input (e.g., in response to the shutter affordance being activated): in accordance with a determination that the image data was captured while the first lighting effect was selected, the electronic device (e.g., 1600) displays the representation of image data (e.g., 1606) with the first lighting effect applied (e.g., display a representation of the image data with the stage light filter applied); and in accordance with a determination that the image data was captured while the second lighting effect (e.g., not stage light) was selected, the electronic device (e.g., 1600) displays the representation of image data (e.g., 1606) with the second lighting effect applied.

In some embodiments, displaying the capture user interface for the first lighting effect includes: the electronic device (e.g., 1600) applying, to the representation of the image data displayed in the digital viewfinder (e.g., 1610), a placeholder filter (e.g., dimming or desaturating a background), wherein the placeholder filter is based on the first lighting effect and is applied without regard to whether or not the first criteria are met. Applying the placeholder filter makes for a smoother, more intuitive (less confusing) transition to the lighting filter. Applying a placeholder filter without regard to whether the first criteria are met provides the user with visual feedback about the depth-map corresponding to the viewfinder content, such as which portions of the image correspond to portions of the depth map in the background (e.g., 1609), as compared to the foreground (e.g., 1608) Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, in response to the first input, the electronic device (e.g., 1600) applies, to the live preview, a placeholder filter (e.g., dimming or desaturating a background) without applying the first change in appearance to the live preview; and in response to detecting that the first criteria have been met, the electronic device (e.g., 1600) applies the first change in appearance to the live preview while continuing to apply the placeholder filter to the live preview (e.g., the placeholder filter is part of the first lighting effect that does not take into account the depth map information and thus is displayed without regard to whether the first criteria have been met). Applying a placeholder filter without regard to whether the first criteria are met provides the user with visual feedback about the depth-map corresponding to the viewfinder content, such as which portions of the image correspond to portions of the depth map in the background (e.g., 1609), as compared to the foreground (e.g., 1608). Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, while displaying the representation of image data, the electronic device (e.g., 1600) displays, on the display (e.g., 1604), a visual indication (e.g., 1638) that the image data includes depth map information. (e.g., a "portrait mode" badge is optionally displayed to indicate the availability of depth map information.

In some embodiments, the electronic device (e.g., 1600) applying the first lighting effect or the second lighting effect includes: applying, to the representation of the image data displayed in the digital viewfinder (e.g., 1610), a simulation of one or more point-of-light sources in space based on the depth map information associated with the image data. Lighting options comprise of natural light, studio light, contour light, stage light, and stage light mono. The different lighting effects model (e.g., simulates) the result of one or more points of light sources in space based on an image data's depth map. The natural lighting option applies no synthetic lighting to an image (e.g. the original image is displayed or a portion of the original image is displayed and a blur is applied to a different portion of the original effect to simulate a bokeh effect). The studio lighting effect includes modelling of multiple discrete points of light sources positioned around the subject (e.g. creates a bright fill of light effect). The contour lighting effect includes modelling of multiple discrete points of light sources positioned at fewer points around the subject to create shadows on the subject's face (e.g., creates a slimming effect, creates shadows on side of a subject's face and/or over the subject's chin). The stage light lighting effect includes modelling of a single discrete point light source positioned above the subject (e.g., creates a spotlight effect). The stage light mono lighting effect includes modelling in black and white of a single discrete point light source positioned around above the subject (e.g., creates a spotlight effect in a black and white). In some embodiments, the lighting filter simulates a light point source. In some embodiments, the lighting effect is snapped in when the first criteria are met, as described in greater detail above). In some embodiments, if the system detects a face, the facial features are taken into consideration when applying the lighting effect. As a result, the lighting effects change the appearance of the representation of the image data based on a subject's specific facial features and facial shape. Applying a simulation of a point-of-light source provides the user with a visual representation of the content of the depth map information and enables the device to provide the user with visual feedback about the shape and depth positioning of objects in the field of view of the camera(s). Providing improved visual feedback enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently. Applying, to the representation of the image data displayed in the viewfinder (e.g., 1610), a simulation of one or more point-of-light sources in generates a lighting effect that simulates the use of external lighting equipment without requiring the external lighting equipment. Generating these lighting effects without requiring the external lighting equipment reduces a size and cost of the equipment needed to generate the image with the specified lighting effects.

In some embodiments, while the first lighting effect is applied, the electronic device (e.g., 1600) maintains at least one value of a previously applied visual effect. (e.g., bokeh, lighting). Thus, it is possible to achieve a light effect and a bokeh effect in one representation of the image data.

In some embodiments, the previously applied visual effect is a color filter.

In some embodiments, the second input is an input received while the first lighting effect is being applied to the representation of image data (e.g., 1606) and wherein applying the second lighting effect includes: gradually transitioning between the first lighting effect and application of the second lighting effect. In some embodiments, gradually transitioning includes at a 1st time 100% 1st, 0% 2nd, at 2nd time, 90% first, 10% second, etc. Gradually transitioning between lighting effects reduces user distraction created by flickering the filters on/off, thereby letting the user focus on taking the desired picture, thereby reducing the number of inputs required to capture the desired photo, reducing the memory requirements for storage of photos. Reducing the number of inputs needed to capture a desired image and reducing the memory requirements enhances the operability of the device and makes the user-device interface more efficient (e.g., by helping the user to achieve an intended result and reducing user mistakes when operating/interacting with the device) which, additionally, reduces power usage and improves battery life of the device by enabling the user to use the device more quickly and efficiently.

Note that details of the processes described above with respect to method 1700 (e.g., FIGS. 17A-17G) are also applicable in an analogous manner to the methods described above. For example, method 700, 900, 1100, 1300, and 1500 optionally includes one or more of the characteristics of the various methods described above and with reference to method 1700. For example, elements of the filter user interface, affordances, and controls from among the various methods can be combined. For another example, the viewfinder in method 1700 is analogous to the viewfinder in methods 700, 900, 1100, 1300, 1500. For another example, the preview of a first filter described in method 700, can be displayed on the display (e.g., 1604). For another example, the result of applying of a first lighting effect to the representation of image data, as described in method 900, can be displayed on the display (e.g., 1604). For another example, the result of applying a first image filter to the foreground region of image data, as described in method 1100, can be displayed on the display (e.g., 1604). For another example, displaying a filter selection interface which includes representations of a plurality of filters in a set of filters, as described in method 1300, can also be displayed on the display (e.g., 1604). For another example, displaying an alignment guide, as described in method 1500, can also be displayed on the display (e.g., 1604). For brevity, these details are not repeated.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 17A-17G are, optionally, implemented by components depicted in FIGS. 1A-1B. For example, displaying operation 1702, detecting operation 1712, displaying operation 1720, displaying operation 1722, displaying operation 1724, and applying operation 1728 are, optionally, implemented by event sorter 170, event recognizer 180, and event handler 190. Event monitor 171 in event sorter 170 detects a contact on touch-sensitive display 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A non-transitory computer-readable storage medium storing one or more programs configured to be executed by one or more processors of an electronic device with one or more cameras, one or more input devices, and a display, the one or more programs including instructions for:

displaying, on the display, a camera application user interface for a camera application, wherein the camera application user interface includes concurrently displaying:
   a digital viewfinder including a live preview of a field of view of one or more cameras; and
   a representation of a filter picker user interface overlaid on the digital viewfinder, wherein the filter picker user interface corresponding to the representation of the filter picker user interface, when displayed, is overlaid on a respective portion of the camera application user interface;

while concurrently displaying the digital viewfinder and the representation of the filter picker user interface, detecting a first input that starts at a location corresponding to the respective portion of the camera application user interface, via the one or more input devices; and in response to detecting the first input that starts at the location corresponding to the respective portion of the camera application user interface:
   in accordance with a determination that first criteria are met, wherein the first criteria include a requirement that the filter picker user interface is overlaid on the respective portion of the live preview when the first input is detected, applying a preview of a first filter to the live preview of the field of view of the one or more cameras that was not applied before the first input was detected; and
   in accordance with a determination that the filter picker user interface is not overlaid on the respective portion of the live preview when the first input is detected, performing a respective operation in the camera application without applying the preview of the first filter to the live preview, wherein the respective operation is an operation changing a media capture setting of the camera application;

while displaying the filter picker user interface and while the first filter is being applied to the live preview of the field of view of the one or more cameras, detecting a swipe input on the camera application user interface that starts at a location on the filter picker user interface and moves across the filter picker user interface; and in response to detecting the swipe input, applying a preview of a second filter, different from the first filter, to the live preview of the field of view.

2. The non-transitory computer-readable storage medium of claim 1, the one or more programs further including instructions for:

while the filter picker user interface is displayed and not overlaid on the respective portion of the live preview, detecting a second input that starts at a location corresponding to the filter picker user interface; and in response to detecting the second input, expanding the filter picker user interface to overlay the respective portion of the live preview.

3. The non-transitory computer-readable storage medium of claim 1, wherein the filter picker user interface includes the representation of the filter picker user interface and representations of a plurality of filters.

4. The non-transitory computer-readable storage medium of claim 2, wherein expanding the filter picker user interface to overlay the respective portion of the live preview occurs without applying a preview of a filter to the live preview of the field of view of the one or more cameras that was not applied before the second input was detected.

5. The non-transitory computer-readable storage medium of claim 2, wherein the representation of the filter picker user interface, when in a first state, is a representation of a container object having a plurality of faces enclosing an internal volume that contains a representation of a first three-dimensional object.

6. The non-transitory computer-readable storage medium of claim 5, wherein, while the representation of the filter picker user interface is in a second state different than the first state, the representation of the container object is changed to remove shading and/or lighting effects.

7. The non-transitory computer-readable storage medium of claim 5, wherein the filter picker user interface includes the representation of the filter picker user interface and representations of a plurality of filters, while the representation of the filter picker user interface is in the first state, one or more of the faces of the plurality of faces or the internal volume has a visual appearance based on a currently selected filter of the plurality of filters.

8. The non-transitory computer-readable storage medium of claim 7, wherein, while the representation of the filter picker user interface is in a second state different than the first state, the visual appearance of the representation of the filter picker user interface is not based on the currently selected filter of the plurality of filters displayed within the internal volume.

9. The non-transitory computer-readable storage medium of claim 3, wherein:
   while the filter picker user interface is displayed and not overlaid on the respective portion of the live preview, the representation of the filter picker user interface and the representations of a plurality of filters are positioned along a line substantially parallel to an edge of the display.

10. The non-transitory computer-readable storage medium of claim 3, wherein:
   while the filter picker user interface is overlaid on the respective portion of the live preview, the representation of the filter picker user interface and the representations of the plurality of filters are positioned along a curved line.

11. The non-transitory computer-readable storage medium of claim 3, wherein the first input is a tap gesture and wherein the location corresponding to the respective portion of the live preview is a location corresponding to a representation of the first filter in the representations of the plurality of filters.

12. The non-transitory computer-readable storage medium of claim 3, wherein:
   the representation of the filter picker user interface includes a representation of the first filter, a representation of a second filter, and a representation of a third filter; and
   a value of a visual characteristic of the representation of the first filter is different than a value of the visual characteristic of the representation of the second filter and the value of the visual characteristic of the representation of the third filter.

13. The non-transitory computer-readable storage medium of claim 12, wherein:
the representation of the second filter is in first direction from the representation of the first filter;
the representation of the third filter is in the first direction from the representation of the second filter; and
the value of the visual characteristic progressively change in a first direction from the representation of the first filter to the representation of the second filter to the representation of the third filter.

14. The non-transitory computer-readable storage medium of claim 13, wherein when the filter picker user interface is overlaid on the respective portion of the live preview, the filter picker user interface includes additional information about the first filter displayed in association with the representation of the first filter.

15. The non-transitory computer-readable storage medium of claim 1, wherein the first input is a tap gesture and wherein performing the respective operation includes selecting a focus point for media capture at an object located in the field of view of the one or more cameras at the respective portion of the live preview at which the first input is detected.

16. The non-transitory computer-readable storage medium of claim 1, wherein the first input is a swipe gesture and wherein performing the respective operation includes changing a camera capture mode of the electronic device.

17. The non-transitory computer-readable storage medium of claim 3, the one or more programs further including instructions for:
while the filter picker user interface is displayed and overlaid on the respective portion of the live preview and while the first filter is being applied to the live preview of the field of view of the one or more cameras, detecting a third input that starts at a location corresponding to the filter picker user interface; and
in response to detecting the third input:
moving a representation of a second filter in the representations of the plurality of filters, to a location on the display that corresponds to a currently selected filter; and
applying a preview of the second filter to the live preview of the field of view.

18. The non-transitory computer-readable storage medium of claim 17, wherein the representation of the filter picker user interface is a representation of a second three-dimensional object having a plurality of faces, the one or more programs further including instructions for:
while the representation of the filter picker user interface is associated with a sixth representation of the representations of the plurality of filters and while the representation of the filter picker user interface presents a first face of the plurality of faces, detecting a sixth input that starts at a location corresponding to the filter picker user interface; and
in response to detecting the sixth input:
rotating a container object to present a second face of the plurality of faces that was not displayed prior to detecting the sixth input;
switching from the first filter being the currently selected filter to a second filter, different from the first filter, being the currently selected filter; and
applying a preview of the second filter to the live preview of the field of view.

19. The non-transitory computer-readable storage medium of claim 17, wherein applying preview of the second filter includes:
gradually transitioning between application of the preview of the first filter and application of the preview of the second filter.

20. The non-transitory computer-readable storage medium of claim 17, wherein further in response to detecting the third input, providing a tactile output.

21. A method, comprising:
at an electronic device with one or more cameras, one or more input devices, and a display:
displaying, on the display, a camera application user interface for a camera application, wherein the camera application user interface includes concurrently displaying:
a digital viewfinder including a live preview of a field of view of one or more cameras; and
a representation of a filter picker user interface overlaid on the digital viewfinder, wherein the filter picker user interface corresponding to the representation of the filter picker user interface, when displayed, is overlaid on a respective portion of the camera application user interface;
while concurrently displaying the digital viewfinder and the representation of the filter picker user interface, detecting a first input that starts at a location corresponding to the respective portion of the camera application user interface, via the one or more input devices; and
in response to detecting the first input that starts at the location corresponding to the respective portion of the camera application user interface:
in accordance with a determination that first criteria are met, wherein the first criteria include a requirement that the filter picker user interface is overlaid on the respective portion of the live preview when the first input is detected, applying a preview of a first filter to the live preview of the field of view of the one or more cameras that was not applied before the first input was detected; and
in accordance with a determination that the filter picker user interface is not overlaid on the respective portion of the live preview when the first input is detected, performing a respective operation in the camera application without applying the preview of the first filter to the live preview, wherein the respective operation is an operation changing a media capture setting of the camera application;
while displaying the filter picker user interface and while the first filter is being applied to the live preview of the field of view of the one or more cameras, detecting a swipe input on the camera application user interface that starts at a location on the filter picker user interface and moves across the filter picker user interface; and
in response to detecting the swipe input, applying a preview of a second filter, different from the first filter, to the live preview of the field of view.

22. The method of claim 21, the method further comprising:
while the filter picker user interface is displayed and not overlaid on the respective portion of the live preview, detecting a second input that starts at a location corresponding to the filter picker user interface; and
in response to detecting the second input, expanding the filter picker user interface to overlay the respective portion of the live preview.

23. The method of claim 21, wherein the filter picker user interface includes the representation of the filter picker user interface and representations of a plurality of filters.

24. The method of claim 22, wherein expanding the filter picker user interface to overlay the respective portion of the live preview occurs without applying a preview of a filter to the live preview of the field of view of the one or more cameras that was not applied before the second input was detected.

25. The method of claim 22, wherein the representation of the filter picker user interface, when in a first state, is a representation of a container object having a plurality of faces enclosing an internal volume that contains a representation of a first three-dimensional object.

26. The method of claim 25, wherein, while the representation of the filter picker user interface is in a second state different than the first state, the representation of the container object is changed to remove shading and/or lighting effects.

27. The method of claim 25, wherein the filter picker user interface includes the representation of the filter picker user interface and representations of a plurality of filters, while the representation of the filter picker user interface is in the first state, one or more of the faces of the plurality of faces or the internal volume has a visual appearance based on a currently selected filter of the plurality of filters.

28. The method of claim 27, wherein, while the representation of the filter picker user interface is in a second state different than the first state, the visual appearance of the representation of the filter picker user interface is not based on the currently selected filter of the plurality of filters displayed within the internal volume.

29. The method of claim 23, wherein:
while the filter picker user interface is displayed and not overlaid on the respective portion of the live preview, the representation of the filter picker user interface and the representations of a plurality of filters are positioned along a line substantially parallel to an edge of the display.

30. The method of claim 23, wherein:
while the filter picker user interface is overlaid on the respective portion of the live preview, the representation of the filter picker user interface and the representations of the plurality of filters are positioned along a curved line.

31. The method of claim 23, wherein the first input is a tap gesture and wherein the location corresponding to the respective portion of the live preview is a location corresponding to a representation of the first filter in the representations of the plurality of filters.

32. The method of claim 23, wherein:
the representation of the filter picker user interface includes a representation of the first filter, a representation of a second filter, and a representation of a third filter; and
a value of a visual characteristic of the representation of the first filter is different than a value of the visual characteristic of the representation of the second filter and the value of the visual characteristic of the representation of the third filter.

33. The method of claim 32, wherein:
the representation of the second filter is in first direction from the representation of the first filter;
the representation of the third filter is in the first direction from the representation of the second filter; and
the value of the visual characteristic progressively change in a first direction from the representation of the first filter to the representation of the second filter to the representation of the third filter.

34. The method of claim 33, wherein when the filter picker user interface is overlaid on the respective portion of the live preview, the filter picker user interface includes additional information about the first filter displayed in association with the representation of the first filter.

35. The method of claim 21, wherein the first input is a tap gesture and wherein performing the respective operation includes selecting a focus point for media capture at an object located in the field of view of the one or more cameras at the respective portion of the live preview at which the first input is detected.

36. The method of claim 21, wherein the first input is a swipe gesture and wherein performing the respective operation includes changing a camera capture mode of the electronic device.

37. The method of claim 23, the method further comprising:
while the filter picker user interface is displayed and overlaid on the respective portion of the live preview and while the first filter is being applied to the live preview of the field of view of the one or more cameras, detecting a third input that starts at a location corresponding to the filter picker user interface; and
in response to detecting the third input:
moving a representation of a second filter in the representations of the plurality of filters, to a location on the display that corresponds to a currently selected filter; and
applying a preview of the second filter to the live preview of the field of view.

38. The method of claim 37, wherein the representation of the filter picker user interface is a representation of a second three-dimensional object having a plurality of faces, the method further comprising:
while the representation of the filter picker user interface is associated with a sixth representation of the representations of the plurality of filters and while the representation of the filter picker user interface presents a first face of the plurality of faces, detecting a sixth input that starts at a location corresponding to the filter picker user interface; and
in response to detecting the sixth input:
rotating a container object to present a second face of the plurality of faces that was not displayed prior to detecting the sixth input;
switching from the first filter being the currently selected filter to a second filter, different from the first filter, being the currently selected filter; and
applying a preview of the second filter to the live preview of the field of view.

39. The method of claim 37, wherein applying preview of the second filter includes: gradually transitioning between application of the preview of the first filter and application of the preview of the second filter.

40. The method of claim 37, wherein further in response to detecting the third input, providing a tactile output.

41. An electronic device, comprising:
one or more cameras;
one or more input devices;
a display; one or more processors; and
memory storing one or more programs configured to be executed by the one or more processors, the one or more programs including instructions for:

displaying, on the display, a camera application user interface for a camera application, wherein the camera application user interface includes concurrently displaying:
- a digital viewfinder including a live preview of a field of view of one or more cameras; and
- a representation of a filter picker user interface overlaid on the digital viewfinder, wherein the filter picker user interface corresponding to the representation of the filter picker user interface, when displayed, is overlaid on a respective portion of the camera application user interface;

while concurrently displaying the digital viewfinder and the representation of the filter picker user interface, detecting a first input that starts at a location corresponding to the respective portion of the camera application user interface, via the one or more input devices; and in response to detecting the first input that starts at the location corresponding to the respective portion of the camera application user interface:
- in accordance with a determination that first criteria are met, wherein the first criteria include a requirement that the filter picker user interface is overlaid on the respective portion of the live preview when the first input is detected, applying a preview of a first filter to the live preview of the field of view of the one or more cameras that was not applied before the first input was detected; and
- in accordance with a determination that the filter picker user interface is not overlaid on the respective portion of the live preview when the first input is detected, performing a respective operation in the camera application without applying the preview of the first filter to the live preview, wherein the respective operation is an operation changing a media capture setting of the camera application;

while displaying the filter picker user interface and while the first filter is being applied to the live preview of the field of view of the one or more cameras, detecting a swipe input on the camera application user interface that starts at a location on the filter picker user interface and moves across the filter picker user interface; and in response to detecting the swipe input, applying a preview of a second filter, different from the first filter, to the live preview of the field of view.

42. The electronic device of claim 41, the one or more programs further including instructions for:
while the filter picker user interface is displayed and not overlaid on the respective portion of the live preview, detecting a second input that starts at a location corresponding to the filter picker user interface; and
in response to detecting the second input, expanding the filter picker user interface to overlay the respective portion of the live preview.

43. The electronic device of claim 41, wherein the filter picker user interface includes the representation of the filter picker user interface and representations of a plurality of filters.

44. The electronic device of claim 42, wherein expanding the filter picker user interface to overlay the respective portion of the live preview occurs without applying a preview of a filter to the live preview of the field of view of the one or more cameras that was not applied before the second input was detected.

45. The electronic device of claim 42, wherein the representation of the filter picker user interface, when in a first state, is a representation of a container object having a plurality of faces enclosing an internal volume that contains a representation of a first three-dimensional object.

46. The electronic device of claim 45, wherein, while the representation of the filter picker user interface is in a second state different than the first state, the representation of the container object is changed to remove shading and/or lighting effects.

47. The electronic device of claim 45, wherein the filter picker user interface includes the representation of the filter picker user interface and representations of a plurality of filters, while the representation of the filter picker user interface is in the first state, one or more of the faces of the plurality of faces or the internal volume has a visual appearance based on a currently selected filter of the plurality of filters.

48. The electronic device of claim 47, wherein, while the representation of the filter picker user interface is in a second state different than the first state, the visual appearance of the representation of the filter picker user interface is not based on the currently selected filter of the plurality of filters displayed within the internal volume.

49. The electronic device of claim 43, wherein:
while the filter picker user interface is displayed and not overlaid on the respective portion of the live preview, the representation of the filter picker user interface and the representations of a plurality of filters are positioned along a line substantially parallel to an edge of the display.

50. The electronic device of claim 43, wherein:
while the filter picker user interface is overlaid on the respective portion of the live preview, the representation of the filter picker user interface and the representations of the plurality of filters are positioned along a curved line.

51. The electronic device of claim 43, wherein the first input is a tap gesture and wherein the location corresponding to the respective portion of the live preview is a location corresponding to a representation of the first filter in the representations of the plurality of filters.

52. The electronic device of claim 43, wherein:
the representation of the filter picker user interface includes a representation of the first filter, a representation of a second filter, and a representation of a third filter; and
a value of a visual characteristic of the representation of the first filter is different than a value of the visual characteristic of the representation of the second filter and the value of the visual characteristic of the representation of the third filter.

53. The electronic device of claim 52, wherein:
the representation of the second filter is in first direction from the representation of the first filter;
the representation of the third filter is in the first direction from the representation of the second filter; and
the value of the visual characteristic progressively change in a first direction from the representation of the first filter to the representation of the second filter to the representation of the third filter.

54. The electronic device of claim 53, wherein when the filter picker user interface is overlaid on the respective portion of the live preview, the filter picker user interface includes additional information about the first filter displayed in association with the representation of the first filter.

55. The electronic device of claim 41, wherein the first input is a tap gesture and wherein performing the respective operation includes selecting a focus point for media capture at an object located in the field of view of the one or more cameras at the respective portion of the live preview at which the first input is detected.

56. The electronic device of claim 41, wherein the first input is a swipe gesture and wherein performing the respective operation includes changing a camera capture mode of the electronic device.

57. The electronic device of claim 43, the one or more programs further including instructions for:
  while the filter picker user interface is displayed and overlaid on the respective portion of the live preview and while the first filter is being applied to the live preview of the field of view of the one or more cameras, detecting a third input that starts at a location corresponding to the filter picker user interface; and
  in response to detecting the third input:
    moving a representation of a second filter in the representations of the plurality of filters, to a location on the display that corresponds to a currently selected filter; and
    applying a preview of the second filter to the live preview of the field of view.

58. The electronic device of claim 57, wherein the representation of the filter picker user interface is a representation of a second three-dimensional object having a plurality of faces, the one or more programs further including instructions for:
  while the representation of the filter picker user interface is associated with a sixth representation of the representations of the plurality of filters and while the representation of the filter picker user interface presents a first face of the plurality of faces, detecting a sixth input that starts at a location corresponding to the filter picker user interface; and
  in response to detecting the sixth input:
    rotating a container object to present a second face of the plurality of faces that was not displayed prior to detecting the sixth input;
    switching from the first filter being the currently selected filter to a second filter, different from the first filter, being the currently selected filter; and
    applying a preview of the second filter to the live preview of the field of view.

59. The electronic device of claim 57, wherein applying preview of the second filter includes:
  gradually transitioning between application of the preview of the first filter and application of the preview of the second filter.

60. The electronic device of claim 57, wherein further in response to detecting the third input, providing a tactile output.

* * * * *

UNITED STATES PATENT AND TRADEMARK OFFICE
CERTIFICATE OF CORRECTION

PATENT NO. : 11,204,692 B2
APPLICATION NO. : 16/733718
DATED : December 21, 2021
INVENTOR(S) : Behkish J. Manzari et al.

It is certified that error appears in the above-identified patent and that said Letters Patent is hereby corrected as shown below:

In the Claims

Claim 1, Column 119, Lines 7-57, adjust the indentations of the text to align with the following claim:
1. A non-transitory computer-readable storage medium storing one or more programs configured to be executed by one or more processors of an electronic device with one or more cameras, one or more input devices, and a display, the one or more programs including instructions for:
    displaying, on the display, a camera application user interface for a camera application, wherein the camera application user interface includes concurrently displaying:
        a digital viewfinder including a live preview of a field of view of one or more cameras; and
        a representation of a filter picker user interface overlaid on the digital viewfinder, wherein the filter picker user interface corresponding to the representation of the filter picker user interface, when displayed, is overlaid on a respective portion of the camera application user interface;
    while concurrently displaying the digital viewfinder and the representation of the filter picker user interface, detecting a first input that starts at a location corresponding to the respective portion of the camera application user interface, via the one or more input devices; and
    in response to detecting the first input that starts at the location corresponding to the respective portion of the camera application user interface:
        in accordance with a determination that first criteria are met, wherein the first criteria include a requirement that the filter picker user interface is overlaid on the respective portion of the live preview when the first input is detected, applying a preview of a first filter to the live preview of the field of view of the one or more cameras that was not applied before the first input was detected; and
        in accordance with a determination that the filter picker user interface is not overlaid on the respective portion of the live preview when the first input is detected, performing a respective operation in the camera application without applying the preview of the first filter to the live preview, wherein the respective operation is an operation changing a media capture setting of the camera application;
    while displaying the tiller picker user interface and while the first filter is being applied to the live preview of the field of view of the one or more cameras, detecting a swipe input on the camera Signed and Sealed this
Twenty-sixth Day of March, 2024

*Katherine Kelly Vidal*
Katherine Kelly Vidal
*Director of the United States Patent and Trademark Office* application user interface that starts at a location on the filter picker user interface and moves across the filter picker user interface; and in response to detecting the swipe input, applying a preview of a second filter, different from the first filter, to the live preview of the field of view.

In Column 121, Line 2, Claim 12, delete "the value" and insert -- a value --, therefor.

In Column 121, Line 6, Claim 13, delete "in first" and insert -- in a first --, therefor.

In Column 121, Line 10, Claim 13, delete "the value" and insert -- a value --, therefor.

In Column 121, Line 10, Claim 13, delete "change" and insert -- changes --, therefor.

Claim 21, Column 122, Lines 10-58, adjust the indentations of the text to align with the following claim:

21. A method, comprising:
> at an electronic device with one or more cameras, one or more input devices, and a display:
>> displaying, on the display, a camera application user interface for a camera application, wherein the camera application user interface includes concurrently displaying:
>>> a digital viewfinder including a live preview of a field of view of one or more cameras; and
>>> a representation of a filter picker user interface overlaid on the digital viewfinder, wherein the filter picker user interface corresponding to the representation of the filter picker user interface, when displayed, is overlaid on a respective portion of the camera application user interface;
>> while concurrently displaying the digital viewfinder and the representation of the filter picker user interface, detecting a first input that starts at a location corresponding to the respective portion of the camera application user interface, via the one or more input devices; and
>> in response to detecting the first input that starts at the location corresponding to the respective portion of the camera application user interface:
>>> in accordance with a determination that first criteria are met, wherein the first criteria include a requirement that the filter picker user interface is overlaid on the respective portion of the live preview when the first input is detected, applying a preview of a first filter to the live preview of the field of view of the one or more cameras that was not applied before the first input was detected; and
>>> in accordance with a determination that the filter picker user interface is not overlaid on the respective portion of the live preview when the first input is detected, performing a respective operation in the camera application without applying the preview of the first filter to the live preview, wherein the respective operation is an operation changing a media capture setting of the camera application;
>> while displaying the filter picker user interface and while the first filter is being applied to the live preview of the field of view of the one or more cameras, detecting a swipe input on the camera application user interface that starts at a location on the filter picker user interface and moves across the filter picker user interface; and
>> in response to detecting the swipe input, applying a preview of a second filter, different from the first filter, to the live preview of the field of view.

CERTIFICATE OF CORRECTION (continued)

U.S. Pat. No. 11,204,692 B2

In Column 123, Line 59, Claim 32, delete "the value" and insert -- a value --, therefor.

In Column 123, Line 62, Claim 33, delete "in first" and insert -- in a first --, therefor.

In Column 123, Line 66, Claim 33, delete "the value" and insert -- a value --, therefor.

In Column 123, Line 66, Claim 33, delete "change" and insert -- changes --, therefor.

Claim 41, Column 124, Lines 61-67, and Column 125, Lines 1-46, adjust the indentations of the text to align with the following claim:

41. An electronic device, comprising:
- one or more cameras;
- one or more input devices;
- a display;
- one or more processors; and
- memory storing one or more programs configured to be executed by the one or more processors, the one or more programs including instructions for:
  - displaying, on the display, a camera application user interface for a camera application, wherein the camera application user interface includes concurrently displaying:
    - a digital viewfinder including a live preview of a field of view of one or more cameras; and
    - a representation of a filter picker user interface overlaid on the digital viewfinder, wherein the filter picker user interface corresponding to the representation of the filter picker user interface, when displayed, is overlaid on a respective portion of the camera application user interface;
  - while concurrently displaying the digital viewfinder and the representation of the filter picker user interface, detecting a first input that starts at a location corresponding to the respective portion of the camera application user interface, via the one or more input devices; and
  - in response to detecting the first input that starts at the location corresponding to the respective portion of the camera application user interface:
    - in accordance with a determination that first criteria are met, wherein the first criteria include a requirement that the filter picker user interface is overlaid on the respective portion of the live preview when the first input is detected, applying a preview of a first filter to the live preview of the field of view of the one or more cameras that was not applied before the first input was detected; and
    - in accordance with a determination that the filter picker user interface is not overlaid on the respective portion of the live preview when the first input is detected, performing a respective operation in the camera application without applying the preview of the first filter to the live preview, wherein the respective operation is an operation changing a media capture setting of the camera application;
  - while displaying the filter picker user interface and while the first filter is being applied to the live preview of the field of view of the one or more cameras, detecting a swipe input on the camera application user interface that starts at a location on the filter picker user interface and moves across the filter picker user interface; and
  - in response to detecting the swipe input, applying a preview of a second filter, different from the first filter, to the live preview of the field of view.

In Column 126, Line 49, Claim 52, delete "the value" and insert -- a value --, therefor.

In Column 126, Line 52, Claim 53, delete "in first" and insert -- in a first --, therefor.

In Column 126, Line 56, Claim 53, delete "the value" and insert -- a value --, therefor.

In Column 126, Line 56, Claim 53, delete "change" and insert -- changes --, therefor.